US005245443A

United States Patent [19]

Burns

[11] Patent Number: 5,245,443

[45] Date of Patent: Sep. 14, 1993

[54] METHOD AND APPARATUS FOR CALIBRATING IMAGE OUTPUT FROM AN IMAGE GENERATING DEVICE

[75] Inventor: James M. Burns, Austin, Tex.

[73] Assignee: Southwest Software, Inc., Austin, Tex.

[21] Appl. No.: 909,731

[22] Filed: Jul. 7, 1992

Related U.S. Application Data

[63] Continuation of Ser. No. 592,022, Oct. 2, 1990, Pat. No. 5,170,257.

[51] Int. Cl.[5] .......................... H04N 1/21; H04N 1/23

[52] U.S. Cl. .................................... 358/298; 358/455; 358/456; 358/458; 358/461

[58] Field of Search ............... 358/298, 455, 456, 457, 358/458, 459, 460, 461, 406, 80, 214; 346/108, 160; 395/107, 109

[56] References Cited

U.S. PATENT DOCUMENTS

| | | | |
|---|---|---|---|
| 5,0170,257 | 12/1992 | Burns | 358/298 |
| 4,004,079 | 1/1977 | Boston | 358/302 |
| 4,833,627 | 5/1989 | Leszczynski | 395/145 |
| 5,157,482 | 10/1992 | Cosgrove | 358/214 X |
| 5,170,261 | 12/1992 | Cargill et al. | 358/298 |
| 5,172,224 | 12/1992 | Collette et al. | 358/80 |

*Primary Examiner*—Benjamin R. Fuller
*Assistant Examiner*—Eric Frahm
*Attorney, Agent, or Firm*—Arnold, White & Durkee

[57] ABSTRACT

An improved method and apparatus for calibrating halftone output images is provided which calibrates subsequent halftone input images with varying imagesetter outputs such as image resolutions, exposure intensities and screen frequencies. Calibration is programmably achieved by programmably selecting a specific calibration set for each corresponding uncalibrated halftone input image. The selected calibration set and mapping transfer function automatically compensates or adjusts the uncalibrated input image for any value of resolution, intensity and screen frequency to produce a calibrated halftone output image in either positive or negative sense output and usable on either paper or film photographic medium. Once the calibrated halftone output is programmably produced, it can then be photoprocessed according to conventional chemical processing means. The present invention represents a substantial improvement in precision and speed by which halftone output images are calibrated in the typeset industry.

13 Claims, 3 Drawing Sheets

PERCENTAGE DOT AREA MEASUREMENTS
MULTIPLE IPI
HIGH RES.
LOW RES.
FILM
PAPER
UNCALIBRATED OUTPUT
PHOTO PROCESSOR
CALIBRATED OUTPUT
PHOTO EXPOSURE
RECORDER
INVERT
RASTER IMAGE PROCESSOR
RASTER MEMORY
DOT GENERATOR
TRANSFER FUNCTION
CALIBRATION FUNCTION
SELECTOR
CAL. SETS
HALFTONE PARAMETERS
EXPOSURE INTENSITY
RESOLUTION
PAGE DESCRIPTION LANGUAGE

METHOD AND APPARATUS FOR CALIBRATING IMAGE OUTPUT FROM AN IMAGE GENERATING DEVICE

This is a continuation of application Ser. No. 07/592,022, filed Oct. 2, 1990 now U.S. Pat. No. 5,170,257.

BACKGROUND OF THE INVENTION

Incorporated herein is a computer program listing printout appendix of source code used to generate calibration sets and calibration transfer functions of a test pattern to enable calibration of halftone output images according to the present invention. Copyright, 1990, Southwest Software Inc. A portion of the disclosure of this patent document contains material which is subject to copyright protection. The copyright owner has no objection to the facsimile reproduction by anyone of the "Program Printcut Appendix", as it appears in the Patent and Trademark Office Patent file or records, but otherwise reserves all copyright rights whatsoever.

This invention relates to a method and apparatus for calibrating halftone output images from an imagesetting device. In particular, the present method and apparatus comprises steps and devices involved in producing a plurality of calibration sets and in using those calibration sets to adjust the uncalibrated halftone input images to produce calibrated output images as a function of image resolution, exposure intensity and screen frequency. Further, the calibration sets can be generated to produce halftone output images on either film or paper and for either positive or negative representation of the halftone input image.

Typically, there are four fundamental steps involved in producing typeset-quality output from a computer front end publishing system such as, e.g., a PostScript imagesetter (or typesetter). First, an application programed (a drawing or page layout package) is used to find what is wanted or actually printed on the paper or film. Second, the "print" option from the program is used to start the printing process. Typically, the print option translates what is seen on the screen into a page description language that the imagesetter can recognize. The page description language is what is then sent to the imagesetter.

Many conventional imagesetter systems consist of raster image processors (RIP) and recorders. An exemplary RIP is one sold under the Model No. RIP-30 by Linotype Company of Hauppauge, New York. The RIP performs the third step in the process by converting the page description language sent to it from the front end into a raster or a grid of lines. Each line contains a series of pixels, which can be considered as a list of dots which turn on or off to form the image. In the fourth step, the RIP sends this raster to the recorder, which uses a modulated light source to expose the image onto either photographic film or paper. An exemplary recorder is one sold as Model No. Linotype-330, also by Linotype Company. The photographic medium, in a light-tight takeup cassette, is then removed from the recorder and photo developed by a conventional chemical process.

All imagesetters have a light source intensity adjustment to provide proper exposure of the film. Exposed areas turn black on both photographic film medium or paper medium after development. The amount or degree of blackness, called "density" is a function of how much the film is exposed. Strictly speaking, density is a measure of how much light is blocked by a piece of film. Conversely, if photographic paper is used, density is the measure of how much light is not reflected. Higher density values correspond to a "blacker" piece of film.

These films are typically used in the publishing industry to make contact printing plates. For reasons of quality and ease of production in printing plate manufacture, it is desirable that the maximum density measurement on a film be in excess of 4.00. The maximum density available is a function of the light source intensity, the photographic medium and the process and chemicals used for development.

Since conventional printing processes cannot reproduce continuous tone tints or images, gray scales (tints) and halftones are approximated in page description languages by overlying a halftone grid on top of the recorder's pixel grid. The halftone grid, often called a screen, is specified by the number of halftone cells per inch (or lines per inch) and the angle from the vertical by which the halftone grid is rotated. Each cell of the half tone grid encompasses a specific number of pixels of the recorder's pixel grid. A continuous tone image is simulated by assigning a gray value to each halftone cell contained within the image. Thus, imagesetters which use PostScript® are unable to produce shades of gray directly, generally approximate shades of gray by utilizing the aforementioned halftone technique. Halftone grids overlying the top of the pixel grids allows for a shade of gray to be approximated by turning a certain percentage of pixels on. The gray value of the halftone is obtained by averaging the gray continuous tone values contained within the dimensional boundaries of the halftone cell. Each halftone cell approximates a shade of gray by turning on, in dot shape, a certain percentage of the pixels contained within the cell. As the cell needs to be darker, more of the pixels are turned on. Theoretically, a 50% gray tint is made by turning on 50% of the pixels in a half-tone cell. These conventional techniques are well known in the art.

Associated with halftones is the problem commonly discovered by densitometers. A densitometer is a scientific instrument that measures density, or the ability of a piece of film to block light. The blacker the film, the more light it absorbs, and the higher the density reading on the densitometer. When measured with a densitometer, a halftone area that was supposed to be 50% gray will typically (for paper positive) be darker, because the higher exposure intensity needed for a higher maximum density (Dmax) tends to expand the pixel size, causing the overall halftone-dot to be larger than it actually is. Thus, halftone images, when uncalibrated, produce a gray value which is typically darker than that which the gray value should be. That is, when 50% of the pixels within a halftone cell are exposed, the resulting dark area covers more than 50% of the area contained by the halftone cell. At a dot area value of 0%, none of the halftone cell's pixels are exposed; at 100% dot value area, all of the pixels are exposed. Both 0% and 100% are always obtainable, therefore a non-linear relationship exists between the commanded dot area (or gray value) and the dot area actually achieved. A series of tint boxes in 5% intervals between 0% and 100% is commonly called a "gray scale".

The non-linear response of the gray scale is a function of the resolution of the recorder pixel grid, the light source intensity, the photographic media (film or paper) and the screen grid. These, however, are not the sole contributors to gray scale non-linearity. Contributing factors include the recorder light source, different film batches and photoprocessor chemicals.

Page description languages referred to hereinabove usually contain a mechanism to correct for non-linearities in gray scale and halftone output. An exemplary page description language is one sold under the trade name PostScript®, by Adobe Systems Inc. of Mountain View, Calif. The mechanism Adobe included in PostScript® is called the "transfer function", and it provides the lowest level means to calibrate the imagesetter to correct for non-linear gray scale response PostScript® transfer functions suffers an important disadvantage in not having the ability to compensate for all the numerous variables which typically cause the non-linear response, e.g., resolution variation in media, resolution, screen frequency exposure intensity, etc.

Not only are conventional imagesetters, and transfer functions therein, lacking in necessary complexity so as to compensate for numerous variations in, e.g., the resolution of the image to be calibrated, the exposure intensity of the to-be-developed image, the screen frequency, etc., but conventional devices also cannot produce precision transfer functions applicable to color image processing. Current imagesetters are black and white devices and "process color" reproductions are produced by overprinting the colored inks yellow, cyan, megenta and black. The colors of an image are "separated" into yellow, cyan, megenta and black components and are then outputted on black and white film in precise percentages. The films, called color separations, represent the amount of process color needed in each area of the page, and are used to make the printing plates. The imagesetter produces black and white, and the ink used with the final printing plate produces color. The RIP and imagesetter mechanism that produces tints and halftones also produces color separations. The key difference is that each color separation is rotated with respect to the others and its respective line per inch specification is slightly different. The rotation and change in lines per inch specification avoids the dots lining up in a moire pattern. While gray scale calibration is mostly insensitive to rotation, it is a function of the halftone lines per inch.

Gray scale calibration is well known in the industry. A series of pre-determined gray scale tint boxes, at pre-determined dot areas, are requested of the RIP and imagesetter, through the page description language, and each tint box on the resulting film is measured with a dot-area densitometer described hereinabove. The resulting measurement, called a "transfer curve" is then used to adjust the requested dot area by an amount necessary to achieve calibrated output.

However, as mentioned above, conventional transfer curves suffer many inherent disadvantages. Existing art divides the method in which the gray scale calibration adjustments are effected into two categories: application program-based and RIP-based. In application program-based gray scale calibration, an attempt is made to compensate for the non-linearities by sending an adjusted transfer curve immediately before the print job. This process is tedious and error prone because it requires an operator to construct a transfer curve under identical output conditions to the present, and to properly identify and select a specific curve to be sent with the print job. This process is duplicated for each application program, and for each imagesetter. If there are multiple front ends sending the imagesetter print jobs, then the files containing the curves must be distributed and managed. The number of transfer curves can become unruly. In an effort to reduce the number of transfer curves required, conventional methods require limiting the number of output conditions which can be specified. For instance, if film negatives at high resolutions of 150 lines per inch was the only output condition, then only one transfer curve per application, per imagesetter would be required. This is typically the case for closed reproduction systems, such as that mentioned in U.S. Pat. Nos. 4,075,662 and 4,500,919. The limitation on output conditions, however, is unrealistic and impractical with multi-function RIPs and imagesetters such those used in Model Nos. RIP-30 and Linotronic-330. A typical production environment using this equipment may require 24 transfer curves, for 5 applications, for 2 imagesetters. This would yield 240 separate transfer curves ($24\times5\times2=240$). If these curves were distributed among four front ends, then the operator would have to manage 960 separate files. In practice, the number of transfer curves used is a balance of output flexibility versus the number of curves to manage.

The second method by which conventional calibration adjustments are made, or RIP-based calibration, was formed as an attempt to reduce the number of curves and files required to support a minimum of output flexibility. Thus, RIP-based calibration is an approach used to calibrate the RIP and the imagesetter as a unit, so that all front ends and all application programs assume the device produces a linear gray scale. This process requires an operator to construct a transfer curve under identical output conditions to the present, and to properly identify and select that curve for use in the RIP and imagesetter. In the existing art, the operator loads the single curve into violative memory within the RIP. This is not repeated for each application programmable front end. In our example, this has the net effect of reducing a number of transfer curves needed from 240 to 48, and the number of files from 960 to 48. Although RIP-based calibration is effective in reducing the number of transfer curves, current RIP-base calibration techniques do not utilize many of the variable inputs which can effect the transfer curve. Furthermore, conventional RIP-based calibration requires manual selection and loading of the transfer curve appropriate to the current output conditions. Manual selection and loading for each transfer curve is not only inefficient but difficult to incorporate and thus, it is error-prone.

Accordingly, current calibration methodology requires that separate transfer curves be constructed to account for the plurality of variable inputs. Included with those inputs is either positive or negative output sense conditions. Images can be outputted in either a positive or negative format, one format or sense being the inversion of the other. Images, lines and type in a page description language are usually specified from the front end in a positive sense. The RIP and imagesetter can output any positive sense, or can switch to a negative independent of the page description. The negative sense is useful in many printing processes. Conventional methods for specifying a negative output sense are as follows:

1. Mathematically, through the transfer function and its interaction with the page description language. This method converts a gray value to negative by subtracting the gray value from 100 prior to halftone dot generation. Hence, a 0% gray value becomes 100%, 25% becomes 75%, etc.

2. Electronically, by inverting the pixel stream in the RIP prior to it leaving the RIP. A gray value is converted to a raster-based halftone dot, the halftone dot is placed in the RIP's raster memory, and after the complete page description is processed, the raster memory is transferred from the RIP in serial fashion to the recorder. Each bit in the pixel stream is inverted; that is, if the bit were on, it is turned off, if the bit were off, it is turned on. This produces a negative image, but because it has the effect of "turning the halftone dot inside out" the transfer curve required to produce the negative calibrated output is substantially different from that used with the mathematical negative.

3. Electronically, by inverting the pixel stream in the recorder immediately after it enters the recorder. This method is substantially similar to the second method above, and uses the same transfer as the second method in order to calibrate.

In practice, these methods are multiplicate in nature. That is, each of the three output sense settings shown above are set either positive or negative, and combine to produce an image. The negative of a negative is a positive. For example, the first method shown above places the output sense setting as positive, and the second and third method each set output sense setting as positive and the resultant image is positive. However, if method one places sense setting as negative, but method two places sense as negative and method three as positive, the resultant image is also positive. The transfer curve for these two cases, however, are different and this must be recognized by the operator for successful calibration. Thus, regardless of which method is used or whether or not the methods are multiplicated such that more than one method is used, an operator must set the methodology each time positive or negative output sense conditions are specified. Accordingly, conventional methods shown above which set sense output are often prone to operator error.

The net result of conventional art and all the complexities described hereinabove, is that halftone calibration for imagesetters with multiple output conditions such as, e.g., resolution, media, halftone frequency, screen intensity and sense/polarity output, is non-intuitive, labor-intensities, tedious and therefore error prone. Current methods require an inordinate amount of attention from the operator for success.

SUMMARY OF THE INVENTION

The problems outlines above are in large part solved by the method and apparatus of the present invention. That is, the halftone output image calibration method and apparatus hereof provides programmable convenience capability in programming imagesetters with variable output conditions. More specifically, the present invention is capable of calibrating halftone output images at various image resolutions, exposure intensities and screen frequencies. Thus, by simply changing, in software, input variables such as resolution, intensity, frequency, sense (polarity) and/photographic medium (film or paper), a more precisely calibrated halftone output is achieved from standard imagesetting devices. The present invention takes into account many variables in its calibration method and apparatus so that a more precisely calibrated output is achieved.

Broadly speaking, the present invention contemplates a method of calibrating halftone output images obtained from a standard imagesetting device. In this method of calibrating halftone output images, a halftone input image is provided with targeted or requested gray value density. The halftone images are then chemically processed and reproduced on photographic media.. The resultant gray values of each halftone image is a function of image resolution, exposure intensity and screen frequency. A densitometer is used to measure the density of each halftone image, and a plurality of calibration sets are then generated corresponding to the variation between the requested gray value density and the respective measured density reading from the densitometer. The calibration sets are then used to convert subsequent plurality of halftone input images to respective plurality of calibrated halftone output images. The method of calibrating halftone images further includes storing the calibrations sets in a local memory medium and programmably retrieving a selected calibration set so as to convert the subsequent halftone input image to a calibrated halftone output image. Conversion, or calibration, can compensate for variation in the imagesetting device's current settings of image resolution, exposure intensity and screen frequency. The calibration method can also calibrate depending upon whether or not the calibrated halftone output image is to be positive or negative or is received on either film or paper photographic medium.

As a further embodiment, the present invention also contemplates a method of calibrating halftone output images from an imagesetting device comprising providing a halftone input image with requested gray value densities, wherein each gray value density is a function of image resolution, exposure intensity and screen frequency of the input image. The uncalibrated halftone input images are chemically processed and thereby exposed on photographic medium so that they can be measured by a densitometer. A plurality of calibration sets are then generated corresponding to the variation between the requested gray value density and the density measured by the densitometer for each halftone input image and at varying values of image resolution, exposure intensity, screen frequency and photographic medium which is to receive the resultant halftone output image. Subsequent halftone input images can be mapped through a transfer function curve or process capable of transferring either positive or negative gray value densities of the subsequent halftone input image to either positive or negative gray value densities of calibrated halftone output image.

The present invention also contemplates an apparatus for generating calibrated halftone output images from an imagesetting device, comprising a halftone input image having a plurality of gray values representing various shades of the halftone input image. Means is provided for converting the input image into a page description languages recognizable by a computer. A raster image processor within the computer is configured for receiving the page description language and converting that language into a raster representation of the halftone input image. A recorder is also connected to the raster image processor to expose the raster representation onto a photographic media such as paper, film, etc. A photoprocessor is then configured to receive the media for chemically developing the photographic media. A densitometer is used to measure the density of each gray value developed photographic media. The variations between measured density of the densitometer and corresponding actual density in entered into a computer in the form of programmed calibration sets. Thus, subsequent uncalibrated halftone input images, which are converted into page description language and inputted into the computer, are applied to a corresponding selected calibration set stored in the computer. The selected calibration set programmably adjusts the uncalibrated halftone input image to produce a calibrated halftone output image. Mapping means is provided for mapping either positive or negative sense representations of the subsequent uncalibrated halftone input images through the raster image processor, recorder, photoprocessor and then outputted on the photographic medium as calibrated positive or negative sense output halftone images. The raster image processor, in conjunction with programmably selected calibration sets and transfer function, provides for rapid and precise calibration of halftone output images before they are photoprocessed.

Therefore, the present application contemplates a new system for calibrating halftone output from imagesetting devices. In one aspect of the invention, a special test strip pattern is constructed from an uncalibrated halftone input image into page description language of the imagesetting device. The test strip pattern contains gray scale requests. This pattern is outputted in an uncalibrated or unadjusted fashion from the imagesetter, developed with a photoprocessor and then measured with a densitometer for its actual density or percent dot area. These measurements, called the halftone response function, combine with the output sense, resolution, exposure intensity and screen frequency with which the test strip was created in order to ultimately produce a polarity of calibration sets.

The calibration set construction process is repeated for each combination of resolution, exposure intensity, and screen frequency of which the operator wishes to calibrate. The calibration set is used in a transfer function process, in which all requested gray values are mapped to values so chosen to provide calibrated output, that is, gray value output measured with a densitometer as being equal to that gray value requested. Thus, the present invention achieves gray value calibration by programmably compensating or adjusting, via calibration sets, the uncalibrated halftone input image. The transfer function used for calibration is the inverse of the halftone response function. The halftone response function is inverted through a look-up table combined with an interpolation process.

In another aspect of the present invention, the plurality of calibration sets are deposited in a raster image processor in such a fashion that once deposited, they no longer require any operator attention for successful use other than periodic checks to verify their continued accuracy. Further, since the calibration sets are deposited in the raster image processor, each is available for use independent of the application program or the page description. A calibration set (and its resulting transfer curve) is automatically selected for use depending upon the current imagesetter setting or resolution, exposure intensity and halftone screen frequency.

In still a further aspect of the present invention, the present method and device provides means by which a transfer curve is programmably provided so that halftone output image sense is mathematically derived from the halftone input image and all the output sense conditions along with resolution, intensity and screen frequency. Namely, a single calibration set at a resolution, exposure intensity and halftone screen frequency is used to calibrate both positive and negative images, whether or not the images are produced with mathematical or electronic inversion included.

DETAILED DESCRIPTION OF THE PREFERRED EMBODIMENTS

Figure 1:
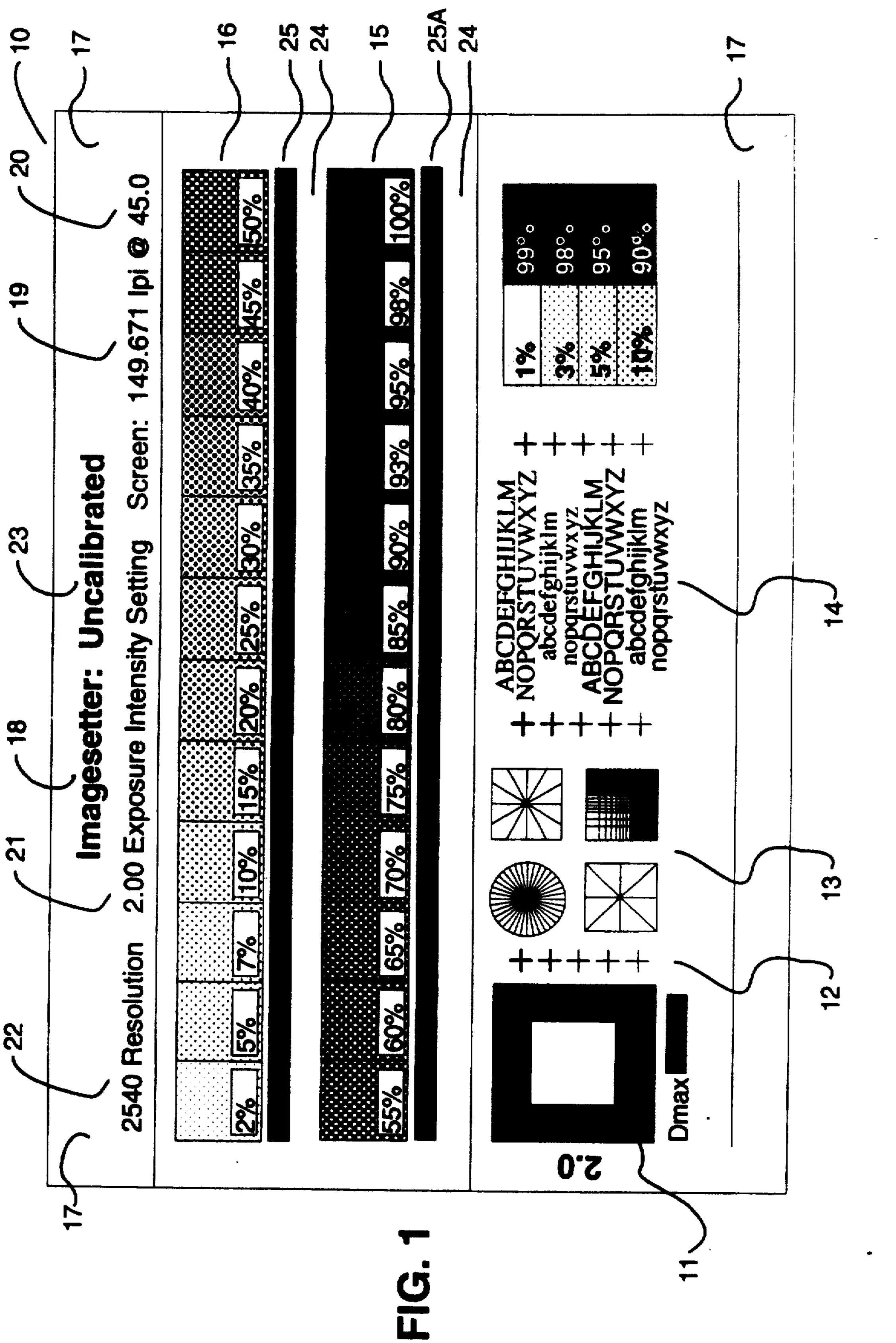
FIG. 1 is a plan view of a sample test strip pattern used by the present invention in setting the imagesetter exposure intensity setting and generating halftone response function for calibration set construction.

Referring to the drawings, FIG. 1 illustrates a sample test strip pattern used by the present invention. In particular, FIG. 1 illustrates an exemplary uncalibrated halftone input image processed in the form of a test pattern 10 representing numerous indicia usable for subsequent calibration of halftone input images. Included within pattern 10 is a solid area 11 along with targets 12, 13 and 14. Targets 12, 13 and 14 are useful in setting the exposure intensity of the halftone image to as a high a value as possible without overexposing the image placed on a media such as film. Solid area 11 and targets 12, 13 and 14 are examined on pattern 10 for evidence of film overexposure so that corrections can be made prior to the imagesetting process. Also included in test pattern 10 are two gray scales 15 and 16 usable in measuring various degrees of densities or gray values ranging between 2% and 100%. 0% is capable of being read from any clear space 17 on pattern 10. It is important to note that pattern 10 is merely a sample and does not indicate all the various forms of test patterns which can be obtained by the present invention. Furthermore, pattern 10 is placed upon a photographic media such as a film so that density readings can be obtained therefrom by a standard densitometer. It is envisioned, however, that other forms of photographic media may be used provided densities can be read therefrom by a standard densitometer. Thus, photographic media such as paper or photographic plates are also possible.

Included for identification of an operator viewing test pattern 10, is the imagesetter name 18 and various parameters which effect the calibrated halftone output image such as, e.g., screen frequency 19, angle of rotation 20 of the halftone image with respect to the type set page, the imagesetter light source exposure intensity 21 and the imagesetter pixel grid resolution 22. Also shown is indicator 23 useable for determining if the gray scale shown on pattern 10 is uncalibrated output (as shown in FIG. 1) or an attempt at calibrated output (not shown). Thus, FIG. 1 illustrates uncalibrated halftone test pattern 10 usable for establishing calibration sets disclosed hereinbelow. Included under each gray scale tint box (2%-100%), is an area 24 usable for recording gray scales with positive output sense. Area 25A is used for recording gray scale areas with negative output sense. Thus, the sample test pattern 10 shown in FIG. 1 is produced with a positive output since area 25A contains positive-output-sense-recorded test patterns.

Figure 2:
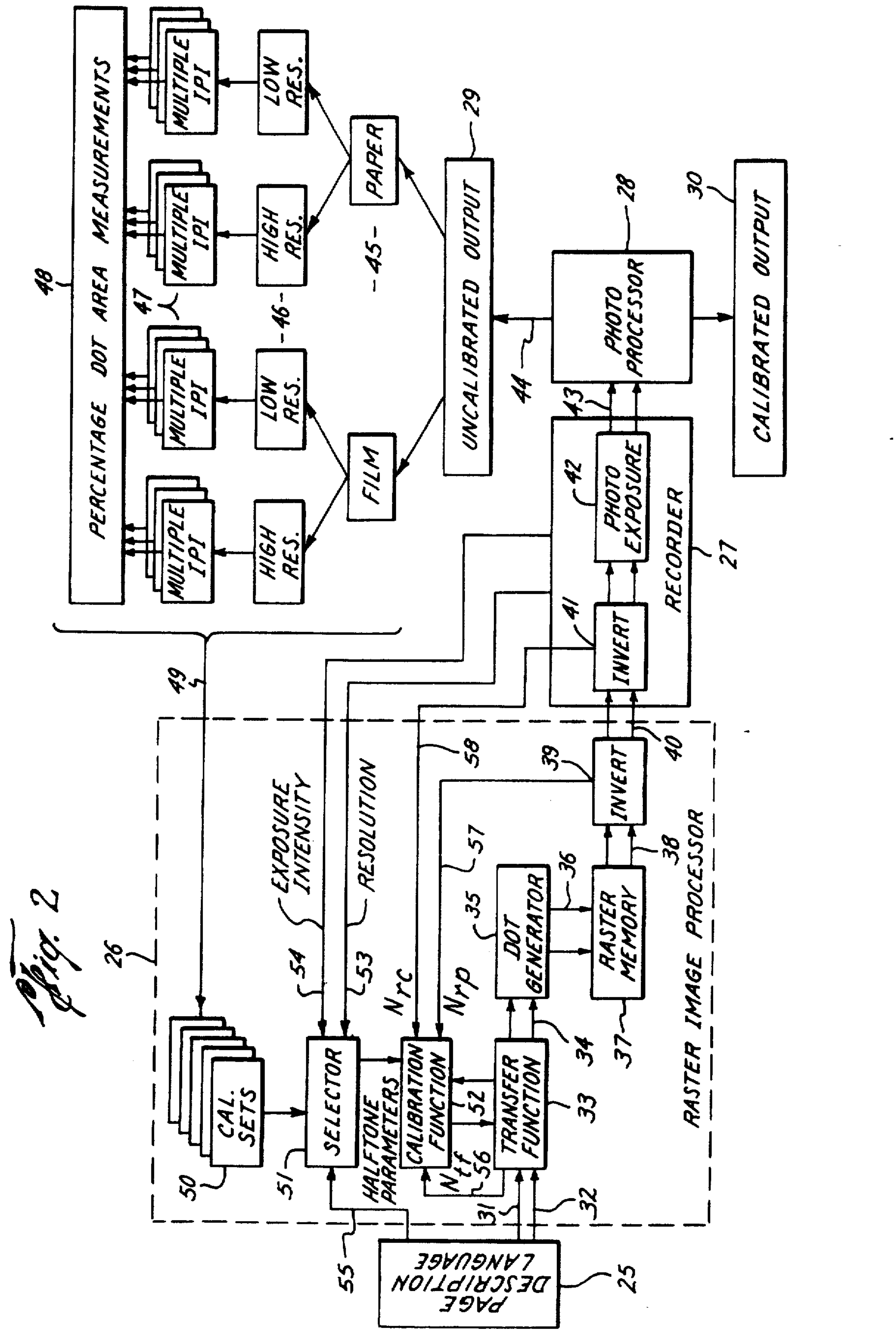
FIG. 2 is a diagrammatic block representation of the present invention showing various components along with the flow of data and steps used in the calibration process; and, FIG. 3 is a graph depicting the method by which, given a calibration set selected for resolution, exposure intensity and halftone screen frequency, the transfer function is derived for the proper output sense condition.

Turning now to FIG. 2, calibrated halftone output images are created by computer front-ends in a page description language 25 as shown. Language 25 is then sent to an imagesetter comprised of a raster image processor, or a RIP, 26. RIP 26 then converts language 25 into a raster format which is then sent to recorder 27. Recorder 27 records the halftone input image on photographic media and delivers that media to photoprocessor 28 for chemical processing and development. Output from photoprocessor 28 is then characterized in one of two categories, namely, uncalibrated halftone output images 29 or calibrated halftone output images 30. Uncalibrated output 29 is then used to characterize the halftone response of the imagesetter, film and photoprocessor system for different combinations of media, resolution and halftone frequency 45, 46 and 47, respectively.

Test pattern 10 shown in FIG. 1 can thereby be encoded from page description language 25 to begin the calibration process. Namely, description language of a halftone image corresponding to test pattern 10 is sent via channel 31 to RIP 26. Test pattern 10 is then ultimately imaged at a predetermined media 45, resolution 46 and halftone frequency 47. First, the gray values in test pattern 10 are mapped through transfer function 33. Note that line art and text, through black in a positive page image, is still considered a gray value of 100%, and is passed through transfer function 33. Not shown, and not germane to this discussion, are the mechanisms that RIP 26 uses to generate the actual text in line art images included in a complete page description.

For purpose of forming calibration sets and characterizing the halftone response, transfer function 33 is set to the unitary function; that is the output gray value equals the input value. Also possible, and equally usable, is an inverse linear transfer function, in which the percent gray value is subtracted from 100% to invert the image. The output value equals 100% minus the input value. Unity or inverse transfer function 33 is set at user direction through page description language 25.

After transfer function 33 (which may have caused a negative image), gray values 34 pass to halftone dot generation section 35. RIP 26 then creates a separate halftone dot proportional in size, usually linear, to each gray value 34. Halftone dots representing each gray value 36 are placed in raster memory 37. Raster memory 37 contains a pixel-by-pixel translation of page description 25. When page description 25 has been completely processed, page image 38 is passed through a conditional invertor 39. Invertor 39 is enabled to produce a negative at user direction through page description language 25.

After the pixel stream 40 leaves RIP 26, it enters recorder 27 and is passed through a similar conditional invertor 41. This invertor 41 is also enabled under user direction through page description language 25. From invertor 41, the pixel stream is used to modulate a light source scanning in raster fashion 42 which then produces a photographic media of the latent image corresponding to test pattern 10 representation of the uncalibrated halftone input image.

The film with the exposed test pattern 43 corresponding to halftone input image test pattern 10, is then developed by photoprocessor 28. Photoprocessor 28 has been used extensively in the art, and therefore, it is not discussed herein.

The processor 28 which produces uncalibrated test pattern images 44 is activated for each combination of media, resolution and halftone frequency desired, 45, 46 and 47, respectively. Test pattern films 43 are divided into a specific media category 45 (film or paper), resolution 46 (high or low) and halftone screen frequencies 47 (multiple lines per inch). Note that while FIG. 2 shows two types of media 45, two resolution values 46 and three halftone screen frequencies 47, it is clearly within the scope and spirit of this invention to include multiple values beyond two types of media, two resolution values and three halftone screen frequencies.

Upon obtaining media 45, resolution 46 and screen frequencies 47 of uncalibrated output 29, the operator can then measure the test pattern gray scales 15 and 16 (shown in FIG. 1) with a standard dot-area densitometer 48. The record of these measurements, along with output sense (either positive or negative), media, exposure intensity, resolution and halftone frequency constitute a calibration set 49. A plurality of calibration sets 50 may be created, stored in RIP 26, and used with transfer function 33 to linearize the imagesetter's halftone response. One or more calibration sets 49 are transferred to RIP 26 in a manner well known in the art. RIP 26 is constructed with a selector 51 and calibration function 52. Thus, selector functions to select a given calibration set 50 within RIP 26 to provide linearized, calibrated halftone response output.

Once calibration sets 50 are obtained and transfer function 33 is in place, subsequent halftone input images can then be calibrated in accordance with calibration sets 50 and transfer function 33. Accordingly, at the start of processing any subsequent halftone input image in the form of subsequent page description language 32, selector 51 is called upon to select a corresponding calibration set 50 appropriate to the current system conditions such as e.g., exposure intensity 21, media 45, resolution 46, screen frequency 47, etc. Current media 45 is determined by a one-to-one mapping process with the exposure intensity 54 which is determined from recorder 27 by query. For example, all film test strips 10 are exposed at the same exposure intensity setting 21 and all paper test strips are exposed at the same exposure intensity setting 21. A requirement of the present invention is that exposure intensity settings 21 be different for each different media 45 (paper or film). In practice, this causes no difficulty. In the event that two different media are properly exposed at the same exposure intensity setting 21, the present invention requires that one media be shifted in exposure intensity. This shift is at most 0.4%, a negligible amount. In this manner, selector 51 can determine which group of calibration set is appropriate to the current media 45 by examining the exposure intensity setting only.

Next, selector 51 narrows the list of possible sets by examining the current resolution 53 from recorder 27. The halftone parameters 55, notably halftone screen frequency, are determined either from default within RIP 26 or may be overridden by page description language 25. Once media 45, resolution 46 and screen frequency 47 are determined, selector 51 examines the group of calibration sets 50 for a match, and if a match is found, it presents the found calibration set to the calibration function 52. In the event that a calibration set match is not found, selector 51 presents a no set, which has the net effect of providing unadjusted halftones. This method of operation has the advantage of not disabling output in the event that halftone input images could not be calibrated—a desirable outcome to many operators. In another embodiment of the present invention, selector 51 terminates current page description 25 if a calibration set could not be found.

Note that in the current art, page description 25 may specify any halftone screen frequency 47 from the practical limits of 40 lines per inch to 300 lines per inch. It would be unreasonable and unworkable to construct a calibration set 50 for every halftone frequency that could be specified. Evidence from testing has shown that a given calibration set at a given halftone screen frequency is accurate at a frequency significantly different from that at which the set was measured. For instance, a calibration set measured at 150 lines per inch may be accurate within a tolerance of 1% for ±15 lines per inch. It is a feature of the present invention that the operator may specify a halftone frequency range for which a calibration set may apply. Selector 51 matches the current halftone frequency to a halftone range, consisting of a starting frequency spanning to an ending frequency, inclusive. The halftone ranges for calibration set at a given exposure intensity 21 and a given resolution 46 are not allowed to overlap, thereby yielding the possibility of only one match. This method has the significant advantage of not allowing the operator to vary the number of calibration sets for various frequencies depending upon the operator's accuracy requirements.

As gray values 32 are specified in page description language where halftone input images are to be calibrated, gray values are mapped through transfer function 33. Transfer function 33 is a convenient way to map user gray values to values that are presented to dot generator 35 of RIP 26 so that the end result is a calibrated halftone output image. Transfer function 33, however, has multiple uses. Page description language 25 may specify an inverted transfer function 33 in order to produce a negative image. In this case, the invention concatenates calibration function 52 with the one specified through page description language 25. Care is taken to ensure that calibration function 52 is not concatenated more than once.

The output sense can be provided by either the default transfer function 33 or of one specified via page description 56 provided to calibration function 52, along with the sense of conditional RIP invertor 57, and the sense of conditional recorder invertor 58. These various data inputs provide the present invention with bases for calibrating or mapping within calibration function 52. Mapping or calibration according to sense of conditional RIP invertor 39 and conditional recorder invertor 41 is described with the aid of FIG. 3.

Figure 3:
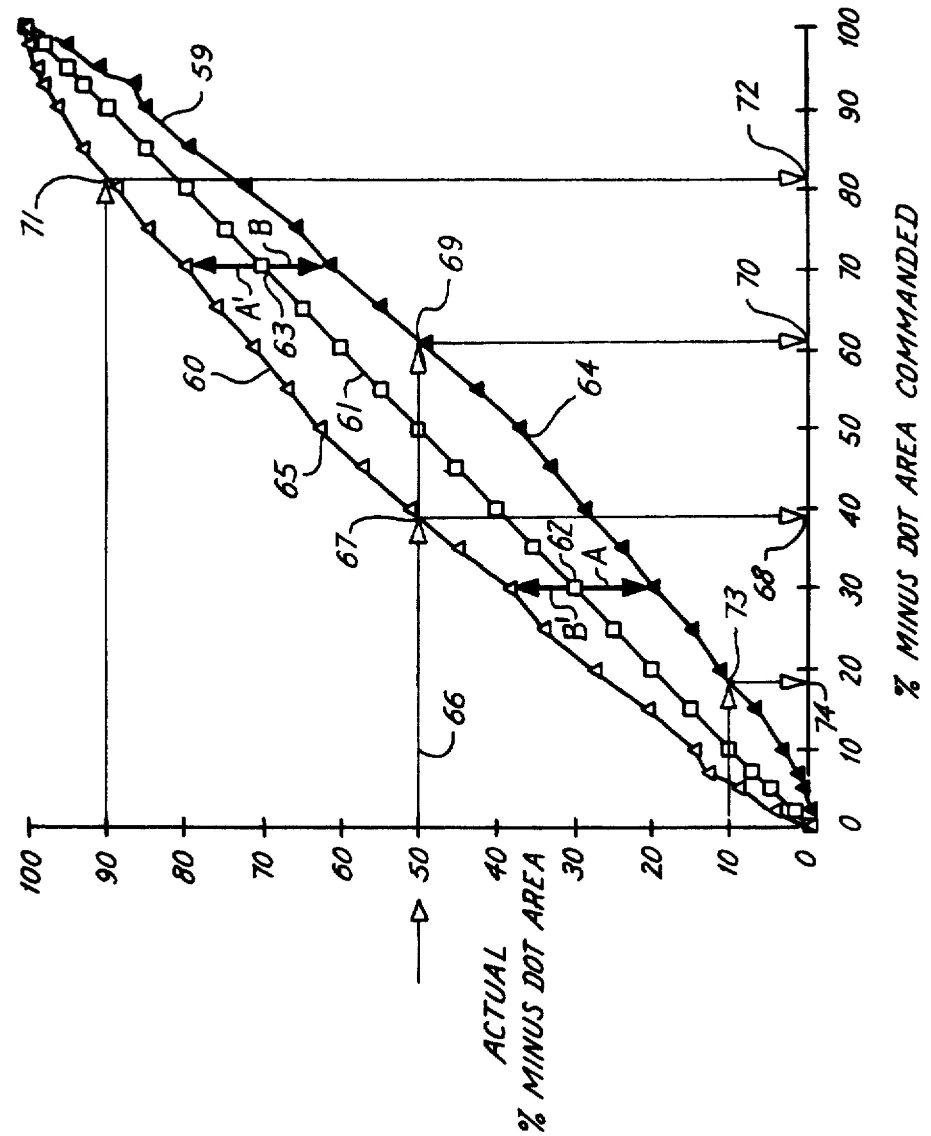

Shown in FIG. 3 is a graphical depiction of the halftone response contained in a typical calibration set. The ordinate and abscissa are in % minus dot area, a typical and widely used halftone measurement for negatives. Dot area measurements are usually spoken of in terms of printed dots on the page. That is, a 10% dot area means that 10% of a given area is covered by dots, or is mostly white. But for a negative that would be used to produce a printing plate that would make a 10% dot area, the area is mostly black, or 90% of the area on the negative is covered by dots. For convenience, this area is called a 10% minus dot area, since the negative produces a 10% dot.

Negative curve 59 of FIG. 3 results if the halftone measurement taken on gray scales 15 and 16 of FIG. 1 were taken from a negative; rather, they were minus dot measurements. If so, positive curve 60 can be constructed from curve 59. In the alternative, if halftone measurements taken on gray scales 15 and 16 were taken from a positive, then they are plotted on curve 60 and negative curve 59 is constructed from positive curve 60. Curve 61 is the unity function, and is shown for reference.

Curve 60 is a complementary curve constructed from curve 59 in the following manner: for each % minus dot area commanded, such as point 62, there is a corresponding point 63 for positive dots, which is simply expressed as 100% less the minus dot point value. At point 62, the difference of the commanded value to the actual value recorded, the distance A, is transferred to the corresponding point 63, in opposite sense, as the distance A'. In like manner, point 63's distance to the negative curve B is transferred to point 62 in opposite fashion as distance B'. The magnitude of A equals A', and the magnitude B equals B' for each corresponding point along curve 61. At points 64 and 65, A equals A' equals B equals B'.

It is a feature of the present invention that the measurement points are symmetric about 50%. That is, a measurement of 2% corresponds to a measurement of 98%, a 5% to 95%, a 7% to 93%, etc. While not mandatory for construction of the complementary curve, this arrangement merely simplifies the algorithms and assures accuracy.

The purpose of the calibration function 52 is to invert the halftone response function from the selected calibration set 50, depending upon the output sense conditions 56, 57 and 58. The present invention relies on the fact that the measured halftone response is usable regardless of the state of the three output sense conditions 56, 57 and 58. Calibration functions 52 is dependent on the individual output sense conditions. Because the effect of the conditional pixel invertors 39 and 41 can be combined through the use of the "exclusive or" function, there are four principal sense conditions to deal with: 1) the transfer function 56 (Ntf) is positive, and invertors 39 and 41 produce a positive for a positive image; 2) Ntf is negative and the invertors 39 and 41 produce a positive for a negative image; 3) Ntf is positive and the invertors 39 and 41 produce a negative for a negative image; and 4) Ntf is negative and the invertors 39 and 41 produce a negative for a positive image.

The above four principal sense conditions are described hereinbelow. In the case where Ntf is positive and invertors are also positive, the dot area value from transfer function 33 is in positive dot, so it is first converted to minus by subtracting from 100%. For an input value of 50%, calibration function follows line 66 until in intersects curve 60 at point 67. This occurs at a given percent dot area-to-command point 68. The value to command from point 68 is then subtracted from 100% and output along path 34 to dot generator 35 of FIG. 2. Other transfer values are computed in like manner by intersecting curve 60. In the case where Ntf is negative and invertors 39 and 41 are positive, the dot area is used directly. For an input value of 50%, calibration function 52 follows line 66 until in intersects curve 59 at point 69. This occurs at a given percent dot area-to-command point 70. The value to command from point 70 is then used directly and output along path 34 to dot generator 35 of FIG. 2. Note that the commanded values for 50% positive and 50% negative are identical, and the commanded value for 25% positive and 75% negative are identical. It is worth mentioning at this point that the use of two curves is not mandatory. The mathematical relationship between positive and negative dot area measurements is straight forward, but the use of two curves here is advantageous for recording the halftone response measurement and to help understand the operation of transfer function 33 and calibration of function 52. If Ntf is positive and invertors 39 and 41 are negative, the dot area value from transfer function 33 is used directly. For this case, however, calibration function 52 intersects the positive curve 60 even though a negative image will ultimately be formed. From an input value of 90%, the curve is intersected at point 71, for a commanded value at point 72. The command value at point 72 is used directly and is sent along path 34 to the dot generator 35. Still further, if Ntf is negative and invertors 39 and 41 are negative, the dot area value from transfer function 33 is inverted by subtracting from 100%. For an input value of 90%, this converts to 10%. The calibration function intersects the negative curve 59, even though a positive image will ultimately be formed. From an input value of 10%, the curve is intersected at point 73. The value to command from point 73 is then subtracted from 100% and is sent along path 34 to dot generator 35.

Note that the last two examples shown above produce the same absolute gray value output. Again, the use of two curves is not mandatory but is helpful for explanation purposes.

The invention herein described assumes short term stability in the photoprocessor 28, photographic media 43 and photo exposure mechanism 42. Significant effort within the current art is devoted to assuring the stability of these three items. In practice, the calibration sets 50, which are a function of these three items, have been shown to be accurate for periods exceeding four weeks, provided there are good controls on the photographic processes. In the event of major change, such as a change in the type of film, chemicals or processor, the existing calibration sets 50 may need to be discarded and new ones created. The present invention provides for easy verification of the calibration set accuracy and can be easily changed.

The current embodiment of the present invention also assumes that dot generator 35 on FIG. 2, produces a fixed dot shape that varies only with gray value requested. In another embodiment of the invention, the dot shape is allowed to change. This replicates the groups 45, 46 and 47 for each different dot shape. Dot shape is also included in the calibration sets 50 and the dot shape is taken into account by selector 51 with input from dot generator 35.

The foregoing description of the present invention has been directed to particular preferred embodiments. It will be apparent, however, to those skilled in the art that modifications and changes in both apparatus and method may be made without departing from the scope and spirit of the invention. For example, the present invention contemplates functioning with any standard raster image processor for any form of output media. Furthermore, the present invention also contemplates use in any standard personal computer which can programmably receive calibration sets and apply those calibrations sets to any form of input page description language. Therefore, it is the applicant's intention in the following claims to cover all such equivalent modifications and variations which fall within the true spirit and scope of this invention.

PROGRAM PRINTOUT APPENDIX

```
{$P}
{MTSM.p}
{copyright © 1989-1990 Southwest Software Inc.}

PROGRAM TSM;

USES
    {$LOAD MacIntf.LOAD}
        MemTypes, QuickDraw, OSIntf, ToolIntf, PackIntf,
    {$LOAD UMacApp.LOAD}
        UMAUtil, UViewCoords, UFailure, UMemory, UMenuSetup, UObject, UList, UAssociation, UMacApp,
    {$LOAD}
        SANE,
        UTEView,
        UGridView,
        UDialog,
        UPrinting,
        UPAP,
        UExtendedText,
        UTSM;

const   ApplLimit = $0130;

type ApplPtr = ^LongInt;

VAR
    {The application object:}
    gTSMApplication:   TTSMApplication;


BEGIN

    {Allocate a larger Stack}
    SetApplLimit (Ptr(ApplPtr(ApplLimit)^ - 8192));

    {Initialize the Toolbox, making 8 calls to MoreMasters:}
    InitToolbox(8);

    {Initialize the UPrinting unit:}
    InitPrinting;

    {Allocate a new TTSMApplication object:}
    New(gTSMApplication);

    {Initialize that new object:}
    gTSMApplication.ITSMApplication(kFileType);

    {Run the application.  When it's done, exit.}
    gTSMApplication.Run;
END.
```

```
/* Copyright © 1989,1990 Jim Burns, Robert Burns & Southwest Software Inc. */
/* All rights reserved. */

#define IncludeRipMaster false
#define spotdrop 41
#define spotdrop2 64

#ifdef Debugging
include MacAppRFiles"Debug.rsrc";
#endif
include MacAppRFiles"MacApp.rsrc";
include MacAppRFiles"Printing.rsrc";
include MacAppRFiles"NewPAP.rsrc";
include "TSMPicts.rsrc";
#define kPSizePopup     235
#define cPSizePopup     1100
#define cUSLetter       1101
#define cUSLegal        1102
#define cA4Letter       1103
#define cB5Letter       1104
#define cTabloid        1105
#define cLetterSideways 1106
#define cLetterExtra    1107
#define cLetterExtraSideways    1108
#define cCopyJobLog     1200
#define cWriteJobLog    1201
#define programname "RIPMaster"
#define programname2 "Precision"


#define cbtcr           2010
#define cbtmd           2011
#define cbtrm           2012
#define cbtul           2013
#define cbtdl           2014
#define cbtgs           2015
#define cbtvr           2016

#define cCalRemove      2020
#define cCalInstall     2021
#define cImageTestStrip 2022
#define cCheckCalibration 2023

#define cNewCal         11
#define cOpenCal        21

#define kResPopup       236
#define cResPopup       3000
#define cRes3386        3001
#define cRes2540        3002
#define cRes1693        3003
#define cRes1270        3004
#define cRes635         3005
#define cResOther       3006



include "TSM" 'CODE';

resource 'res!' (1000, purgeable) {
    {  /* array StringArray: 2 elements */
       /* [1] */
       "ARes2";
    }
```

```
};

type 'vers' {
    byte;       /* first part Of version number in BCD */
    byte;       /* second and third parts */
    byte development=0x20, alpha=0x40, beta=0x060, release=0x080;
    byte;       /* Stage of non-release */
    integer Country;    /*contry code */
    pstring;    /* Short version number string */
    pstring;    /* Long version number string */
};


resource 'vers' (2) {
    0x01, 0x01, 0x80, 0x00, 0x00, "1.1",
    "Precision v1.1"
};

resource 'vers' (1) {
    0x01, 0x01, 0x80, 0x00, 0x00, "1.1",
    "1.1 (US) © 1989,1990 "
    "Southwest Software Inc."
};

type    'SWA3' {
        pstring;
};

resource 'SWA3' (0, purgeable) {
    programname2
    "™ Version 1.1 Copyright © 1990 Southwest Software Inc."
};



resource 'BNDL' (128) {
    'SWA3',
    0,
     {  /* array TypeArray: 2 elements */
        /* [1] */
        'ICN#',
         {  /* array IDArray: 2 elements */
            /* [1] */
            0, 128;
            /* [2] */
#if IncludeRipMaster
            1, 129;
            /* [3] */
            2, 130
#else
            1, 129
#endif
        };
        /* [2] */
        'FREF',
         {  /* array IDArray: 2 elements */
            /* [1] */
            0, 128;
            /* [2] */
#if IncludeRipMaster
            1, 129;
            /* [2] */
            2, 130
#else
```

```
            1, 129
#endif
        }
    }
};

resource 'FREF' (128) {
    'APPL',
    0,
    ""
};

resource 'FREF' (129) {
    'SWF3',
    1,
    ""
};

#if IncludeRipMaster
resource 'FREF' (130) {
    'SWF1',
    2,
    ""
};
#endif
resource 'ICN#' (128) {
    { /* array: 2 elements */
        /* [1] */
        $"00 00 00 00 00 00 00 00 00 00 00 00 00 00 00 00"
        $"00 00 00 40 00 00 40 80 18 00 E0 80 1C 01 51 00"
        $"0E 01 51 00 07 02 4A 08 03 B2 4A 10 01 C4 44 20"
        $"00 E8 46 40 00 78 4A 81 00 3C 49 06 00 1E 53 38"
        $"00 3F 54 C0 00 4F EB 40 00 47 FC 40 00 81 F0 20"
        $"00 80 F0 20 01 00 60 10 02 00 40 08 02 00 40 08"
        $"01 C0 40 70 00 38 43 80 00 07 5C 00 00 00 E0",
        /* [2] */
        $"00 00 00 00 00 00 00 00 00 00 00 00 00 00 00 00"
        $"00 00 00 40 00 00 40 80 18 00 E0 80 1C 01 F1 00"
        $"0E 01 F1 00 07 03 FA 08 03 83 FA 10 01 C7 FC 20"
        $"00 EF FE 40 00 7F FE 81 00 3F FF 06 00 1F FF 38"
        $"00 3F FF C0 00 7F FF C0 00 7F FF C0 00 FF FF E0"
        $"00 FF FF E0 01 FF FF F0 03 FF FF F8 03 FF FF F8"
        $"01 FF FF F0 00 3F FF 80 00 07 FC 00 00 00 E0"
    }
};

resource 'ICN#' (129) {
    { /* array: 2 elements */
        /* [1] */
        $"1F FF FC 00 10 00 06 00 10 00 05 00 10 00 04 80"
        $"10 00 04 40 10 00 04 20 10 00 07 F0 10 00 00 10"
        $"10 00 00 10 10 00 00 10 10 00 00 10 10 00 08 10"
        $"13 02 10 10 13 87 20 10 11 CA A2 10 10 EA C4 10"
        $"10 72 C8 10 10 3A F0 10 10 3F 66 10 10 4E F8 10"
        $"10 47 90 10 10 82 08 10 11 02 04 10 11 82 0C 10"
        $"10 72 70 10 10 0F 80 10 10 00 00 10 10 00 00 10"
        $"10 00 00 10 10 00 00 10 10 00 00 10 1F FF FF F0",
        /* [2] */
        $"1F FF FC 00 1F FF FE 00 1F FF FF 00 1F FF FF 80"
        $"1F FF FF C0 1F FF FF E0 1F FF FF F0 1F FF FF F0"
        $"1F FF FF F0 1F FF FF F0 1F FF FF F0 1F FF FF F0"
        $"1F FF FF F0 1F FF FF F0 1F FF FF F0 1F FF FF F0"
        $"1F FF FF F0 1F FF FF F0 1F FF FF F0 1F FF FF F0"
        $"1F FF FF F0 1F FF FF F0 1F FF FF F0 1F FF FF F0"
```

```
        $"1F FF FF F0 1F FF FF F0 1F FF FF F0 1F FF FF F0"
        $"1F FF FF F0 1F FF FF F0 1F FF FF F0 1F FF FF F0"
    }
};

#if IncludeRipMaster

resource 'ICN#' (130, purgeable, preload) {
    { /* array: 2 elements */
        /* [1] */
        $"0F FF FE 00 08 00 03 00 08 00 02 80 08 00 02 40"
        $"08 00 02 20 08 00 02 10 08 00 03 F8 08 00 00 08"
        $"08 00 00 08 08 00 00 08 08 00 00 08 08 7F FF 08"
        $"08 D5 55 88 08 AA AB 88 08 D5 55 88 08 9A AF 88"
        $"08 C5 5D 88 08 92 B7 88 08 C5 5D 88 08 90 B7 88"
        $"08 C5 DD 88 08 93 F7 88 08 C7 FD 88 08 9F FF 88"
        $"08 DF FD 88 08 BF FF 88 08 FF FF 88 08 7F FF 08"
        $"08 00 00 08 08 00 00 08 08 00 00 08 0F FF FF F8",
        /* [2] */
        $"0F FF FE 00 0F FF FF 00 0F FF FF 80 0F FF FF C0"
        $"0F FF FF E0 0F FF FF F0 0F FF FF F8 0F FF FF F8"
        $"0F FF FF F8 0F FF FF F8 0F FF FF F8 0F FF FF F8"
        $"0F FF FF F8 0F FF FF F8 0F FF FF F8 0F FF FF F8"
        $"0F FF FF F8 0F FF FF F8 0F FF FF F8 0F FF FF F8"
        $"0F FF FF F8 0F FF FF F8 0F FF FF F8 0F FF FF F8"
        $"0F FF FF F8 0F FF FF F8 0F FF FF F8 0F FF FF F8"
        $"0F FF FF F8 0F FF FF F8 0F FF FF F8 0F FF FF F8"
    }
};

#endif


resource 'STR#' (1000, purgeable) {
    {   /* array StringArray: 2 elements */
        /* [1] */
        "Document          User          Status   Completion  Type    Pgs  In   Time     ";
        /* [2] */
        "Document          User          Status   Completion  Type    Pgs  Cm   Time     ";
        /* [3] */
        "Document          User          Status   Completion  Type    Pgs  Pc   Time     ";
        /* [4] */
        "Document          User          Status   Completion  Type    Pgs  Cr   Time     "
    }
};

resource 'STR#' (1001, purgeable) {
    {   /* array StringArray: 2 elements */
        /* [1] */
        "In.";
        /* [2] */
        "Cm.";
        /* [3] */
        "Picas";
        /* [4] */
        "Cr."
    }
};

resource 'STR#' (1002, purgeable) {
    {   /* array StringArray: 2 elements */
        /* [1] */
        "                                                        --- ----";
        /* [2] */
```

```
        "     Feed & Cut                                          ";
        /* [3] */
        "---------------------------------------------------------------------------";
        /* [4] */
        "<updating>"
    }
};

resource 'STR#' (1003, purgeable) {
     {  /* array StringArray: 2 elements */
        /* [1] */
        "idle;";
        /* [2] */
        "busy;";
        /* [3] */
        "waiting;";
        /* [4] */
        "printing;";
        /* [5] */
        "initializing;"
    }
};

resource 'STR#' (1004, purgeable) {
     {  /* array StringArray: 2 elements */
        /* [1] */
        "None";
        /* [2] */
        "Disabled";
        /* [3] */
        "Enabled"
    }
};

#if IncludeRipMaster

resource 'view' (1001, purgeable) {
    { /* array viewArray: 6 elements */
        /* [1] */
        root, 'WIND',
        { /* array: 1 elements */
            /* [1] */
            50, 10
        },
        { /* array: 1 elements */
            /* [1] */
            285, 498
        }, sizeVariable, sizeVariable, notShown, enabled,
        Window {
            "TWindow",
            zoomDocProc,
            goAwayBox,
            resizable,
            modeless,
            ignoreFirstClick,
            freeOnClosing,
            disposeOnFree,
            doesntCloseDocument,
            dontOpenWithDocument,
            dontAdaptToScreen,
            stagger,
            forceOnScreen,
            dontCenter,
            'TSMG',
```

```
        ""
    },
    /* [2] */
    'WIND', 'TSMG',
    { /* array: 1 elements */
        /* [1] */
        0, 0
    },
    { /* array: 1 elements */
        /* [1] */
        285, 498
    }, sizeRelSuperView, sizeRelSuperView, shown, disabled,
    View {
        "TTSMView"
    },
    /* [3] */
    'TSMG', 'btcl',
    { /* array: 1 elements */
        /* [1] */
        5, 380
    },
    { /* array: 1 elements */
        /* [1] */
        16, 100
    }, sizeFixed, sizeFixed, shown, enabled,
    Button {
        "TButton",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        "Clear Log"
    },
    /* [5] */
    'TSMG', 'SCRH',
    { /* array: 1 elements */
        /* [1] */
        25, 0
    },
    { /* array: 1 elements */
        /* [1] */
        20, 498 - kSBarSizeMinus1
    }, sizeFixed, sizeRelSuperView, shown, disabled,
    Scroller {
        "TScroller",
        noVertScrollBar,
        noHorzScrollBar,
        256,
        256,
        16,
```

```
        16,
        noVertConstrain,
        noHorzConstrain,
        {0, 0, 0, 0}
    },
    /* [6] */
    'SCRH', 'jghd',
    { /* array: 1 elements */
        /* [1] */
        0, 4
    },
    { /* array: 1 elements */
        /* [1] */
        20, 270
    }, sizeVariable, sizeVariable, shown, enabled,
    TextGridView {
        "THeadGridView",
        1,
        1,
        16,
        30,
        1,
        4,
        dontAdornRows,
        dontAdornCols,
        singleSelection,
        underline,
        9,
        { /* array: 3 elements */
            /* [1] */
            0x0,
            /* [2] */
            0x0,
            /* [3] */
            0x0
        },
        "Monaco"
    },
    /* [3] */
    'TSMG', 'SCRL',
    { /* array: 1 elements */
        /* [1] */
        45, 0
    },
    { /* array: 1 elements */
        /* [1] */
        285 - kSBarSizeMinus1 - 45,
        498 - kSBarSizeMinus1
    }, sizeRelSuperView, sizeRelSuperView, shown, disabled,
    Scroller {
        "TScroller",
        VertScrollBar,
        HorzScrollBar,
        256,
        256,
        12,
        16,
        noVertConstrain,
        noHorzConstrain,
        {0, 0, 0, 0}
    },
    /* [4] */
    'SCRL', 'jgrd',
    { /* array: 1 elements */
```

```
        /* [1] */
        0, 4
    },
    { /* array: 1 elements */
        /* [1] */
        150, 270
    }, sizeVariable, sizeVariable, shown, enabled,
    TextGridView {
        "TJobGridView",
        10,
        1,
        12,
        30,
        2,
        4,
        dontAdornRows,
        dontAdornCols,
        singleSelection,
        plain,
        9,
        { /* array: 3 elements */
            /* [1] */
            0x0,
            /* [2] */
            0x0,
            /* [3] */
            0x0
        },
        "Monaco"
    },
    'TSMG', 'gsnm',
    { /* array: 1 elements */
        /* [1] */
        5, 10
    },
    { /* array: 1 elements */
        /* [1] */
        16, 256
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        12,
        { /* array: 3 elements */
            /* [1] */
            0x0,
            /* [2] */
            0x0,
            /* [3] */
            0x0
        },
        "",
        justLeft,
        ""
    },
    'TSMG', 'uptx',
    { /* array: 1 elements */
```

```
            /* [1] */
            5, 272
        },
        { /* array: 1 elements */
            /* [1] */
            16, 100
        }, sizeFixed, sizeFixed, shown, disabled,
        StaticText {
            "TStaticText",
            0b0,
            {1, 1},
            sizeable,
            notDimmed,
            notHilited,
            doesntDismiss,
            {0, 0, 0, 0},
            plain,
            9,
            { /* array: 3 elements */
                /* [1] */
                0x0,
                /* [2] */
                0x0,
                /* [3] */
                0x0
            },
            "Monaco",
            justLeft,
            ""
        }
    }
};

resource 'view' (1002, purgeable) {
    { /* array viewArray: 6 elements */
        /* [1] */
        'root', 'TSMP',
        { /* array: 1 elements */
            /* [1] */
            0, 0
        },
        { /* array: 1 elements */
            /* [1] */
            285, 432
        }, sizeVariable, sizeVariable, shown, disabled,
        View {
            "TTSMViewP"
        },
        /* [6] */
        'TSMP', 'jghp',
        { /* array: 1 elements */
            /* [1] */
            25, 0
        },
        { /* array: 1 elements */
            /* [1] */
            20, 270
        }, sizeVariable, sizeVariable, shown, enabled,
        TextGridView {
            "THeadGridView",
            1,
            1,
            16,
            30,
```

```
        1,
        4,
        dontAdornRows,
        dontAdornCols,
        singleSelection,
        underline,
        9,
        { /* array: 3 elements */
            /* [1] */
            0x0,
            /* [2] */
            0x0,
            /* [3] */
            0x0
        },
        "Courier"
    },
    'TSMP', 'jgrp',
    { /* array: 1 elements */
        /* [1] */
        45,0
    },
    { /* array: 1 elements */
        /* [1] */
        150, 270
    }, sizeVariable, sizeVariable, shown, enabled,
    TextGridView {
        "TJobGridView",
        10,
        1,
        12,
        30,
        2,
        4,
        dontAdornRows,
        dontAdornCols,
        singleSelection,
        plain,
        9,
        { /* array: 3 elements */
            /* [1] */
            0x0,
            /* [2] */
            0x0,
            /* [3] */
            0x0
        },
        "Courier"
    },
    'TSMP', 'gsnp',
    { /* array: 1 elements */
        /* [1] */
        5, 10
    },
    { /* array: 1 elements */
        /* [1] */
        16, 256
    }, sizeFixed, sizeFixed, shown, disabled,
    StaticText {
        "TStaticText",
        0b0,
        {1, 1},
        sizeable,
        notDimmed,
```

```
            notHilited,
            doesntDismiss,
            {0, 0, 0, 0},
            plain,
            12,
            { /* array: 3 elements */
                /* [1] */
                0x0,
                /* [2] */
                0x0,
                /* [3] */
                0x0
            },
            "",
            justLeft,
            ""
        }

    }
};
resource 'view' (1000, purgeable) {
    { /* array viewArray: 19 elements */
        /* [1] */
        root, 'WND2',
        { /* array: 1 elements */
            /* [1] */
            50, 20
        },
        { /* array: 1 elements */
            /* [1] */
            150, 465
        }, sizeVariable, sizeVariable, notShown, enabled,
        Window {
            "TWindow",
            noGrowDocProc,
            goAwayBox,
            notResizable,
            modeless,
            ignoreFirstClick,
            freeOnClosing,
            disposeOnFree,
            closesDocument,
            openWithDocument,
            dontAdaptToScreen,
            stagger,
            dontForceOnScreen,
            dontCenter,
            noID,
            "<<<>>>"
        },
        /* [2] */
        'WND2', 'DLOG',
        { /* array: 1 elements */
            /* [1] */
            0, 0
        },
        { /* array: 1 elements */
            /* [1] */
            150, 460
        }, sizeVariable, sizeVariable, shown, disabled,
        DialogView {
            "TTSMConfigView",
            noID,
            noID
```

```
),
/* [3] */
'DLOG', 'VW02',
{ /* array: 1 elements */
    /* [1] */
    0, 15
},
{ /* array: 1 elements */
    /* [1] */
    16, 128
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    justLeft,
    "Typesetter Name: "
},
/* [4] */
'DLOG', 'tsnm',
{ /* array: 1 elements */
    /* [1] */
    20, 15
},
{ /* array: 1 elements */
    /* [1] */
    20, 429
}, sizeFixed, sizeFixed, shown, enabled,
EditText {
    "TEditText",
    0b1111,
    {1, 1},
    sizeable,
    notDimmed,
    notHilited,
    doesntDismiss,
    {2, 2, 2, 2},
    plain,
    0,
    { /* array: 3 elements */
        /* [1] */
        0x0,
        /* [2] */
        0x0,
        /* [3] */
        0x0
    },
    "A",
```

```
        justLeft,
        "testing",
        93,
        0b1111000000000000000000000100000000
    },
    /* [5] */
    'DLOG', 'VW04',
    { /* array: 1 elements */
        /* [1] */
        48, 20
    },
    { /* array: 1 elements */
        /* [1] */
        88, 200
    }, sizeFixed, sizeFixed, shown, disabled,
    Cluster {
        "TCluster",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        "Status Window"
    },
    /* [6] */
    'VW04', 'VW06',
    { /* array: 1 elements */
        /* [1] */
        36, 32
    },
    { /* array: 1 elements */
        /* [1] */
        16, 64
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
```

```
        0x0
    },
    "",
    justRight,
    "Roll Size: "
},
/* [7] */
'VWC4', 'rlsz',
{ /* array: 1 elements */
    /* [1] */
    36, 100
},
{ /* array: 1 elements */
    /* [1] */
    20, 50
}, sizeFixed, sizeFixed, shown, enabled,
NumberText {
    "TSmartNumberText",
    0b1111,
    {1, 1},
    sizeable,
    notDimmed,
    notHilited,
    doesntDismiss,
    {2, 2, 2, 2},
    plain,
    0,
    { /* array: 3 elements */
        /* [1] */
        0x0,
        /* [2] */
        0x0,
        /* [3] */
        0x0
    },
    "A",
    justRight,
    "1800",
    unlimited,
    0b1111000000000000000000100000000,
    1800,
    0,
    3600
},
/* [8] */
'VW04', 'runt',
{ /* array: 1 elements */
    /* [1] */
    37, 153
},
{ /* array: 1 elements */
    /* [1] */
    15, 43
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
```

```
        0,
        { /* array: 3 elements */
            /* [1] */
            0x0,
            /* [2] */
            0x0,
            /* [3] */
            0x0
        },
        "",
        justLeft,
        "In."
    },
    /* [9] */
    'VW04', 'VW11',
    { /* array: 1 elements */
        /* [1] */
        59, 5
    },
    { /* array: 1 elements */
        /* [1] */
        20, 90
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,,
            /* [3] */
            0x0
        },
        "",
        justRight,
        "Feed Length: "
    },
    /* [10] */
    'VW04', 'funt',
    { /* array: 1 elements */
        /* [1] */
        62, 153
    },
    { /* array: 1 elements */
        /* [1] */
        18, 43
    }, sizeFixed, sizeFixed, shown, disabled,
    StaticText {
        "TStaticText",
        0b0,
        {1, 1},
        sizeable,
        notDimmed,
        notHilited,
        doesntDismiss,
```

```
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "In."
    },
    /* [11] */
    'VW04', 'fdsz',
    { /* array: 1 elements */
        /* [1] */
        60, 100
    },
    { /* array: 1 elements */
        /* [1] */
        20, 50
    }, sizeFixed, sizeFixed, shown, enabled,
    NumberText {
        "TSmartNumberText",
        0b1111,
        {1, 1},
        sizeable,
        notDimmed,
        notHilited,
        doesntDismiss,
        {2, 2, 2, 2},
        plain,
        0,
        { /* array: 3 elements */
            /* [1] */
            0x0,,
            /* [2] */
            0x0,
            /* [3] */
            0x0
        },
        "A",
        justRight,
        "8",
        unlimited,
        0b1111000000000000000000000100000000,
        8,
        0,
        24
    },
    /* [12] */
    'VW04', 'swds',
    { /* array: 1 elements */
        /* [1] */
        16, 20
    },
    { /* array: 1 elements */
        /* [1] */
        16, 160
    }, sizeFixed, sizeFixed, shown, enabled,
    CheckBox {
```

```
        "TCheckBox",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        off,
        "Display on Startup"
    },
    /* [13] */
    'DLOG', 'VW05',
    { /* array: 1 elements */
        /* [1] */
        48, 240
    },
    { /* array: 1 elements */
        /* [1] */
        40, 200
    }, sizeFixed, sizeFixed, shown, disabled,
    Cluster {
        "TCluster",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        "Job Log Window"
    },
    /* [14] */
    'VW05', 'jwds',
    { /* array: 1 elements */
        /* [1] */
        16, 20
    },
    { /* array: 1 elements */
        /* [1] */
        16, 144
    }, sizeFixed, sizeFixed, shown, enabled,
```

```
CheckBox {
    "TCheckBox",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    off,
    "Display on Startup"
},
/* [15] */
'DLOG', 'MSCL',
{ /* array: 1 elements */
    /* [1] */
    92, 240
},
{ /* array: 1 elements */
    /* [1] */
    44, 200
}, sizeFixed, sizeFixed, shown, disabled,
Cluster {
    "TCluster",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    "Measurement System"
},
/* [16] */
'MSCL', 'msin',
{ /* array: 1 elements */
    /* [1] */
    16, 8
},
{ /* array: 1 elements */
    /* [1] */
    16, 44
```

```
}, sizeFixed, sizeFixed, shown, enabled,
Radio {
    "TRadio",
    0b0,
    {1, 1},
    sizeable,
    notDimmed,
    notHilited,
    doesntDismiss,
    {0, 0, 0, 0},
    plain,
    9,
    { /* array: 3 elements */
        /* [1] */
        0x0,
        /* [2] */
        0x0,
        /* [3] */
        0x0
    },
    "A",
    on,
    "Inches"
},
/* [17] */
'MSCL', 'mscm',
{ /* array: 1 elements */
    /* [1] */
    16, 56
},
{ /* array: 1 elements */
    /* [1] */
    16, 44
}, sizeFixed, sizeFixed, shown, enabled,
Radio {
    "TRadio",
    0b0,
    {1, 1},
    sizeable,
    notDimmed,
    notHilited,
    doesntDismiss,
    {0, 0, 0, 0},
    plain,
    9,
    { /* array: 3 elements */
        /* [1] */
        0x0,
        /* [2] */
        0x0,
        /* [3] */
        0x0
    },
    "A",
    off,
    "Cm"
},
/* [18] */
'MSCL', 'mspc',
{ /* array: 1 elements */
    /* [1] */
    16, 104
},
{ /* array: 1 elements */
```

```
            /* [1] */
            16, 44
        }, sizeFixed, sizeFixed, shown, enabled,
        Radio {
            "TRadio",
            0b0,
            {1, 1},
            sizeable,
            notDimmed,
            notHilited,
            doesntDismiss,
            {0, 0, 0, 0},
            plain,
            9,
            { /* array: 3 elements */
                /* [1] */
                0x0,
                /* [2] */
                0x0,
                /* [3] */
                0x0
            },
            "A",
            off,
            "Picas"
        },
        /* [19] */
        'MSCL', 'mscr',
        { /* array: 1 elements */
            /* [1] */
            16, 152
        },
        { /* array: 1 elements */
            /* [1] */
            16, 44
        }, sizeFixed, sizeFixed, shown, enabled,
        Radio {
            "TRadio",
            0b0,
            {1, 1},
            sizeable,
            notDimmed,
            notHilited,
            doesntDismiss,
            {0, 0, 0, 0},
            plain,
            9,
            { /* array: 3 elements */
                /* [1] */
                0x0,
                /* [2] */
                0x0,
                /* [3] */
                0x0
            },
            "A",
            off,
            "Cicr"
        }
    }
};

resource 'view' (1003, purgeable) {
    { /* array viewArray: 31 elements */
```

```
/* [1] */
root, noID,
{ /* array: 1 elements */
    /* [1] */
    45, 20
},
{ /* array: 1 elements */
    /* [1] */
    280, 460
}, sizeVariable, sizeVariable, notShown, enabled,
Window {
    "TWindow",
    noGrowDocProc,
    goAwayBox,
    notResizable,
    modeless,
    ignoreFirstClick,
    dontFreeOnClosing,
    disposeOnFree,
    doesntCloseDocument,
    dontOpenWithDocument,
    dontAdaptToScreen,
    stagger,
    dontForceOnScreen,
    dontCenter,
    noID,
    "<<<>>>"
},
/* [2] */
root, 'SDLG',
{ /* array: 1 elements */
    /* [1] */
    0, 0
},
{ /* array: 1 elements */
    /* [1] */
    272, 464
}, sizeVariable, sizeVariable, shown, disabled,
DialogView {,
    "TTSMStatusView",
    noID,
    noID
},
/* [3] */
'SDLG', 'SPCT',
{ /* array: 1 elements */
    /* [1] */
    48, 176
},
{ /* array: 1 elements */
    /* [1] */
    190, 91
}, sizeFixed, sizeFixed, shown, disabled,
Picture {
    "TCsPicture",
    0b0,
    {1, 1},
    sizeable,
    notDimmed,
    notHilited,
    doesntDismiss,
    {0, 0, 0, 0},
    plain,
    0,
```

```
    { /* array: 3 elements */
        /* [1] */
        0x0,
        /* [2] */
        0x0,
        /* [3] */
        0x0
    },
    "",
    16532
},
/* [4] */
'SDLG', 'TPCT',
{ /* array: 1 elements */
    /* [1] */
    107, 16
},
{ /* array: 1 elements */
    /* [1] */
    159, 132
}, sizeFixed, sizeFixed, shown, disabled,
Picture {
    "TS1Picture",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    16533
},
/* [5] */
'TPCT', 'VW03',
{ /* array: 1 elements */
    /* [1] */
    0, 7
},
{ /* array: 1 elements */
    /* [1] */
    15, 100
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
```

```
        { /* array: 3 elements */
            /* [1] */
            0x0,
            /* [2] */
            0x0,
            /* [3] */
            0x0
        },
        "",
        justLeft,
        "Utilization"
    },
    /* [6] */
    'TPCT', 'VW06',
    { /* array: 1 elements */
        /* [1] */
        54, 7
    },
    { /* array: 1 elements */
        /* [1] */
        15, 100
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "VM Used"
    },
    /* [7] */
    'TPCT', 'VW07',
    { /* array: 1 elements */
        /* [1] */
        108, 7
    },
    { /* array: 1 elements */
        /* [1] */
        15, 100
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
```

```
            plain,
            0,
            { /* array: 3 elements */
                /* [1] */
                0x0,
                /* [2] */
                0x0,
                /* [3] */
                0x0
            },
            "",
            justLeft,
            "Disk Space"
        },
        /* [8] */
        'SDLG', 'VW04',
        { /* array: 1 elements */
            /* [1] */
            16, 288
        },
        { /* array: 1 elements */
            /* [1] */
            112, 160
        }, sizeFixed, sizeFixed, shown, disabled,
        Cluster {
            "TCluster",
            0b0,
            {1, 1},
            sizeable,
            notDimmed,
            notHilited,
            doesntDismiss,
            {0, 0, 0, 0},
            plain,
            0,
            { /* array: 3 elements */
                /* [1] */
                0x0,
                /* [2] */
                0x0,
                /* [3] */
                0x0
            },
            "",
            "Take-Up Cassette"
        },
        /* [9] */
        'VW04', 'BTFC',
        { /* array: 1 elements */
            /* [1] */
            80, 32
        },
        { /* array: 1 elements */
            /* [1] */
            16, 96
        }, sizeFixed, sizeFixed, shown, enabled,
        Button {
            "TButton",
            0b0,
            {1, 1},
            sizeable,
            notDimmed,
            notHilited,
            doesntDismiss,
```

```
    {0, 0, 0, 0},
    plain,
    0,
    { /* array: 3 elements */
        /* [1] */
        0x0,
        /* [2] */
        0x0,
        /* [3] */
        0x0
    },
    "",
    "Feed&Cut"
},
/* [10] */
'VW04', 'VW08',
{ /* array: 1 elements */
    /* [1] */
    16, 80
},
{ /* array: 1 elements */
    /* [1] */
    16, 48
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    justLeft,
    "Jobs"
},
/* [11] */
'VW04', 'VW09',
{ /* array: 1 elements */
    /* [1] */
    32, 80
},
{ /* array: 1 elements */
    /* [1] */
    16, 48
}, sizeFixed, sizeFixed, shown, disabled,
StaticText {
    "TStaticText",
    0b0,
    {1, 1},
    sizeable,
    notDimmed,
    notHilited,
```

```
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "Pages"
    },
    /* [12] */
    'VW04', 'VW10',
    { /* array: 1 elements */
        /* [1] */
        48, 80
    },
    { /* array: 1 elements */
        /* [1] */
        16, 48
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "Length"
    },
    /* [13] */
    'VW04', 'tujb',
    { /* array: 1 elements */
        /* [1] */
        16, 16
    },
    { /* array: 1 elements */
        /* [1] */
        16, 56
    }, sizeFixed, sizeFixed, shown, disabled,
    StaticText {
        "TStaticText",
        0b0,
        {1, 1},
        sizeable,
```

```
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "A",
        justRight,
        "0"
    },
    /* [14] */
    'VW04', 'tupg',
    { /* array: 1 elements */
        /* [1] */
        32, 16
    },
    { /* array: 1 elements */
        /* [1] */
        16, 56
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "A",
        justRight,
        "0"
    },
    /* [15] */
    'VW04', 'tuln',
    { /* array: 1 elements */
        /* [1] */
        48, 16
    },
    { /* array: 1 elements */
        /* [1] */
        16, 56
    }, sizeFixed, sizeFixed, shown, disabled,
    StaticText {
        "TStaticText",
        0b0,
```

```
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "A",
        justRight,
        "0"
    },
    /* [16] */
    'SDLG', 'VW05',
    { /* array: 1 elements */
        /* [1] */
        160, 288
    },
    { /* array: 1 elements */
        /* [1] */
        96, 160
    }, sizeFixed, sizeFixed, shown, disabled,
    Cluster {
        "TCluster",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        "Supply Cassette"
    },
    /* [17] */
    'VW05', 'BTRL',
    { /* array: 1 elements */
        /* [1] */
        64, 32
    },
    { /* array: 1 elements */
        /* [1] */
        16, 96
    }, sizeFixed, sizeFixed, shown, enabled,
    Button {
        "TButton",
```

```
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        "Reload"
    },
    /* [18] */
    'VW05', 'VW11',
    { /* array: 1 elements */
        /* [1] */
        16, 80
    },
    { /* array: 1 elements */
        /* [1] */
        16, 48
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "Pages"
    },
    /* [19] */
    'VW05', 'VW12',
    { /* array: 1 elements */
        /* [1] */
        32, 80
    },
    { /* array: 1 elements */
        /* [1] */
        16, 48
    }, sizeFixed, sizeFixed, shown, disabled,
    StaticText {
```

```
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "Length"
    },
    /* [20] */
    'VW05', 'sppg',
    { /* array: 1 elements */
        /* [1] */
        16, 16
    },
    { /* array: 1 elements */
        /* [1] */
        16, 56
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "A",
        justRight,
        ""
    },
    /* [21] */
    'VW05', 'spln',
    { /* array: 1 elements */
        /* [1] */
        32, 16
    },
    { /* array: 1 elements */
        /* [1] */
        16, 56
```

```
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "A",
    justRight,
    ""
},
/* [22] */
'SDLG', 'VW18',
{ /* array: 1 elements */
    /* [1] */
    8, 16
},
{ /* array: 1 elements */
    /* [1] */
    16, 48
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    justRight,
    "User:"
},
/* [23] */
'SDLG', 'VW19',
{ /* array: 1 elements */
    /* [1] */
    24, 16
},
{ /* array: 1 elements */
```

```
        /* [1] */
        16, 48
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justRight,
        "Job:"
    },
    /* [24] */
    'SDLG', 'VW20',
    { /* array: 1 elements */
        /* [1] */
        40, 16
    },
    { /* array: 1 elements */
        /* [1] */
        16, 48
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justRight,
        "Status:"
    },
    /* [25] */
    'SDLG', 'stus',
    { /* array: 1 elements */
        /* [1] */
        8, 72
```

```
},
{ /* array: 1 elements */
    /* [1] */
    16, 200
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "A",
    justLeft,
    ""
},
/* [26] */
'SDLG', 'stjb',
{ /* array: 1 elements */
    /* [1] */
    24, 72
},
{ /* array: 1 elements */
    /* [1] */
    16, 200
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "A",
    justLeft,
    ""
},
/* [27] */
'SDLG', 'stst',
{ /* array: 1 elements */
```

```
        /* [1] */
        40, 72
    },
    { /* array: 1 elements */
        /* [1] */
        16, 96
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "A",
        justLeft,
        ""
    },
    /* [28] */
    'SDLG', 'VW01',
    { /* array: 1 elements */
        /* [1] */
        64, 16
    },
    { /* array: 1 elements */
        /* [1] */
        16, 80
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justRight,
        "Resolution:"
    },
    /* [29] */
```

```
'SDLG', 'resl',
{ /* array: 1 elements */
    /* [1] */
    64, 112
},
{ /* array: 1 elements */
    /* [1] */
    16, 48
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "A",
    justRight,
    ""
},
/* [30] */
'SDLG', 'VW02',
{ /* array: 1 elements */
    /* [1] */
    80, 16
},
{ /* array: 1 elements */
    /* [1] */
    16, 80
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    justRight,
    "Interface:"
```

```
        },
        /* [31] */
        'SDLG', 'itfc',
        { /* array: 1 elements */
            /* [1] */
            80, 104
        },
        { /* array: 1 elements */
            /* [1] */
            16, 56
        }, sizeFixed, sizeFixed, shown, disabled,
        StaticText {
            "TStaticText",
            0b0,
            {1, 1},
            sizeable,
            notDimmed,
            notHilited,
            doesntDismiss,
            {0, 0, 0, 0},
            plain,
            0,
            { /* array: 3 elements */
                /* [1] */
                0x0,
                /* [2] */
                0x0,
                /* [3] */
                0x0
            },
            "A",
            justRight,
            ""
        }
    }
};


#endif


resource 'view' (1004, purgeable) {
    { /* array viewArray: 5 elements */
        /* [1] */
        root, noID,
        { /* array: 1 elements */
            /* [1] */
            50, 40
        },
        { /* array: 1 elements */
            /* [1] */
            160, 432
        }, sizeVariable, sizeVariable, notShown, enabled,
        Window {
            "TWindow",
            dBoxProc,
            noGoAwayBox,
            notResizable,
            modal,
            ignoreFirstClick,
            dontFreeOnClosing,
            disposeOnFree,
            closesDocument,
            openWithDocument,
```

```
        dontAdaptToScreen,
        dontStagger,
        forceOnScreen,
        centerHorizontally,
        noID,
        "PSError"
    },
    /* [2] */
    root, 'PSDL',
    { /* array: 1 elements */
        /* [1] */
        0, 0
    },
    { /* array: 1 elements */
        /* [1] */
        160, 432
    }, sizeVariable, sizeVariable, shown, disabled,
    DialogView {
        "TDialogView",
        'psok',
        'psok'
    },
    /* [3] */
    'PSDL', 'VW03',
    { /* array: 1 elements */
        /* [1] */
        16, 32
    },
    { /* array: 1 elements */
        /* [1] */
        16, 368
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "The job generated the following PostScri"
        "pt error:"
    },
    /* [4] */
    'PSDL', 'VW04',
    { /* array: 1 elements */
        /* [1] */
        48, 32
    },
    { /* array: 1 elements */
        /* [1] */
```

```
            64, 368
        }, sizeFixed, sizeFixed, shown, disabled,
        StaticText {
            "TStaticText",
            0b1111,
            {1, 1},
            sizeable,
            notDimmed,
            notHilited,
            doesntDismiss,
            {0, 0, 0, 0},
            plain,
            0,
            { /* array: 3 elements */
                /* [1] */
                0x0,
                /* [2] */
                0x0,
                /* [3] */
                0x0
            },
            "",
            justLeft,
            "^0"
        },
        /* [5] */
        'PSDL', 'psok',
        { /* array: 1 elements */
            /* [1] */
            120, 320
        },
        { /* array: 1 elements */
            /* [1] */
            24, 80
        }, sizeFixed, sizeFixed, shown, enabled,
        Button {
            "TButton",
            0b1000000,
            {3, 3}, ,
            sizeable,
            notDimmed,
            notHilited,
            dismisses,
            {4, 4, 4, 4},
            plain,
            0,
            { /* array: 3 elements */
                /* [1] */
                0x0,
                /* [2] */
                0x0,
                /* [3] */
                0x0
            },
            "",
            "OK"
        }
    }
};

resource 'view' (1005, purgeable) {
    { /* array viewArray: 9 elements */
        /* [1] */
        root, noID,
```

```
{ /* array: 1 elements */
    /* [1] */
    50, 40
},
{ /* array: 1 elements */
    /* [1] */
    240, 424
}, sizeVariable, sizeVariable, notShown, enabled,
Window {
    "TWindow",
    9,
    noGoAwayBox,
    notResizable,
    modal,
    ignoreFirstClick,
    dontFreeOnClosing,
    disposeOnFree,
    closesDocument,
    dontOpenWithDocument,
    dontAdaptToScreen,
    dontStagger,
    dontForceOnScreen,
    center,
    noID,
    "<<<>>>"
},
/* [2] */
root, 'IZDL',
{ /* array: 1 elements */
    /* [1] */
    0, 0
},
{ /* array: 1 elements */
    /* [1] */
    240, 424
}, sizeVariable, sizeVariable, shown, disabled,
DialogView {
    "TDialogView",
    'insl',
    'cncl'
},
/* [3] */
'IZDL', 'cncl',
{ /* array: 1 elements */
    /* [1] */
    204, 48
},
{ /* array: 1 elements */
    /* [1] */
    16, 72
}, sizeFixed, sizeFixed, shown, enabled,
Button {
    "TButton",
    0b0,
    {3, 3},
    sizeable,
    notDimmed,
    notHilited,
    dismisses,
    {0, 0, 0, 0},
    plain,
    0,
    { /* array: 3 elements */
        /* [1] */
```

```
        0x0,
        /* [2] */
        0x0,
        /* [3] */
        0x0
    },
    "",
    "Cancel"
},
/* [4] */
'IZDL', 'insl',
{ /* array: 1 elements */
    /* [1] */
    200, 296
},
{ /* array: 1 elements */
    /* [1] */
    24, 80
}, sizeFixed, sizeFixed, shown, enabled,
Button {
    "TButton",
    0b1000000,
    {3, 3},
    sizeable,
    notDimmed,
    notHilited,
    dismisses,
    {4, 4, 4, 4},
    plain,
    0,
    { /* array: 3 elements */
        /* [1] */
        0x0,
        /* [2] */
        0x0,
        /* [3] */
        0x0
    },
    "",
    "Install"
},
/* [5] */
'IZDL', 'VW05',
{ /* array: 1 elements */
    /* [1] */
    24, 80
},
{ /* array: 1 elements */
    /* [1] */
    32, 336
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
```

```
            0x0,
            /* [2] */
            0x0,
            /* [3] */
            0x0
        },
        "",
        justLeft,
        "The "
        programname
        " software is not inst"
        "alled on typesetter ^0."
    },
    /* [6] */
    'IZDL', 'VW06',
    { /* array: 1 elements */
        /* [1] */
        64, 80
    },
    { /* array: 1 elements */
        /* [1] */
        48, 336
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "The Install procedure will download the "
        programname
        " software onto your typesetter's disk"
        " and will restart the typesetter."
    },
    /* [7] */
    'IZDL', 'VW07',
    { /* array: 1 elements */
        /* [1] */
        120, 80
    },
    { /* array: 1 elements */
        /* [1] */
        32, 336
    }, sizeFixed, sizeFixed, shown, disabled,
    StaticText {
        "TStaticText",
        0b0,
        {1, 1},
        sizeable,
```

```
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "Afterwards, the software will be aut"
        "omatically loaded each time your types"
        "etter restarts."
    },
    /* [8] */
    'IZDL', 'VW08',
    { /* array: 1 elements */
        /* [1] */
        24, 16
    },
    { /* array: 1 elements */
        /* [1] */
        32, 32
    }, sizeFixed, sizeFixed, shown, disabled,
    Icon {
        "TIcon",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        preferColor,
        2
    },
    /* [9] */
    'IZDL', 'VW09',
    { /* array: 1 elements */
        /* [1] */
        160, 80
    },
    { /* array: 1 elements */
        /* [1] */
        16, 336
    }, sizeFixed, sizeFixed, shown, disabled,
    StaticText {
```

```
            "TStaticText",
            0b0,
            {1, 1},
            sizeable,
            notDimmed,
            notHilited,
            doesntDismiss,
            {0, 0, 0, 0},
            plain,
            0,
            { /* array: 3 elements */
                /* [1] */
                0x0,
                /* [2] */
                0x0,
                /* [3] */
                0x0
            },
            "",
            justLeft,
            "Do you wish to install the software "
            "now?"
        }
    }
};

resource 'view' (1006, purgeable) {
    { /* array viewArray: 8 elements */
        /* [1] */
        root, noid,
        { /* array: 1 elements */
            /* [1] */
            50, 40
        },
        { /* array: 1 elements */
            /* [1] */
            192, 408
        }, sizeVariable, sizeVariable, notShown, enabled,
        Window {
            "TWindow",
            9,
            noGoAwayBox,
            notResizable,
            modal,
            ignoreFirstClick,
            dontFreeOnClosing,
            disposeOnFree,
            doesntCloseDocument,
            dontOpenWithDocument,
            dontAdaptToScreen,
            dontStagger,
            dontForceOnScreen,
            center,
            noID,
            "<<<>>>"
        },
        /* [2] */
        root, 'DLOG',
        { /* array: 1 elements */
            /* [1] */
            0, 0
        },
        { /* array: 1 elements */
            /* [1] */
```

```
        192, 408
    }, sizeVariable, sizeVariable, shown, disabled,
    DialogView {
        "TDialogView",
        'insl',
        'cncl'
    },
    /* [3] */
    'DLOG', 'cncl',
    { /* array: 1 elements */
        /* [1] */
        152, 32
    },
    { /* array: 1 elements */
        /* [1] */
        16, 72
    }, sizeFixed, sizeFixed, shown, enabled,
    Button {
        "TButton",
        0b0,
        {3, 3},
        sizeable,
        notDimmed,
        notHilited,
        dismisses,
        {0, 0, 0, 0},
        plain,
        0,
        { /* array: 3 elements */
            /* [1] */
            0x0,
            /* [2] */
            0x0,
            /* [3] */
            0x0
        },
        "",
        "Cancel"
    },
    /* [4] */
    'DLOG', 'insl',
    { /* array: 1 elements */
        /* [1] */
        148, 264
    },
    { /* array: 1 elements */
        /* [1] */
        24, 80
    }, sizeFixed, sizeFixed, shown, enabled,
    Button {
        "TButton",
        0b1000000,
        {3, 3},
        sizeable,
        notDimmed,
        notHilited,
        dismisses,
        {4, 4, 4, 4},
        plain,
        0,
        { /* array: 3 elements */
            /* [1] */
            0x0,
            /* [2] */
```

```
        0x0,
        /* [3] */
        0x0
    },
    "",
    "Install"
},
/* [5] */
'DLOG', 'VW05',
{ /* array: 1 elements */
    /* [1] */
    24, 16
},
{ /* array: 1 elements */
    /* [1] */
    32, 32
}, sizeFixed, sizeFixed, shown, disabled,
Icon {
    "TIcon",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    dontPreferColor,
    2
},
/* [6] */
'DLOG', 'VW07',
{ /* array: 1 elements */
    /* [1] */
    24, 64
},
{ /* array: 1 elements */
    /* [1] */
    48, 336
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
```

```
        /* [2] */
        0x0,
        /* [3] */
        0x0
    },
    "",
    justLeft,
    "The Install procedure will download the "
    programname
    " software onto, your typesetter's disk"
    " and will restart the typesetter."
},
/* [7] */
'DLOG', 'VW08',
{ /* array: 1 elements */
    /* [1] */
    80, 64
},
{ /* array: 1 elements */
    /* [1] */
    32, 336
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    justLeft,
    "Afterwards, the software will be aut"
    "omatically loaded each time your types"
    "etter restarts."
},
/* [8] */
'DLOG', 'VW10',
{ /* array: 1 elements */
    /* [1] */
    120, 64
},
{ /* array: 1 elements */
    /* [1] */
    16, 336
}, sizeFixed, sizeFixed, shown, disabled,
StaticText {
    "TStaticText",
    0b0,
    {1, 1},
    sizeable,
    notDimmed,
    notHilited,
```

```
            doesntDismiss,
            {0, 0, 0, 0},
            plain,
            0,
            { /* array: 3 elements */
                /* [1] */
                0x0,
                /* [2] */
                0x0,
                /* [3] */
                0x0
            },
            "",
            justLeft,
            "Do you wish to install the software "
            "now?"
        }
    }
};

resource 'view' (1007, purgeable) {
    { /* array viewArray: 8 elements */
        /* [1] */
        root, noID,
        { /* array: 1 elements */
            /* [1] */
            50, 40
        },
        { /* array: 1 elements */
            /* [1] */
            192, 408
        }, sizeVariable, sizeVariable, notShown, enabled,
        Window {
            "TWindow",
            9,
            noGoAwayBox,
            notResizable,
            modal,
            ignoreFirstClick,
            dontFreeOnClosing,
            disposeOnFree,
            doesntCloseDocument,
            dontOpenWithDocument,
            dontAdaptToScreen,
            dontStagger,
            dontForceOnScreen,
            center,
            noID,
            "<<<>>>"
        },
        /* [2] */
        root, 'DLOG',
        { /* array: 1 elements */
            /* [1] */
            0, 0
        },
        { /* array: 1 elements */
            /* [1] */
            192, 408
        }, sizeVariable, sizeVariable, shown, disabled,
        DialogView {
            "TDialogView",
            'cncl',
            'cncl'
```

```
},
/* [3] */
'DLOG', 'VW03',
{ /* array: 1 elements */
    /* [1] */
    24, 16
},
{ /* array: 1 elements */
    /* [1] */
    32, 32
}, sizeFixed, sizeFixed, shown, disabled,
Icon {
    "TIcon",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    dontPreferColor,
    0
},
/* [4] */
'DLOG', 'VW04',
{ /* array: 1 elements */
    /* [1] */
    24, 64
},
{ /* array: 1 elements */
    /* [1] */
    48, 336
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
```

```
        justLeft,
        "The Remove "
        programname
        "procedure will  remove th"
        "e software from your typesetter's di"
        "sk and memory, and will restart the type"
        "setter."
    },
    /* [5] */
    'DLOG', 'rmve',
    { /* array: 1 elements */
        /* [1] */
        152, 304
    },
    { /* array: 1 elements */
        /* [1] */
        16, 72
    }, sizeFixed, sizeFixed, shown, enabled,
    Button {
        "TButton",
        0b0,
        {3, 3},
        sizeable,
        notDimmed,
        notHilited,
        dismisses,
        {0, 0, 0, 0},
        plain,
        0,
        { /* array: 3 elements */
            /* [1] */
            0x0,
            /* [2] */
            0x0,
            /* [3] */
            0x0
        },
        "",
        "Remove",
    },
    /* [6] */
    'DLOG', 'cncl',
    { /* array: 1 elements */
        /* [1] */
        148, 52
    },
    { /* array: 1 elements */
        /* [1] */
        24, 80
    }, sizeFixed, sizeFixed, shown, enabled,
    Button {
        "TButton",
        0b1000000,
        {3, 3},
        sizeable,
        notDimmed,
        notHilited,
        dismisses,
        {4, 4, 4, 4},
        plain,
        0,
        { /* array: 3 elements */
            /* [1] */
            0x0,
```

```
        /* [2] */
        0x0,
        /* [3] */
        0x0
    },
    "",
    "Cancel"
},
/* [7] */
'DLOG', 'VW07',
{ /* array: 1 elements */
    /* [1] */
    80, 64
},
{ /* array: 1 elements */
    /* [1] */
    32, 336
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    justLeft,
    "Do this only if you wish to discontinue "
    "job and cassette tracking."
},
/* [8] */
'DLOG', 'VW08',
{ /* array: 1 elements */
    /* [1] */
    120, 64
},
{ /* array: 1 elements */
    /* [1] */
    16, 336
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
```

```
            /* [1] */
            0x0,
            /* [2] */
            0x0,
            /* [3] */
            0x0
        },
        "",
        justLeft,
        "Do you wish to remove the software n"
        "ow?"
    }
  }
};

resource 'view' (1008, purgeable) {
  { /* array viewArray: 5 elements */
    /* [1] */
    root, noID,
    { /* array: 1 elements */
        /* [1] */
        50, 40
    },
    { /* array: 1 elements */
        /* [1] */
        80, 448
    }, sizeVariable, sizeVariable, notShown, enabled,
    Window {
        "TWindow",
        9,
        noGoAwayBox,
        notResizable,
        modal,
        ignoreFirstClick,
        dontFreeOnClosing,
        disposeOnFree,
        doesntCloseDocument,
        dontOpenWithDocument,
        dontAdaptToScreen,
        dontStagger,
        forceOnScreen,
        centerHorizontally,
        noID,
        "<<<>>>"
    },
    /* [2] */
    root, 'DLOG',
    { /* array: 1 elements */
        /* [1] */
        0, 0
    },
    { /* array: 1 elements */
        /* [1] */
        80, 448
    }, sizeVariable, sizeVariable, shown, disabled,
    DialogView {
        "TTSMInitializeView",
        'cncl',
        noID
    },
    /* [3] */
    'DLOG', 'VW03',
    { /* array: 1 elements */
        /* [1] */
```

```
    16, 16
},
{ /* array: 1 elements */
    /* [1] */
    32, 32
}, sizeFixed, sizeFixed, shown, disabled,
Icon {
    "TIcon",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    dontPreferColor,
    1
},
/* [4] */
'DLOG', 'VW04',
{ /* array: 1 elements */
    /* [1] */
    16, 64
},
{ /* array: 1 elements */
    /* [1] */
    32, 368
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    justLeft,
    "Installing ^0 on printer ^1:  Please w"
    "ait..."
},
/* [5] */
```

```
        'DLCG', 'cncl',
        { /* array: 1 elements */
            /* [1] */
            48, 352
        },
        { /* array: 1 elements */
            /* [1] */
            24, 80
        }, sizeFixed, sizeFixed, shown, enabled,
        Button {
            "TButton",
            0b1000000,
            {3, 3},
            sizeable,
            notDimmed,
            notHilited,
            dismisses,
            {4, 4, 4, 4},
            plain,
            0,
            { /* array: 3 elements */
                /* [1] */
                0x0,
                /* [2] */
                0x0,
                /* [3] */
                0x0
            },
            "",
            "Cancel"
        }
    }
};

resource 'view' (1009, purgeable) {
    { /* array viewArray: 5 elements */
        /* [1] */
        root, noID,
        { /* array: 1 elements */
            /* [1] */
            50, 40
        },
        { /* array: 1 elements */
            /* [1] */
            80, 448
        }, sizeVariable, sizeVariable, notShown, enabled,
        Window {
            "TWindow",
            9,
            noGoAwayBox,
            notResizable,
            modal,
            ignoreFirstClick,
            dontFreeOnClosing,
            disposeOnFree,
            doesntCloseDocument,
            dontOpenWithDocument,
            dontAdaptToScreen,
            dontStagger,
            forceOnScreen,
            centerHorizontally,
            noID,
            "<<<>>>"
        },
```

```
/* [2] */
root, 'DLOG',
{ /* array: 1 elements */
    /* [1] */
    0, 0
},
{ /* array: 1 elements */
    /* [1] */
    80, 448
}, sizeVariable, sizeVariable, shown, disabled,
DialogView {
    "TTSMInitializeView",
    'cncl',
    noID
},
/* [3] */
'DLOG', 'VW03',
{ /* array: 1 elements */
    /* [1] */
    16, 16
},
{ /* array: 1 elements */
    /* [1] */
    32, 32
}, sizeFixed, sizeFixed, shown, disabled,
Icon {
    "TIcon",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    dontPreferColor,
    1
},
/* [4] */
'DLOG', 'VW04',
{ /* array: 1 elements */
    /* [1] */
    16, 64
},
{ /* array: 1 elements */
    /* [1] */
    32, 368
}, sizeFixed, sizeFixed, shown, disabled,
StaticText {
    "TStaticText",
    0b0,
    {1, 1},
    sizeable,
    notDimmed,
```

```
            notHilited,
            doesntDismiss,
            {0, 0, 0, 0},
            plain,
            0,
            { /* array: 3 elements */
                /* [1] */
                0x0,
                /* [2] */
                0x0,
                /* [3] */
                0x0
            },
            "",
            justLeft,
            "Removing ^0 from printer ^1:  Please wai"
            "t..."
        },
        /* [5] */
        'DLOG', 'cncl',
        { /* array: 1 elements */
            /* [1] */
            48, 352
        },
        { /* array: 1 elements */
            /* [1] */
            24, 80
        }, sizeFixed, sizeFixed, shown, enabled,
        Button {
            "TButton",
            0b1000000,
            {3, 3},
            sizeable,
            notDimmed,
            notHilited,
            dismisses,
            {4, 4, 4, 4},
            plain,
            0,
            { /* array: 3 elements */
                /* [1] */
                0x0,
                /* [2] */
                0x0,
                /* [3] */
                0x0
            },
            "",
            "Cancel"
        }
    }
};

#if IncludeRipMaster

resource 'view' (1010, purgeable) {
    { /* array viewArray: 8 elements */
        /* [1] */
        root, noid,
        { /* array: 1 elements */
            /* [1] */
            50, 40
        },
        { /* array: 1 elements */
```

```
    /* [1] */
    192, 408
}, sizeVariable, sizeVariable, notShown, enabled,
Window {
    "TWindow",
    9,
    noGoAwayBox,
    notResizable,
    modal,
    ignoreFirstClick,
    dontFreeOnClosing,
    disposeOnFree,
    doesntCloseDocument,
    dontOpenWithDocument,
    dontAdaptToScreen,
    dontStagger,
    dontForceOnScreen,
    center,
    noID,
    "<<<>>>"
},
/* [2] */
root, 'DLOG',
{ /* array: 1 elements */
    /* [1] */
    0, 0
},
{ /* array: 1 elements */
    /* [1] */
    192, 408
}, sizeVariable, sizeVariable, shown, disabled,
DialogView {
    "TDialogView",
    'insl',
    'insl'
},
/* [3] */
'DLOG', 'cncl',
{ /* array: 1 elements */
    /* [1] */
    152, 32
},
{ /* array: 1 elements */
    /* [1] */
    16, 72
}, sizeFixed, sizeFixed, shown, enabled,
Button {
    "TButton",
    0b0,
    {3, 3},
    sizeable,
    notDimmed,
    notHilited,
    dismisses,
    {0, 0, 0, 0},
    plain,
    0,
    { /* array: 3 elements */
        /* [1] */
        0x0,
        /* [2] */
        0x0,
        /* [3] */
        0x0
```

```
    },
    "",
    "Cancel"
},
/* [4] */
'DLOG', 'insl',
{ /* array: 1 elements */
    /* [1] */
    148, 264
},
{ /* array: 1 elements */
    /* [1] */
    24, 80
}, sizeFixed, sizeFixed, shown, enabled,
Button {
    "TButton",
    0b1000000,
    {3, 3},
    sizeable,
    notDimmed,
    notHilited,
    dismisses,
    {4, 4, 4, 4},
    plain,
    0,
    { /* array: 3 elements */
        /* [1] */
        0x0,
        /* [2] */
        0x0,
        /* [3] */
        0x0
    },
    "",
    "Install"
},
/* [5] */
'DLOG', 'VW05',
{ /* array: 1 elements */
    /* [1] */
    24, 16
},
{ /* array: 1 elements */
    /* [1] */
    32, 32
}, sizeFixed, sizeFixed, shown, disabled,
Icon {
    "TIcon",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
```

```
        },
        "",
        dontPreferColor,
        2
    },
    /* [6] */
    'DLOG', 'VW07',
    { /* array: 1 elements */
        /* [1] */
        24, 64
    },
    { /* array: 1 elements */
        /* [1] */
        48, 336
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "The Install Alternate Job Slug procedure will download "
        "an alternate job slug definition onto your typesetter's disk."
    },
    /* [7] */
    'DLOG', 'VW08',
    { /* array: 1 elements */
        /* [1] */
        80, 64
    },
    { /* array: 1 elements */
        /* [1] */
        32, 336
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
```

```
            0x0,
            /* [3] */
            0x0
        },
        "",
        justLeft,
        "To install, you select a PostScript text file that contains "
        "your alternate job slug definition."
    },
    /* [8] */
    'DLOG', 'VW10', '
    { /* array: 1 elements */
        /* [1] */
        120, 64
    },
    { /* array: 1 elements */
        /* [1] */
        16, 336
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "Do you wish to install the alternate slug line "
        "now?"
    }
  }
};
resource 'view' (1011, purgeable) {
  { /* array viewArray: 8 elements */
    /* [1] */
    root, noID,
    { /* array: 1 elements */
        /* [1] */
        50, 40
    },
    { /* array: 1 elements */
        /* [1] */
        192, 408
    }, sizeVariable, sizeVariable, notShown, enabled,
    Window {
        "TWindow",
        9,
        noGoAwayBox,
        notResizable,
        modal,
        ignoreFirstClick,
```

```
        dontFreeOnClosing,
        disposeOnFree,
        doesntCloseDocument,
        dontOpenWithDocument,
        dontAdaptToScreen,
        dontStagger,
        dontForceOnScreen,
        center,
        noID,
        "<<<>>>"
    },
    /* [2] */
    root, 'DLOG',
    { /* array: 1 elements */
        /* [1] */
        0, 0
    },
    { /* array: 1 elements */
        /* [1] */
        192, 408
    }, sizeVariable, sizeVariable, shown, disabled,
    DialogView {
        "TDialogView",
        'cncl',
        'cncl'
    },
    /* [3] */
    'DLOG', 'VW03',
    { /* array: 1 elements */
        /* [1] */
        24, 16
    },
    { /* array: 1 elements */
        /* [1] */
        32, 32
    }, sizeFixed, sizeFixed, shown, disabled,
    Icon {
        "TIcon",,
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        dontPreferColor,
        0
    },
    /* [4] */
    'DLOG', 'VW04',
    { /* array: 1 elements */
        /* [1] */
        24, 64
```

```
    },
    { /* array: 1 elements */
        /* [1] */
        48, 336
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "The Remove Job Slug procedure will remove th"
        "e job slug definition from your typesetter's di"
        "sk."
    },
    /* [5] */
    'DLOG', 'rmve',
    { /* array: 1 elements */
        /* [1] */
        152, 304
    },
    { /* array: 1 elements */
        /* [1] */
        16, 72
    }, sizeFixed, sizeFixed, shown, enabled,
    Button {
        "TButton",
        0b0,
        {3, 3},
        sizeable,
        notDimmed,
        notHilited,
        dismisses,
        {0, 0, 0, 0},
        plain,
        0,
        { /* array: 3 elements */
            /* [1] */
            0x0,
            /* [2] */
            0x0,
            /* [3] */
            0x0
        },
        "",
        "Remove"
    },
    /* [6] */
    'DLOG', 'cncl',
```

```
{ /* array: 1 elements */
    /* [1] */
    148, 52
},
{ /* array: 1 elements */
    /* [1] */
    24, 80
}, sizeFixed, sizeFixed, shown, enabled,
Button {
    "TButton",
    0b1000000,
    {3, 3},
    sizeable,
    notDimmed,
    notHilited,
    dismisses,
    {4, 4, 4, 4},
    plain,
    0,
    { /* array: 3 elements */
        /* [1] */
        0x0,
        /* [2] */
        0x0,
        /* [3] */
        0x0
    },
    "",
    "Cancel"
},
/* [7] */
'DLOG', 'VW07',
{ /* array: 1 elements */
    /* [1] */
    80, 64
},
{ /* array: 1 elements */
    /* [1] */
    32, 336
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    justLeft,
    "Do this only if you wish to discontinue "
    "job slug printing on the paper/film."
},
```

```
        /* [8] */
        'DLOG', 'VW08',
        { /* array: 1 elements */
            /* [1] */
            120, 64
        },
        { /* array: 1 elements */
            /* [1] */
            16, 336
        }, sizeFixed, sizeFixed, shown, disabled,
        StaticText {
            "TStaticText",
            0b0,
            {1, 1},
            sizeable,
            notDimmed,
            notHilited,
            doesntDismiss,
            {0, 0, 0, 0},
            plain,
            0,
            { /* array: 3 elements */
                /* [1] */
                0x0,
                /* [2] */
                0x0,
                /* [3] */
                0x0
            },
            "",
            justLeft,
            "Do you wish to remove the slug line n"
            "ow?"
        }
    }
};

resource 'view' (1012, purgeable) {
    { /* array viewArray: 7 elements */
        /* [1] */
        root, noID,
        { /* array: 1 elements */
            /* [1] */
            50, 40
        },
        { /* array: 1 elements */
            /* [1] */
            200, 410
        }, sizeVariable, sizeVariable, notShown, enabled,
        Window {
            "TWindow",
            dBoxProc,
            noGoAwayBox,
            notResizable,
            modal,
            ignoreFirstClick,
            dontFreeOnClosing,
            disposeOnFree,
            doesntCloseDocument,
            dontOpenWithDocument,
            dontAdaptToScreen,
            dontStagger,
            dontForceOnScreen,
```

```
        center,
        noID,
        "<<<>>>"
    },
    /* [2] */
    root, 'MEMF',
    { /* array: 1 elements */
        /* [1] */
        0, 0
    },
    { /* array: 1 elements */
        /* [1] */
        192, 408
    }, sizeVariable, sizeVariable, shown, disabled,
    DialogView {
        "TDialogView",
        'VW05',
        'VW05'
    },
    /* [3] */
    'MEMF', 'VW02',
    { /* array: 1 elements */
        /* [1] */
        19, 16
    },
    { /* array: 1 elements */
        /* [1] */
        32, 32
    }, sizeFixed, sizeFixed, shown, disabled,
    Icon {
        "TIcon",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        dontPreferColor,
        0
    },
    /* [4] */
    'MEMF', 'VW03',
    { /* array: 1 elements */
        /* [1] */
        16, 64
    },
    { /* array: 1 elements */
        /* [1] */
        48, 336
    }, sizeFixed, sizeFixed, shown, disabled,
    StaticText {
        "TStaticText",
```

```
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "There is no longer enough Macintosh memo"
        "ry to store the job log for ^0."
    },
    /* [5] */
    'MEMF', 'VW05',
    { /* array: 1 elements */
        /* [1] */
        164, 308
    },
    { /* array: 1 elements */
        /* [1] */
        24, 80
    }, sizeFixed, sizeFixed, shown, enabled,
    Button {
        "TButton",
        0b1000000,
        {3, 3},
        sizeable,
        notDimmed,
        notHilited,
        dismisses,
        {4, 4, 4, 4},
        plain,
        0,
        { /* array: 3 elements */
            /* [1] */
            0x0,
            /* [2] */
            0x0,
            /* [3] */
            0x0
        },
        "",
        "OK"
    },
    /* [6] */
    'MEMF', 'VW06',
    { /* array: 1 elements */
        /* [1] */
        64, 64
    },
    { /* array: 1 elements */
        /* [1] */
        32, 336
    }, sizeFixed, sizeFixed, shown, disabled,
```

```
        StaticText {
            "TStaticText",
            0b0,
            {1, 1},
            sizeable,
            notDimmed,
            notHilited,
            doesntDismiss,
            {0, 0, 0, 0},
            plain,
            0,
            { /* array: 3 elements */
                /* [1] */
                0x0,
                /* [2] */
                0x0,
                /* [3] */
                0x0
            },
            "",
            justLeft,
            "The oldest entries will be dropped from "
            "the screen display, but remain recorded "
            "on the typesetter."
        },
        /* [7] */
        'MEMF', 'VW07',
        { /* array: 1 elements */
            /* [1] */
            112, 64
        },
        { /* array: 1 elements */
            /* [1] */
            32, 336
        }, sizeFixed, sizeFixed, shown, disabled,
        StaticText {
            "TStaticText",
            0b0,
            {1, 1},
            sizeable,
            notDimmed,
            notHilited,
            doesntDismiss,
            {0, 0, 0, 0},
            plain,
            0,
            { /* array: 3 elements */
                /* [1] */
                0x0,
                /* [2] */
                0x0,
                /* [3] */
                0x0
            },
            "",
            justLeft,
            "Give RIPMaster more memory under Multifi"
            "nder, or press "Clear Log" to clear the "
            "log file."
        }
    }
};

#endif
```

```
resource 'view' (1014, purgeable) (
    { /* array viewArray: 2 elements */
        /* [1] */
        root, '  st',
        { /* array: 1 elements */
            /* [1] */
            50, 40
        },
        { /*.array: 1 elements */
            /* [1] */
            118, 350
        }, sizeVariable, sizeVariable, notShown, enabled,
        Window {
            "TWindow",
            dBoxProc,
            noGoAwayBox,
            notResizable,
            modeless,
            ignoreFirstClick,
            dontFreeOnClosing,
            disposeOnFree,
            doesntCloseDocument,
            dontOpenWithDocument,
            dontAdaptToScreen,
            dontStagger,
            forceOnScreen,
            dontCenter,
            noID,
            "<<<>>>"
        },
        /* [2] */
        '  st', 'VW02',
        { /* array: 1 elements */
            /* [1] */
            0, 0
        },
        { /* array: 1 elements */
            /* [1] */
            118, 350
        }, sizeFixed, sizeFixed, shown, disabled,
        Picture {
            "TPicture",
            0b0,
            {1, 1},
            notSizeable,
            notDimmed,
            notHilited,
            doesntDismiss,
            {0, 0, 0, 0},
            plain,
            0,
            { /* array: 3 elements */
                /* [1] */
                0x0,
                /* [2] */
                0x0,
                /* [3] */
                0x0
            },
            "",
            16535
        }
    }
```

```
;

resource 'view' (1015, purgeable) (
    { /* array viewArray: 2 elements */
        /* [1] */
        root, '  st',
        { /* array: 1 elements */
            /* [1] */
            50, 40
        },
        { /* array: 1 elements */
            /* [1] */
            118, 350
        }, sizeVariable, sizeVariable, notShown, enabled,
        Window {
            "TWindow",
            9,
            noGoAwayBox,
            notResizable,
            modeless,
            ignoreFirstClick,
            dontFreeOnClosing,
            disposeOnFree,
            doesntCloseDocument,
            dontOpenWithDocument,
            dontAdaptToScreen,
            dontStagger,
            forceOnScreen,
            dontCenter,
            noID,
            "<<<>>>"
        },
        /* [2] */
        '  st', 'VW01',
        { /* array: 1 elements */
            /* [1] */
            0, 0
        },
        { /* array: 1 elements */
            /* [1] */
            118, 350
        }, sizeFixed, sizeFixed, shown, disabled,
        Picture {
            "TPicture",
            0b0,
            {1, 1},
            notSizeable,
            notDimmed,
            notHilited,
            doesntDismiss,
            {0, 0, 0, 0},
            plain,
            0,
            { /* array: 3 elements */
                /* [1] */
                0x0,
                /* [2] */
                0x0,
                /* [3] */
                0x0
            },
            "",
            16536
```

```
			}
	}
};

resource 'view' (1016, purgeable) {
	{ /* array viewArray: 2 elements */
		/* [1] */
		root, '  st',
		{ /* array: 1 elements */
			/* [1] */
			50, 40
		},
		{ /* array: 1 elements */
			/* [1] */
			118, 350
		}, sizeVariable, sizeVariable, notShown, enabled,
		Window {
			"TWindow",
			9,
			noGoAwayBox,
			notResizable,
			modeless,
			ignoreFirstClick,
			dontFreeOnClosing,
			disposeOnFree,
			doesntCloseDocument,
			dontOpenWithDocument,
			dontAdaptToScreen,
			dontStagger,
			forceOnScreen,
			dontCenter,
			noID,
			"<<<>>>"
		},
		/* [2] */
		'  st', 'VW01',
		{ /* array: 1 elements */
			/* [1] */
			0, 0
		},
		{ /* array: 1 elements */
			/* [1] */
			118, 350
		}, sizeFixed, sizeFixed, shown, disabled,
		Picture {
			"TPicture",
			0b0,
			{1, 1},
			notSizeable,
			notDimmed,
			notHilited,
			doesntDismiss,
			{0, 0, 0, 0},
			plain,
			0,
			{ /* array: 3 elements */
				/* [1] */
				0x0,
				/* [2] */
				0x0,
				/* [3] */
				0x0
			},
			"",
```

```
            16536
        }
    }
};


resource 'view' (1017, purgeable) {
    { /* array viewArray: 7 elements */
        /* [1] */
        root, noID,
        { /* array: 1 elements */
            /* [1] */
            50, 40
        },
        { /* array: 1 elements */
            /* [1] */
            268, 402
        }, sizeVariable, sizeVariable, notShown, enabled,
        Window {
            "TWindow",
            dBoxProc,
            noGoAwayBox,
            notResizable,
            modal,
            ignoreFirstClick,
            freeOnClosing,
            disposeOnFree,
            doesntCloseDocument,
            dontOpenWithDocument,
            dontAdaptToScreen,
            dontStagger,
            dontForceOnScreen,
            dontCenter,
            noID,
            "<<<>>>"
        },
        /* [2] */
        root, 'DLOG',
        { /* array: 1 elements */
            /* [1] */
            0, 0
        },
        { /* array: 1 elements */
            /* [1] */
            270, 402
        }, sizeVariable, sizeVariable, shown, disabled,
        DialogView {
            "TDialogView",
            'abOK',
            'abOK'
        },
        /* [3] */
        'DLOG', 'VW03',
        { /* array: 1 elements */
            /* [1] */
            0, 0
        },
        { /* array: 1 elements */
            /* [1] */
            267, 291
        }, sizeFixed, sizeFixed, shown, disabled,
        Picture {
            "TPicture",
            0b0,
```

```
        {1, 1},
        notSizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        16537
    },
    /* [4] */
    'DLOG', 'VW04',
    { /* array: 1 elements */
        /* [1] */
        16, 291
    },
    { /* array: 1 elements */
        /* [1] */
        20, 103
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "Version 1.1"
    },
    /* [5] */
    'DLOG', 'VW05',
    { /* array: 1 elements */
        /* [1] */
        36, 290
    },
    { /* array: 1 elements */
        /* [1] */
        60, 108
    }, sizeFixed, sizeFixed, shown, disabled,
    StaticText {
        "TStaticText",
```

```
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "Copyright © 1990 Southwest Software Inc."
    },
    /* [6] */
    'DLOG', 'VW06',
    { /* array: 1 elements */
        /* [1] */
        100, 291
    },
    { /* array: 1 elements */
        /* [1] */
        90, 114
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "This program was written with MacApp © 1"
        "985-1988 Apple Computer Inc."
    },
    /* [7] */
    'DLOG', 'abOK',
    { /* array: 1 elements */
        /* [1] */
        232, 293
    },
    { /* array: 1 elements */
        /* [1] */
        24, 80
```

```
        }, sizeFixed, sizeFixed, shown, enabled,
        Button {
            "TButton",
            0b1000000,
            {3, 3},
            sizeable,
            notDimmed,
            notHilited,
            dismisses,
            {4, 4, 4, 4},
            plain,
            0,
            { /* array: 3 elements */
                /* [1] */
                0x0,
                /* [2] */
                0x0,
                /* [3] */
                0x0
            },
            "",
            "OK"
        }
    }
};


resource 'view' (1018, purgeable) {
    { /* array viewArray: 2 elements */
        /* [1] */
        root, '  st',
        { /* array: 1 elements */
            /* [1] */
            50, 40
        },
        { /* array: 1 elements */
            /* [1] */
            267, 291
        }, sizeVariable, sizeVariable, notShown, enabled,
        Window {
            "TWindow",
            9,
            noGoAwayBox,
            notResizable,
            modeless,
            ignoreFirstClick,
            dontFreeOnClosing,
            disposeOnFree,
            doesntCloseDocument,
            dontOpenWithDocument,
            dontAdaptToScreen,
            dontStagger,
            forceOnScreen,
            dontCenter,
            noID,
            "<<<>>>"
        },
        /* [2] */
        '  st', 'VW01',
        { /* array: 1 elements */
            /* [1] */
            0, 0
        },
        { /* array: 1 elements */
```

```
            /* [1] */
            267, 291
        }, sizeFixed, sizeFixed, shown, disabled,
        Picture {
            "TPicture",
            0b0,
            {1, 1},
            notSizeable,
            notDimmed,
            notHilited,
            doesntDismiss,
            {0, 0, 0, 0},
            plain,
            0,
            { /* array: 3 elements */
                /* [1] */
                0x0,
                /* [2] */
                0x0,
                /* [3] */
                0x0
            },
            "",
            16537
        }
    }
};
resource 'view' (2000, purgeable) {
    { /* array viewArray: 17 elements */
        /* [1] */
        root, 'WND1',
        { /* array: 1 elements */
            /* [1] */
            50, 40
        },
        { /* array: 1 elements */
            /* [1] */
            244, 484
        }, sizeFixed, sizeFixed, notShown, enabled,
        Window {
            "TWindow",
            noGrowDocProc,
            goAwayBox,
            notResizable,
            modeless,
            ignoreFirstClick,
            freeOnClosing,
            disposeOnFree,
            closesDocument,
            openWithDocument,
            dontAdaptToScreen,
            stagger,
            dontForceOnScreen,
            dontCenter,
            noID,
            "<<<>>>"
        },
        /* [2] */
        'WND1', 'cdoc',
        { /* array: 1 elements */
            /* [1] */
            0, 0
        },
        { /* array: 1 elements */
```

```
        /* [1] */
        244, 484
    }, sizeVariable, sizeVariable, shown, disabled,
    DialogView {
        "TCalSelectDialogView",
        noID,
        noID
    },
    /* [3] */
    'cdoc', 'tsnm',
    { /* array: 1 elements */
        /* [1] */
        20, 16
    },
    { /* array: 1 elements */
        /* [1] */
        20, 429
    }, sizeFixed, sizeFixed, shown, enabled,
    EditText {
        "TEditText",
        0b1111,
        {1, 1},
        sizeable,
        notDimmed,
        notHilited,
        doesntDismiss,
        {2, 2, 2, 2},
        plain,
        0,
        { /* array: 3 elements */
            /* [1] */
            0x0,
            /* [2] */
            0x0,
            /* [3] */
            0x0
        },
        "A",
        justLeft,
        "testing",
        93,
        0b111100000000000000000000100000000
    },
    /* [4] */
    'cdoc', 'VW03',
    { /* array: 1 elements */
        /* [1] */
        0, 16
    },
    { /* array: 1 elements */
        /* [1] */
        16, 148
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
```

```
        { /* array: 3 elements */
            /* [1] */
            0x0,
            /* [2] */
            0x0,
            /* [3] */
            0x0
        },
        "",
        justLeft,
        "Imagesetter Name:"
    },
    /* [5] */
    'cdoc', 'VW06',
    { /* array: 1 elements */
        /* [1] */
        44, 9
    },
    { /* array: 1 elements */
        /* [1] */
        191, 466
    }, sizeFixed, sizeFixed, shown, disabled,
    Cluster {
        "TCluster",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        "Gray Scale Calibration Sets"
    },
    /* [6] */
    'VW06', 'btdl',
    { /* array: 1 elements */
        /* [1] */
        68, 189
    },
    { /* array: 1 elements */
        /* [1] */
        16, 88
    }, sizeFixed, sizeFixed, shown, enabled,
    Button {
        "TCommandButton",
        0b0,
        {1, 1},
        sizeable,
        notDimmed,
        notHilited,
        doesntDismiss,
        {0, 0, 0, 0},
        plain,
```

```
            0,
            { /* array: 3 elements */
                /* [1] */
                0x0,
                /* [2] */
                0x0,
                /* [3] */
                0x0
            },
            "",
            "Download All"
        },
        /* [7] */
        'VW06', 'btcr',
        { /* array: 1 elements */
            /* [1] */
            88, 189
        },
        { /* array: 1 elements */
            /* [1] */
            16, 88
        }, sizeFixed, sizeFixed, shown, enabled,
        Button {
            "TCommandButton",
            0b0,
            {1, 1},
            sizeable,
            notDimmed,
            notHilited,
            doesntDismiss,
            {0, 0, 0, 0},
            plain,
            0,
            { /* array: 3 elements */
                /* [1] */
                0x0,
                /* [2] */
                0x0,
                /* [3] */
                0x0
            },
            "",
            "Create"
        },
        /* [10] */
        'VW06', 'VW11',
        { /* array: 1 elements */
            /* [1] */
            25, 20
        },
        { /* array: 1 elements */
            /* [1] */
            16, 80
        }, sizeFixed, sizeFixed, shown, disabled,
        StaticText {
            "TStaticText",
            0b0,
            {1, 1},
            sizeable,
            notDimmed,
            notHilited,
            doesntDismiss,
            {0, 0, 0, 0},
            plain,
```

```
        0,
        { /* array: 3 elements */
            /* [1] */
            0x0,
            /* [2] */
            0x0,
            /* [3] */
            0x0
        },
        "",
        justLeft,
        "Local Sets:"
    },
    /* [12] */
    'VW06', 'VW15',
    { /* array: 1 elements */
        /* [1] */
        25, 292
    },
    { /* array: 1 elements */
        /* [1] */
        16, 128
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        12,
        { /* array: 3 elements */
            /* [1] */
            0x0,
            /* [2] */
            0x0,
            /* [3] */
            0x0
        },
        "",
        justLeft,
        "Rip Resident Sets:"
    },
    /* [13] */
    'cdoc', 'lcsc',
    { /* array: 1 elements */
        /* [1] */
        92, 24
    },
    { /* array: 1 elements */
        /* [1] */
        128,
        162 - kSBarSizeMinus1
    }, sizeRelSuperView, sizeRelSuperView, shown, disabled,
    Scroller {
        "TScroller",
        VertScrollBar,
        noHorzScrollBar,
        256,
        256,
        16,
```

```
		16,
		noVertConstrain,
		noHorzConstrain,
		{0, 0, 0, 0}
	},
	/* [14] */
	'lcsc', 'lcgd',
	{ /* array: 1 elements */
		/* [1] */
		0,0
	},
	{ /* array: 1 elements */
		/* [1] */
		150, 150
	}, sizeVariable, sizeVariable, shown, enabled,
	TextGridView {
		"TCalListView",
		10,
		1,
		16,
		30,
		0,
		4,
		dontAdornRows,
		dontAdornCols,
		singleSelection,
		plain,
		12,
		{ /* array: 3 elements */
			/* [1] */
			0x0,
			/* [2] */
			0x0,
			/* [3] */
			0x0
		},
		""
	},
	/* [15] */
	'cdoc', 'rpsc',
	{ /* array: 1 elements */
		/* [1] */
		92, 298
	},
	{ /* array: 1 elements */
		/* [1] */
		128,
		162 - kSBarSizeMinus1
	}, sizeRelSuperView, sizeRelSuperView, shown, disabled,
	Scroller {
		"TScroller",
		VertScrollBar,
		noHorzScrollBar,
		256,
		256,
		16,
		16,
		noVertConstrain,
		noHorzConstrain,
		{0, 0, 0, 0}
	},
	/* [16] */
	'rpsc', 'rpgd',
	{ /* array: 1 elements */
```

```
            /* [1] */
            0,0
        },
        { /* array: 1 elements */
            /* [1] */
            150,150
        }, sizeVariable, sizeVariable, shown, enabled,
        TextGridView {
            "TCalListView",
            10,
            1,
            16,
            162 - kSBarSizeMinus1 - 2,
            0,
            4,
            dontAdornRows,
            dontAdornCols,
            singleSelection,
            plain,
            12,
            { /* array: 3 elements */
                /* [1] */
                0x0,
                /* [2] */
                0x0,
                /* [3] */
                0x0
            },
            ""
        }

    }
};

resource 'view' (2008, purgeable) {
    { /* array viewArray: 5 elements */
        /* [1] */
        root, noID, ,
        { /* array: 1 elements */
            /* [1] */
            50, 40
        },
        { /* array: 1 elements */
            /* [1] */
            80, 448
        }, sizeVariable, sizeVariable, notShown, enabled,
        Window {
            "TWindow",
            9,
            noGoAwayBox,
            notResizable,
            modal,
            ignoreFirstClick,
            dontFreeOnClosing,
            disposeOnFree,
            doesntCloseDocument,
            dontOpenWithDocument,
            dontAdaptToScreen,
            dontStagger,
            forceOnScreen,
            centerHorizontally,
            noID,
            "<<<>>>"
        },
```

```
/* [2] */
root, 'DLOG',
{ /* array: 1 elements */
    /* [1] */
    0, 0
},
{ /* array: 1 elements */
    /* [1] */
    80, 448
}, sizeVariable, sizeVariable, shown, disabled,
DialogView {
    "TTSMInitializeView",
    'cncl',
    noID
},
/* [3] */
'DLOG', 'VW03',
{ /* array: 1 elements */
    /* [1] */
    16, 16
},
{ /* array: 1 elements */
    /* [1] */
    32, 32
}, sizeFixed, sizeFixed, shown, disabled,
Icon {
    "TIcon",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    dontPreferColor,
    1
},
/* [4] */
'DLOG', 'VW04',
{ /* array: 1 elements */
    /* [1] */
    16, 64
},
{ /* array: 1 elements */
    /* [1] */
    32, 368
}, sizeFixed, sizeFixed, shown, disabled,
StaticText {
    "TStaticText",
    0b0,
    {1, 1},
    sizeable,
    notDimmed,
```

```
            notHilited,
            doesntDismiss,
            {0, 0, 0, 0},
            plain,
            0,
            { /* array: 3 elements */
                /* [1] */
                0x0,
                /* [2] */
                0x0,
                /* [3] */
                0x0
            },
            "",
            justLeft,
            "Downloading ^0 calibration sets to printer ^1:  Please w"
            "ait..."
        },
        /* [5] */
        'DLOG', 'cncl',
        { /* array: 1 elements */
            /* [1] */
            48, 352
        },
        { /* array: 1 elements */
            /* [1] */
            24, 80
        }, sizeFixed, sizeFixed, shown, enabled,
        Button {
            "TButton",
            0b1000000,
            {3, 3},
            sizeable,
            notDimmed,
            notHilited,
            dismisses,
            {4, 4, 4, 4},
            plain,
            0,
            { /* array: 3 elements */
                /* [1] */
                0x0,
                /* [2] */
                0x0,
                /* [3] */
                0x0
            },
            "",
            "Cancel"
        }
    }
};

resource 'view' (2009, purgeable) {
    { /* array viewArray: 9 elements */
        /* [1] */
        root, noID,
        { /* array: 1 elements */
            /* [1] */
            50, 40
        },
        { /* array: 1 elements */
            /* [1] */
            240, 424
```

```
}, sizeVariable, sizeVariable, notShown, enabled,
Window {
    "TWindow",
    9,
    noGoAwayBox,
    notResizable,
    modal,
    ignoreFirstClick,
    dontFreeOnClosing,
    disposeOnFree,
    closesDocument, ,
    dontOpenWithDocument;
    dontAdaptToScreen,
    dontStagger,
    dontForceOnScreen,
    center,
    noID,
    "<<<>>>"
},
/* [2] */
root, 'IZDL',
{ /* array: 1 elements */
    /* [1] */
    0, 0
},
{ /* array: 1 elements */
    /* [1] */
    240, 424
}, sizeVariable, sizeVariable, shown, disabled,
DialogView {
    "TDialogView",
    'insl',
    'cncl'
},
/* [3] */
'IZDL', 'cncl',
{ /* array: 1 elements */
    /* [1] */
    204, 48 ,
},
{ /* array: 1 elements */
    /* [1] */
    16, 72
}, sizeFixed, sizeFixed, shown, enabled,
Button {
    "TButton",
    0b0,
    {3, 3},
    sizeable,
    notDimmed,
    notHilited,
    dismisses,
    {0, 0, 0, 0},
    plain,
    0,
    { /* array: 3 elements */
        /* [1] */
        0x0,
        /* [2] */
        0x0,
        /* [3] */
        0x0
    },
    "",
```

```
        "Cancel"
    },
    /* [4] */
    'IZDL', 'insl',
    { /* array: 1 elements */
        /* [1] */
        200, 296
    },
    { /* array: 1 elements */
        /* [1] */
        24, 80
    }, sizeFixed, sizeFixed, shown, enabled,
    Button {
        "TButton",
        0b1000000,
        {3, 3},
        sizeable,
        notDimmed,
        notHilited,
        dismisses,
        {4, 4, 4, 4},
        plain,
        0,
        { /* array: 3 elements */
            /* [1] */
            0x0,
            /* [2] */
            0x0,
            /* [3] */
            0x0
        },
        "",
        "Install"
    },
    /* [5] */
    'IZDL', 'VW05',
    { /* array: 1 elements */
        /* [1] */
        24, 80
    },
    { /* array: 1 elements */
        /* [1] */
        32, 336
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
```

```
        justLeft,
        "The "
        programname2
        " software is not inst"
        "alled on typesetter ^0."
    },
    /* [6] */
    'IZDL', 'VW06',
    { /* array: 1 elements */
        /* [1] */
        64, 80
    },
    { /* array: 1 elements */
        /* [1] */
        48, 336
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "The Install procedure will download the "
        programname2
        " software onto your typesetter's disk"
        " and will restart the typesetter."
    },
    /* [7] */
    'IZDL', 'VW07',
    { /* array: 1 elements */
        /* [1] */
        120, 80
    },
    { /* array: 1 elements */
        /* [1] */
        32, 336
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
```

```
            /* [1] */
            0x0,
            /* [2] */
            0x0,
            /* [3] */
            0x0
        },
        "",
        justLeft,
        "Afterwards, the spftware will be aut"
        "omatically loaded each time your types"
        "etter restarts."
    },
    /* [8] */
    'IZDL', 'VW08',
    { /* array: 1 elements */
        /* [1] */
        24, 16
    },
    { /* array: 1 elements */
        /* [1] */
        32, 32
    }, sizeFixed, sizeFixed, shown, disabled,
    Icon {
        "TIcon",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        preferColor,
        2
    },
    /* [9] */
    'IZDL', 'VW09',
    { /* array: 1 elements */
        /* [1] */
        160, 80
    },
    { /* array: 1 elements */
        /* [1] */
        16, 336
    }, sizeFixed, sizeFixed, shown, disabled,
    StaticText {
        "TStaticText",
        0b0,
        {1, 1},
        sizeable,
        notDimmed,
        notHilited,
        doesntDismiss,
```

```
            {0, 0, 0, 0},
            plain,
            0,
            { /* array: 3 elements */
                /* [1] */
                0x0,
                /* [2] */
                0x0,
                /* [3] */
                0x0
            },
            "",
            justLeft,
            "Do you wish to install the software "
            "now?"
        }
    }
};

resource 'view' (2010, purgeable) {
    { /* array viewArray: 5 elements */
        /* [1] */
        root, noID,
        { /* array: 1 elements */
            /* [1] */
            50, 40
        },
        { /* array: 1 elements */
            /* [1] */
            80, 448
        }, sizeVariable, sizeVariable, notShown, enabled,
        Window {
            "TWindow",
            9,
            noGoAwayBox,
            notResizable,
            modal,
            ignoreFirstClick,
            dontFreeOnClosing,
            disposeOnFree,
            doesntCloseDocument,
            dontOpenWithDocument,
            dontAdaptToScreen,
            dontStagger,
            forceOnScreen,
            centerHorizontally,
            noID,
            "<<<>>>"
        },
        /* [2] */
        root, 'DLOG',
        { /* array: 1 elements */
            /* [1] */
            0, 0
        },
        { /* array: 1 elements */
            /* [1] */
            80, 448
        }, sizeVariable, sizeVariable, shown, disabled,
        DialogView {
            "TTSMInitializeView",
            'cncl',
            noID
        },
```

```
/* [3] */
'DLOG', 'VW03',
{ /* array: 1 elements */
    /* [1] */
    16, 16
},
{ /* array: 1 elements */
    /* [1] */
    32, 32
}, sizeFixed, sizeFixed, shown, disabled,
Icon {
    "TIcon",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    dontPreferColor,
    1
},
/* [4] */
'DLOG', 'VW04',
{ /* array: 1 elements */
    /* [1] */
    16, 64
},
{ /* array: 1 elements */
    /* [1] */
    32, 368
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    justLeft,
```

```
            "Downloading ^0 software to printer ^1:  Please w"
            "ait..."
        },
        /* [5] */
        'DLOG', 'cncl',
        { /* array: 1 elements */
            /* [1] */
            48, 352
        },
        { /* array: 1 elements */
            /* [1] */
            24, 80
        }, sizeFixed, sizeFixed, shown, enabled,
        Button {
            "TButton",
            0b1000000,
            {3, 3},
            sizeable,
            notDimmed,
            notHilited,
            dismisses,
            {4, 4, 4, 4},
            plain,
            0,
            { /* array: 3 elements */
                /* [1] */
                0x0,
                /* [2] */
                0x0,
                /* [3] */
                0x0
            },
            "",
            "Cancel"
        }
    }
};
resource 'view' (2011, purgeable) {
    { /* array viewArray: 8 elements */
        /* [1] */
        root, noID,
        { /* array: 1 elements */
            /* [1] */
            50, 40
        },
        { /* array: 1 elements */
            /* [1] */
            192, 408
        }, sizeVariable, sizeVariable, notShown, enabled,
        Window {
            "TWindow",
            9,
            noGoAwayBox,
            notResizable,
            modal,
            ignoreFirstClick,
            dontFreeOnClosing,
            disposeOnFree,
            doesntCloseDocument,
            dontOpenWithDocument,
            dontAdaptToScreen,
            dontStagger,
            dontForceOnScreen,
            center,
```

```
        noID,
        "<<<>>>"
    },
    /* [2] */
    root, 'DLOG',
    { /* array: 1 elements */
        /* [1] */
        0, 0
    },
    { /* array: 1 elements */
        /* [1] */
        192, 408
    }, sizeVariable, sizeVariable, shown, disabled,
    DialogView {
        "TDialogView",
        'cncl',
        'cncl'
    },
    /* [3] */
    'DLOG', 'VW03',
    { /* array: 1 elements */
        /* [1] */
        24, 16
    },
    { /* array: 1 elements */
        /* [1] */
        32, 32
    }, sizeFixed, sizeFixed, shown, disabled,
    Icon {
        "TIcon",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        dontPreferColor,
        0
    },
    /* [4] */
    'DLOG', 'VW04',
    { /* array: 1 elements */
        /* [1] */
        24, 64
    },
    { /* array: 1 elements */
        /* [1] */
        48, 336
    }, sizeFixed, sizeFixed, shown, disabled,
    StaticText {
        "TStaticText",
        0b0,
```

```
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "The Remove "
        programname2
        "procedure will  remove th"
        "e software from your typesetter's di"
        "sk and memory, and will restart the type"
        "setter."
    },
    /* [5] */
    'DLOG', 'rmve',
    { /* array: 1 elements */
        /* [1] */
        152, 304
    },
    { /* array: 1 elements */
        /* [1] */
        16, 72
    }, sizeFixed, sizeFixed, shown, enabled,
    Button {
        "TButton",
        0b0,
        {3, 3},
        sizeable,
        notDimmed,
        notHilited,
        dismisses,
        {0, 0, 0, 0},
        plain,
        0,
        { /* array: 3 elements */
            /* [1] */
            0x0,
            /* [2] */
            0x0,
            /* [3] */
            0x0
        },
        "",
        "Remove"
    },
    /* [6] */
    'DLOG', 'cncl',
    { /* array: 1 elements */
        /* [1] */
        148, 52
    },
    { /* array: 1 elements */
```

```
    /* [1] */
    24, 80
}, sizeFixed, sizeFixed, shown, enabled,
Button {
    "TButton",
    0b1000000,
    {3, 3},
    sizeable,
    notDimmed,
    notHilited,
    dismisses,
    {4, 4, 4, 4},
    plain,
    0,
    { /* array: 3 elements */
        /* [1] */
        0x0,
        /* [2] */
        0x0,
        /* [3] */
        0x0
    },
    "",
    "Cancel"
},
/* [7] */
'DLOG', 'VW07',
{ /* array: 1 elements */
    /* [1] */
    80, 64
},
{ /* array: 1 elements */
    /* [1] */
    32, 336
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    justLeft,
    "Do this only if you wish to discontinue "
    "grey scale calibration corrections."
},
/* [8] */
'DLOG', 'VW08',
{ /* array: 1 elements */
    /* [1] */
    120, 64
```

```
        },
        { /* array: 1 elements */
            /* [1] */
            16, 336
        }, sizeFixed, sizeFixed, shown, disabled,
        StaticText {
            "TStaticText",
            0b0,
            {1, 1},
            sizeable,
            notDimmed,
            notHilited,
            doesntDismiss,
            {0, 0, 0, 0},
            plain,
            0,
            { /* array: 3 elements */
                /* [1] */
                0x0,
                /* [2] */
                0x0,
                /* [3] */
                0x0
            },
            "",
            justLeft,
            "Do you wish to remove the software n"
            "ow?"
        }
    }
};

resource 'view' (3000, purgeable) {
    { /* array viewArray: 76 elements */
        /* [1] */
        root, noID,
        { /* array: 1 elements */
            /* [1] */
            50, 40
        },
        { /* array: 1 elements */
            /* [1] */
            288, 496
        }, sizeVariable, sizeVariable, notShown, enabled,
        Window {
            "TWindow",
            dBoxProc,
            nogoAwayBox,
            notResizable,
            modal,
            ignoreFirstClick,
            FreeOnClosing,
            disposeOnFree,
            doesntCloseDocument,
            dontOpenWithDocument,
            dontAdaptToScreen,
            dontstagger,
            forceOnScreen,
            center,
            noID,
            "Calibration Set"
        },
        /* [2] */
        root, 'cldg',
```

```
{ /* array: 1 elements */
    /* [1] */
    0, 0
},
{ /* array: 1 elements */
    /* [1] */
    288, 496
}, sizeVariable, sizeVariable, shown, disabled,
DialogView {
    "TCalDataDialogView",
    'cdok',
    'cdcl'
},
/* [4] */
'cldg', 'cdok',
{ /* array: 1 elements */
    /* [1] */
    10, 395
},
{ /* array: 1 elements */
    /* [1] */
    24, 80
}, sizeFixed, sizeFixed, shown, enabled,
Button {
    "TButton",
    0b1000000,
    {3, 3},
    sizeable,
    notDimmed,
    notHilited,
    dismisses,
    {4, 4, 4, 4},
    plain,
    0,
    { /* array: 3 elements */
        /* [1] */
        0x0,
        /* [2] */
        0x0,
        /* [3] */
        0x0
    },
    "",
    "OK"
},
/* [8] */
'cldg', 'cdcl',
{ /* array: 1 elements */
    /* [1] */
    10, 270
},
{ /* array: 1 elements */
    /* [1] */
    24, 80
}, sizeFixed, sizeFixed, shown, enabled,
Button {
    "TButton",
    0b0,
    {1, 1},
    sizeable,
    notDimmed,
    notHilited,
    dismisses,
    {0, 0, 0, 0},
```

```
            plain,
            0,
            { /* array: 3 elements */
                /* [1] */
                0x0,
                /* [2] */
                0x0,
                /* [3] */
                0x0
            },
            "",
            "Cancel"
        },
#ifdef spotfunc
        /* [3] */
        'cldg', 'VW11',
        { /* array: 1 elements */
            /* [1] */
            78, 20
        },
        { /* array: 1 elements */
            /* [1] */
            86, 232
        }, sizeFixed, sizeFixed, shown, disabled,
        Cluster {
            "TCluster",
            0b0,
            {1, 1},
            sizeable,
            Dimmed,
            notHilited,
            doesntDismiss,
            {0, 0, 0, 0},
            plain,
            0,
            { /* array: 3 elements */
                /* [1] */
                0x0,
                /* [2] */
                0x0,
                /* [3] */
                0x0
            },
            "",
            "Spot Function"
        },
        /* [4] */
        'VW11', 'lssp',
        { /* array: 1 elements */
            /* [1] */
            20, 12
        },
        { /* array: 1 elements */
            /* [1] */
            58, 208
        }, sizeVariable, sizeVariable, shown, enabled,
        TEView {
            "TTEView",
            withStyle,
            autoWrap,
            acceptChanges,
            freeText,
            cTyping,
            unlimited,
```

```
			{4, 4, 4, 4},
			justLeft,
			plain,
			9,
			{ /* array: 3 elements */
				/* [1] */
				0x0,
				/* [2] */
				0x0,
				/* [3] */
				0x0
			},
			"Geneva"

		},
#endif
		/* [19] */
		'cldg', 'VW22',
		{ /* array: 1 elements */
			/* [1] */
			26 + spotdrop, 18
		},
		{ /* array: 1 elements */
			/* [1] */
			20, 184
		}, sizeFixed, sizeFixed, shown, disabled,
		StaticText {
			"TStaticText",
			0b0,
			{1, 1},
			sizeable,
			notDimmed,
			notHilited,
			doesntDismiss,
			{0, 0, 0, 0},
			plain,
			0,
			{ /* array: 3 elements */
				/* [1] */
				0x0,
				/* [2] */
				0x0,
				/* [3] */
				0x0
			},
			"",
			justRight,
			"Media Type:"
		},
		/* [20] */
		'cldg', 'mtyp',
		{ /* array: 1 elements */
			/* [1] */
			23 + spotdrop, 206
		},
		{ /* array: 1 elements */
			/* [1] */
			20, 44
		}, sizeFixed, sizeFixed, shown, enabled,
		EditText {
			"TEditText",
			0b1111,
			{1, 1},
			sizeable,
```

```
        notDimmed,
        notHilited,
        doesntDismiss,
        {2, 2, 2, 2},
        plain,
        0,
        { /* array: 3 elements */
            /* [1] */
            0x0,
            /* [2] */
            0x0,
            /* [3] */
            0x0
        },
        "",
        justLeft,
        "Film",
        10,
        0b1111000000000000000000000100000000
    },
    /* [19] */
    'cldg', 'VW06',
    { /* array: 1 elements */
        /* [1] */
        53 + spotdrop2, 18
    },
    { /* array: 1 elements */
        /* [1] */
        20, 184
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justRight,
        "Exposure Intensity Setting:"
    },
    /* [20] */
    'cldg', 'cdei',
    { /* array: 1 elements */
        /* [1] */
        50 + spotdrop2, 206
    },
    { /* array: 1 elements */
        /* [1] */
        20, 44
    }, sizeFixed, sizeFixed, shown, enabled,
    ExtendedText {
```

```
        "TExtendedText",
        0b1111,
        {1, 1},
        sizeable,
        notDimmed,
        notHilited,
        doesntDismiss,
        {2, 2, 2, 2},
        plain,
        0,
        { /* array: 3 elements */
            /* [1] */
            0x0,
            /* [2] */
            0x0,
            /* [3] */
            0x0
        },
        "",
        justRight,
        "2.00",
        unlimited,
        0b1111000000000000000000000100000000,
        0,
        8,
        2,
        "2.00"
    },
    /* [5] */
    'cldg', 'VW03',
    { /* array: 1 elements */
        /* [1] */
        48, 264
    },
    { /* array: 1 elements */
        /* [1] */
        116, 212
    }, sizeFixed, sizeFixed, shown, disabled,
    Cluster {
        "TCluster",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        "Screen"
    },
    /* [6] */
    'VW03', 'lsnm',
    { /* array: 1 elements */
        /* [1] */
```

```
        16, 108
    },
    { /* array: 1 elements */
        /* [1] */
        20, 60
    }, sizeFixed, sizeFixed, shown, enabled,
    ExtendedText {
        "TExtendedText",
        0b1111,
        {1, 1},
        sizeable,
        notDimmed,
        notHilited,
        doesntDismiss,
        {2, 2, 2, 2},
        plain,
        0,
        { /* array: 3 elements */
            /* [1] */
            0x0,
            /* [2] */
            0x0,
            /* [3] */
            0x0
        },
        "",
        justRight,
        "150",
        unlimited,
        0b1111000000000000000000000100000000,
        0,
        300,
        3,
        "150.000"
    },
    /* [7] */
    'VW03', 'lscp',
    { /* array: 1 elements */
        /* [1] */
        40, 108
    },
    { /* array: 1 elements */
        /* [1] */
        20, 60
    }, sizeFixed, sizeFixed, shown, enabled,
    ExtendedText {
        "TExtendedText",
        0b1111,
        {1, 1},
        sizeable,
        notDimmed,
        notHilited,
        doesntDismiss,
        {2, 2, 2, 2},
        plain,
        0,
        { /* array: 3 elements */
            /* [1] */
            0x0,
            /* [2] */
            0x0,
            /* [3] */
            0x0
        },
```

```
        "",
        justRight,
        "150",
        unlimited,
        0b1111000000000000000000000100000000,
        0,
        300,
        3,
        "150.000"
    },
    /* [8] */
    'VW03', 'lsfr',
    { /* array: 1 elements */
        /* [1] */
        64, 108
    },
    { /* array: 1 elements */
        /* [1] */
        20, 60
    }, sizeFixed, sizeFixed, shown, enabled,
    ExtendedText {
        "TExtendedText",
        0b1111,
        {1, 1},
        sizeable,
        notDimmed,
        notHilited,
        doesntDismiss,
        {2, 2, 2, 2},
        plain,
        0,
        { /* array: 3 elements */
            /* [1] */
            0x0,
            /* [2] */
            0x0,
            /* [3] */
            0x0
        },
        "",
        justRight,
        "0",
        unlimited,
        0b1111000000000000000000000100000000,
        0,
        300,
        3,
        "0.000"
    },
    /* [9] */
    'VW03', 'lsto',
    { /* array: 1 elements */
        /* [1] */
        88, 108
    },
    { /* array: 1 elements */
        /* [1] */
        20, 60
    }, sizeFixed, sizeFixed, shown, enabled,
    ExtendedText {
        "TExtendedText",
        0b1111,
        {1, 1},
        sizeable,
```

```
        notDimmed,
        notHilited,
        doesntDismiss,
        {2, 2, 2, 2},
        plain,
        0,
        { /* array: 3 elements */
            /* [1] */
            0x0,
            /* [2] */
            0x0,
            /* [3] */
            0x0
        },
        "",
        justRight,
        "300",
        unlimited,
        0b11110000000000000000000100000000,
        0,
        300,
        3,
        "300.000"
    },
    /* [10] */
    'VW03', 'VW28',
    { /* array: 1 elements */
        /* [1] */
        16, 40
    },
    { /* array: 1 elements */
        /* [1] */
        20, 64
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justRight,
        "Name:"
    },
    /* [11] */
    'VW03', 'VW29',
    { /* array: 1 elements */
        /* [1] */
        40, 40
    },
    { /* array: 1 elements */
```

```
        /* [1] */
        20, 64
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justRight,
        "Cal Point:"
    },
    /* [12] */
    'VW03', 'VW30',
    { /* array: 1 elements */
        /* [1] */
        64, 16
    },
    { /* array: 1 elements */
        /* [1] */
        20, 88
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justRight,
        "Adjust From:"
    },
    /* [13] */
    'VW03', 'VW31',
    { /* array: 1 elements */
        /* [1] */
        88, 40
```

```
},
{ /* array: 1 elements */
    /* [1] */
    20, 64
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    justRight,
    "to:"
},
/* [14] */
'VW03', 'VW12',
{ /* array: 1 elements */
    /* [1] */
    17, 172
},
{ /* array: 1 elements */
    /* [1] */
    19, 20
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    justLeft,
    "lpi"
},
/* [15] */
'VW03', 'VW32',
{ /* array: 1 elements */
```

```
    /* [1] */
    40, 172
},
{ /* array: 1 elements */
    /* [1] */
    20, 24
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    justLeft,
    "lpi"
},
/* [16] */
'VW03', 'VW33',
{ /* array: 1 elements */
    /* [1] */
    64, 172
},
{ /* array: 1 elements */
    /* [1] */
    20, 20
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    justLeft,
    "lpi"
},
/* [17] */
```

```
'VW03', 'VW34',
{ /* array: 1 elements */
    /* [1] */
    88, 172
},
{ /* array: 1 elements */
    /* [1] */
    20, 24
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    justLeft,
    "lpi"
},
/* [18] */
'cldg', 'resp',
{ /* array: 1 elements */
    /* [1] */
    25 + spotdrop, 20
},
{ /* array: 1 elements */
    /* [1] */
    20, 144
}, sizeVariable, sizeVariable, shown, enabled,
Popup {
    "TChangeOPopUp",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    kResPopup,
    0,
```

```
    30
},
/* [21] */
'cldg', 'VW02',
{ /* array: 1 elements */
    /* [1] */
    168, 20
},
{ /* array: 1 elements */
    /* [1] */
    104, 456
}, sizeFixed, sizeFixed, shown, disabled,
Cluster {
    "TCluster",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    "Dot Area Measurements (Uncalibrated)"
},
/* [22] */
'VW02', 'pldn',
{ /* array: 1 elements */
    /* [1] */
    16, 216
},
{ /* array: 1 elements */
    /* [1] */
    16, 88
}, sizeFixed, sizeFixed, notshown, disabled,
Radio {
    "TRadio",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
```

```
    off,
    "+ Density"
},
/* [23] */
'VW02', 'ngdn',
{ /* array: 1 elements */
    /* [1] */
    16, 132
},
{ /* array: 1 elements */
    /* [1] */
    16, 84
}, sizeFixed, sizeFixed, notshown, disabled,
Radio {
    "TRadio",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    off,
    "- Density"
},
/* [24] */
'VW02', 'pldt',
{ /* array: 1 elements */
    /* [1] */
    16, 72
},
{ /* array: 1 elements */
    /* [1] */
    16, 56
}, sizeFixed, sizeFixed, shown, enabled,
Radio {
    "TRadio",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
```

```
    },
    "",
    off,
    "+ Dot"
},
/* [25] */
'VW02', 'ngdt',
{ /* array: 1 elements */
    /* [1] */
    16, 16
},
{ /* array: 1 elements */
    /* [1] */
    16, 52
}, sizeFixed, sizeFixed, shown, enabled,
Radio {
    "TRadio",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    on,
    "- Dot"
},
/* [26] */
'VW02', 'VW05',
{ /* array: 1 elements */
    /* [1] */
    12, 304
},
{ /* array: 1 elements */
    /* [1] */
    16, 48
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
```

```
            /* [3] */
            0x0
        },
        "",
        justRight,
        "Dmax:"
    },
    /* [27] */
    'VWO2', 'dmax',
    { /* array: 1 elements */
        /* [1] */
        12, 356
    },
    { /* array: 1 elements */
        /* [1] */
        20, 48
    }, sizeFixed, sizeFixed, shown, enabled,
    ExtendedText {
        "TExtendedText",
        0b1111,
        {1, 1},
        sizeable,
        notDimmed,
        notHilited,
        doesntDismiss,
        {2, 2, 2, 2},
        plain,
        0,
        { /* array: 3 elements */
            /* [1] */
            0x0,
            /* [2] */
            0x0,
            /* [3] */
            0x0
        },
        "",
        justRight,
        "0",
        5,
        0b11110000000000000000000100000000,
        0,
        8,
        3,
        "0.000"
    },
    /* [28] */
    'VWO2', 'ntry',
    { /* array: 1 elements */
        /* [1] */
        28, 4
    },
    { /* array: 1 elements */
        /* [1] */
        76, 444
    }, sizeVariable, sizeVariable, shown, disabled,
    View {
        "TCalDataView"
    },
    /* [29] */
    'ntry', 'cd02',
    { /* array: 1 elements */
        /* [1] */
        8, 8
```

```
},
{ /* array: 1 elements */
    /* [1] */
    16, 32
}, sizeFixed, sizeFixed, shown, enabled,
ExtendedText {
    "TExtendedText",
    0b1111,
    {1, 1},
    sizeable,
    notDimmed,
    notHilited,
    doesntDismiss,
    {2, 2, 2, 2},
    plain,
    9,
    { /* array: 3 elements */
        /* [1] */
        0x0,
        /* [2] */
        0x0,
        /* [3] */
        0x0
    },
    "A",
    justCenter,
    "2",
    5,
    0b11110000000000000000000100000000,
    0,
    100,
    2,
    "2.00"
},
/* [30] */
'ntry', 'cd05',
{ /* array: 1 elements */
    /* [1] */
    8, 44
},
{ /* array: 1 elements */
    /* [1] */
    16, 32
}, sizeFixed, sizeFixed, shown, enabled,
ExtendedText {
    "TExtendedText",
    0b1111,
    {1, 1},
    sizeable,
    notDimmed,
    notHilited,
    doesntDismiss,
    {2, 2, 2, 2},
    plain,
    9,
    { /* array: 3 elements */
        /* [1] */
        0x0,
        /* [2] */
        0x0,
        /* [3] */
        0x0
    },
    "A",
```

```
        justCenter,
        "5",
        5,
        0b1111000000000000000000000100000000,
        0,
        100,
        2,
        "5.00"
    },
    /* [31] */
    'ntry', 'cd07',
    { /* array: 1 elements */
        /* [1] */
        8, 80
    },
    { /* array: 1 elements */
        /* [1] */
        16, 32
    }, sizeFixed, sizeFixed, shown, enabled,
    ExtendedText {
        "TExtendedText",
        0b1111,
        {1, 1},
        sizeable,
        notDimmed,
        notHilited,
        doesntDismiss,
        {2, 2, 2, 2},
        plain,
        9,
        { /* array: 3 elements */
            /* [1] */
            0x0,
            /* [2] */
            0x0,
            /* [3] */
            0x0
        },
        "A",
        justCenter,
        "7",
        5,
        0b1111000000000000000000000100000000,
        0,
        100,
        2,
        "7.00"
    },
    /* [32] */
    'ntry', 'cd10',
    { /* array: 1 elements */
        /* [1] */
        8, 116
    },
    { /* array: 1 elements */
        /* [1] */
        16, 32
    }, sizeFixed, sizeFixed, shown, enabled,
    ExtendedText {
        "TExtendedText",
        0b1111,
        {1, 1},
        sizeable,
        notDimmed,
```

```
        notHilited,
        doesntDismiss,
        {2, 2, 2, 2},
        plain,
        9,
        { /* array: 3 elements */
            /* [1] */
            0x0,
            /* [2] */
            0x0,
            /* [3] */
            0x0
        },
        "A",
        justCenter,
        "10",
        5,
        0b1111000000000000000000000100000000,
        0,
        100,
        2,
        "10.00"
    },
    /* [33] */
    'ntry', 'cd15',
    { /* array: 1 elements */
        /* [1] */
        8, 152
    },
    { /* array: 1 elements */
        /* [1] */
        16, 32
    }, sizeFixed, sizeFixed, shown, enabled,
    ExtendedText {
        "TExtendedText",
        0b1111,
        {1, 1},
        sizeable,
        notDimmed,
        notHilited,
        doesntDismiss,
        {2, 2, 2, 2},
        plain,
        9,
        { /* array: 3 elements */
            /* [1] */
            0x0,
            /* [2] */
            0x0,
            /* [3] */
            0x0
        },
        "A",
        justCenter,
        "15",
        5,
        0b1111000000000000000000000100000000,
        0,
        100,
        2,
        "15.00"
    },
    /* [34] */
    'ntry', 'cd20',
```

```
{ /* array: 1 elements */
    /* [1] */
    8, 188
},
{ /* array: 1 elements */
    /* [1] */
    16, 32
}, sizeFixed, sizeFixed, shown, enabled,
ExtendedText {
    "TExtendedText",
    0b1111,
    {1, 1},
    sizeable,
    notDimmed,
    notHilited,
    doesntDismiss,
    {2, 2, 2, 2},
    plain,
    9,
    { /* array: 3 elements */
        /* [1] */
        0x0,
        /* [2] */
        0x0,
        /* [3] */
        0x0
    },
    "A",
    justCenter,
    "20",
    5,
    0b11110000000000000000000100000000,
    0,
    100,
    2,
    "20.00"
},
/* [35] */
'ntry', 'cd25',
{ /* array: 1 elements */
    /* [1] */
    8, 224
},
{ /* array: 1 elements */
    /* [1] */
    16, 32
}, sizeFixed, sizeFixed, shown, enabled,
ExtendedText {
    "TExtendedText",
    0b1111,
    {1, 1},
    sizeable,
    notDimmed,
    notHilited,
    doesntDismiss,
    {2, 2, 2, 2},
    plain,
    9,
    { /* array: 3 elements */
        /* [1] */
        0x0,
        /* [2] */
        0x0,
        /* [3] */
```

```
            0x0
        },
        "A",
        justCenter,
        "25",
        5,
        0b111100000000000000000000100000000,
        0,
        100,
        2,
        "25.00"
    },
    /* [36] */
    'ntry', 'cd30',
    { /* array: 1 elements */
        /* [1] */
        8, 260
    },
    { /* array: 1 elements */
        /* [1] */
        16, 32
    }, sizeFixed, sizeFixed, shown, enabled,
    ExtendedText {
        "TExtendedText",
        0b1111,
        {1, 1},
        sizeable,
        notDimmed,
        notHilited,
        doesntDismiss,
        {2, 2, 2, 2},
        plain,
        9,
        { /* array: 3 elements */
            /* [1] */
            0x0,
            /* [2] */
            0x0,
            /* [3] */
            0x0
        },
        "A",
        justCenter,
        "30",
        5,
        0b111100000000000000000000100000000,
        0,
        100,
        2,
        "30.00"
    },
    /* [37] */
    'ntry', 'cd35',
    { /* array: 1 elements */
        /* [1] */
        8, 296
    },
    { /* array: 1 elements */
        /* [1] */
        16, 32
    }, sizeFixed, sizeFixed, shown, enabled,
    ExtendedText {
        "TExtendedText",
        0b1111,
```

```
        {1, 1},
        sizeable,
        notDimmed,
        notHilited,
        doesntDismiss,
        {2, 2, 2, 2},
        plain,
        9,
        { /* array: 3 elements */
            /* [1] */
            0x0,
            /* [2] */
            0x0,
            /* [3] */
            0x0
        },
        "A",
        justCenter,
        "35",
        5,
        0b11110000000000000000000100000000,
        0,
        100,
        2,
        "35.00"
    },
    /* [38] */
    'ntry', 'cd40',
    { /* array: 1 elements */
        /* [1] */
        8, 332
    },
    { /* array: 1 elements */
        /* [1] */
        16, 32
    }, sizeFixed, sizeFixed, shown, enabled,
    ExtendedText {
        "TExtendedText",
        0b1111, ,
        {1, 1},
        sizeable,
        notDimmed,
        notHilited,
        doesntDismiss,
        {2, 2, 2, 2},
        plain,
        9,
        { /* array: 3 elements */
            /* [1] */
            0x0,
            /* [2] */
            0x0,
            /* [3] */
            0x0
        },
        "A",
        justCenter,
        "40",
        5,
        0b11110000000000000000000100000000,
        0,
        100,
        2,
        "40.00"
```

```
},
/* [39] */
'ntry', 'cd45',
{ /* array: 1 elements */
    /* [1] */
    8, 368
},
{ /* array: 1 elements */
    /* [1] */
    16, 32
}, sizeFixed, sizeFixed, shown, enabled,
ExtendedText {
    "TExtendedText",
    0b1111,
    {1, 1},
    sizeable,
    notDimmed,
    notHilited,
    doesntDismiss,
    {2, 2, 2, 2},
    plain,
    9,
    { /* array: 3 elements */
        /* [1] */
        0x0,
        /* [2] */
        0x0,
        /* [3] */
        0x0
    },
    "A",
    justCenter,
    "45",
    5,
    0b1111000000000000000000000100000000,
    0,
    100,
    2,
    "45.00" ,
},
/* [40] */
'ntry', 'cd50',
{ /* array: 1 elements */
    /* [1] */
    8, 404
},
{ /* array: 1 elements */
    /* [1] */
    16, 32
}, sizeFixed, sizeFixed, shown, enabled,
ExtendedText {
    "TExtendedText",
    0b1111,
    {1, 1},
    sizeable,
    notDimmed,
    notHilited,
    doesntDismiss,
    {2, 2, 2, 2},
    plain,
    9,
    { /* array: 3 elements */
        /* [1] */
        0x0,
```

```
            /* [2] */
            0x0,
            /* [3] */
            0x0
        },
        "A",
        justCenter,
        "50",
        5,
        0b11110000000000000000000100000000,
        0,
        100,
        2,
        "50.00"
    },
    /* [41] */
    'ntry', 'VW26',
    { /* array: 1 elements */
        /* [1] */
        24, 404
    },
    { /* array: 1 elements */
        /* [1] */
        12, 32
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        9,
        { /* array: 3 elements */
            /* [1] */
            0x0,,
            /* [2] */
            0x0,
            /* [3] */
            0x0
        },
        "A",
        justCenter,
        "50%"
    },
    /* [42] */
    'ntry', 'VW25',
    { /* array: 1 elements */
        /* [1] */
        24, 368
    },
    { /* array: 1 elements */
        /* [1] */
        12, 32
    }, sizeFixed, sizeFixed, shown, disabled,
    StaticText {
        "TStaticText",
        0b0,
        {1, 1},
        sizeable,
        notDimmed,
```

```
        notHilited,
        doesntDismiss,
        {0, 0, 0, 0},
        plain,
        9,
        { /* array: 3 elements */
            /* [1] */
            0x0,
            /* [2] */
            0x0,
            /* [3] */
            0x0
        },
        "A",
        justCenter,
        "45%"
    },
    /* [43] */
    'ntry', 'VW24',
    { /* array: 1 elements */
        /* [1] */
        24, 332
    },
    { /* array: 1 elements */
        /* [1] */
        12, 32
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        9,
        { /* array: 3 elements */
            /* [1] */
            0x0,
            /* [2] */
            0x0,
            /* [3] */
            0x0
        },
        "A",
        justCenter,
        "40%"
    },
    /* [44] */
    'ntry', 'VW23',
    { /* array: 1 elements */
        /* [1] */
        24, 296
    },
    { /* array: 1 elements */
        /* [1] */
        12, 32
    }, sizeFixed, sizeFixed, shown, disabled,
    StaticText {
        "TStaticText",
        0b0,
        {1, 1},
```

```
        sizeable,
        notDimmed,
        notHilited,
        doesntDismiss,
        {0, 0, 0, 0},
        plain,
        9,
        { /* array: 3 elements */
            /* [1] */
            0x0,
            /* [2] */
            0x0,
            /* [3] */
            0x0
        },
        "A",
        justCenter,
        "35%"
    },
    /* [45] */
    'ntry', 'VW22',
    { /* array: 1 elements */
        /* [1] */
        24, 260
    },
    { /* array: 1 elements */
        /* [1] */
        12, 32
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        9,
        { /* array: 3 elements */
            /* [1] */
            0x0,
            /* [2] */
            0x0,
            /* [3] */
            0x0
        },
        "A",
        justCenter,
        "30%"
    },
    /* [46] */
    'ntry', 'VW21',
    { /* array: 1 elements */
        /* [1] */
        24, 224
    },
    { /* array: 1 elements */
        /* [1] */
        12, 32
    }, sizeFixed, sizeFixed, shown, disabled,
    StaticText {
        "TStaticText",
```

```
        0b0,
        {1, 1},
        sizeable,
        notDimmed,
        notHilited,
        doesntDismiss,
        {0, 0, 0, 0},
        plain,
        9,
        { /* array: 3 elements */
            /* [1] */
            0x0,
            /* [2] */
            0x0,
            /* [3] */
            0x0
        },
        "A",
        justCenter,
        "25%"
    },
    /* [47] */
    'ntry', 'VW20',
    { /* array: 1 elements */
        /* [1] */
        24, 188
    },
    { /* array: 1 elements */
        /* [1] */
        12, 32
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        9,
        { /* array: 3 elements */
            /* [1] */
            0x0,
            /* [2] */
            0x0,
            /* [3] */
            0x0
        },
        "A",
        justCenter,
        "20%"
    },
    /* [48] */
    'ntry', 'VW19',
    { /* array: 1 elements */
        /* [1] */
        24, 152
    },
    { /* array: 1 elements */
        /* [1] */
        12, 32
    }, sizeFixed, sizeFixed, shown, disabled,
```

```
StaticText {
    "TStaticText",
    0b0,
    {1, 1},
    sizeable,
    notDimmed,
    notHilited,
    doesntDismiss,
    {0, 0, 0, 0},
    plain,
    9,
    { /* array: 3 elements */
        /* [1] */
        0x0,
        /* [2] */
        0x0,
        /* [3] */
        0x0
    },
    "A",
    justCenter,
    "15%"
},
/* [49] */
'ntry', 'VW18',
{ /* array: 1 elements */
    /* [1] */
    24, 116
},
{ /* array: 1 elements */
    /* [1] */
    12, 32
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    9,
    { /* array: 3 elements */
        /* [1] */
        0x0,
        /* [2] */
        0x0,
        /* [3] */
        0x0
    },
    "A",
    justCenter,
    "10%"
},
/* [50] */
'ntry', 'VW17',
{ /* array: 1 elements */
    /* [1] */
    24, 80
},
{ /* array: 1 elements */
    /* [1] */
```

```
        12, 32
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        9,
        { /* array: 3 elements */
            /* [1] */
            0x0,
            /* [2] */
            0x0,
            /* [3] */
            0x0
        },
        "A",
        justCenter,
        "7%"
    },
    /* [51] */
    'ntry', 'VW16',
    { /* array: 1 elements */
        /* [1] */
        24, 44
    },
    { /* array: 1 elements */
        /* [1] */
        12, 32
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        9,
        { /* array: 3 elements */
            /* [1] */
            0x0,
            /* [2] */
            0x0,
            /* [3] */
            0x0
        },
        "A",
        justCenter,
        "5%"
    },
    /* [52] */
    'ntry', 'VW15',
    { /* array: 1 elements */
        /* [1] */
        24, 8
    },
```

```
{ /* array: 1 elements */
    /* [1] */
    12, 32
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    9,
    { /* array: 3 elements */
        /* [1] */
        0x0,
        /* [2] */
        0x0,
        /* [3] */
        0x0
    },
    "A",
    justCenter,
    "2%"
},
/* [53] */
'ntry', 'cd55',
{ /* array: 1 elements */
    /* [1] */
    40, 8
},
{ /* array: 1 elements */
    /* [1] */
    16, 32
}, sizeFixed, sizeFixed, shown, enabled,
ExtendedText {
    "TExtendedText",
    0b1111,
    {1, 1},
    sizeable,
    notDimmed,
    notHilited,
    doesntDismiss,
    {2, 2, 2, 2},
    plain,
    9,
    { /* array: 3 elements */
        /* [1] */
        0x0,
        /* [2] */
        0x0,
        /* [3] */
        0x0
    },
    "A",
    justCenter,
    "55",
    5,
    0b11110000000000000000000100000000,
    0,
    100,
    2,
```

```
        "55.00"
    },
    /* [54] */
    'ntry', 'cd60',
    { /* array: 1 elements */
        /* [1] */
        40, 44
    },
    { /* array: 1 elements */
        /* [1] */
        16, 32
    }, sizeFixed, sizeFixed, shown, enabled,
    ExtendedText {
        "TExtendedText",
        0b1111,
        {1, 1},
        sizeable,
        notDimmed,
        notHilited,
        doesntDismiss,
        {2, 2, 2, 2},
        plain,
        9,
        { /* array: 3 elements */
            /* [1] */
            0x0,
            /* [2] */
            0x0,
            /* [3] */
            0x0
        },
        "A",
        justCenter,
        "60",
        5,
        0b1111000000000000000000000100000000,
        0,
        100,
        2,
        "60.00"
    },
    /* [55] */
    'ntry', 'cd65',
    { /* array: 1 elements */
        /* [1] */
        40, 80
    },
    { /* array: 1 elements */
        /* [1] */
        16, 32
    }, sizeFixed, sizeFixed, shown, enabled,
    ExtendedText {
        "TExtendedText",
        0b1111,
        {1, 1},
        sizeable,
        notDimmed,
        notHilited,
        doesntDismiss,
        {2, 2, 2, 2},
        plain,
        9,
        { /* array: 3 elements */
            /* [1] */
```

```
            0x0,
            /* [2] */
            0x0,
            /* [3] */
            0x0
        },
        "A",
        justCenter,
        "65",
        5,
        0b11110000000000000000000100000000,
        0,
        100,
        2,
        "65.00"
    },
    /* [56] */
    'ntry', 'cd70',
    { /* array: 1 elements */
        /* [1] */
        40, 116
    },
    { /* array: 1 elements */
        /* [1] */
        16, 32
    }, sizeFixed, sizeFixed, shown, enabled,
    ExtendedText {
        "TExtendedText",
        0b1111,
        {1, 1},
        sizeable,
        notDimmed,
        notHilited,
        doesntDismiss,
        {2, 2, 2, 2},
        plain,
        9,
        { /* array: 3 elements */
            /* [1] */
            0x0,
            /* [2] */
            0x0,
            /* [3] */
            0x0
        },
        "A",
        justCenter,
        "70",
        5,
        0b11110000000000000000000100000000,
        0,
        100,
        2,
        "70.00"
    },
    /* [57] */
    'ntry', 'cd75',
    { /* array: 1 elements */
        /* [1] */
        40, 152
    },
    { /* array: 1 elements */
        /* [1] */
        16, 32
```

```
}, sizeFixed, sizeFixed, shown, enabled,
ExtendedText {
    "TExtendedText",
    0b1111,
    {1, 1},
    sizeable,
    notDimmed,
    notHilited,
    doesntDismiss,
    {2, 2, 2, 2},
    plain,
    9,
    { /* array: 3 elements */
        /* [1] */
        0x0,
        /* [2] */
        0x0,
        /* [3] */
        0x0
    },
    "A",
    justCenter,
    "75",
    5,
    0b111100000000000000000000100000000,
    0,
    100,
    2,
    "75.00"
},
/* [58] */
'ntry', 'cd80',
{ /* array: 1 elements */
    /* [1] */
    40, 188
},
{ /* array: 1 elements */
    /* [1] */
    16, 32
}, sizeFixed, sizeFixed, shown, enabled,
ExtendedText {
    "TExtendedText",
    0b1111,
    {1, 1},
    sizeable,
    notDimmed,
    notHilited,
    doesntDismiss,
    {2, 2, 2, 2},
    plain,
    9,
    { /* array: 3 elements */
        /* [1] */
        0x0,
        /* [2] */
        0x0,
        /* [3] */
        0x0
    },
    "A",
    justCenter,
    "80",
    5,
    0b111100000000000000000000100000000,
```

```
        0,
        100,
        2,
        "80.00"
    },
    /* [59] */
    'ntry', 'cd85',
    { /* array: 1 elements */
        /* [1] */
        40, 224
    },
    { /* array: 1 elements */
        /* [1] */
        16, 32
    }, sizeFixed, sizeFixed, shown, enabled,
    ExtendedText {
        "TExtendedText",
        0b1111,
        {1, 1},
        sizeable,
        notDimmed,
        notHilited,
        doesntDismiss,
        {2, 2, 2, 2},
        plain,
        9,
        { /* array: 3 elements */
            /* [1] */
            0x0,
            /* [2] */
            0x0,
            /* [3] */
            0x0
        },
        "A",
        justCenter,
        "85",
        5,
        0b11110000000000000000000100000000,
        0,
        100,
        2,
        "85.00"
    },
    /* [60] */
    'ntry', 'cd90',
    { /* array: 1 elements */
        /* [1] */
        40, 260
    },
    { /* array: 1 elements */
        /* [1] */
        16, 32
    }, sizeFixed, sizeFixed, shown, enabled,
    ExtendedText {
        "TExtendedText",
        0b1111,
        {1, 1},
        sizeable,
        notDimmed,
        notHilited,
        doesntDismiss,
        {2, 2, 2, 2},
        plain,
```

```
        9,
        { /* array: 3 elements */
            /* [1] */
            0x0,
            /* [2] */
            0x0,
            /* [3] */
            0x0
        },
        "A",
        justCenter,
        "90",
        5,
        0b1111000000000000000000000100000000,
        0,
        100,
        2,
        "90.00"
    },
    /* [61] */
    'ntry', 'cd93',
    { /* array: 1 elements */
        /* [1] */
        40, 296
    },
    { /* array: 1 elements */
        /* [1] */
        16, 32
    }, sizeFixed, sizeFixed, shown, enabled,
    ExtendedText {
        "TExtendedText",
        0b1111,
        {1, 1},
        sizeable,
        notDimmed,
        notHilited,
        doesntDismiss,
        {2, 2, 2, 2},
        plain,
        9,
        { /* array: 3 elements */
            /* [1] */
            0x0,
            /* [2] */
            0x0,
            /* [3] */
            0x0
        },
        "A",
        justCenter,
        "93",
        5,
        0b1111000000000000000000000100000000,
        0,
        100,
        2,
        "93.00"
    },
    /* [62] */
    'ntry', 'cd95',
    { /* array: 1 elements */
        /* [1] */
        40, 332
    },
```

```
{ /* array: 1 elements */
    /* [1] */
    16, 32
}, sizeFixed, sizeFixed, shown, enabled,
ExtendedText {
    "TExtendedText",
    0b1111,
    {1, 1},
    sizeable,
    notDimmed,
    notHilited,
    doesntDismiss,
    {2, 2, 2, 2},
    plain,
    9,
    { /* array: 3 elements */
        /* [1] */
        0x0,
        /* [2] */
        0x0,
        /* [3] */
        0x0
    },
    "A",
    justCenter,
    "95",
    5,
    0b11110000000000000000000010000000C,
    0,
    100,
    2,
    "95.00"
},
/* [63] */
'ntry', 'cd98',
{ /* array: 1 elements */
    /* [1] */
    40, 368
},
{ /* array: 1 elements */
    /* [1] */
    16, 32
}, sizeFixed, sizeFixed, shown, enabled,
ExtendedText {
    "TExtendedText",
    0b1111,
    {1, 1},
    sizeable,
    notDimmed,
    notHilited,
    doesntDismiss,
    {2, 2, 2, 2},
    plain,
    9,
    { /* array: 3 elements */
        /* [1] */
        0x0,
        /* [2] */
        0x0,
        /* [3] */
        0x0
    },
    "A",
    justCenter,
```

```
        "98",
        5,
        0b1111000000000000000000000100000000,
        0,
        100,
        2,
        "98.00"
    },
    /* [64] */
    'ntry', 'cd00',
    { /*.array: 1 elements */
        /* [1] */
        40, 404
    },
    { /* array: 1 elements */
        /* [1] */
        16, 32
    }, sizeFixed, sizeFixed, shown, disabled,
    ExtendedText {
        "TExtendedText",
        0b1111,
        {1, 1},
        sizeable,
        notDimmed,
        notHilited,
        doesntDismiss,
        {2, 2, 2, 2},
        plain,
        9,
        { /* array: 3 elements */
            /* [1] */
            0x0,
            /* [2] */
            0x0,
            /* [3] */
            0x0
        },
        "A",
        justCenter,
        "100.00",
        5,
        0b1111000000000000000000000100000000,
        0,
        100,
        2,
        "100.00"
    },
    /* [65] */
    'ntry', 'VW38',
    { /* array: 1 elements */
        /* [1] */
        56, 404
    },
    { /* array: 1 elements */
        /* [1] */
        12, 32
    }, sizeFixed, sizeFixed, shown, disabled,
    StaticText {
        "TStaticText",
        0b0,
        {1, 1},
        sizeable,
        notDimmed,
        notHilited,
```

```
        doesntDismiss,
        {0, 0, 0, 0},
        plain,
        9,
        { /* array: 3 elements */
            /* [1] */
            0x0,
            /* [2] */
            0x0,
            /* [3] */
            0x0
        },
        "A",
        justCenter,
        "100%"
    },
    /* [66] */
    'ntry', 'VW39',
    { /* array: 1 elements */
        /* [1] */
        56, 368
    },
    { /* array: 1 elements */
        /* [1] */
        12, 32
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        9,
        { /* array: 3 elements */
            /* [1] */
            0x0,
            /* [2] */
            0x0,
            /* [3] */
            0x0
        },
        "A",
        justCenter,
        "98%"
    },
    /* [67] */
    'ntry', 'VW40',
    { /* array: 1 elements */
        /* [1] */
        56, 332
    },
    { /* array: 1 elements */
        /* [1] */
        12, 32
    }, sizeFixed, sizeFixed, shown, disabled,
    StaticText {
        "TStaticText",
        0b0,
        {1, 1},
        sizeable,
```

```
        notDimmed,
        notHilited,
        doesntDismiss,
        {0, 0, 0, 0},
        plain,
        9,
        { /* array: 3 elements */
            /* [1] */
            0x0,
            /* [2] */
            0x0,
            /* [3] */
            0x0
        },
        "A",
        justCenter,
        "95%"
    },
    /* [68] */
    'ntry', 'VW41',
    { /* array: 1 elements */
        /* [1] */
        56, 296
    },
    { /* array: 1 elements */
        /* [1] */
        12, 32
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        9,
        { /* array: 3 elements */
            /* [1] */
            0x0,
            /* [2] */
            0x0,
            /* [3] */
            0x0
        },
        "A",
        justCenter,
        "93%"
    },
    /* [69] */
    'ntry', 'VW42',
    { /* array: 1 elements */
        /* [1] */
        56, 260
    },
    { /* array: 1 elements */
        /* [1] */
        12, 32
    }, sizeFixed, sizeFixed, shown, disabled,
    StaticText {
        "TStaticText",
        0b0,
```

```
        {1, 1},
        sizeable,
        notDimmed,
        notHilited,
        doesntDismiss,
        {0, 0, 0, 0},
        plain,
        9,
        { /* array: 3 elements */
            /* [1] */
            0x0,
            /* [2] */
            0x0,
            /* [3] */
            0x0
        },
        "A",
        justCenter,
        "90%"
    },
    /* [70] */
    'ntry', 'VW43',
    { /* array: 1 elements */
        /* [1] */
        56, 224
    },
    { /* array: 1 elements */
        /* [1] */
        12, 32
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        9,
        { /* array: 3 elements */
            /* [1] */
            0x0,
            /* [2] */
            0x0,
            /* [3] */
            0x0
        },
        "A",
        justCenter,
        "85%"
    },
    /* [71] */
    'ntry', 'VW44',
    { /* array: 1 elements */
        /* [1] */
        56, 188
    },
    { /* array: 1 elements */
        /* [1] */
        12, 32
    }, sizeFixed, sizeFixed, shown, disabled,
    StaticText {
```

```
        "TStaticText",
        0b0,
        {1, 1},
        sizeable,
        notDimmed,
        notHilited,
        doesntDismiss,
        {0, 0, 0, 0},
        plain,
        9,
        { /* array: 3 elements */
            /* [1] */
            0x0,
            /* [2] */
            0x0,
            /* [3] */
            0x0
        },
        "A",
        justCenter,
        "80%"
    },
    /* [72] */
    'ntry', 'VW45',
    { /* array: 1 elements */
        /* [1] */
        56, 152
    },
    { /* array: 1 elements */
        /* [1] */
        12, 32
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        9,
        { /* array: 3 elements */
            /* [1] */
            0x0,
            /* [2] */
            0x0,
            /* [3] */
            0x0
        },
        "A",
        justCenter,
        "75%"
    },
    /* [73] */
    'ntry', 'VW46',
    { /* array: 1 elements */
        /* [1] */
        56, 116
    },
    { /* array: 1 elements */
        /* [1] */
        12, 32
```

```
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    9,
    { /* array: 3 elements */
        /* [1] */
        0x0,
        /* [2] */
        0x0,
        /* [3] */
        0x0
    },
    "A",
    justCenter,
    "70%"
},
/* [74] */
'ntry', 'VW47',
{ /* array: 1 elements */
    /* [1] */
    56, 80
},
{ /* array: 1 elements */
    /* [1] */
    12, 32
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    9,
    { /* array: 3 elements */
        /* [1] */
        0x0,
        /* [2] */
        0x0,
        /* [3] */
        0x0
    },
    "A",
    justCenter,
    "65%"
},
/* [75] */
'ntry', 'VW48',
{ /* array: 1 elements */
    /* [1] */
    56, 44
},
{ /* array: 1 elements */
```

```
            /* [1] */
            12, 32
        }, sizeFixed, sizeFixed, shown, disabled,
        StaticText {
            "TStaticText",
            0b0,
            {1, 1},
            sizeable,
            notDimmed,
            notHilited,
            doesntDismiss,
            {0, 0, 0, 0},
            plain,
            9,
            { /* array: 3 elements */
                /* [1] */
                0x0,
                /* [2] */
                0x0,
                /* [3] */
                0x0
            },
            "A",
            justCenter,
            "60%"
        },
        /* [76] */
        'ntry', 'VW49',
        { /* array: 1 elements */
            /* [1] */
            56, 8
        },
        { /* array: 1 elements */
            /* [1] */
            12, 32
        }, sizeFixed, sizeFixed, shown, disabled,
        StaticText {
            "TStaticText",
            0b0,
            {1, 1},
            sizeable,
            notDimmed,
            notHilited,
            doesntDismiss,
            {0, 0, 0, 0},
            plain,
            9,
            { /* array: 3 elements */
                /* [1] */
                0x0,
                /* [2] */
                0x0,
                /* [3] */
                0x0
            },
            "A",
            justCenter,
            "55%"
        }
    }
};

resource 'view' (3001, purgeable) {
    { /* array viewArray: 6 elements */
```

```
/* [1] */
root, noID,
{ /* array: 1 elements */
    /* [1] */
    50, 40
},
{ /* array: 1 elements */
    /* [1] */
    116, 256
}, sizeVariable, sizeVariable, notShown, enabled,
Window {
    "TWindow",
    dBoxProc,
    noGoAwayBox,
    notResizable,
    modal,
    doFirstClick,
    freeOnClosing,
    disposeOnFree,
    doesntCloseDocument,
    dontOpenWithDocument,
    dontAdaptToScreen,
    dontStagger,
    forceOnScreen,
    center,
    noID,
    "<<<>>>"
},
/* [2] */
root, 'DLOG',
{ /* array: 1 elements */
    /* [1] */
    0, 0
},
{ /* array: 1 elements */
    /* [1] */
    116, 256
}, sizeVariable, sizeVariable, shown, disabled,
DialogView {
    "TDialogView",
    'btOK',
    'cncl'
},
/* [3] */
'DLOG', 'VW05',
{ /* array: 1 elements */
    /* [1] */
    32, 12
},
{ /* array: 1 elements */
    /* [1] */
    20, 112
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
```

```
        { /* array: 3 elements */
            /* [1] */
            0x0,
            /* [2] */
            0x0,
            /* [3] */
            0x0
        },
        "",
        justRight,
        "Resolution:"
    },
    /* [4] */
    'DLOG', 'nrez',
    { /* array: 1 elements */
        /* [1] */
        32, 132
    },
    { /* array: 1 elements */
        /* [1] */
        20, 64
    }, sizeFixed, sizeFixed, shown, enabled,
    NumberText {
        "TNumberText",
        0b1111,
        {1, 1},
        sizeable,
        notDimmed,
        notHilited,
        doesntDismiss,
        {2, 2, 2, 2},
        plain,
        0,
        { /* array: 3 elements */
            /* [1] */
            0x0,
            /* [2] */
            0x0,
            /* [3] */
            0x0
        },
        "",
        justRight,
        "2540",
        unlimited,
        0b111100000000000000000000100000000,
        2540,
        0,
        10000
    },
    /* [5] */
    'DLOG', 'cncl',
    { /* array: 1 elements */
        /* [1] */
        72, 28
    };
    { /* array: 1 elements */
        /* [1] */
        20, 84
    }, sizeFixed, sizeFixed, shown, enabled,
    Button {
        "TButton",
        0b0,
        {1, 1},
```

```
            sizeable,
            notDimmed,
            notHilited,
            dismisses,
            {0, 0, 0, 0},
            plain,
            0,
            { /* array: 3 elements */
                /* [1] */
                0x0,
                /* [2] */
                0x0,
                /* [3] */
                0x0
            },
            "",
            "Cancel"
        },
        /* [6] */
        'DLOG', 'btOK',
        { /* array: 1 elements */
            /* [1] */
            68, 136
        },
        { /* array: 1 elements */
            /* [1] */
            28, 80
        }, sizeFixed, sizeFixed, shown, enabled,
        Button {
            "TButton",
            0b1000000,
            {3, 3},
            sizeable,
            notDimmed,
            notHilited,
            dismisses,
            {4, 4, 4, 4},
            plain,
            0,
            { /* array: 3 elements */
                /* [1] */
                0x0,
                /* [2] */
                0x0,
                /* [3] */
                0x0
            },
            "",
            "OK"
        }
    }
};

resource 'view' (3002, purgeable) {
    { /* array viewArray: 15 elements */
        /* [1] */
        root, noID,
        { /* array: 1 elements */
            /* [1] */
            50, 40
        },
        { /* array: 1 elements */
            /* [1] */
            240, 272
```

```
}, sizeVariable, sizeVariable, notShown, enabled,
Window {
    "TWindow",
    dBoxProc,
    noGoAwayBox,
    notResizable,
    modal,
    doFirstClick,
    freeOnClosing,
    disposeOnFree,
    doesntCloseDocument,
    dontOpenWithDocument,
    dontAdaptToScreen,
    dontStagger,
    forceOnScreen,
    center,
    noID,
    "<<<>>>"
},
/* [2] */
root, 'DLOG',
{ /* array: 1 elements */
    /* [1] */
    0, 0
},
{ /* array: 1 elements */
    /* [1] */
    240, 272
}, sizeVariable, sizeVariable, shown, disabled,
DialogView {
    "TStripDialogView",
    'btOK',
    'cncl'
},
/* [3] */
'DLOG', 'reis',
{ /* array: 1 elements */
    /* [1] */
    44, 20
},
{ /* array: 1 elements */
    /* [1] */
    20, 232
}, sizeFixed, sizeFixed, shown, enabled,
CheckBox {
    "TCheckBox",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
```

```
        off,
        "Run Exposure Intensity Sweep"
    },
    /* [4] */
    'DLOG', 'sdnt',
    { /* array: 1 elements */
        /* [1] */
        68, 180
    },
    { /* array: 1 elements */
        /* [1] */
        20, 52
    }, sizeFixed, sizeFixed, shown, enabled,
    ExtendedText {
        "TExtendedText",
        0b1111,
        {1, 1},
        sizeable,
        notDimmed,
        notHilited,
        doesntDismiss,
        {2, 2, 2, 2},
        plain,
        0,
        { /* array: 3 elements */
            /* [1] */
            0x0,
            /* [2] */
            0x0,
            /* [3] */
            0x0
        },
        "",
        justRight,
        "0.00",
        unlimited,
        0b1111000000000000000000000100000000,
        0,
        8,
        2,
        "0.00"
    },
    /* [5] */
    'DLOG', 'idnt',
    { /* array: 1 elements */
        /* [1] */
        92, 180
    },
    { /* array: 1 elements */
        /* [1] */
        20, 52
    }, sizeFixed, sizeFixed, shown, enabled,
    ExtendedText {
        "TExtendedText",
        0b1111,
        {1, 1},
        sizeable,
        notDimmed,
        notHilited,
        doesntDismiss,
        {2, 2, 2, 2},
        plain,
        0,
        { /* array: 3 elements */
```

```
        /* [1] */
        0x0,
        /* [2] */
        0x0,
        /* [3] */
        0x0
    },
    "",
    justRight,
    "0.00",
    unlimited,
    0b11110000000000000000000000100000000,
    0,
    8,
    2,
    "0.00"
},
/* [6] */
'DLOG', 'ednt',
{ /* array: 1 elements */
    /* [1] */
    116, 180
},
{ /* array: 1 elements */
    /* [1] */
    20, 52
}, sizeFixed, sizeFixed, shown, enabled,
ExtendedText {
    "TExtendedText",
    0b1111,
    {1, 1},
    sizeable,
    notDimmed,
    notHilited,
    doesntDismiss,
    {2, 2, 2, 2},
    plain,
    0,
    { /* array: 3 elements */
        /* [1] */
        0x0,
        /* [2] */
        0x0,
        /* [3] */
        0x0
    },
    "",
    justRight,
    "0.00",
    unlimited,
    0b11110000000000000000000000100000000,
    0,
    8,
    2,
    "0.00"
},
/* [7] */
'DLOG', 'negp',
{ /* array: 1 elements */
    /* [1] */
    20, 20
},
{ /* array: 1 elements */
    /* [1] */
```

```
        20, 212
    }, sizeFixed, sizeFixed, shown, enabled,
    CheckBox {
        "TCheckBox",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        off,
        "Image Negative Page"
    },
    /* [8] */
    'DLOG', 'sdst',
    { /* array: 1 elements */
        /* [1] */
        70, 34
    },
    { /* array: 1 elements */
        /* [1] */
        18, 142
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justRight,
        "Start Density Setting:"
    },
    /* [9] */
    'DLOG', 'idst',
    { /* array: 1 elements */
        /* [1] */
        94, 70
    },
```

```
{ /* array: 1 elements */
    /* [1] */
    18, 104
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    justRight,
    "Increment:"
},
/* [10] */
'DLOG', 'edst',
{ /* array: 1 elements */
    /* [1] */
    118, 32
},
{ /* array: 1 elements */
    /* [1] */
    20, 142
}, sizeFixed, sizeFixed, shown, disabled,
StaticText {
    "TStaticText",
    0b0,
    {1, 1},
    sizeable,
    notDimmed,
    notHilited,
    doesntDismiss,
    {0, 0, 0, 0},
    plain,
    0,
    { /* array: 3 elements */
        /* [1] */
        0x0,
        /* [2] */
        0x0,
        /* [3] */
        0x0
    },
    "",
    justRight,
    "End Density Setting:"
},
/* [13] */
'DLOG', 'unls',
{ /* array: 1 elements */
    /* [1] */
```

```
        144, 20
    },
    { /* array: 1 elements */
        /* [1] */
        20, 232
    }, sizeFixed, sizeFixed, shown, enabled,
    CheckBox {
        "TCheckBox",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        off,
        "Use non-default screen"
    },
    /* [14] */
    'DLOG', 'iant',
    { /* array: 1 elements */
        /* [1] */
        168, 36
    },
    { /* array: 1 elements */
        /* [1] */
        20, 60
    }, sizeFixed, sizeFixed, shown, enabled,
    ExtendedText {
        "TExtendedText",
        0b1111,
        {1, 1},
        sizeable,
        notDimmed,
        notHilited,
        doesntDismiss,
        {2, 2, 2, 2},
        plain,
        0,
        { /* array: 3 elements */
            /* [1] */
            0x0,
            /* [2] */
            0x0,
            /* [3] */
            0x0
        },
        "",
        justRight,
        "45.000",
        unlimited,
        0b111100000000000000000000100000000,
        0,
```

```
        360,
        3,
        "45.000"
    },
    /* [15] */
    'DLOG', 'last',
    { /* array: 1 elements */
        /* [1] */
        170, 100
    },
    { /* array: 1 elements */
        /* [1] */
        20, 50
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "°angle"
    },
    /* [14] */
    'DLOG', 'lsnt',
    { /* array: 1 elements */
        /* [1] */
        168, 172
    },
    { /* array: 1 elements */
        /* [1] */
        20, 60
    }, sizeFixed, sizeFixed, shown, enabled,
    ExtendedText {
        "TExtendedText",
        0b1111,
        {1, 1},
        sizeable,
        notDimmed,
        notHilited,
        doesntDismiss,
        {2, 2, 2, 2},
        plain,
        0,
        { /* array: 3 elements */
            /* [1] */
            0x0,
            /* [2] */
            0x0,
            /* [3] */
```

```
            0x0
        ),
        "",
        justRight,
        "149.671",
        unlimited,
        0b1111000000000000000000000100000000,
        1,
        999,
        3,
        "149.671"
    },
    /* [15] */
    'DLOG', 'lsst',
    { /* array: 1 elements */
        /* [1] */
        170, 148
    },
    { /* array: 1 elements */
        /* [1] */
        20, 20
    }, sizeFixed, sizeFixed, shown, disabled,
    StaticText {
        "TStaticText",
        0b0,
        {1, 1},
        sizeable,
        notDimmed,
        notHilited,
        doesntDismiss,
        {0, 0, 0, 0},
        plain,
        0,
        { /* array: 3 elements */
            /* [1] */
            0x0,
            /* [2] */
            0x0,
            /* [3] */
            0x0
        },
        "",
        justLeft,
        "lpi:"
    },
        /* [11] */
    'DLOG', 'btOK',
    { /* array: 1 elements */
        /* [1] */
        200, 152
    },
    { /* array: 1 elements */
        /* [1] */
        24, 80
    }, sizeFixed, sizeFixed, shown, enabled,
    Button {
        "TButton",
        0b1000000,
        {3, 3},
        sizeable,
        notDimmed,
        notHilited,
        dismisses,
        {4, 4, 4, 4},
```

```
            plain,
            0,
            { /* array: 3 elements */
                /* [1] */
                0x0,
                /* [2] */
                0x0,
                /* [3] */
                0x0
            },
            "",
            "Print"
        },
        /* [12] */
        'DLOG', 'cncl',
        { /* array: 1 elements */
            /* [1] */
            204, 40
        },
        { /* array: 1 elements */
            /* [1] */
            16, 72
        }, sizeFixed, sizeFixed, shown, enabled,
        Button {
            "TButton",
            0b0,
            {3, 3},
            sizeable,
            notDimmed,
            notHilited,
            dismisses,
            {0, 0, 0, 0},
            plain,
            0,
            { /* array: 3 elements */
                /* [1] */
                0x0,
                /* [2] */
                0x0,
                /* [3] */
                0x0
            },
            "",
            "Cancel"
        }
    }
};



resource 'SIZE' (-1) {
    saveScreen,
    acceptSuspendResumeEvents,
#ifdef MPW2
    doOwnActivate,
#else
    enableOptionSwitch,
    canBackground,
    MultiFinderAware,
    backgroundAndForeground,
    dontGetFrontClicks,
#endif
```

```
#ifdef Debugging
    1000 * 1024,
    512 * 1024
#else
    1000 * 1024,
    512 * 1024
#endif
};

resource 'DITL' (201, purgeable) {
     {  /* array DITLarray: 3 elements */
        /* [1] */
        {160, 182, 180, 262},
        Button {
            enabled,
            "OK"
        };
        /* [2] */
        {10, 75, 150, 306},
        StaticText {
            disabled,
            programname2
            "\n - Version 1.1\n"
            "©1990 Southwest Software Inc.\n"
            "\nThis program was written "
            "with MacApp® © 1985-1988 Apple Computer, Inc."
        };
        /* [3] */
        {10, 20, 42, 52},
        Icon {
            disabled,
            1
        }
    }
};

resource 'ALRT' (201, purgeable) {
    {90, 100, 280, 412},
    201,
    {
        OK, visible, silent;
        OK, visible, silent;
        OK, visible, silent;
        OK, visible, silent
    }
};

resource 'cmnu' (1) {
    1,
    textMenuProc,
    0x7FFFFFFD,
    enabled,
    apple,
     {  /* array: 2 elements */
        /* [1] */
        "About "
        programname2
        "…", noIcon, noKey, noMark, plain, cAboutApp;
        /* [2] */
        "-", noIcon, noKey, noMark, plain, nocommand
    }
};

resource 'cmnu' (2) {
```

```
    2,
    textMenuProc,
    0x7FFFFBBB,
    enabled,
    "File",
     {  /* array: 12 elements */
        /* [1] */
#if IncludeRipMaster

        "New " programname, noIcon, "n", noMark, plain, cNew;
#endif
        /* [1] */
        "New " programname2, noIcon, "N", noMark, plain, cNewCal;
        /* [2] */
#if IncludeRipMaster
        "Open " programname, noIcon, "o", noMark, plain, cOpen;
#endif
        /* [3] */
        "Open…", noIcon, "O", noMark, plain, cOpenCal;
        /* [3.5] */
        "-", noIcon, noKey, noMark, plain, nocommand;
        /* [4] */
        "Close", noIcon, noKey, noMark, plain, cClose;
        /* [4.5] */
        "Save", noIcon, "S", noMark, plain, cSave;
        /* [5] */
        "Save As…", noIcon, noKey, noMark, plain, cSaveAs;
        /* [6] */
        "Save a Copy In…", noIcon, noKey, noMark, plain, cSaveCopy;
        /* [7] */
        "-", noIcon, noKey, noMark, plain, nocommand;
        /* [8] */
#if IncludeRipMaster
        "Write Job Log", noIcon, noKey, noMark, plain, cWriteJobLog;
        /* [9] */
        "-", noIcon, noKey, noMark, plain, nocommand;
#endif
        /* [10] */
        "Page Setup…", noIcon, noKey, noMark, plain, cPageSetup;
        /* [11] */
        "Print One", noIcon, noKey, noMark, plain, cPrintOne;
        /* [12] */
        "Print…", noIcon, noKey, noMark, plain, cPrint;
        /* [13] */
        "-", noIcon, noKey, noMark, plain, nocommand;
        /* [14] */
        "Quit", noIcon, "Q", noMark, plain, cQuit
    }
};

resource 'cmnu' (3) {
    3,
    textMenuProc,
    0x7FFFFBD,
    enabled,
    "Edit",
     {  /* array: 8 elements */
        /* [1] */
        "Undo", noIcon, "Z", noMark, plain, cUndo;
        /* [2] */
        "-", noIcon, noKey, noMark, plain, nocommand;
        /* [3] */
        "Cut", noIcon, "X", noMark, plain, cCut;
        /* [4] */
```

```
        "Copy", noIcon, "C", noMark, plain, cCopy;
        /* [5] */
        "Paste", noIcon, "V", noMark, plain, cPaste;
        /* [6] */
        "Clear", noIcon, noKey, noMark, plain, cClear;
        /* [7] */
        "-", noIcon, noKey, noMark, plain, nocommand;
        /* [8] */
#if IncludeRipMaster
        "Copy Job Log", noIcon, noKey, noMark, plain, cCopyJobLog;
        /* [9] */
        "-", noIcon, noKey, noMark, plain, nocommand;
#endif
        /* [10] */
        "Show Clipboard", noIcon, noKey, noMark, plain, cShowClipboard
    }
};

#if IncludeRipMaster
resource 'cmnu' (4) {
    4,
    textMenuProc,
    allEnabled,
    enabled,
    programname,
     {  /* array: 1 element */
        /* [1] */
        "Remove "
        programname, noIcon, noKey, noMark, plain, 1007;
        /* [2] */
        "Remove Job Slug", noIcon, noKey, noMark, plain, 1011;
        /* [3] */
        "-", noIcon, noKey, noMark, plain, nocommand;
        /* [4] */
        "Install "
        programname, noIcon, noKey, noMark, plain, 1006;
        /* [5] */
        "Install Alternate Job Slug", noIcon, noKey, noMark, plain, 1010;
        /* [6] */
        "-", noIcon, noKey, noMark, plain, nocommand;
        /* [7] */
        "Job Log Window", noIcon, noKey, noMark, plain, 1001;
        /* [8] */
        "Status Window", noIcon, noKey, noMark, plain, 1003
    }
};
#endif

resource 'cmnu' (5) {
    5,
    textMenuProc,
    allEnabled,
    enabled,
    programname2,
     {  /* array: 1 element */
        /* [1] */
        "Remove "
        programname2, noIcon, noKey, noMark, plain, cCalRemove;
        /* [2] */
        "Install "
        programname2, noIcon, noKey, noMark, plain, cCalInstall;
        /* [3] */
        "-", noIcon, noKey, noMark, plain, nocommand;
        "Print Density/Gray Scale Test Strips", noIcon, noKey, noMark, plain, cImageTestStrip;
```

```
        /* [2] */
        "Print Calibrated Gray Scale Test Strips", noIcon, noKey, noMark, plain, cCheckCalibration;
        /* [3] */
        "-", noIcon, noKey, noMark, plain, nocommand;
        /* [4] */
        "Create Set", noIcon, "G", noMark, plain, cbtcr;
        /* [5] */
        "Modify Set", noIcon, "M", noMark, plain, cbtmd;
        /* [6] */
        "Remove Set", noIcon, "R", noMark, plain, cbtrm;
        /* [7] */
        "-", noIcon, noKey, noMark, plain, nocommand;
        /* [8] */
        "Download Sets", noIcon, noKey, noMark, plain, cbtdl;
        /* [9] */
        /*"Upload Sets", noIcon, noKey, noMark, plain, cbtul;*/
        /* [2] */
        "Get RIP-Resident Set List", noIcon, noKey, noMark, plain, cbtgs;
        /* [2] */
        "View RIP-Resident Set", noIcon, noKey, noMark, plain, cbtvr
    }
};

resource 'MBAR' (128) {
#if IncludeRipMaster
    {1; 2; 3; 4; 5}
#else
    {1; 2; 3; 5}
#endif
};

#if IncludeRipMaster
resource 'cmnu' (kPSizePopup) {
    kPSizePopup,
    textMenuProc,
    allEnabled,
    enabled,
    "Page Size",
    {
/* [1] */   "Letter", noIcon, "", "", plain, cUSLetter;
/* [2] */   "Letter tv", noIcon, "", "", plain, cLetterSideways;
/* [3] */   "Letter xt", noIcon, "", "", plain, cLetterExtra;
/* [4] */   "Letter xt tv", noIcon, "", "", plain, cLetterExtraSideways;
/* [5] */   "Legal", noIcon, "", "", plain, cUSLegal;
/* [6] */   "A4 Letter", noIcon, "", "", plain, cA4Letter;
/* [7] */   "B5 Letter", noIcon, "", "", plain, cB5Letter;
/* [8] */   "Tabloid", noIcon, "", "", plain, cTabloid
    }
};
#endif

resource 'cmnu' (kResPopup) {
    kResPopup,
    textMenuProc,
    allEnabled,
    enabled,
    "dpi",
    {
/* [1] */   "3386", noIcon, "", "", plain, cRes3386;
/* [2] */   "2540", noIcon, "", "", plain, cRes2540;
/* [3] */   "1693", noIcon, "", "", plain, cRes1693;
/* [4] */   "1270", noIcon, "", "", plain, cRes1270;
/* [5] */   "635", noIcon, "", "", plain, cRes635;
/* [6] */   "Other…", noIcon, "", "", plain, cResOther
```

```
    }
};

resource 'view' (cPSizePopup, purgeable) {
    {
        root, noID, { 136, 276 }, { 22, 120 }, sizeFixed, sizeFixed, shown, enabled,
        Popup {
            "TPopup",
                noAdornment, sizeable, notDimmed, notHilited, doesntDismiss,
                noInset, systemFont,
            kPSizePopup, 1, 80 )
    }
};


resource 'ALRT' (301, purgeable) {
    {100, 120, 240, 392},
    301,
    {
        OK, visible, silent;
        OK, visible, silent;
        OK, visible, silent;
        OK, visible, silent
    }
};

resource 'DITL' (301, purgeable) {
     {  /* array DITLarray: 3 elements */
        /* [1] */
        {115, 182, 135, 262},
        Button {
            enabled,
            "OK"
        };
        /* [2] */
        {10, 80, 110, 270},
        StaticText {
            disabled,
            "Couldn't find typesetter ^0. "
            "Make sure the name is correct "
            "and the typesetter is on."
        };
        /* [3] */
        {10, 20, 42, 52},
        Icon {
            disabled,
            1
        }
    }
};

resource 'ALRT' (302, purgeable) {
    {100, 120, 240, 392},
    302,
    {
        OK, visible, silent;
        OK, visible, silent;
        OK, visible, silent;
        OK, visible, silent
    }
};

resource 'DITL' (302, purgeable) {
     {  /* array DITLarray: 3 elements */
```

```
        /* [1] */
        {115, 182, 135, 262},
        Button {
            enabled,
            "OK"
        };
        /* [2] */
        {10, 80, 110, 270},
        StaticText {
            disabled,
            "Could not ^0 because ^1. "
        };
        /* [3] */
        {10, 20, 42, 52},
        Icon {
            disabled,
            1
        }
    }
};

resource 'ALRT' (304, purgeable) {
    {100, 60, 240, 532},
    304,
    { /* array: 4 elements */
        /* [1] */
        OK, visible, silent,
        /* [2] */
        OK, visible, silent,
        /* [3] */
        OK, visible, silent,
        /* [4] */
        OK, visible, silent
    }
};


resource 'DITL' (304, purgeable) {
    { /* array DITLarray: 4 elements */
        /* [1] */
        {94, 378, 114, 458},
        Button {
            enabled,
            "OK"
        },
        /* [2] */
        {10, 80, 38, 418},
        StaticText {
            disabled,
            "The typesetter generated the PostScript "
            "error:"
        },
        /* [3] */
        {10, 20, 42, 52},
        Icon {
            disabled,
            1
        },
        /* [4] */
        {55, 19, 81, 458},
        StaticText {
            disabled,
            "^0"
        }
```

```
    }
};

resource 'ALRT' (306, purgeable) {
    {100, 120, 240, 392},
    306,
    {
        OK, visible, silent;
        OK, visible, silent;
        OK, visible, silent;
        OK, visible, silent
    }
};

resource 'DITL' (306, purgeable) {
    {   /* array DITLarray: 3 elements */
        /* [1] */
        {115, 182, 135, 262},
        Button {
            enabled,
            "OK"
        };
        /* [2] */
        {10, 80, 110, 270},
        StaticText {
            disabled,
            "There system you are running is too old.  "
            "Make sure that you are running System "
            "version 5.1 or higher."
        };
        /* [3] */
        {10, 20, 42, 52},
        Icon {
            disabled,
            1
        }
    }
};

resource 'ALRT' (307, purgeable) {
    {100, 120, 240, 392},
    307,
    {
        OK, visible, silent;
        OK, visible, silent;
        OK, visible, silent;
        OK, visible, silent
    }
};

resource 'DITL' (307, purgeable) {
    {   /* array DITLarray: 3 elements */
        /* [1] */
        {115, 182, 135, 262},
        Button {
            enabled,
            "OK"
        };
        /* [2] */
        {10, 80, 110, 270},
        StaticText {
            disabled,
            "There must be a PostScript printer selected "
            "by the Chooser.  "
```

```
            "Open the Chooser to select a PostScript printer "
            "and close the Chooser when done."
        };
        /* [3] */
        {10, 20, 42, 52},
        Icon {
            disabled,
            1
        }
    }
};
resource 'ALRT' (309, purgeable) {
    {100, 120, 240, 392},
    309,
    {
        OK, visible, silent;
        OK, visible, silent;
        OK, visible, silent;
        OK, visible, silent
    }
};

resource 'DITL' (309, purgeable) {
     {  /* array DITLarray: 3 elements */
        /* [1] */
        {115, 182, 135, 262},
        Button {
            enabled,
            "OK"
        };
        /* [2] */
        {10, 80, 110, 270},
        StaticText {
            disabled,
            "Printer timed out. "
        };
        /* [3] */
        {10, 20, 42, 52},
        Icon {
            disabled,
            1
        }
    }
};

resource 'ALRT' (312, purgeable) {
    {100, 120, 240, 392},
    312,
    {
        OK, visible, silent;
        OK, visible, silent;
        OK, visible, silent;
        OK, visible, silent
    }
};

resource 'DITL' (312, purgeable) {
     {  /* array DITLarray: 3 elements */
        /* [1] */
        {115, 182, 135, 262},
        Button {
            enabled,
            "OK"
        };
```

```
        /* [2] */
        {10, 80, 110, 270},
        StaticText {
            disabled,
            "Connection cancelled. "
        };
        /* [3] */
        {10, 20, 42, 52},
        Icon {
            disabled,
            1
        }
    }
};

resource 'ALRT' (313, purgeable) {
    {100, 120, 240, 392},
    313,
    {
        OK, visible, silent;
        OK, visible, silent;
        OK, visible, silent;
        OK, visible, silent
    }
};

resource 'DITL' (313, purgeable) {
    {   /* array DITLarray: 3 elements */
        /* [1] */
        {115, 182, 135, 262},
        Button {
            enabled,
            "OK"
        };
        /* [2] */
        {10, 80, 110, 270},
        StaticText {
            disabled,
            "Not enough disk space to write the file. "
        };
        /* [3] */
        {10, 20, 42, 52},
        Icon {
            disabled,
            1
        }
    }
};

resource 'ALRT' (400, purgeable) {
    {100, 120, 240, 392},
    400,
    {
        OK, visible, silent;
        OK, visible, silent;
        OK, visible, silent;
        OK, visible, silent
    }
};

resource 'DITL' (400, purgeable) {
    {   /* array DITLarray: 3 elements */
        /* [1] */
        {115, 182, 135, 262},
```

```
        Button {
            enabled,
            "OK"
        };
        /* [2] */
        {10, 80, 110, 270},
        StaticText {
            disabled,
            "Please enter the media name. "
        };
        /* [3] */
        {10, 20, 42, 52}, ,
        Icon {
            disabled,
            1
        }
    }
};

resource 'ALRT' (401, purgeable) {
    {100, 120, 240, 392},
    401,
    {
        OK, visible, silent;
        OK, visible, silent;
        OK, visible, silent;
        OK, visible, silent
    }
};

resource 'DITL' (401, purgeable) {
    {   /* array DITLarray: 3 elements */
        /* [1] */
        {115, 182, 135, 262},
        Button {
            enabled,
            "OK"
        };
        /* [2] */
        {10, 80, 110, 270},
        StaticText {
            disabled,
            "Sorry, but the 'from' point must be "
            "less than or equal to the "
            "'to' point. "
        };
        /* [3] */
        {10, 20, 42, 52},
        Icon {
            disabled,
            1
        }
    }
};

resource 'ALRT' (402, purgeable) {
    {100, 120, 240, 392},
    402,
    {
        OK, visible, silent;
        OK, visible, silent;
        OK, visible, silent;
        OK, visible, silent
    }
```

```
};

resource 'DITL' (402, purgeable) {
    {   /* array DITLarray: 3 elements */
        /* [1] */
        {115, 182, 135, 262},
        Button {
            enabled,
            "OK"
        };
        /* [2] */
        {10, 80, 110, 270},
        StaticText {
            disabled,
            "Sorry, but the uncalibrated measurements "
            "should increase. Check your data entry "
            "or re-check your measurements."
        };
        /* [3] */
        {10, 20, 42, 52},
        Icon {
            disabled,
            1
        }
    }
};

resource 'ALRT' (403, purgeable) {
    {100, 120, 240, 392},
    403,
    {
        OK, visible, silent;
        OK, visible, silent;
        OK, visible, silent;
        OK, visible, silent
    }
};

resource 'DITL' (403, purgeable) {
    {   /* array DITLarray: 3 elements */
        /* [1] */
        {115, 182, 135, 262},
        Button {
            enabled,
            "OK"
        };
        /* [2] */
        {10, 80, 110, 270},
        StaticText {
            disabled,
            "Sorry, but this calibration set matches "
            "(or overlaps) the set '^0'. "
            "Make sure the sets are unique."
        };
        /* [3] */
        {10, 20, 42, 52},
        Icon {
            disabled,
            1
        }
    }
};

type 'POST' { /* General POST StringList resource definition */
```

```
        integer;                            /* type of data */
        array StringArray {
              string;                          /* String */
        };
/*      byte = 0;                              Terminating string      */
};

#if IncludeRipMaster
resource 'POST' (201,purgeable) {
256,
{
"%!PS-Adobe-2.0 Query\r";
"%%Title: Retrieve Log File\r";
"%% returns %%[StartJob: <usertime> ]%%\r";
"%%          %%[EndJob:  <document><user><status><completion>\r";
"%%                      <page size><pages><inches><elapsed time>\r";
"%%          %%[FileSize:  <JobFileSize>\r";
"\r";
"statusdict begin\r";
"/jobname (RIPMaster; document: Retrieve Log) def\r";
"end\r";
"\r";
"/buffer 512 string def\r";
"/nullcount 0 def\r";
"/nulllimit 30 def\r";
"/outfile (%stdout)(w) file def\r";
"\r";
"/dumpfile\r";
"   {\r";
"       {   pfile buffer readstring\r";
"        \r";
"           {\r";
"               dup length 0 ne \r";
"               {   outfile exch writestring flush\r";
"                   /nullcount 0 def\r";
"               }\r";
"               {   pop \r";
"                   /nullcount nullcount 1 add def\r";
"                   nullcount nulllimit gt\r";
"                   {exit} if\r";
"               } ifelse\r";
"           }\r";
"           {\r";
"               = flush exit\r";
"           }\r";
"           ifelse\r";
"       } loop\r";
"   } def\r";
"\r";
"\r";
"TSM /logfilename get dup status\r";
"{  pop pop exch pop \r";
"   TSM /jobfileoffset get lt\r";
"   { TSM /jobfileoffset 0 put }\r";
"   if\r";
"   \r";
"   (r+) file /pfile exch def\r";
"   pfile TSM /jobfileoffset get setfileposition\r";
"   dumpfile\r";
"   pfile closefile\r";
"} if\r";
"\r";
"TSM /logfilename get status\r";
"{pop pop exch pop}\r";
```

```
"{0} ifelse\r";
"\r";
"(%%[FileSize: ) print 20 string cvs print ( ]%%) =\r";
"       \r";
"/TSM where\r";
"{pop TSM /TSMActive false put } if\r";
"\r";
"(%%[Last:]%%) = flush\r";
"\r";
""
}
};


resource 'POST' (200,purgeable) {
256,
{
"%!PS-Adobe-2.0 Query\r";
"%%Title: Check for TSM Prep\r";
"%% returns <file sys><diskonline><TSMprep><version><enabled><active>\r";
"\r";
"statusdict begin\r";
"/jobname (RIPMaster; document: Query) def\r";
"end\r";
"(%%[TSMStatus: ) print\r";
"statusdict /diskstatus known       %have a file system\r";
"{\r";
"   (true  ) print\r";
"   statusdict /diskonline known        % disk there\r";
"   {   statusdict begin diskonline end\r";
"       {(true  )}\r";
"       {(false )} ifelse\r";
"   }\r";
"   {   (true  )}                 % if no online command, assume online\r";
"   ifelse\r";
"   print\r";
"}\r";
"{(false ) print (false ) print}\r";
"ifelse\r";
"\r";
"/TSM where\r";
"{  pop \r";
"   (true  ) print                   % TSM prep loaded\r";
"   TSM /version get print ( ) print     % version\r";
"\r";
"   TSM /activefilename get status      % enabled\r";
"   {   pop pop pop pop (true  )}\r";
"   {(false )} ifelse\r";
"   print\r";
"   \r";
"   TSM /TSMActive get               % active\r";
"   {(true  )}\r";
"   {(false )} ifelse\r";
"   print\r";
"} \r";
"{  (false ) print (0.0 ) print (false ) print (false ) print\r";
"}\r";
"ifelse\r";
"\r";
"(]%%) =\r";
"/TSM where\r";
"{/TSMActive false put              % dont log this job\r";
"} if\r";
"flush\r";
```

```
""
}
};
#endif

resource 'POST' (202,purgeable) {
256,
{
"%!PS-Adobe-2.0 Query\r";
"%%Title: Get Disk Statistics\r";
"statusdict begin\r";
"/jobname (RIPMaster; document: DiskQuery) def\r";
"end\r";
"/TSM where\r";
"(pop TSM /TSMActive false put ) if\r";
"statusdict begin\r";
"(%%[DiskStatus: ) print\r";
"userdiskpercent 3 string cvs print ( ) print\r";
"diskstatus 7 string cvs print ( ) print \r";
"7 string cvs print ( ) print \r";
"(]%%) = \r";
"flush\r";
"end\r";
""
}
};

resource 'POST' (203,purgeable) {
256,
{
"%!PS-Adobe-2.0 Query\r";
"%%Title: Get VM Statistics\r";
"statusdict begin\r";
"/jobname (RIPMaster; document: VMQuery) def\r";
"end\r";
"/TSM where\r";
"(pop TSM /TSMActive false put ) if\r";
"\r";
"(%%[VMStatus: ) print\r";
"vmstatus 10 string cvs print ( ) print \r";
"10 string cvs print ( ) print\r";
"10 string cvs print ( ) print\r";
"/TSM where\r";
"{  pop\r";
"   TSM /hasworkingli5 get exec\r";
"   {   statusdict begin\r";
"           resolution\r";
"       end\r";
"   }\r";
"   {   72 0 matrix defaultmatrix dtransform pop cvi\r";
"   } ifelse\r";
"}\r";
"{ 0 } ifelse\r";
"\r";
"10 string cvs print ( ) print\r";
"\r";
"statusdict /li5backendparams known\r";
"{  256 string \r";
"   statusdict begin li5backendparams end\r";
"   length 0 gt\r";
"   { 2 }\r";
"   { 1 } ifelse\r";
"}\r";
"{ 0 } ifelse\r";
```

```
"\r";
"3 string cvs print ( ) print\r";
"\r";
"(]%%) =\r";
"flush\r";
"\r";
""
}
};

#if IncludeRipMaster

resource 'POST' (204,purgeable) {
256,
{
"%!PS-Adobe-2.0 Query\r";
"%%Title: Retrieve Memo Files\r";
"%% returns %%[Memo: <memo #><supply inches><takeup inches> ]%%\r";
"\r";
"statusdict begin\r";
"/jobname (RIPMaster; document: RetrieveMemo) def\r";
"end\r";
"\r";
"/buffer 1000 string def\r";
"/nullcount 0 def\r";
"/nulllimit 30 def\r";
"/dumpfile\r";
"   {\r";
"       {   pfile buffer readline\r";
"        \r";
"           {\r";
"               dup length 0 ne \r";
"               {   =\r";
"                   /nullcount 0 def\r";
"               }\r";
"               {   pop \r";
"                   /nullcount nullcount 1 add def\r";
"                   nullcount nulllimit gt\r";
"                   {exit} if\r";
"               } ifelse\r";
"           }\r";
"           {\r";
"                = exit\r";
"           }\r";
"           ifelse\r";
"       } loop\r";
"       flush\r";
"   } def\r";
"\r";
"\r";
"(TSM/Memo*) {  \r";
"           (r) file /pfile exch def\r";
"           dumpfile\r";
"           pfile closefile\r";
"       } 100 string filenameforall\r";
"       \r";
"/TSM where\r";
"{pop TSM /TSMActive false put } if\r";
"flush\r";
""
}
};

resource 'POST' (205,purgeable) {
```

```
256,
{
"%PS-Adobe 2.0\r";
"%%Title - Feed and Cut\r";
"\r";
"statusdict begin\r";
"/jobname (RIPMaster; document: AdvanceCut) def\r";
"end\r";
"\r";
"/resetfilmstats\r";
"{  \r";
"TSM begin\r";
"   memofilename status\r";
"   {   pop pop pop pop }\r";
"   {   \r";
"       /statfile memofilename (w) file def\r";
"       statfile (%%[Memo: 0 180000 0 0 ]%%) writestring\r";
"       statfile 13 write\r";
"       statfile 10 write\r";
"       statfile closefile\r";
"   }\r";
"   ifelse\r";
"\r";
"   /statfile memofilename (r+) file def\r";
"   statfile 10 setfileposition\r";
"   statfile token                 %read inches in supply cassette\r";
"   {   /supplyinches exch def      % in units of 100\r";
"   }\r";
"   {   /supplyinches 180000 def    % assume 150 ft roll\r";
"   } ifelse\r";
"   statfile 11 setfileposition\r";
"   \r";
"   TSM /hasdecfc get exec                  % use internal counter if there\r";
"   {   TSM /supplyinches\r";
"       statusdict begin filmcounter end\r";
"       .003937 mul cvi            % put in units of hundreds of inches\r";
"       put\r";
"   } if\r";
"\r";
"   \r";
"   /takeupinches 0 def\r";
"   /numjobs 0 def\r";
"   \r";
"   TSM /hasdecfc get exec         % use internal counter if there\r";
"   {   supplyinches\r";
"   }\r";
"   {\r";
"       halffeedinches 2 mul           % half on the front, half on the back\r";
"       supplyinches exch sub          % take away from supply\r";
"   } ifelse\r";
"   7 string cvs                   % in units of 100\r";
"           \r";
"   \r";
"   statfile exch writestring      % and write it out\r";
"   \r";
"   ( )                            % add delimiter\r";
"   statfile exch writestring       % and write it out\r";
"\r";
"   takeupinches                   % add to takeup\r";
"   7 string cvs                   % in units of 100\r";
"\r";
"   statfile exch writestring      % and write it out\r";
"   \r";
"   ( )                            % add delimiter\r";
```

```
"   statfile exch writestring        % and write it out\r";
"\r";
"   numjobs 4 string cvs \r";
"   statfile exch writestring\r";
"\r";
"   statfile ( ]%%) writestring\r";
"   statfile 13 write\r";
"   statfile 10 write\r";
"   \r";
"   statfile closefile               % and done\r";
"end\r";
") def\r";
"\r";
"/halffeedinches feedlength 100 mul 2 idiv def  % feedlength set by sting before job runs\r";
"                                               % because half stays in\r";
"\r";
"TSM /hasworkingl15 get exec\r";
"{  statusdict begin \r";
"       {   l15backendstatus                    % wait until imagesetter \r";
"           dup dup dup\r";
"           0 eq                                % idle\r";
"           exch\r";
"           2 eq                                % offline\r";
"           or\r";
"           exch\r";
"           12 eq                               % but don't care cassette not there\r";
"           or\r";
"           exch\r";
"           1 eq\r";
"           or\r";
"           statusdict /haltbutton known\r";
"           { haltbutton}\r";
"           { false } ifelse\r";
"           or\r";
"           {exit} if\r";
"       } loop\r";
"\r";
"       256 string l15backendparams             % check if L200 back end\r";
"       231 get\r";
"       65 eq                                   % L200 feeds 6 inches\r";
"       {6}{9} ifelse                           % others feed 9\r";
"       \r";
"       feedlength exch sub dup\r";
"       0 gt\r";
"       {\r";
"           72 mul cvi\r";
"           userdict exch /addfeed  exch put\r";
"           initgraphics\r";
"           statusdict /setpage known              % typesetters have this command\r";
"           {\r";
"               792 addfeed 1 setpage              % so set strip  \r";
"               showpage\r";
"           }\r";
"           if                                     % test on a laser printer\r";
"       } {pop} ifelse\r";
"\r";
"\r";
"       statusdict /oldcutfilm known\r";
"       {   oldcutfilm } if\r";
"   end             %if rip can do, go ahead and cut it\r";
"} if\r";
"\r";
"TSM /TSMActive get\r";
"{  TSM begin\r";
```

```
"       resetfilmstats                              %   anc reset\r";
"       diskcheck                                   % and sys up with space\r";
"       {   \r";
"           {   openlogfile\r";
"               fillblank\r";
"               lString 3 (FeednCut:) putinterval\r";
"               pLine\r";
"               closelogfile\r";
"           } stopped           %snag if any error\r";
"           pop\r";
"       }\r";
"       if\r";
"   end\r";
"} if\r";
"\r";
"\r";
"\r";
"/TSM where\r";
"{pop TSM /TSMActive false put } if\r";
""
}
};

resource 'POST' (206,purgeable) {
256, {
"%PS-Adobe 2.0\r";
"%%Title - reload\r";
"/reloadfilmstats\r";
"{  \r";
"TSM begin\r";
"       /statfile memofilename (w) file def\r";
"       statfile (%%[Memo: 0 ) writestring\r";
"       \r";
"       statfile rolllength 100 mul feedlength 100 mul sub\r";
"       \r";
"       8 string cvs writestring\r";
"       \r";
"       statfile ( ) writestring\r";
"       \r";
"       statfile (0) writestring\r";
"       \r";
"       statfile ( 0 ]%%) writestring\r";
"       statfile 13 write\r";
"       statfile 10 write\r";
"       statfile closefile\r";
"   end\r";
"} def\r";
"\r";
"/rolllength where\r";
"{pop}\r";
"{ /rolllength 1800 def\r";
"  /feedlength 8 def        }\r";
"ifelse\r";
"reloadfilmstats\r";
"\r";
"/TSM where\r";
"{pop TSM /TSMActive false put } if\r";
"\r";
"\r";
""
}
};

resource 'POST' (207,purgeable) {
```

```
256,
{
"%!PS-Adobe-2.0 Query\r";
"%%Title:   Get time synch\r";
"%% puts    %%[TimeSynch: <mac time> <usertime> ]%% in log file\r";
"\r";
"statusdict begin\r";
"/jobname (RIPMaster; document: TimeSynch) def\r";
"end\r";
"\r";
"/dotimesynch\r";
"{\r";
"   fillblank\r";
"   lString 3 (TimeSynch: ) putinterval\r";
"   lString 14 mactime putinterval\r";
"   lString 14 mactime length add 1 add usertime 11 string cvs putinterval\r";
"} def\r";
"\r";
"TSM begin\r";
"   diskcheck\r";
"   {   \r";
"       openlogfile\r";
"       dotimesynch\r";
"       pLine\r";
"       closelogfile\r";
"   }\r";
"   if\r";
"end % TSM\r";
"\r";
"/TSM where\r";
"{pop TSM /TSMActive false put } if\r";
""
}
};

resource 'POST' (208,purgeable) {
256,
{
"%!PS-Adobe-2.0 Query\r";
"%%Title: Clear Log File\r";
"\r";
"statusdict begin\r";
"/jobname (RIPMaster; document: ClearLog) def\r";
"end\r";
"\r";
"/TSM where\r";
"{  pop\r";
"   TSM /logfilename get dup status \r";
"   {pop pop pop pop deletefile}\r";
"   if\r";
"   TSM /TSMActive false put \r";
"} if\r";
"\r";
""
}
};

resource 'POST' (209,purgeable) {
256,
{
"%PS-Adobe 2.0\r";
"(TSM/Activate) (w) file closefile\r";
"/TSM where\r";
"{pop TSM /TSMActive false put } if\r";
```

```
"(TSM/Memo0) status\r";
"(  pop pop pop pop (TSM/Memo0) deletefile } if\r";
"   \r";
"/statfile (TSM/Memo0) (w) file def\r";
"statfile (%%[Memo: 0 ) writestring\r";
"\r";
"statusdict /li5backendparams known\r";
"(  256 string \r";
"   statusdict begin li5backendparams end\r";
"   length 0 gt\r";
"   { true }\r";
"   { false} ifelse\r";
")\r";
"( false } ifelse\r";
"\r";
"(  % has working li5 - use filmcounter if decrementing\r";
"   statusdict begin\r";
"       256 string li5backendparams              % check film counter mode\r";
"   end\r";
"   81 get\r";
"   49 eq                                        % 0 is incrementing counter\r";
"   (\r";
"       statusdict begin filmcounter end\r";
"       .003937 mul cvi                          % put in units of hundreds of inches\r";
"       7 string cvs\r";
"   }\r";
"   ( (180000) }\r";
"   ifelse\r";
"}\r";
"( (180000) }\r";
"ifelse\r";
"statfile exch writestring\r";
"statfile ( 0 0 ]%%) writestring\r";
"statfile 13 write\r";
"statfile 10 write\r";
"statfile closefile\r";
"\r";
"/SpoolFile (TSM/TSMMain) (w) file def\r";
"SpoolFile == flush\r";
"currentfile == flush\r";
"/buffer 1024 string def\r";
"/storefile ( (starting storefile) = flush\r";
"   (    \r";
"       currentfile buffer readstring\r";
"       \r";
"       (   %(****) = dup length = (****) = flush\r";
"           SpoolFile exch writestring\r";
"       }\r";
"       (   (closing) = flush\r";
"           (****) = dup length = (****) = flush\r";
"           serverdict begin stdin bytesavailable end == flush\r";
"           dup length 0 eq\r";
"           {SpoolFile closefile exit}\r";
"           {SpoolFile exch writestring}\r";
"           ifelse\r";
"       }\r";
"       ifelse\r";
"   } loop\r";
") def\r";
"(all is defined) = flush\r";
"storefile\r";
"%  TypeSet Manager v 17\r";
"%      - Routine to perform automatic job logging to PostScript hard disk\r";
"%\r";
```

```
"%  Copyright 1989, 1990 Jim Burns & Southwest Software Inc.\r";
"%\r";
"%  Edit History\r";
"%       -   June 1989:  Beta version\r";
"%       -   Jun 30      1st Lino run v42.5 RIP-1 - setlights\r";
"%       -   Jul 21      1st Lino run v49.3 RIP-2 - setlights (one param)\r";
"%       -   Jul 24      remove exitserver - disk jobs exs automatically\r";
"%                       use realtime instead of usertime\r";
"%       -   Jul 26      add slug line capability\r";
"%       -   Aug 1       remove ss\r";
"%       -   Aug 5       force job print if error print\r";
"%                       add monitorcut\r";
"%       -   Aug 15      add dynamic LI5 check\r";
"%       -   Aug 25      add watchstreams in stdin waitloop\r";
"%       -   Sep 5       allow for user sys/start\r";
"%       -   Sep 27      fix cutfilm when counter not up\r";
"%       -   Oct 10      add startup message to log, disable log date\r";
"%---------------------------------------------------------------------\r";
"%  Version 1.6\r";
"%       -   Nov 21      change to monitor cut once per job cycle\r";
"%                       change to not set counter to dec for old 300Rs\r";
"%       -   Dec 23      allow setfilmcounter to set increment number for 300Rs\r";
"%                       disable appleshare spooler ioerror logging\r";
"%       -   Dec 30      record log units in tenths of an inch\r";
"%                       add European page types to log and slug\r";
"%       -   Jan 22      v1.6b3 - changed getjobinches to use filmcounter if there\r";
"%                       Freehand and Separator cheat, so make pageparams invalid\r";
"%       -   Feb 14      v1.6b4 - changed filmcounter usage to inc or dec\r";
"%                       only set to dec on boot for LTC500 or LTC300\r";
"%                       remove references to hasworkingfc\r";
"%       -   June 15     v1.6b5 - CM 1.0b4 changed showpage re-definition to account for\r";
"%                       Separators incorrect way of re-defining\r";
"\r";
"% on startup job, RIP-2 automatically does an exitserver for you\r";
"\r";
"%%Title:    Smart findfont\r";
"%           abort if switch to courier\r";
"/oldfindfont /findfont load def\r";
"/findfont\r";
"{\r";
"   dup\r";
"   /Courier eq\r";
"   {   oldfindfont }\r";
"   {   \r";
"       dup\r";
"       oldfindfont\r";
"       dup FontDirectory /Courier get eq\r";
"       { pop /FontNotFound .error}\r";
"       {exch pop}\r";
"       ifelse\r";
"   } ifelse\r";
"} def\r";
"\r";
"/oldshowpage /showpage load def\r";
"/oldcopypage /copypage load def\r";
"/showpage\r";
"{  \r";
"   TSM /doshowpage get exec\r";
"} def\r";
"\r";
"/copypage\r";
"{  \r";
"   TSM /docopypage get exec\r";
"} def\r";
```

```
"\r";
"/cvxi                    <hex string> cvxi <integer>\r";
"{\r";
"   dup\r";
"   length \r";
"   3 add \r";
"   string \r";
"   dup\r";
"   dup 4 1 roll\r";
"   0 (16#) \r";
"   putinterval\r";
"   exch \r";
"   3 \r";
"   exch \r";
"   putinterval\r";
"   cvi\r";
"} def\r";
"\r";
"\r";
"\r";
"%start of TSM stuff\r";
"\r";
"\r";
"%  ***     Allocate and stuff TSM dictionary\r";
"%  *\r";
"%  *\r";
"/TSM 100 dict def\r";
"TSM begin\r";
"\r";
"/timestring 8 string def\r";
"\r";
"/logfilename (TSM/JobLog) def\r";
"/activefilename (TSM/Activate) def\r";
"/memofilename (TSM/Memo0) def\r";
"/slugfilename (TSM/Slug) def\r";
"/mactime (0) def\r";
"/numpages 0 def\r";
"/version (1.6) def\r";
"/jobstat (OK) def\r";
"/jobfileoffset 0 def\r";
"/countjob 0 def\r";
"/joberror false def\r";
"/feeddetected false def\r";
"/initialfilmcount 0 def\r";
"/loopfc 0 def\r";
"/jobinchclear (0         ) def\r";
"/jobinches (          ) def\r";
"/TSMActive true def\r";
"\r";
"%  ***     ShowPage re-definition procs\r";
"%  *\r";
"%  *    \r";
"%          This fairly involved process is required because of the method separator\r";
"%          uses to re-define showpage. Separator redefines in order to place the registration\r";
"%          marks on the next page of a particular color. We have redefined in userdict. They didnt.\r";
"%          When showpage gets called, the stack looks like:\r";
"%\r";
"%          systemdict\r";
"%          userdict            <-- we redefine showpage here\r";
"%          sep dict 1\r";
"%          sep dict 2          <-- separator redefines it here\r";
"%          sep dict 3\r";
"%          userdict            <-- separator pushes this, but our definition is in here!\r";
"%          AldusDict           and showpage is called from here\r";
```

```
"\r";
"\r";
"/getdictstackpos                     % return position of <dict> on\r";
"{                                    % dict stack\r";
"   countdictstack\r";
"   dup 1 sub exch\r";
"   array\r";
"   dictstack\r";
"   exch\r";
"   {   \r";
"       2 copy\r";
"       get\r";
"       3 index \r";
"       eq\r";
"       { 3 1 roll pop pop exit} if\r";
"       1 sub\r";
"       dup 0 lt\r";
"       { 3 1 roll pop pop exit} if\r";
"   } loop\r";
"} def\r";
"\r";
"/savep ageinches\r";
"{  \r";
"   {   TSM /jobinches get dup cvi\r";
"       statusdict /pageparams get exec % get page size height\r";
"       pop pop exch pop              % in 72nds of an inch\r";
"       100 mul 36 add 72 div         % in rounded 100th of an inch\r";
"       #copies mul cvi abs           % assumes all pages equal!\r";
"       add \r";
"       8 string cvs\r";
"       0 exch putinterval\r";
"   } stopped pop\r";
"} def\r";
"\r";
"/ripmshowpage\r";
"{  \r";
"   TSM /savep ageinches get exec\r";
"   oldshowpage\r";
"} def\r";
"/ripmcopypage\r";
"{  \r";
"   TSM /savep ageinches get exec\r";
"   oldcopypage\r";
"} def\r";
"\r";
"/dictlulvl -1 def\r";
"\r";
"/doshowpage\r";
"{\r";
"   TSM /dictlulvl get dup\r";
"   -1 eq                             % first time through\r";
"   {   \r";
"       pop\r";
"       TSM /dictcontext\r";
"       countdictstack array dictstack put\r";
"\r";
"       userdict TSM /getdictstackpos get exec 1 sub        % <initial> start with dict entry after userc
"       dup\r";
"       0 ne\r";
"       {\r";
"           -1                            % increment\r";
"           0                             % limit\r";
"           {                             % proc to perform lookup\r";
"               dup                       % if showpage known in dict,\r";
```

```
"               TSM /dictcontext get exch get       % execute it there\r";
"               /showpage known \r";
"               {exit}                        % this really ought to exit\r";
"               {pop} ifelse\r";
"           \r";
"           } for                         %\r";
"           dup\r";
"           TSM exch /dictlulvl exch put\r";
"           TSM /dictcontext get exch get\r";
"           /showpage get \r";
"           exec\r";
"       }\r";
"       {\r";
"           pop\r";
"           TSM /ripmshowpage get exec\r";
"           TSM /dictlulvl -1 put\r";
"\r";
"       } ifelse\r";
"   }\r";
"   {   \r";
"       pop\r";
"       TSM /ripmshowpage get exec\r";
"       TSM /dictlulvl -1 put\r";
"\r";
"   } ifelse\r";
"} def\r";
"\r";
"/docopypage\r";
"{\r";
"   TSM /dictlulvl get dup\r";
"   -1 eq                             % first time through\r";
"   {   \r";
"       pop\r";
"       TSM /dictcontext\r";
"       countdictstack array dictstack put\r";
"\r";
"       userdict TSM /getdictstackpos get exec 1 sub        % <initial> start with dict entry after user
"       dup\r";
"       0 ne\r";
"       {\r";
"           -1                            % increment\r";
"           0                             % limit\r";
"           {                             % proc to perform lookup\r";
"               dup                       % if showpage known in dict,\r";
"               TSM /dictcontext get exch get       % execute it there\r";
"               /copypage known \r";
"               {exit}                        % this really ought to exit\r";
"               {pop} ifelse\r";
"           \r";
"           } for                         %\r";
"           dup\r";
"           TSM exch /dictlulvl exch put\r";
"           TSM /dictcontext get exch get\r";
"           /copypage get \r";
"           exec\r";
"       }\r";
"       {\r";
"           pop\r";
"           TSM /ripmcopypage get exec\r";
"           TSM /dictlulvl -1 put\r";
"\r";
"       } ifelse\r";
"   }\r";
"   {   \r";
```

```
"       pop\r";
"       TSM /ripmcopypage get exec\r";
"       TSM /dictlulvl -1 put\r";
"\r";
"    ) ifelse\r";
") def\r";
"\r";
"\r";
"%  and now back to normalcy\r";
"\r";
"%  determine if working LI5 interface supported\r";
"/hasworkingli5 {\r";
"   save\r";
"   statusdict /li5backendparams known\r";
"   {   256 string \r";
"       statusdict begin li5backendparams end\r";
"       length 0 gt\r";
"       { true }\r";
"       { false} ifelse\r";
"   }\r";
"   { false } ifelse\r";
"   exch restore\r";
") def\r";
"\r";
"%  determine if working (decrementing) film counter supported\r";
"/hasdecfc {\r";
"   save\r";
"   statusdict /li5backendparams known\r";
"   {   256 string \r";
"       statusdict begin li5backendparams end\r";
"       dup\r";
"       length 0 gt\r";
"       { 81 get 49 eq }\r";
"       { pop false} ifelse\r";
"   }\r";
"   { false } ifelse\r";
"   exch restore\r";
") def\r";
"\r";
"/getclock\r";
"{  systemdict /realtime known\r";
"   {realtime}\r";
"   {usertime} ifelse\r";
") def\r";
"\r";
"/getfilm                                % getfilm <value> \r";
"{                                       % gets film via li5, in order to stop E2 errors\r";
"   statusdict /li5backendparams known\r";
"   {   save\r";
"       statusdict begin 256 string li5backendparams end\r";
"       dup length 0 ne\r";
"       {   72 8 getinterval\r";
"           cvxi                        % convert from hex to integer\r";
"       }\r";
"       { pop 0} ifelse                 % if li5 not enabled, then return neg\r";
"       exch restore\r";
"   }\r";
"   { 0 } ifelse                        % if no li5, return 0\r";
") def\r";
"\r";
"\r";
"\r";
"%  *** <string> unpackstring  <chn-1> ... <ch1> <ch0> <length>\r";
"%  *\r";
```

```
"%  *\r";
"%\r";
"\r";
"\r";
"/unpackstring {\r";
"   userdict begin\r";
"       dup\r";
"       /upstr exch def\r";
"       length\r";
"       dup \r";
"       /upstrndx exch def              % on stack - < n >\r";
"       {\r";
"           upstrndx 1 sub\r";
"           dup\r";
"           /upstrndx exch def\r";
"           upstr exch \r";
"           get             %puts int value of char on stack\r";
"       } repeat\r";
"       upstr length\r";
"   end\r";
"} def\r";
"\r";
"/rjust {\r";
"       dup \r";
"       length\r";
"       exch\r";
"       3 1 roll\r";
"       sub\r";
"       exch\r";
"       putinterval\r";
"       } def\r";
"\r";
"/pLine {lString\r";
"       unpackstring\r";
"       {   logfile exch write } repeat\r";
"       logfile 13 write\r";
"       logfile 10 write\r";
"       } def\r";
"       \r";
"   \r";
"/lString 126 string def\r";
"\r";
"/fillblank \r";
"{ \r";
"   0\r";
"   lString length\r";
"   {   dup \r";
"       lString exch\r";
"       32 put\r";
"       1 add\r";
"   } repeat\r";
"   pop\r";
"   lString 0 (%%[) putinterval\r";
"   lString dup length 3 sub (]%%) putinterval\r";
"\r";
"} def\r";
"\r";
"/getusername                   %extract user name from jobname\r";
"   {\r";
"       statusdict /jobname get         \r";
"       dup\r";
"       null eq\r";
"       {pop (unknown;)}\r";
"       if\r";
```

```
"       (;) search\r";
"       {exch pop exch pop\r";
"           dup length 0 eq\r";
"           {pop (unknown)}if\r";
"           }                %keeps up till first ;\r";
"       if                         %MacPaint has name only\r";
"   } def\r";
"\r";
"/getdocname                 %extract document name from jobname\r";
"   {\r";
"       statusdict /jobname get          \r";
"       dup\r";
"       null eq\r";
"       {pop (unknown)}\r";
"       {\r";
"           (: ) search\r";
"           {   pop pop\r";
"               (;) search\r";
"               {exch pop exch pop}\r";
"               if\r";
"           } \r";
"           {pop (unknown)}\r";
"           ifelse\r";
"       } ifelse\r";
"   } def\r";
"\r";
"/getelpt\r";
"   {\r";
"       userdict begin\r";
"           timestring 0 (00:00:00) putinterval\r";
"\r";
"           systemdict /realtime known\r";
"           {realtime}\r";
"           {usertime} ifelse\r";
"           strttime \r";
"           sub 1000 div cvi\r";
"           dup\r";
"\r";
"           3600 div cvi \r";
"           100 add 3 string cvs 1 2 getinterval\r";
"           timestring exch 0 exch putinterval\r";
"           \r";
"           dup\r";
"           dup\r";
"           3600 div cvi 3600 mul sub 60 div cvi\r";
"           100 add 3 string cvs 1 2 getinterval\r";
"           timestring exch 3 exch putinterval\r";
"\r";
"           dup\r";
"           60 div cvi 60 mul sub\r";
"           100 add 3 string cvs 1 2 getinterval\r";
"           timestring exch 6 exch putinterval\r";
"\r";
"           timestring\r";
"       end\r";
"} def         \r";
"\r";
"/pgsizearray              % array of page types and sizes\r";
"mark\r";
"18.00 (TabX)\r";
"17.54 (A3x)\r";
"17.00 (Tab)\r";
"16.54 (A3)\r";
"15.00 (Legalx)\r";
```

```
"14.00 (Legal)\r";
"12.69 (A4x)\r";
"12.00 (Letterx)\r";
"11.69 (A4)\r";
"11.00 (Letter)\r";
"10.20 (Letters)\r";
" 9.84 (B5)\r";
" 9.50 (Lettvxt)\r";
" 8.50 (Lettrtv)\r";
" 8.26 (A5)\r";
"counttomark\r";
"dup\r";
"/numpgsz exch def\r";
"array astore\r";
"exch pop def\r";
"/errtol 0.20 def\r";
"\r";
"\r";
"/getpagetype                    % return letter, legal, tab or custom for slug\r";
"{\r";
"\r";
"   numpages 0 ne\r";
"   {\r";
"       jobinches cvi               % v1.6b5 loaded from showpages      \r";
"                                   % put in units of hundreds of inches\r";
"       100 div                     % now in inches\r";
"       numpages div                % now inch per page\r";
"   }\r";
"   {   statusdict begin pageparams end\r";
"                               % <width> <height> <offset> <orientation>\r";
"       0 eq             % if orientation 0, page on side - use width\r";
"       {   pop pop }\r";
"       {   pop exch pop }ifelse\r";
"       72 div           % in inches\r";
"   } ifelse\r";
"   \r";
"   /pgheight exch def\r";
"   (Custom)\r";
"   0 2 numpgsz 1 sub      % search array of types\r";
"   {\r";
"       dup\r";
"       pgsizearray exch get\r";
"       pgheight sub abs \r";
"       errtol lt\r";
"       {   \r";
"           pgsizearray exch 1 add get \r";
"           exch pop exit\r";
"       }\r";
"       {pop} ifelse\r";
"   } for\r";
"\r";
"} def\r";
"\r";
"/getjobinches\r";
"{  feeddetected                    % monitorfeed hack - return neg tu inches\r";
"   {   0 takeupinches sub          % so that updatefilmstats will show no inches\r";
"   }\r";
"   {                               % else do normal\r";
"\r";
"       jobinches cvi               % v1.6b5 loaded from showpages      \r";
"       dup 0 eq                    %\r";
"       {   pop                     % else if counter she no move, use postscript\r";
"           statusdict begin pageparams end % get page size height\r";
"           pop pop exch pop        % in 72nds of an inch\r";
```

```
"           100 mul 36 add 72 idiv          % in rounded 100th of an inch\r";
"           numpages mul                    % assumes all pages equal!\r";
"           cvi\r";
"       } if\r";
"   } ifelse\r";
"   cvi\r";
"} def\r";
"\r";
"/diskcheck         % only run if enough space and disk file trigger on\r";
"{\r";
"   TSM /activefilename get status      % only log if activated\r";
"   { pop pop pop pop\r";
"       statusdict begin diskstatus end % exit true if more than 5k avail\r";
"       pop 5 ge\r";
"   }\r";
"   { false\r";
"   } ifelse\r";
"} def\r";
"   \r";
"/openlogfile\r";
"{\r";
"   TSM /logfile logfilename (r+) file put\r";
"   TSM /logfilename get status\r";
"   {   pop pop exch pop            % have number of bytes\r";
"       TSM /logfile get exch setfileposition   % set for append\r";
"   } if\r";
"} def\r";
"/closelogfile\r";
"{\r";
"   TSM /logfile get closefile\r";
"} def\r";
"   \r";
"/endingjobstats\r";
"{\r";
"   fillblank\r";
"   lString 3 (EndJob:) putinterval\r";
"   lString 11 getdocname  putinterval\r";
"   lString 44 getusername putinterval\r";
"\r";
"   lString 76 jobstat putinterval\r";
"   \r";
"   lString 82\r";
"   \r";
"   systemdict /realtime known\r";
"   {realtime}\r";
"   {usertime} ifelse\r";
"\r";
"   11 string cvs putinterval\r";
"\r";
"   statusdict begin pagecount end\r";
"   startcnt sub\r";
"   dup                         %store off number of pages\r";
"   TSM exch\r";
"   /numpages exch\r";
"   put\r";
"   7 string cvs\r";
"   lString exch 107 exch rjust\r";
"   \r";
"   lString 97 getpagetype putinterval  % v1.6b3 moved after numpages put, because used\r";
"\r";
"   lString 113                 % number of inches used v1.6b2 align ones digits (was 112)\r";
"   getjobinches                % for commonality with previous versions\r";
"   5 add 10 idiv               % v1.6b2 - record log in tenths of an inch v1.6b4 no round\r";
"   5 string cvs rjust          % v1.6b2 - make one more space\r";
```

```
"   \r";
"   lString 114 getelpt putinterval\r";
"\r";
"                   \r";
"} def\r";
"/beginningjobstats\r";
"{\r";
"   TSM /strttime \r";
"   systemdict /realtime known\r";
"   {realtime}\r";
"   {usertime} ifelse\r";
"   put\r";
"   TSM /numpages 0 put\r";
"   TSM /jobstat (OK) put\r";
"   statusdict begin pagecount end\r";
"   /startcnt exch def\r";
"\r";
"   %   disable start job entries for disk log - not needed\r";
"   %fillblank\r";
"   %lString 3 (StartJob:) putinterval\r";
"   %lString 87\r";
"   %statusdict begin pagecount end\r";
"   %7 string cvs rjust\r";
"\r";
"   %lString 22\r";
"   %usertime 11 string cvs rjust\r";
"} def\r";
"/errorstats\r";
"   {    \r";
"        $error begin\r";
"        fillblank\r";
"        lString 3 (TSMERROR:) putinterval\r";
"        lString 13\r";
"        errorname\r";
"        dup type /stringtype ne{=string cvs}if\r";
"        putinterval\r";
"        lString 33 (OFFENDING COMMAND: ) putinterval\r";
"        lString 52 \r";
"        /command load\r";
"        dup type /stringtype ne{=string cvs}if\r";
"        putinterval\r";
"        end\r";
"        TSM /jobstat (ERROR) put\r";
"} def\r";
"\r";
"/updatefilmstats\r";
"{  \r";
"TSM begin\r";
"   memofilename status\r";
"   {    pop pop pop pop }\r";
"   {    \r";
"        /statfile memofilename (w) file def\r";
"        statfile (%%[Memo: 0 180000 0 0 ]%%) writestring\r";
"        statfile 13 write\r";
"        statfile 10 write\r";
"        statfile closefile\r";
"   }\r";
"   ifelse\r";
"\r";
"   /statfile memofilename (r+) file def\r";
"   statfile 10 setfileposition\r";
"   statfile token               %read inches in supply cassette\r";
"   {    /supplyinches exch def  % in units of 100\r";
"        statfile token\r";
```

```
"       {   /takeupinches exch def\r";
"           statfile token          % number of jobs\r";
"           {   /numjobs exch def}\r";
"           {   /numjobs 0 def  }\r";
"           ifelse\r";
"       }\r";
"       {   /takeupinches 0 def\r";
"           /numjobs 0 def\r";
"       }\r";
"       ifelse\r";
"   }\r";
"   {   /supplyinches 180000 def    % assume 150 ft roll\r";
"       /takeupinches 0 def\r";
"       /numjobs 0 def\r";
"   } ifelse\r";
"   statfile 11 setfileposition\r";
"   \r";
"   feeddetected                    % cassette empty\r";
"   { /numjobs 0 def} if\r";
"   \r";
"   getjobinches                    % returns neg of takeup if feeddetected\r";
"\r";
"   dup\r";
"\r";
"   feeddetected                    % v1.4 - if feed detected, but counter not avail, user\r";
"   {                               % must have sent a 115 cutfilm command\r";
"       TSM /hasdecfc get \r";
"       exec not                    % v1.6b4\r";
"       {\r";
"           pop 900                 % pop neg of takeup, but leave 9 inches to sub from supply\r";
"       } if\r";
"   } if\r";
"   \r";
"   supplyinches exch sub           % take away from supply\r";
"   TSM /hasdecfc get exec          % v1.6b4 use internal counter if there and decrementing\r";
"   {   pop\r";
"       statusdict begin filmcounter end\r";
"       .003937 mul cvi             % put in units of hundreds of inches\r";
"   } if\r";
"\r";
"   7 string cvs                    % in units of 100\r";
"           \r";
"   \r";
"   statfile exch writestring       % and write it out\r";
"   \r";
"   ( )                             % add delimiter\r";
"   statfile exch writestring       % and write it out\r";
"\r";
"   takeupinches add                % add to takeup\r";
"   7 string cvs                    % in units of 100\r";
"\r";
"   statfile exch writestring       % and write it out\r";
"   \r";
"   ( )                             % add delimiter\r";
"   statfile exch writestring       % and write it out\r";
"\r";
"   numjobs 1 add countjob add 4 string cvs \r";
"   statfile exch writestring\r";
"\r";
"   statfile ( )%%) writestring\r";
"   statfile 13 write\r";
"   statfile 10 write\r";
"   \r";
"   statfile closefile              % and done\r";
```

```
"end\r";
"} def\r";
"\r";
"/monitorcut\r";
"{  \r";
"   {\r";
"       initialfilmcount\r";
"       getfilm sub\r";
"       abs\r";
"       0 ne    % counter moved\r";
"       {   \r";
"           TSM /initialfilmtime getclock put\r";
"           {   TSM /loopfc getfilm put\r";
"               TSM /loopclock getclock put\r";
"               {   getclock loopclock sub\r";
"                   1000 ge\r";
"                   {exit} if\r";
"               } loop\r";
"               getfilm loopfc sub\r";
"               0 eq\r";
"               {exit} if\r";
"           } loop  % counter has not moved for 1 second\r";
"       % now reset film cassettes\r";
"           \r";
"           TSM /countjob -1 put\r";
"           TSM /feeddetected true put\r";
"           updatefilmstats\r";
"           \r";
"           TSM /diskcheck get exec             % only log if activated\r";
"           {   TSM /TSMActive true put\r";
"               {   openlogfile\r";
"                   fillblank\r";
"                   lString 3 (FeednCut:) putinterval\r";
"                   pLine\r";
"                   closelogfile\r";
"               } stopped           %snag if any error\r";
"               pop\r";
"           } if\r";
"\r";
"           TSM /countjob 0 put\r";
"           TSM /feeddetected false put\r";
"           TSM /initialfilmcount getfilm put\r";
"       } if\r";
"   } stopped pop\r";
"} def\r";
"\r";
"end % TSM\r";
"\r";
"errordict begin                        % Inform logger of error\r";
"errordict /handleerror get /oldhandleerror exch def\r";
"errordict /handleerror \r";
"{\r";
"   TSM begin\r";
"           TSM /TSMActive get\r";
"           diskcheck and\r";
"           {   \r";
"               {   % AppleShare LaserSpooler always gets this error\r";
"                   %   to log it seriously clutters up the log\r";
"                   $error begin\r";
"                       errorname\r";
"                       dup type /stringtype ne{=string cvs}if\r";
"                       (ioerror) eq\r";
"                       /command load\r";
"                       dup type /stringtype ne{=string cvs}if\r";
```

```
"                   (restore) eq and not\r";
"               end\r";
"               (   openlogfile\r";
"                   errorstats\r";
"                   pLine\r";
"                   closelogfile\r";
"                   TSM /joberror true put\r";
"               } if\r";
"           } stopped pop\r";
"       }\r";
"       if\r";
"   end % TSM\r";
"   errordict /oldhandleerror get exec\r";
"} put\r";
"end % errordict\r";
"\r";
"\r";
"serverdict begin\r";
"/oldexecjob /execjob load def\r";
"\r";
"/execjob\r";
"   {   TSM begin\r";
"           TSM /initialfilmcount getfilm put\r";
"           jobinches 0 jobinchclear putinterval\r";
"       end\r";
"\r";
"       serverdict begin\r";
"           {   serverdict /watchstreams known\r";
"               {   watchstreams    }\r";
"               {   stdin bytesavailable 0 ne   }\r";
"               ifelse\r";
"               (exit) if\r";
"               statusdict begin \r";
"                   /jobstate (idle) def\r";
"                   TSM /setlights get exec\r";
"                   statusdict /haltbutton known\r";
"                   { haltbutton}\r";
"                   { false } ifelse\r";
"               end\r";
"               { exit } if\r";
"           } loop\r";
"           TSM /hasworkingl15 get exec             % v1.6b4 use any style of counter\r";
"           {   TSM begin\r";
"                   monitorcut\r";
"               end\r";
"           } if\r";
"       end\r";
"\r";
"       TSM /joberror false put\r";
"       TSM /diskcheck get exec             % only log if activated\r";
"       {   TSM begin\r";
"               /TSMActive true store\r";
"           % disable start job logging - not needed    \r";
"               %openlogfile\r";
"           beginningjobstats\r";
"               %pLine\r";
"               %closelogfile\r";
"           end\r";
"       } \r";
"       { TSM /TSMActive false put\r";
"       } ifelse\r";
"\r";
"       serverdict /oldexecjob get exec\r";
"\r";
```

```
"       TSM /TSMActive get\r";
"       {   TSM begin\r";
"               getusername\r";
"               (unknown) eq\r";
"               getdocname\r";
"               (unknown) eq\r";
"               and not                  % dont log unknown jobs\r";
"               \r";
"               statusdict begin pagecount end\r";
"               startcnt sub\r";
"               0 ne or                  % but log if page count bumped\r";
"               joberror or              % or if we logged an error\r";
"               diskcheck and            % and sys up with space\r";
"               {   \r";
"                   {   openlogfile\r";
"                       endingjobstats\r";
"                       pLine\r";
"                       closelogfile\r";
"                       updatefilmstats\r";
"                       statusdict begin pagecount end\r";
"                       startcnt sub\r";
"                       0 ne\r";
"                       {   TSM /slugfilename get status\r";
"                           {   pop pop pop pop\r";
"                               {   userdict /#copies 1 put\r";
"                                   TSM /initialfilmcount getfilm put   % v1.6b4 no double count\r";
"                                   jobinches 0 jobinchclear putinterval\r";
"                                   TSM /slugfilename get run\r";
"                                   TSM /numpages 0 put                 % v1.6b4 was one page\r";
"                                   TSM /countjob -1 put\r";
"                                   updatefilmstats\r";
"                               } stopped\r";
"                               pop\r";
"                               TSM /countjob 0 put\r";
"                           } if\r";
"                       } if\r";
"                   } stopped            %snag if any error\r";
"                   pop\r";
"               }\r";
"               if\r";
"           end\r";
"       } if\r";
"   } def\r";
"\r";
"end %serverdict\r";
"\r";
"%  *** SetLights Stubb routine\r";
"%  *\r";
"%  *\r";
"\r";
"%      pageparams <width> <height> <offset> <orientation>\r";
"TSM /setlights {} put\r";
"statusdict /setblink known\r";
"{  TSM /setlights {0 setblink} put} if\r";
"\r";
"statusdict /setlight known %RIP 1 needs 2 params - RIP 2 needs 1\r";
"{  TSM /setlights {mark 0 0 setlight 1 0 setlight cleartomark} put} if\r";
"\r";
"\r";
"%  *** PageParams Stubb routine\r";
"%  *\r";
"%  *\r";
"\r";
"%      pageparams <width> <height> <offset> <orientation>\r";
```

```
"\r";
"statusdict /pageparams known not   % define pageparams stub if not known\r";
"{  statusdict\r";
"   /pageparams\r";
"   {   $printerdict /width known\r";
"       {   $printerdict /width get\r";
"           8 mul 72 mul 300 idiv\r";
"           $printerdict /height get\r";
"           72 mul 300 idiv\r";
"           0 1\r";
"       }\r";
"       [792 612 0 1]              %leave dummy if other p/s dont have\r";
"       ifelse\r";
"   } put\r";
"} if\r";
"\r";
"\r";
"%  *** cutfilm routine\r";
"%  *\r";
"%  *\r";
"\r";
"%      cutfilm\r";
"\r";
"statusdict /cutfilm known          % override cutfilm to clear tu cassette\r";
"{\r";
"  statusdict begin\r";
"      /oldcutfilm /cutfilm load def\r";
"      /cutfilm \r";
"      {\r";
"          statusdict begin\r";
"              oldcutfilm\r";
"          end\r";
"          TSM begin\r";
"              TSM /countjob -1 put\r";
"              TSM /feeddetected true put\r";
"              updatefilmstats\r";
"              \r";
"              TSM /diskcheck get exec          % only log if activated\r";
"              {   TSM /TSMActive true put\r";
"                  {   openlogfile\r";
"                      fillblank\r";
"                      lString 3 (FeednCut:) putinterval\r";
"                      pLine\r";
"                      closelogfile\r";
"                  } stopped          %snag if any error\r";
"                  pop\r";
"              } if\r";
"  \r";
"              TSM /countjob 0 put\r";
"              TSM /feeddetected false put\r";
"          end\r";
"      } def\r";
"  end\r";
"} if\r";
"\r";
"% v1.6 - disable decrementing film counter for L-300R with film advance set\r";
"% v1.6b4 - only set counter to dec if LTC 300 or LTC 500 - otherwise leave alone\r";
"\r";
"\r";
"TSM /diskcheck get exec              % only log if room\r";
"{  TSM begin\r";
"   {   openlogfile\r";
"       fillblank\r";
"       lString 3 (StartUp:) putinterval\r";
```

```
"       pLine\r";
"       closelogfile\r";
"   } stopped                       %snag if any error so it boots\r";
"   pop\r";
"   end\r";
") if\r";
"\r";
"\r";
"(      % if LTC 300 or LTC 500, reset counter after boot with saved value\r";
"   \r";
"   TSM /hasworkingli5 get exec\r";
"   {\r";
"       statusdict begin\r";
"           256 string li5backendparams           % check film counter mode\r";
"       end\r";
"       dup\r";
"       81 get\r";
"       48 eq                               % 0 is incrementing counter\r";
"       exch\r";
"       dup\r";
"       230 2 getinterval (01) eq           % V1.6b4 if LTC300\r";
"       exch\r";
"       230 2 getinterval (02) eq           % or LTC 500\r";
"       or\r";
"       and\r";
"       {\r";
"           /statfile TSM /memofilename get (r+) file def\r";
"           statfile 10 setfileposition\r";
"           statfile token              %read inches in supply cassette\r";
"           {   /supplyinches exch def      % in units of 100\r";
"           }\r";
"           {   /supplyinches 180000 def    % assume 150 ft roll\r";
"           } ifelse\r";
"           statfile closefile\r";
"           statusdict begin \r";
"               1000\r";
"               {   \r";
"                   1 sub dup\r";
"                   0 lt\r";
"                   {stop} if           % dont wait too long to finish boot\r";
"\r";
"                   li5backendstatus\r";
"                   dup\r";
"                   0 eq\r";
"                   exch\r";
"                   dup\r";
"                   2 eq\r";
"                   exch\r";
"                   1 eq\r";
"                   or\r";
"                   or\r";
"                   statusdict /haltbutton known\r";
"                   { haltbutton}\r";
"                   { false } ifelse\r";
"                   or\r";
"                   {exit} if\r";
"               } loop\r";
"               pop\r";
"               \r";
"               supplyinches 100 mul .3937 div cvi  %v1.2 bug - was at 10 thousand\r";
"               false setfilmcounter \r";
"           end \r";
"       } if        % incrementing counter and LTC 300 or 500\r";
"   } if        % hasworkingli5\r";
```

```
"   \r";
"   \r";
") stopped pop\r";
"\r";
"\r";
"\r";
""
}
};

resource 'POST' (210,purgeable) {
256,
{
"%!PS-Adobe-2.0 ExitServer\r";
"%%Title: Set Sys/Start file from temp\r";
"%\r";
"%  Copyright 1989 Jim Burns\r";
"\r";
"serverdict begin 0 exitserver\r";
"/appendage\r";
"(%%TSMAppendage\r";
"vmstatus                % check save level\r";
"pop pop                     % if not in exitserver\r";
"0 ne                    % then do one\r";
"(  serverdict begin 0 exitserver\r";
") if\r";
"\r";
"(TSM/TSMMain) run       % then do startup\r";
")\r";
"def\r";
"\r";
"(Sys/Start) status      % do we have a sys/start\r";
"(  pop pop exch pop     % have size\r";
"   dup /ssize exch def\r";
"   /sfile (Sys/Start) (r+) file def\r";
"   \r";
"   ssize appendage length ge                 % is file bigger than our appendage\r";
"   {   ssize appendage length sub\r";
"       sfile exch setfileposition            % point to possible append age\r";
"       sfile 14 string readstring            % and suck it up\r";
"       not exch \r";
"       (%%TSMAppendage) ne or           % if bad read, or not our stuff\r";
"       {   sfile ssize setfileposition       % set to eof \r";
"       }                                     % else set for overwrite\r";
"       {   sfile ssize appendage length sub setfileposition\r";
"       } ifelse\r";
"   \r";
"   }\r";
"   {   sfile ssize setfileposition      % not bigger - set to eof\r";
"   } ifelse             % file bigger\r";
"\r";
"}\r";
"{  /sfile (Sys/Start) (w) file def      % else make one\r";
"}\r";
"ifelse\r";
"\r";
"sfile appendage writestring                  % and put our guy out\r";
"sfile closefile\r";
"\r";
"statusdict begin\r";
"statusdict /setdosysstart known\r";
"{  true setdosysstart\r";
"   (%%[DoSysStart set true]%%) =\r";
"} if\r";
```

```
"end\r";
""
}
};
#endif

resource 'POST' (211,purgeable) {
256,
{
"%!PS-Adobe-2.0 Query\r";
"%%Title: Restart Printer\r";
"serverdict begin 0 exitserver\r";
"\r";
"/thetime usertime def\r";
"{\r";
"   usertime thetime sub abs\r";
"   10000 gt\r";
"   {exit} if\r";
"} loop\r";
"\r";
"systemdict /quit get exec\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
```

```
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
```

```
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
```

```
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"%bugbugbugbugbugbugbugbugbugbugbugbugbugbugbugbugb\r";
"\r";
""
}
};
```

```
#if IncludeRipMaster

resource 'POST' (212,purgeable) {
256,
{
"%!PS-Adobe-2.0 ExitServer\r";
"%%Title: Smart Clear Sys/Start file\r";
"%\r";
"%  Copyright 1989 Jim Burns\r";
"\r";
"serverdict begin 0 exitserver\r";
"/appendage\r";
"(%%TSMAppendage\r";
"vmstatus                % check save level\r";
"pop pop                     % if not in exitserver\r";
"0 ne                    % then do one\r";
"{  serverdict begin 0 exitserver\r";
"} if\r";
"\r";
"(TSM/TSMMain) run       % then do startup\r";
")\r";
"def\r";
"/linefeed ( ) def\r";
"linefeed 0 10 put\r";
"(Sys/Start) status      % do we have a sys/start\r";
"{  pop pop exch pop     % have size\r";
"   dup /ssize exch def\r";
"   /sfile (Sys/Start) (r+) file def\r";
"   ssize appendage length ge               % is file equal to or bigger than our appendage\r";
"   {   ssize appendage length sub\r";
"       dup 0 eq\r";
"       {   sfile closefile                 % if only our stuff\r";
"           (Sys/Start) deletefile          % whack it\r";
"       }\r";
"       {   sfile exch setfileposition      % point to possible append age\r";
"           sfile 14 string readstring      % and suck it up\r";
"           { \r";
"               (%%TSMAppendage) eq         % if our stuff\r";
"               {   sfile ssize appendage length sub setfileposition\r";
"                   appendage length 1 sub         % write over since truncate wont work\r";
"                   {   sfile ( ) writestring\r";
"                   } repeat\r";
"                   sfile linefeed writestring\r";
"               } if\r";
"           }\r";
"           if\r";
"       } ifelse\r";
"   \r";
"   }\r";
"   if                                  % file bigger\r";
"   sfile closefile\r";
"}\r";
"if\r";
"\r";
"\r";
"\r";
"(TSM/JobLog) status\r";
"{(TSM/JobLog) deletefile} if\r";
"(TSM/Activate) status\r";
"{(TSM/Activate) deletefile} if\r";
"(TSM/Memo0) status\r";
"{(TSM/Memo0) deletefile} if\r";
"(TSM/Slug) status\r";
```

```
"{(TSM/Slug) deletefile} if\r";
"(TSM/TSMMain) status\r";
"{(TSM/TSMMain) deletefile} if\r";
""
}
};
#endif

resource 'POST' (213,purgeable) {
256,
{
"%!PS-Adobe-2.0 ExitServer\r";
"%%Title: run exitserver\r";
"%\r";
"%  Copyright 1989 Jim Burns\r";
"\r";
"serverdict begin 0 exitserver\r";
}
};

#if IncludeRipMaster

resource 'POST' (214,purgeable) {
256,
{
"%!PS-Adobe-2.0 \r";
"%%Title: setfilmcounter\r";
"%\r";
"%  Copyright 1989 Jim Burns\r";
"\r";
"TSM /hasworkingli5 get exec\r";
"{\r";
"   statusdict begin\r";
"       256 string li5backendparams            % check film counter mode\r";
"   end\r";
"   dup\r";
"   230 2 getinterval (01) eq             % V1.6b4 if LTC300\r";
"   exch\r";
"   230 2 getinterval (02) eq             % or LTC 500\r";
"   or\r";
"   TSM /hasdecfc get exec                % or counter dec already\r";
"   or\r";
"   {\r";
"   statusdict begin \r";
"       {   li5backendstatus\r";
"           dup\r";
"           12 eq\r";
"           exch\r";
"           dup\r";
"           0 eq\r";
"           exch\r";
"           dup\r";
"           2 eq\r";
"           exch\r";
"           1 eq\r";
"           or\r";
"           or\r";
"           or\r";
"           statusdict /haltbutton known\r";
"           { haltbutton}\r";
"           { false } ifelse\r";
"           or\r";
"           {exit} if\r";
"       } loop\r";
```

```
"       \r";
"       rolllength feedlength 2 idiv sub 10000 mul .3937 div cvi\r";
"       false setfilmcounter \r";
"   end \r";
"   } if\r";
"} if\r";
""
}
};

resource 'POST' (215,purgeable) {
256,
{
"%!PS-Adobe-2.0\r";
"%%Title: Clear Slug file\r";
"%\r";
"%  Copyright 1989 Jim Burns\r";
"\r";
"statusdict begin\r";
"/jobname (RIPMaster; document: RemoveSlug) def\r";
"end\r";
"(TSM/Slug) status\r";
"{  (TSM/Slug) deletefile\r";
"} if\r";
"/TSM where\r";
"{pop TSM /TSMActive false put } if\r";
""
}
};
#endif

resource 'POST' (217,purgeable) {
256,
{
"(TSM/Slug) status\r";
"{ pop pop pop pop (TSM/Slug) deletefile} if\r";
"/SpoolFile (TSM/Slug) (w) file def\r";
"SpoolFile == flush\r";
"currentfile == flush\r";
"/buffer 1024 string def\r";
"/storefile { (starting storefile) = flush\r";
"   {   \r";
"       currentfile buffer readstring\r";
"       \r";
"       {   %(****) = dup length = (****) = flush\r";
"           SpoolFile exch writestring\r";
"       }\r";
"       {   (closing) = flush\r";
"           (****) = dup length = (****) = flush\r";
"           serverdict begin stdin bytesavailable end == flush\r";
"           dup length 0 eq\r";
"           {SpoolFile closefile exit}\r";
"           {SpoolFile exch writestring}\r";
"           ifelse\r";
"       }\r";
"       ifelse\r";
"   } loop\r";
"} def\r";
"(all is defined) = flush\r";
"storefile\r";
""
}
};
```

```
resource 'POST' (218,purgeable) {
256,
{
"%!PS-Adobe-2.0 Query\r";
"%%Title: Query to Spooler/Non-Spooler status\r";
"%%?BeginSpoolerQuery\r";
"%%?EndSpoolerQuery %%[Spooler:  ]%%\r";
""
}
};

#if IncludeRipMaster

resource 'POST' (220,purgeable) {
256,
{
"(TSM/Slug) status\r";
"{ pop pop pop pop (TSM/Slug) deletefile} if\r";
"/SpoolFile (TSM/Slug) (w) file def\r";
"SpoolFile == flush\r";
"currentfile == flush\r";
"/buffer 1024 string def\r";
"/storefile { (starting storefile) = flush\r";
"   {   \r";
"       currentfile buffer readstring\r";
"       \r";
"       {   %(****) = dup length = (****) = flush\r";
"           SpoolFile exch writestring\r";
"       }\r";
"       {   (closing) = flush\r";
"           (****) = dup length = (****) = flush\r";
"           serverdict begin stdin bytesavailable end == flush\r";
"           dup length 0 eq\r";
"           {SpoolFile closefile exit}\r";
"           {SpoolFile exch writestring}\r";
"           ifelse\r";
"       }\r";
"       ifelse\r";
"   } loop\r";
"} def\r";
"(all is defined) = flush\r";
"storefile\r";
"%!PS-Adobe-2.0 \r";
"%%Title: Print Job Slug\r";
"   TSM /slugsave save put                          % save off in case slug runs in exitserver\r";
"\r";
"   lString 0 (          )        putinterval     % clear %%[ in string\r";
"   lString dup length 3 sub (   )  putinterval   % clear ]%% in string\r";
"   lString 82 (          )       putinterval     % clear internal clock readout\r";
"   lString 82 \r";
"   TSM /hasworkingli5 get exec                      % can find resolution without\r";
"   {   statusdict begin resolution end }            % costly resolution test\r";
"   {   72 0 matrix defaultmatrix dtransform pop cvi } % otherwise, use default\r";
"   ifelse\r";
"   10 string cvs putinterval\r";
"\r";
"   initgraphics\r";
"   userdict /width 792 put\r";
"   statusdict /setpage known              % typesetters have this command\r";
"   {\r";
"       statusdict begin\r";
"           width 72 1 setpage             % so set one inch strip \r";
"       end\r";
"   }\r";
```

```
"   {   72 72 translate .5 .5 scale          % otherwise do this so we can\r";
"   } ifelse                                 % test on a laser printer\r";
"   1 setlinewidth\r";
"   10 36 moveto\r";
"   width 36 lineto\r";
"   stroke\r";
"   /inches 1.0  def\r";
"   /centimeters 2.54 def\r";
"   /picas 6 def\r";
"   /ciceros 5.618 def\r";
"   lString 113\r";
"   \r";
"   inches\r";
"   lString 109 5 getinterval cvi\r";
"   10 div mul .5 add cvi\r";
"   5 string cvs \r";
"   lString 109 (     ) putinterval rjust\r";
"   /Helvetica findfont 8 scalefont setfont\r";
"   lString stringwidth\r";
"   pop width exch sub 5 sub\r";
"   40 moveto\r";
"   lString show\r";
"\r";
"showpage\r";
"\r";
"clear\r";
"TSM /slugsave get restore\r";
""
}
};

resource 'POST' (221,purgeable) {
256,
{
"(TSM/Slug) status\r";
"{ pop pop pop pop (TSM/Slug) deletefile} if\r";
"/SpoolFile (TSM/Slug) (w) file def\r";
"SpoolFile == flush\r";
"currentfile == flush\r";
"/buffer 1024 string def\r";
"/storefile { (starting storefile) = flush\r";
"   {   \r";
"       currentfile buffer readstring\r";
"       \r";
"       {   %(****) = dup length = (****) = flush\r";
"           SpoolFile exch writestring\r";
"       }\r";
"       {   (closing) = flush\r";
"           (****) = dup length = (****) = flush\r";
"           serverdict begin stdin bytesavailable end == flush\r";
"           dup length 0 eq\r";
"           {SpoolFile closefile exit}\r";
"           {SpoolFile exch writestring}\r";
"           ifelse\r";
"       }\r";
"       ifelse\r";
"   } loop\r";
"} def\r";
"(all is defined) = flush\r";
"storefile\r";
"%!PS-Adobe-2.0 \r";
"%%Title: Print Job Slug\r";
"   TSM /slugsave save put                   % save off in case slug runs in exitserver\r";
"\r";
```

```
"   lString 0 (          )         putinterval     % clear %%! in string\r";
"   lString dup length 3 sub (   )  putinterval    % clear !%% in string\r";
"   lString 82 (           )       putinterval     % clear internal clock readout\r";
"   lString 82 \r";
"   TSM /hasworkingli5 get exec                      % can find resolution without\r";
"   (   statusdict begin resolution end )            % costly resolution test\r";
"   (   72 0 matrix defaultmatrix dtransform pop cvi )  % otherwise, use default\r";
"   ifelse\r";
"   10 string cvs putinterval\r";
"\r";
"   initgraphics\r";
"   userdict /width 792 put\r";
"   statusdict /setpage known              % typesetters have this command\r";
"   {\r";
"       statusdict begin\r";
"           width 72 1 setpage             % so set one inch strip \r";
"       end\r";
"   }\r";
"   (   72 72 translate .5 .5 scale        % otherwise do this so we can\r";
"   ) ifelse                               % test on a laser printer\r";
"   1 setlinewidth\r";
"   10 36 moveto\r";
"   width 36 lineto\r";
"   stroke\r";
"   /inches 1.0  def\r";
"   /centimeters 2.54 def\r";
"   /picas 6 def\r";
"   /ciceros 5.618 def\r";
"   lString 113\r";
"   \r";
"   centimeters\r";
"   lString 109 5 getinterval cvi\r";
"   10 div mul .5 add cvi\r";
"   5 string cvs \r";
"   lString 109 (     ) putinterval rjust\r";
"   /Helvetica findfont 8 scalefont setfont\r";
"   lString stringwidth\r";
"   pop width exch sub 5 sub\r";
"   40 moveto\r";
"   lString show\r";
"\r";
"showpage\r";
"\r";
"clear\r";
"TSM /slugsave get restore\r";
""
}
};

resource 'POST' (222,purgeable) (
256,
{
"(TSM/Slug) status\r";
"( pop pop pop pop (TSM/Slug) deletefile) if\r";
"/SpoolFile (TSM/Slug) (w) file def\r";
"SpoolFile == flush\r";
"currentfile == flush\r";
"/buffer 1024 string def\r";
"/storefile ( (starting storefile) = flush\r";
"   {   \r";
"       currentfile buffer readstring\r";
"       \r";
"       (   %(****) = dup length = (****) = flush\r";
"           SpoolFile exch writestring\r";
```

```
"        )\r";
"        (    (closing) = flush\r";
"             (****) = dup length = (****) = flush\r";
"             serverdict begin stdin bytesavailable end == flush\r";
"             dup length 0 eq\r";
"             (SpoolFile closefile exit)\r";
"             (SpoolFile exch writestring)\r";
"             ifelse\r";
"        )\r";
"        ifelse\r";
"    } loop\r";
"} def\r";
"(all is defined) = flush\r";
"storefile\r";
"%!PS-Adobe-2.0 \r";
"%%Title: Print Job Slug\r";
"    TSM /slugsave save put                        % save off in case slug runs in exitserver\r";
"\r";
"    lString 0 (           )         putinterval    % clear %%[ in string\r";
"    lString dup length 3 sub (    )  putinterval    % clear ]%% in string\r";
"    lString 82 (            )       putinterval    % clear internal clock readout\r";
"    lString 82 \r";
"    TSM /hasworkingli5 get exec                       % can find resolution without\r";
"    {    statusdict begin resolution end }            % costly resolution test\r";
"    {    72 0 matrix defaultmatrix dtransform pop cvi }  % otherwise, use default\r";
"    ifelse\r";
"    10 string cvs putinterval\r";
"\r";
"    initgraphics\r";
"    userdict /width 792 put\r";
"    statusdict /setpage known              % typesetters have this command\r";
"    {\r";
"        statusdict begin\r";
"            width 72 1 setpage             % so set one inch strip \r";
"        end\r";
"    }\r";
"    {    72 72 translate .5 .5 scale       % otherwise do this so we can\r";
"    } ifelse                               % test on a laser printer\r";
"    1 setlinewidth\r";
"    10 36 moveto\r";
"    width 36 lineto\r";
"    stroke\r";
"    /inches 1.0  def\r";
"    /centimeters 2.54 def\r";
"    /picas 6 def\r";
"    /ciceros 5.618 def\r";
"    lString 113\r";
"    \r";
"    picas\r";
"    lString 109 5 getinterval cvi\r";
"    10 div mul .5 add cvi\r";
"    5 string cvs \r";
"    lString 109 (      ) putinterval rjust\r";
"    /Helvetica findfont 8 scalefont setfont\r";
"    lString stringwidth\r";
"    pop width exch sub 5 sub\r";
"    40 moveto\r";
"    lString show\r";
"\r";
"showpage\r";
"\r";
"clear\r";
"TSM /slugsave get restore\r";
""             ;
```

```
}
};

resource 'POST' (223,purgeable) {
256,
{
"(TSM/Slug) status\r";
"{ pop pop pop pop (TSM/Slug) deletefile} if\r";
"/SpoolFile (TSM/Slug) (w) file def\r";
"SpoolFile == flush\r";
"currentfile == flush\r";
"/buffer 1024 string def\r";
"/storefile { (starting storefile) = flush\r";
"   {   \r";
"       currentfile buffer readstring\r";
"       \r";
"       {   %(****) = dup length = (****) = flush\r";
"           SpoolFile exch writestring\r";
"       }\r";
"       {   (closing) = flush\r";
"           (****) = dup length = (****) = flush\r";
"           serverdict begin stdin bytesavailable end == flush\r";
"           dup length 0 eq\r";
"           {SpoolFile closefile exit}\r";
"           {SpoolFile exch writestring}\r";
"           ifelse\r";
"       }\r";
"       ifelse\r";
"   } loop\r";
"} def\r";
"(all is defined) = flush\r";
"storefile\r";
"%!PS-Adobe-2.0 \r";
"%%Title: Print Job Slug\r";
"   TSM /slugsave save put                      % save off in case slug runs in exitserver\r";
"\r";
"   lString 0 (           )         putinterval     % clear %%[ in string\r";
"   lString dup length 3 sub (    )  putinterval     % clear ]%% in string\r";
"   lString 82 (     .      )        putinterval     % clear internal clock readout\r";
"   lString 82 \r";
"   TSM /hasworkingli5 get exec                    % can find resolution without\r";
"   {   statusdict begin resolution end }          % costly resolution test\r";
"   {   72 0 matrix defaultmatrix dtransform pop cvi }  % otherwise, use default\r";
"   ifelse\r";
"   10 string cvs putinterval\r";
"\r";
"   initgraphics\r";
"   userdict /width 792 put\r";
"   statusdict /setpage known              % typesetters have this command\r";
"   {\r";
"       statusdict begin\r";
"           width 72 1 setpage             % so set one inch strip \r";
"       end\r";
"   }\r";
"   {   72 72 translate .5 .5 scale        % otherwise do this so we can\r";
"   } ifelse                               % test on a laser printer\r";
"   1 setlinewidth\r";
"   10 36 moveto\r";
"   width 36 lineto\r";
"   stroke\r";
"   /inches 1.0  def\r";
"   /centimeters 2.54 def\r";
"   /picas 6 def\r";
"   /ciceros 5.628 def\r";
```

```
"   lString 113\r";
"   \r";
"   ciceros\r";
"   lString 109 5 getinterval cvi\r";
"   10 div mul .5 add cvi\r";
"   5 string cvs \r";
"   lString 109 (     ) putinterval rjust\r";
"   /Helvetica findfont 8 scalefont setfont\r";
"   lString stringwidth\r";
"   pop width exch sub 5 sub\r";
"   40 moveto\r";
"   lString show\r";
"\r";
"showpage\r";
"\r";
"clear\r";
"TSM /slugsave get restore\r";
""
}
};
#endif

resource 'POST' (300,purgeable) {
256,
{
"%!PS-Adobe-2.0 Query\r";
"%%Title: Check for SWS Cal Prep\r";
"%% returns <file sys><diskonline><Calprep><version><enabled><active>\r";
"\r";
"statusdict begin\r";
"/jobname (Precision; document: Query) def\r";
"end\r";
"(%%[CalStatus: ) print\r";
"statusdict /diskstatus known       %have a file system\r";
"{\r";
"   (true  ) print\r";
"   statusdict /diskonline known        % disk there\r";
"   {   statusdict begin diskonline end\r";
"       {(true  )}\r";
"       {(false )} ifelse\r";
"   }\r";
"   {   (true  )}                    % if no online command, assume online\r";
"   ifelse\r";
"   print\r";
"}\r";
"{(false ) print (false ) print}\r";
"ifelse\r";
"\r";
"/swscaldict where\r";
"{  pop \r";
"   (true  ) print                    % TSM prep loaded\r";
"   swscaldict /version get print ( ) print % version\r";
"\r";
"   %TSM /activefilename get status     % enabled\r";
"   %{  pop pop pop pop (true  )}\r";
"   %{(false )} ifelse\r";
"   (true  )\r";
"   print\r";
"   \r";
"   swscaldict /calibratoractive get               % active\r";
"   {(true  )}\r";
"   {(false )} ifelse\r";
"   print\r";
"} \r";
```

```
"(  (false ) print (0.0 ) print (false ) print (false ) print\r";
")\r";
"ifelse\r";
"\r";
"([%%) =\r";
"/TSM where\r";
"(/TSMActive false put              % dont log this job\r";
") if\r";
"flush\r";
"\r";
""
}
};

resource 'POST' (301,purgeable) {
256,
{
"%!PS-Adobe-2.0\r";
"%%Title: L300R Calibrator - single measurement for negative or positive\r";
"%%Creator: Southwest Software Inc., Austin, Texas\r";
"%%CreationDate: 5/28/90\r";
"\r";
"statusdict begin\r";
"/jobname (Precision; document: Cal Set Installation) def\r";
"end\r";
"\r";
"/SpoolFile (CAL/CALSets) (w) file def\r";
"SpoolFile == flush\r";
"currentfile == flush\r";
"/buffer 1024 string def\r";
"/storefile { (starting storefile) = flush\r";
"   {   \r";
"       currentfile buffer readstring\r";
"       \r";
"       {   %(****) = dup length = (****) = flush\r";
"           SpoolFile exch writestring\r";
"       }\r";
"       {   (closing) = flush\r";
"           (****) = dup length = (****) = flush\r";
"           serverdict begin stdin bytesavailable end == flush\r";
"           dup length 0 eq\r";
"           {SpoolFile closefile exit}\r";
"           {SpoolFile exch writestring}\r";
"           ifelse\r";
"       }\r";
"       ifelse\r";
"   } loop\r";
"} def\r";
"(all is defined) = flush\r";
"storefile\r";
"%!PS-Adobe-2.0\r";
"%%Title: Measurement Pairs for Calibration Set (negative)\r";
"%%Creator: Southwest Software Inc., Austin, Texas\r";
"%%CreationDate: 5/28/90\r";
"%%BoundingBox: 0 0 0 0\r";
"%%Pages: Attend\r";
"\r";

""
}
};

resource 'POST' (302,purgeable) {
256,
```

```
;
"%!PS-Adobe-2.0\r";
"%%Title: PostScript Calibrator - single measurement for negative or positive\r";
"%%Creator: Southwest Software Inc., Austin, Texas\r";
"%%CreationDate: 5/28/90\r";
"%%Copyright (c) 1990 Southwest Software Inc., Austin, Texas    All rights reserved.\r";
"\r";
"statusdict begin\r";
"/jobname (Precision; document: Disk Installation) def\r";
"end\r";
"\r";
"/SpoolFile (CAL/CALMain) (w) file def\r";
"SpoolFile == flush\r";
"currentfile == flush\r";
"/buffer 1024 string def\r";
"/storefile { (starting storefile) = flush\r";
"   {   \r";
"       currentfile buffer readstring\r";
"       \r";
"       {   %(****) = dup length = (****) = flush\r";
"           SpoolFile exch writestring\r";
"       }\r";
"       {   (closing) = flush\r";
"           (****) = dup length = (****) = flush\r";
"           serverdict begin stdin bytesavailable end == flush\r";
"           dup length 0 eq\r";
"           {SpoolFile closefile exit}\r";
"           {SpoolFile exch writestring}\r";
"           ifelse\r";
"       }\r";
"       ifelse\r";
"   } loop\r";
"} def\r";
"(all is defined) = flush\r";
"storefile\r";
"%!PS-Adobe-2.0\r";
"%%Title: PostScript Calibrator - single measurement for negative or positive\r";
"%%Copyright (c) 1990 Southwest Software Inc., Austin, Texas    All rights reserved.\r";
"%%Creator: Southwest Software Inc., Austin, Texas\r";
"%%CreationDate: 5/20/90\r";
"%%BoundingBox: 0 0 0 0\r";
"%%Pages: Attend\r";
"%serverdict begin 0 exitserver\r";
"%%BeginProlog\r";
"\r";
"/cvxi                  %   <hex string> cvxi <integer>\r";
"{\r";
"   dup\r";
"   length \r";
"   3 add \r";
"   string \r";
"   dup\r";
"   dup 4 1 roll\r";
"   0 (16#) \r";
"   putinterval\r";
"   exch \r";
"   3 \r";
"   exch \r";
"   putinterval\r";
"   cvi\r";
"} def\r";
"\r";
"/swscaldict 25 dict def\r";
"\r";
```

```
"swscaldict begin\r";
"\r";
"\r";
"%  ***     Set up default variables\r";
"%  *\r";
"%  *\r";
"\r";
"   /debug false def                      % controls pdebug prints\r";
"   /debugcorrections false def           % controls xfer number printing\r";
"   /calibratoractive true def            % turns calibrator on/off\r";
"   /version (1.1) def\r";
"\r";
"   /combineprocs\r";
"   {\r";
"       1 index length 1 index length add\r";
"       array\r";
"       dup\r";
"       0\r";
"       4 index putinterval\r";
"       dup\r";
"       3 index length\r";
"       3 index putinterval\r";
"       3 1 roll\r";
"       pop pop\r";
"       cvx\r";
"   } def\r";
"\r";
"/generatepositive\r";
"{\r";
"   /actualpositive                      % film positive has errors the other way\r";
"   theoretical length array def\r";
"   0 1 theoretical length 1 sub\r";
"   {   \r";
"       actualpositive exch\r";
"       dup dup\r";
"       theoretical length \r";
"       exch \r";
"       sub \r";
"       1 \r";
"       sub\r";
"       dup \r";
"       theoretical exch get\r";
"       exch\r";
"       actualnegative exch get\r";
"       sub\r";
"       exch\r";
"       theoretical exch get\r";
"       add\r";
"       put\r";
"   } for\r";
"} def\r";
"\r";
"/generatenegative\r";
"{\r";
"   /actualnegative                      % film positive has errors the other way\r";
"   theoretical length array def\r";
"   0 1 theoretical length 1 sub\r";
"   {   \r";
"       actualnegative exch\r";
"       dup dup\r";
"       theoretical length \r";
"       exch \r";
"       sub \r";
"       1 \r";
```

```
"       sub\r";
"       dup \r";
"       theoretical exch get\r";
"       exch\r";
"       actualpositive exch get\r";
"       sub\r";
"       exch\r";
"       theoretical exch get\r";
"       add\r";
"       put\r";
"   } for\r";
"} def\r";
"\r";
"\r";
"\r";
"/calsetsdict 50 dict def\r";
"calsetsdict begin\r";
"   /nullcalset 20 dict def\r";
"   nullcalset begin\r";
"       /name    (Null) def\r";
"       /media       (Any)       def\r";
"       /dpi         -1          def\r";
"       /density     0.00        def\r";
"       /freqname    0           def\r";
"       /freqlow     0           def\r";
"       /freqhigh    1000        def\r";
"       /theoretical                    % real numbers get downloaded separately\r";
"           [ 0.00 1.00 ] def\r";
"       /actualnegative\r";
"           [ 0.00 1.00 ] def\r";
"       generatepositive                % set up default for rip default (film pos)\r";
"       /negxfer false def\r";
"       /initialneg false def\r";
"       /actual actualpositive def\r";
"   end\r";
"   \r";
"   /defaultcalset nullcalset def\r";
"\r";
"end\r";
"\r";
"/currentcalset calsetsdict /defaultcalset get def\r";
"\r";
"%  *** buildcalset\r";
"%  *   (spot) <[actual]> <[theoretical]> <negxfer> <freqhigh> <freqlow> <freqname> \r";
"%  *   <density> <dpi> <media> (name) buildcalset\r";
"%  *\r";
"\r";
"/exdf {exch def} def\r";
"\r";
"/buildcalset\r";
"{\r";
"   calsetsdict begin\r";
"       dup\r";
"       cvn\r";
"       dup\r";
"       20 dict def\r";
"       load\r";
"       begin\r";
"           /name            exdf\r";
"           /media           exdf\r";
"           /dpi             exdf\r";
"           \r";
"           100 mul round cvi\r";
"           /density         exdf\r";
```

```
"\r";
"           /freqname       exdf\r";
"           /freqpoint      exdf\r";
"           /freqlow        exdf\r";
"           /freqhigh       exdf\r";
"           /negxfer        exdf\r";
"           /theoretical    exdf\r";
"           /actual         exdf\r";
"           /spotfunc       exdf\r";
"           \r";
"           negxfer\r";
"           {   /actualnegative actual def\r";
"               /initialneg true def\r";
"               generatepositive\r";
"           }\r";
"           {   /actualpositive actual def\r";
"               /initialneg false def\r";
"               generatenegative\r";
"           } ifelse\r";
"       end\r";
"   end\r";
"} def\r";
"\r";
"\r";
"/getdictstackpos                        % return position of <dict> on\r";
"{                                       % dict stack\r";
"   countdictstack\r";
"   dup 1 sub exch\r";
"   array\r";
"   dictstack\r";
"   exch\r";
"   {   \r";
"       2 copy\r";
"       get\r";
"       3 index \r";
"       eq\r";
"       { 3 1 roll pop pop exit} if\r";
"       1 sub\r";
"       dup 0 lt\r";
"       { 3 1 roll pop pop exit} if\r";
"   } loop\r";
"} def\r";
"\r";
"\r";
"\r";
"\r";
"/applycorrections                       % apply calibration corrections, based on\r";
"{                                       % the current theoretical and actual xfer curves\r";
" swscaldict begin\r";
"  currentcalset begin\r";
"   negxfer not                          % if positive xfer, convert from %gray \r";
"   {1 exch sub } if                     % to %dot area, neg xfer is already converted\r";
"   debugcorrections \r";
"   {   (<) print dup 100 mul round cvi 10 string cvs print (>:) print  } if\r";
"\r";
"   /target exch def                     % \r";
"   target 0 eq                          % run # 3 did not have this\r";
"   { 0 }                                % had a one percent screen on type\r";
"   { target 1 eq\r";
"       { 1 } \r";
"       {\r";
"           0 1 actual length\r";
"           {\r";
"               /j exch def\r";
```

```
"              actual j get dup\r";
"              target ge                 % if actual gt target, then interpolate\r";
"              (    target eq            % if equal, dump out (zero and one condition)\r";
"                  {    theoretical j get\r";
"                       exit\r";
"                  }\r";
"                  {    theoretical j 1 sub get dup\r";
"                       theoretical j get exch sub\r";
"                       target actual j 1 sub get sub\r";
"                       actual j get actual j 1 sub get sub\r";
"                       div mul add\r";
"                       exit\r";
"                  } ifelse\r";
"              } if\r";
"              pop\r";
"          )  for\r";
"          debugcorrections \r";
"          {    j (<) print 3 string cvs print (>:) print   } if\r";
"      ) ifelse\r";
"   } ifelse\r";
"   debugcorrections\r";
"   {    (<) print dup 100 mul round cvi 10 string cvs print (>:) print  } if\r";
"   negxfer not                         % if positive xfer, convert from %gray \r";
"   (1 exch sub ) if                    % to %dot area, neg already converted\r";
"  end\r";
" end\r";
"} def\r";
"\r";
"/getcurrentnegative                % getcurrentnegative <value> \r";
"{\r";
"   statusdict /li5backendparams known\r";
"   {    \r";
"   save\r";
"       statusdict begin 256 string li5backendparams end\r";
"       dup length 0 ne\r";
"       {    \r";
"           5 1 getinterval      % get neg print indicator\r";
"           (1) eq               % and leave on stack\r";
"       }\r";
"       { pop false} ifelse      % if li5 not enabled, then no neg output\r";
"       exch restore\r";
"   }\r";
"   {\r";
"       statusdict /invert known         % or maybe cg\r";
"       {    statusdict begin\r";
"                invert\r";
"           end\r";
"       }\r";
"       {    false                       % assume pos print\r";
"       } ifelse\r";
"   } ifelse        % if no li5 or cg, assume no neg output\r";
"} def\r";
"\r";
"\r";
"/getdensity                 %  <res> getdensity <value> \r";
"{\r";
"   statusdict /li5backendparams known\r";
"   {    save\r";
"       statusdict begin 256 string li5backendparams end\r";
"       dup length 0 ne\r";
"       {    exch 4 mul cvi 112 add 4 getinterval\r";
"           cvxi                 % convert from hex to integer\r";
"       }\r";
"       { pop 0} ifelse      % if li5 not enabled, then return neg\r";
```

```
"       exch restore\r";
"   }\r";
"   { pop 0 } ifelse    % if no li5, return -1\r";
"} def\r";
"\r";
"/getcurrentdensity             %  getcurrentdensity <value> \r";
"{\r";
"   statusdict /li5backendparams known\r";
"   {   save\r";
"       statusdict begin 256 string li5backendparams end\r";
"       dup length 0 ne\r";
"       {   dup 6 2 getinterval cvxi\r";
"           4 mul cvi 112 add 4 getinterval\r";
"           cvxi                % convert from hex to integer\r";
"       }\r";
"       { pop 0} ifelse         % if li5 not enabled, then return zero\r";
"       exch restore\r";
"   }\r";
"   { \r";
"       statusdict /statuscommand known\r";
"       {\r";
"                               % aha - must be cg \r";
"           save\r";
"           (_GET05)            % try to read the density\r";
"           256 string\r";
"           statusdict /statuscommand get exec % hope command works first time - why wouldnt it?\r";
"           {\r";
"               cvi             % got response string - make integer    \r";
"           }\r";
"           {\r";
"               pop 0           % dump response string (i hope)\r";
"           } ifelse\r";
"           exch restore    \r";
"       }\r";
"       {\r";
"           0                   % is nowhere, return zig\r";
"       } ifelse\r";
"   } ifelse                    % if no li5, try statuscommand\r";
"} def\r";
"\r";
"/getcurrentres             %  getcurrentres <0 high 1 med 2 low> \r";
"{\r";
"   statusdict /li5backendparams known\r";
"   {   save\r";
"       statusdict begin 256 string li5backendparams end\r";
"       dup length 0 ne\r";
"       {   6 2 getinterval cvxi\r";
"       }\r";
"       ( pop 0) ifelse         % if li5 not enabled, then return neg\r";
"       exch restore\r";
"   }\r";
"   { pop 0 } ifelse    % if no li5, return -1\r";
"} def\r";
"       \r";
"/getcurrentdpi\r";
"{\r";
"   statusdict /resolution known\r";
"   {   statusdict begin \r";
"           resolution \r";
"       end \r";
"   }\r";
"   { 0 } ifelse\r";
"   dup 0 eq        \r";
"   {   pop 72 0 matrix defaultmatrix dtransform pop cvi }  % otherwise, use default\r";
```

```
"   if\r";
"\r";
") def\r";
"\r";
"/findcalset                        % <dpi> <density> <freq> <angle> <proc> findcalset\r";
"{                                  %  returns <calset dict>\r";
"   pop pop\r";
"   swscaldict begin\r";
"       /findfreq exch def\r";
"       /finddensity exch def\r";
"       /finddpi exch def\r";
"       null\r";
"       calsetsdict\r";
"       {\r";
"           exch pop\r";
"           dup\r";
"           begin\r";
"               dpi finddpi eq\r";
"               density finddensity eq\r";
"               freqlow findfreq le\r";
"               freqhigh findfreq ge\r";
"               and\r";
"               and\r";
"               and\r";
"           end\r";
"           {exch pop exit}\r";
"           if\r";
"           pop\r";
"       } forall\r";
"       dup null eq\r";
"       {   pop calsetsdict /defaultcalset get\r";
"       } if\r";
"   end\r";
"} def\r";
"\r";
"/setcalset                         % <{xfer func}> <calset dict> setcalset \r";
"{\r";
"   dup swscaldict /currentcalset \r";
"   3 -1 roll \r";
"   put\r";
"   begin       \r";
"       dup length array copy cvx       % remove calibrator call if there\r";
"       dup dup length dup 0 gt\r";
"       {\r";
"           1 sub dup\r";
"           3 1 roll\r";
"           get\r";
"           cvlit\r";
"           /calibrate eq\r";
"           { \r";
"               2 copy null cvx put\r";
"               pop\r";
"           }\r";
"           { pop}\r";
"           ifelse\r";
"       }\r";
"       {pop pop} ifelse\r";
"       \r";
"       dup\r";
"       1 exch exec                     % send white\r";
"       exch\r";
"       0 exch exec                     % send black\r";
"       lt\r";
"                                       % true means neg xfer function\r";
```

```
"\r";
"\r";
"       statusdict /negativeprint known     % get RIP negative sense\r";
"       {   statusdict begin\r";
"               negativeprint\r";
"           end\r";
"       }\r";
"       { \r";
"           false\r";
"       } ifelse\r";
"\r";
"       getcurrentnegative  \r";
"       xor                   % if both are negative, result is null\r";
"       /negbackend exch def        \r";
"       \r";
"       {   /negxfer true def\r";
"           /actual \r";
"           negbackend\r";
"           {actualpositive}\r";
"           {actualnegative}\r";
"           ifelse\r";
"           def\r";
"       }\r";
"       {   /negxfer false def\r";
"           /actual \r";
"           negbackend\r";
"           {actualnegative}\r";
"           {actualpositive}\r";
"           ifelse\r";
"            def\r";
"       }\r";
"       ifelse\r";
"   end \r";
"} def\r";
"\r";
"\r";
"end                  %swscaldict\r";
"   \r";
"\r";
"\r";
"/calibrate {\r";
"   swscaldict /debugcorrections get\r";
"   {   dup 100 mul round cvi 10 string cvs print  \r";
"       (:) print\r";
"   } if \r";
"   swscaldict /calibratoractive get\r";
"   {   swscaldict /applycorrrections get exec\r";
"   } if\r";
"   swscaldict /debugcorrections get\r";
"   {   dup 100 mul round cvi 10 string cvs =\r";
"   } if\r";
"} def\r";
"\r";
"\r";
"userdict /swsformat known not\r";
"{\r";
"   userdict /swsformat systemdict put\r";
"   userdict /systemdict systemdict length dict put\r";
"   \r";
"   systemdict begin\r";
"   \r";
"   swsformat\r";
"   {\r";
"       def\r";
```

```
"    } forall\r";
") if\r";
"\r";
"\r";
"/setscreen \r";
"{\r";
"   swscaldict /debug get\r";
"   {    (********SetScreen - frequency:) print \r";
"        2 index =\r";
"   } if \r";
"   \r";
"   //swsformat /setscreen get exec \r";
"\r";
"   userdict /currenttransfer get exec   % cause setcalset uses the xfer function\r";
"   dup\r";
"   swscaldict begin                     % to set neg xfer\r";
"       getcurrentdpi\r";
"       getcurrentdensity\r";
"       currentscreen\r";
"       findcalset\r";
"       setcalset\r";
"   end\r";
"   systemdict /settransfer get exec        % and set using new xfer func\r";
"   swscaldict /debug get\r";
"   {    \r";
"       (********CurrentCalSet - ) print\r";
"       swscaldict /currentcalset get \r";
"       /name get =\r";
"   } if \r";
"\r";
"} def\r";
"\r";
"/settransfer \r";
"{\r";
"   swscaldict /debug get\r";
"   {    (========SetTransfer - realsystem currrent:) = \r";
"       //swsformat /currenttransfer get exec ==\r";
"   } if \r";
"\r";
"   dup                           % cause setcalset uses the new xfer function\r";
"   swscaldict begin              % to set neg xfer\r";
"       getcurrentdpi\r";
"       getcurrentdensity\r";
"       currentscreen\r";
"       findcalset\r";
"       setcalset\r";
"   end\r";
"\r";
"       \r";
"   swscaldict /debug get\r";
"   { (========SetTransfer - NegXfer) = \r";
"       swscaldict /currentcalset get /negxfer get ==\r";
"   } if\r";
"\r";
"   dup \r";
"   dup length 1 sub dup -1 gt\r";
"   { get }\r";
"   { pop pop /x } ifelse\r";
"   cvlit                              % try to make sure we dont get two\r";
"   /calibrate ne\r";
"   {    \r";
"       {calibrate} swscaldict /combineprocs get exec\r";
"   } if\r";
"   \r";
```

```
"   swscaldict /debug get\r";
"   {   (========SetTransfer - Next) = dup ==\r";
"   } if\r";
"\r";
"   //swsformat /settransfer get exec \r";
"\r";
"   swscaldict /debug get\r";
"   {   \r";
"       (========CurrentCalSet - ) print\r";
"       swscaldict /currentcalset get \r";
"       /name get =\r";
"   } if \r";
"}\r";
"def\r";
"/currenttransfer \r";
"{\r";
"   //swsformat /currenttransfer get exec\r";
"   swscaldict /debug get\r";
"   {   (-------- CurrentXfer realsystem Read:) = \r";
"       dup ==\r";
"   } if \r";
"   dup length array copy cvx \r";
"   dup dup length dup 0 gt\r";
"   {1 sub null cvx put\r";
"   }\r";
"   {pop pop} ifelse\r";
"   swscaldict /debug get\r";
"   {   (-------- CurrentXfer output:) = \r";
"       dup ==\r";
"       (--------) = \r";
"   } if \r";
"}\r";
"def\r";
"end\r";
"\r";
"\r";
"%%%       ***     settransfer in userdict\r";
"%      *\r";
"%      *\r";
"%             \r";
"/settransfer \r";
"   {\r";
"       userdict /md known              % if the appledict is defined,\r";
"       {                               % its settransfer concats new with\r";
"           md swscaldict /getdictstackpos get exec\r";
"           dup\r";
"           -1 ne exch\r";
"           userdict swscaldict /getdictstackpos get exec\r";
"           lt\r";
"           and\r";
"           {   \r";
"               systemdict /currenttransfer get exec\r";
"               swscaldict /combineprocs get exec\r";
"           }\r";
"           if\r";
"       }\r";
"       if                       % md or systemdict on stack\r";
"\r";
"       systemdict /settransfer get \r";
"       exec \r";
"   }\r";
"def\r";
"/currenttransfer \r";
"   {\r";
```

```
"   systemdict /currenttransfer get exec \r";
"   }\r";
"def\r";
"\r";
"\r";
"/setscreen \r";
"   {\r";
"   systemdict /setscreen get exec \r";
"   }\r";
"def\r";
"\r";
"$printerdict /DefaultTransfer known\r";
"{  $printerdict begin\r";
"       /DefaultTransfer \r";
"       {\r";
"           {}\r";
"           swscaldict begin\r";
"               getcurrentdpi\r";
"               getcurrentdensity\r";
"               currentscreen\r";
"               findcalset\r";
"               setcalset\r";
"           end\r";
"           {calibrate}\r";
"       } def\r";
"   end\r";
"}\r";
"{\r";
"   [ /a4 /a4small /b5 /legal /letter /lettersmall /note ]\r";
"   {\r";
"       dup\r";
"       userdict exch known\r";
"       {\r";
"           dup load\r";
"           {{calibrate} settransfer} swscaldict /combineprocs get exec def\r";
"       }\r";
"       {   pop }\r";
"       ifelse\r";
"   } forall\r";
"} ifelse\r";
"\r";
"/swsformat 2 dict def\r";
"swsformat begin\r";
"   /1 (1) def\r";
"   /2 (2) def\r";
"end\r";
"\r";
"swscaldict begin\r";
"swscaldict\r";
"{\r";
"   dup\r";
"   xcheck\r";
"   {\r";
"       systemdict /executeonly get exec def\r";
"   }\r";
"   {   \r";
"       pop pop\r";
"   } ifelse\r";
"} forall\r";
"end\r";
"\r";
"%%EndProlog\r";
"\r";
"% load initial calibration sets\r";
```

```
"(CAL/CALSets) status\r";
"{(CAL/CALSets) run} if\r";
"\r";
"\r";
""
)
);

resource 'POST' (303,purgeable) {
256,
{
"%!PS-Adobe-2.0\r";
"%%Title: \r";
"%%Creator: Southwest Software Inc., Austin, Texas\r";
"%%CreationDate: 5/28/90\r";
"%%BoundingBox: 0 0 842 450\r";
"%%Pages: Attend\r";
"%%DocumentFonts: Times-Roman Helvetica-Bold \r";
"\r";
"\r";
"%%BeginProlog\r";
"\r";
"statusdict begin\r";
"/jobname (Precision; document: Test Strip) def\r";
"end\r";
"\r";
"\r";
"/setabs            % <point size> setabsolute\r";
"{  \r";
"   0 matrix defaultmatrix dtransform idtransform \r";
"   pop \r";
"} def\r";
"\r";
"/cvxi                  %   <hex string> cvxi <integer>\r";
"{\r";
"   dup\r";
"   length \r";
"   3 add \r";
"   string \r";
"   dup\r";
"   dup 4 1 roll\r";
"   0 (16#) \r";
"   putinterval\r";
"   exch \r";
"   3 \r";
"   exch \r";
"   putinterval\r";
"   cvi\r";
"} def\r";
"\r";
"\r";
"/concatstring\r";
"{\r";
"\r";
"   1 index length 1 index length add\r";
"   string\r";
"   dup\r";
"   0\r";
"   4 index putinterval\r";
"   dup\r";
"   3 index length\r";
"   3 index putinterval\r";
"   3 1 roll\r";
"   pop pop\r";
```

```
"} def\r";
"\r";
"/getcurrentnegative            %  getcurrentnegative <value> \r";
"{\r";
"   statusdict /li5backendparams known\r";
"   {   \r";
"   save\r";
"       statusdict begin 256 string li5backendparams end\r";
"       dup length 0 ne\r";
"       {   \r";
"           5 1 getinterval     % get neg print indicator\r";
"           (1) eq              % and leave on stack\r";
"       }\r";
"       { pop false} ifelse     % if li5 not enabled, then no neg output\r";
"       exch restore\r";
"   }\r";
"   {\r";
"       statusdict /invert known        % or maybe cg\r";
"       {   statusdict begin\r";
"               invert\r";
"           end\r";
"       }\r";
"       {   false                       % assume pos print\r";
"       } ifelse\r";
"   } ifelse        % if no li5 or cg, assume no neg output\r";
"} def\r";
"\r";
"/getdensity                % <res> getdensity <value> \r";
"{\r";
"   statusdict /li5backendparams known\r";
"   {   save\r";
"       statusdict begin 256 string li5backendparams end\r";
"       dup length 0 ne\r";
"       {   exch 4 mul cvi 112 add 4 getinterval\r";
"           cvxi                % convert from hex to integer\r";
"       }\r";
"       { pop 0} ifelse     % if li5 not enabled, then return neg\r";
"       exch restore\r";
"   }\r";
"   { pop 0 } ifelse    % if no li5, return -1\r";
"} def\r";
"\r";
"/getcurrentdensity             %  getcurrentdensity <value> \r";
"{\r";
"   statusdict /li5backendparams known\r";
"   {   save\r";
"       statusdict begin 256 string li5backendparams end\r";
"       dup length 0 ne\r";
"       {   dup 6 2 getinterval cvxi\r";
"           4 mul cvi 112 add 4 getinterval\r";
"           cvxi                % convert from hex to integer\r";
"       }\r";
"       { pop 0} ifelse         % if li5 not enabled, then return zero\r";
"       exch restore\r";
"   }\r";
"   { \r";
"       statusdict /statuscommand known\r";
"       {\r";
"                               % aha - must be cg \r";
"           save\r";
"           (_GET05)            % try to read the density\r";
"           256 string\r";
"           statusdict /statuscommand get exec % hope command works first time - why wouldnt it?\r";
"           {\r";
```

```
"               cvi              % got response string - make integer    \r";
"           }\r";
"           {\r";
"               pop 0           % dump response string (i hope)\r";
"           } ifelse\r";
"           exch restore    \r";
"       }\r";
"       {\r";
"           0                   % is nowhere, return zig\r";
"       } ifelse\r";
"   } ifelse                    % if no li5, try statuscommand\r";
"} def\r";
"\r";
"/getcurrentres             %  getcurrentres <0 high 1 med 2 low> \r";
"{\r";
"   statusdict /li5backendparams known\r";
"   {   save\r";
"       statusdict begin 256 string li5backendparams end\r";
"       dup length 0 ne\r";
"       {   6 2 getinterval cvxi\r";
"       }\r";
"       { pop 0} ifelse         % if li5 not enabled, then return neg\r";
"       exch restore\r";
"   }\r";
"   { 0 } ifelse    % if no li5, return -1\r";
"} def\r";
"\r";
"/normalize     % <x> <y> normalize <x> <y>\r";
"{              % normalize to pixel boundaries\r";
"   transform\r";
"   round exch round exch\r";
"   itransform\r";
"} def\r";
"\r";
"/dnormalize        % <x> <y> dnormalize <x> <y>\r";
"{              % dnormalize to pixel boundaries\r";
"   dtransform\r";
"   round exch round exch\r";
"   idtransform\r";
"} def\r";
"\r";
"/theorectical\r";
"[\r";
"0.000\r";
"0.020\r";
"0.050\r";
"0.070\r";
"0.100\r";
"0.150\r";
"0.200\r";
"0.250\r";
"0.300\r";
"0.350\r";
"0.400\r";
"0.450\r";
"0.500\r";
"0.550\r";
"0.600\r";
"0.650\r";
"0.700\r";
"0.750\r";
"0.800\r";
"0.850\r";
"0.900\r";
```

```
"0.930\r";
"0.950\r";
"0.980\r";
"1.000\r";
"] def\r";
"\r";
"\r";
"\r";
"\r";
"\r";
"\r";
"/inch {72 mul} def\r";
"/width 11.2 inch def\r";
"/height 7.42 inch def\r";
"/pname 255 string def\r";
"/cshow\r";
"{  dup stringwidth pop 2 div neg 0 rmoveto show\r";
"} def\r";
"/dobox\r";
"{  \r";
"   dup 0 exch rlineto\r";
"   exch  0 rlineto\r";
"   neg 0 exch rlineto\r";
"   closepath stroke\r";
"} def\r";
"/fillbox\r";
"{  \r";
"   dup 0 exch rlineto\r";
"   exch  0 rlineto\r";
"   neg 0 exch rlineto\r";
"   closepath fill\r";
"} def\r";
"\r";
"/showdensitybox\r";
"{\r";
"   0 0 moveto\r";
"   0 setgray\r";
"   144 144 fillbox\r";
"   \r";
"   36 36 moveto\r";
"   1 setgray\r";
"   72 72 fillbox\r";
"   \r";
"       \r";
"   15 -15 moveto\r";
"   0 setgray\r";
"   /Helvetica findfont 12 scalefont setfont\r";
"   (Dmax) cshow\r";
"   \r";
"   36 -24 moveto\r";
"   54 20 fillbox\r";
"   \r";
"   90 -24 moveto\r";
"   1 setgray\r";
"   54 20 fillbox\r";
"   \r";
"   0 setgray\r";
"   \r";
"   90 rotate\r";
"   /Helvetica findfont 24 scalefont setfont\r";
"   72 10 moveto    \r";
"   getcurrentdensity\r";
"   100 div 6 string cvs cshow\r";
"   \r";
```

```
"} def\r";
"/show45box\r";
"{  \r";
"   newpath\r";
"   0 0 normalize moveto\r";
"   0.25 setabs setlinewidth\r";
"   144 144 \r";
"   dup 0 exch normalize rlineto\r";
"   exch  0 normalize rlineto\r";
"   neg 0 exch normalize rlineto\r";
"   closepath gsave stroke grestore clip\r";
"   72 72 normalize translate\r";
"   4 \r";
"   {   newpath\r";
"       -102 0 normalize moveto\r";
"       102 0 normalize lineto stroke\r";
"       45 rotate\r";
"   } repeat\r";
"} def\r";
"\r";
"/show30box\r";
"{  \r";
"   newpath\r";
"   0 0 normalize moveto\r";
"   0.25 setabs setlinewidth\r";
"   144 144 \r";
"   dup 0 exch normalize rlineto\r";
"   exch  0 normalize rlineto\r";
"   neg 0 exch normalize rlineto\r";
"   closepath gsave stroke grestore clip\r";
"   72 72 normalize translate\r";
"   6 \r";
"   {   newpath\r";
"       -102 0 normalize moveto\r";
"       102 0 normalize lineto stroke\r";
"       30 rotate\r";
"   } repeat\r";
"} def\r";
"\r";
"/showcircle\r";
"{  \r";
"   newpath\r";
"   0 0 normalize moveto\r";
"   0.1 setabs setlinewidth\r";
"   72 72 normalize translate\r";
"   newpath\r";
"   0 0 72 0 360 arc stroke\r";
"   36 \r";
"   {   newpath\r";
"       -72 0 normalize moveto\r";
"       72 0 normalize lineto stroke\r";
"       5 rotate\r";
"   } repeat\r";
"} def\r";
"\r";
"/showhairbox\r";
"{  \r";
"   gsave\r";
"       81 0 translate\r";
"       0.4375 dup scale\r";
"       showlogbox\r";
"   grestore\r";
"   \r";
"   gsave\r";
```

```
"       0 81 translate\r";
"       0.4375 dup scale\r";
"       showcircle\r";
"   grestore\r";
"       \r";
"   gsave\r";
"       81 81 translate\r";
"       0.4375 dup scale\r";
"       show30box\r";
"   grestore\r";
"       \r";
"   gsave\r";
"       0.4375 dup scale\r";
"       show45box\r";
"   grestore\r";
"       \r";
"\r";
"} def\r";
"\r";
"/showlogbox\r";
"{\r";
"   72 72 normalize translate\r";
"   0.1 setabs setlinewidth\r";
"\r";
"   1 1 100 \r";
"   {   log\r";
"       1 sub 72 mul\r";
"       newpath\r";
"       0  normalize\r";
"       moveto\r";
"       0 72 rmoveto\r";
"       0 -144 rlineto\r";
"       stroke      \r";
"   \r";
"   } for\r";
"   \r";
"   -90 rotate\r";
"   1 1 100 \r";
"   {   log\r";
"       1 sub 72 mul\r";
"       newpath\r";
"       0  normalize\r";
"       moveto\r";
"       0 72 rmoveto\r";
"       0 -144 rlineto\r";
"       stroke      \r";
"   \r";
"   } for\r";
"} def\r";
"\r";
"/showpixelcross        % <num pixels> showpixelcross\r";
"{\r";
"   18 18 \r";
"   dnormalize\r";
"   translate\r";
"   dup \r";
"   .99999 sub dup idtransform pop setlinewidth\r";
"   newpath\r";
"   -18 0  normalize moveto\r";
"   18 0  normalize lineto stroke\r";
"   0 -18  normalize moveto\r";
"   0 18  normalize lineto stroke\r";
"   9 -18  normalize moveto\r";
"   /Helvetica findfont 18 scalefont setfont\r";
```

```
"   3 string cvs show\r";
"   \r";
"} def\r";
"/showpixelgroup\r";
"{\r";
"   gsave\r";
"   1 showpixelcross\r";
"   grestore\r";
"   40 0 dnormalize translate\r";
"   gsave\r";
"   2 showpixelcross\r";
"   grestore\r";
"   40 0 dnormalize translate\r";
"   gsave\r";
"   3 showpixelcross\r";
"   grestore\r";
"   40 0 dnormalize translate\r";
"   gsave\r";
"   4 showpixelcross\r";
"   grestore\r";
"   40 0 dnormalize translate\r";
"   gsave\r";
"   5 showpixelcross\r";
"   grestore\r";
"   \r";
"\r";
"} def\r";
"\r";
"\r";
"\r";
"/graylabelbox\r";
"{  \r";
"   0 0 moveto\r";
"   currentgray /cg exch def\r";
"   dup 0 exch rlineto\r";
"   exch  0 rlineto\r";
"   neg 0 exch rlineto\r";
"   closepath gsave fill grestore 0 setgray stroke\r";
"   cg\r";
"   .725 lt\r";
"   {1 setgray}\r";
"   {0 setgray} ifelse\r";
"   1 cg sub .005 add 100 mul cvi 3 string cvs %dup length 2 sub 0 exch getinterval\r";
"   /Helvetica findfont 12 scalefont setfont\r";
"   5 5 moveto show (%) show\r";
"} def\r";
"/showline\r";
"{  0 lead translate\r";
"   0 0 moveto\r";
"   show\r";
"} def  \r";
"/cshowline\r";
"{  0 lead translate\r";
"   78 0 moveto\r";
"   cshow\r";
"} def  \r";
"/showlorem\r";
"{\r";
"   /Times-Roman findfont dup 9 scalefont setfont\r";
"   /FontBBox get dup 3 get exch 1 get sub 12 mul 1000 div .8 mul neg\r";
"   /lead exch def\r";
"   (Lorem ipsum dolor sit amet, consectetuer ) showline\r";
"   (adipiscing elit, sed diam nonummy nibh ) showline\r";
"   (euismod tincidunt ut laoreet dolore magna ) showline\r";
```

```
"    (aliquam erat volutpat.  Ut wisi enim ad mi-) showline\r";
"    (nim veniam, quis nostrud exerci tation ulla-) showline\r";
"    (mcorper suscipit lobortis nisl ut aliquip ex ) showline\r";
"    (ea commodo consequat.  Duis autem vel ) showline\r";
"%   (eum iriure dolor in hendrerit in vulputate ve-) showline\r";
"\r";
"%   (eum iriure dolor in hendrerit in vulputate ve-) showline\r";
"%   (lit esse molestie consequat, vel illum dolore ) showline\r";
"%   (eu feugiat nulla facilisis at vero eros et ac-) showline\r";
"%   (cumsan et iusto odio dignissim qui blandit ) showline\r";
"%   (praesent luptatum zzril delenit augue duis ) showline\r";
"%   (dolore te feugait nulla facilisi.  ) showline\r";
"\r";
"    ( ) showline\r";
"    (ABCDEFGHIJKLMNOPQRSTUVWXYZ) cshowline\r";
"    (abcdefghijklmnopqrstuvwxyz) cshowline\r";
"    ( ) showline\r";
"    /Helvetica findfont dup 9 scalefont setfont\r";
"    (ABCDEFGHIJKLMNOPQRSTUVWXYZ) cshowline\r";
"    (abcdefghijklmnopqrstuvwxyz) cshowline\r";
"    \r";
"\r";
"} def\r";
"    \r";
"\r";
"/dopage\r";
"{\r";
"    /calmessage ( Uncalibrated) def\r";
"    /usingneg () def\r";
"    userdict /swscaldict known\r";
"    {   swscaldict begin\r";
"            calibratoractive                    % on/off\r";
"        end\r";
"        {\r";
"            swscaldict /currentcalset get\r";
"            dup\r";
"            /negxfer get\r";
"            {(Negative)}\r";
"            {(Positive)} ifelse\r";
"            /usingneg exch def\r";
"            /name get \r";
"            dup\r";
"            (Null) eq\r";
"            {\r";
"                pop\r";
"                ( ** No Calibration Set Found ** ) \r";
"            }\r";
"            {\r";
"                ( Calibrated     Set: ) \r";
"                exch concatstring\r";
"            } ifelse\r";
"            /calmessage exch def \r";
"        } if\r";
"    } if\r";
"\r";
"    gsave\r";
"        1 setlinejoin\r";
"        1 setabs setlinewidth\r";
"        0 0 moveto\r";
"        width height dobox\r";
"\r";
"        /Helvetica-Bold findfont 24 scalefont setfont\r";
"        statusdict begin pname printername end \r";
"        (: ) concatstring\r";
```

```
"       calmessage concatstring\r";
"       width 2 div  \r";
"       height 38 sub moveto\r";
"       cshow\r";
"\r";
"       /Helvetica findfont 18 scalefont setfont\r";
"       width 2 div \r";
"       height 72 sub moveto\r";
"\r";
"       usingneg                                          % say neg or positive set\r";
"       (     ) concatstring\r";
"       \r";
"       statusdict /resolution known\r";
"       {   statusdict begin resolution end }             % costly resolution test\r";
"       {   72 0 matrix defaultmatrix dtransform pop cvi } % otherwise, use default\r";
"       ifelse\r";
"\r";
"       5 string cvs concatstring                         % display resolution\r";
"       ( Resolution) concatstring\r";
"       (     ) concatstring                              % set five spaces\r";
"       \r";
"       getcurrentdensity\r";
"       100 div 6 string cvs concatstring\r";
"       ( Exposure Intensity Setting) concatstring\r";
"       (     ) concatstring\r";
"       \r";
"       (Screen: ) concatstring\r";
"       currentscreen pop pop 10 string cvs concatstring\r";
"       ( lpi @ ) concatstring\r";
"\r";
"       currentscreen pop exch pop 10 string cvs concatstring\r";
"       ( ) dup 0 8#312  put concatstring\r";
"\r";
"       cshow                                     % and pump it out\r";
"\r";
"       0 height 85 sub moveto\r";
"       width 0 rlineto stroke\r";
"       /sqboxx 468 def\r";
"\r";
"       0 height sqboxx sub 144 add 18 add moveto\r";
"       width 0 rlineto stroke\r";
"       \r";
"       .5  setabs setlinewidth     \r";
"       gsave\r";
"           /boxw width 72 sub theorectical length 1 sub 2 div div def\r";
"           /boxh 72 def\r";
"           /modnumber width 72 sub boxw div cvi def\r";
"           36 height 85 sub 18 sub boxh sub 20 add translate\r";
"           1 1 theorectical length 1 sub    % loop over each element in array\r";
"           {   /lc exch def                 % save loop counter\r";
"               1 theorectical lc get sub setgray\r";
"               boxw boxh 20 sub graylabelbox\r";
"               \r";
"               0 setgray\r";
"               1 -24 moveto\r";
"               boxw 2 sub 20 fillbox\r";
"               \r";
"               1 -44 moveto\r";
"               1 setgray\r";
"               boxw 2 sub 20 fillbox\r";
"               \r";
"               boxw 0 translate\r";
"               lc modnumber mod 0 eq   % have we exceeded width\r";
"               {   lc boxw mul neg boxh neg 28 sub translate\r";
```

```
"            }\r";
"            if\r";
"        } for\r";
"    grestore\r";
"\r";
"    gsave\r";
"%       25 height sqboxx sub 144 add 18 add 65 add normalize translate\r";
"        36 36 add 144 add -4 add \r";
"        height sqboxx sub 20 add normalize translate\r";
"\r";
"        90 rotate\r";
"        .5 .5 scale\r";
"        showpixelgroup\r";
"    grestore\r";
"\r";
"    gsave\r";
"%       width 10 sub height sqboxx sub 144 add 18 add 65 add normalize translate\r";
"        width 36 sub 144 sub 36 sub 144 sub 25 sub -16 add\r";
"        height sqboxx sub 20 add normalize translate\r";
"\r";
"        90 rotate\r";
"        .5 .5 scale\r";
"        showpixelgroup\r";
"    grestore\r";
"\r";
"    gsave\r";
"%       width 10 sub height sqboxx sub 144 add 18 add 65 add normalize translate\r";
"        width 36 sub 144 sub -16 add \r";
"        height sqboxx sub 20 add normalize translate\r";
"\r";
"        90 rotate\r";
"        .5 .5 scale\r";
"        showpixelgroup\r";
"    grestore\r";
"\r";
"    gsave\r";
"        36 height sqboxx sub translate\r";
"        showdensitybox\r";
"    grestore\r";
"\r";
"    gsave\r";
"        36 36 add 144 add 10 add height sqboxx sub translate\r";
"        showhairbox\r";
"    grestore\r";
"\r";
"    gsave\r";
"        width 36 sub 144 sub 36 sub 144 sub 25 sub \r";
"        height sqboxx sub 144 add translate\r";
"        showlorem\r";
"    grestore\r";
"\r";
"    gsave\r";
"        width 36 sub 144 sub height sqboxx sub translate\r";
"        .9 setgray\r";
"        72 36 graylabelbox\r";
"        0 36 translate\r";
"        .95 setgray\r";
"        72 36 graylabelbox\r";
"        0 36 translate\r";
"        .97 setgray\r";
"        72 36 graylabelbox\r";
"        0 36 translate\r";
"        .99 setgray\r";
"        72 36 graylabelbox\r";
```

```
"           72 -108 translate\r";
"           .1 setgray\r";
"           72 36 graylabelbox\r";
"           0 36 translate\r";
"           .05 setgray\r";
"           72 36 graylabelbox\r";
"           0 36 translate\r";
"           .02 setgray\r";
"           72 36 graylabelbox\r";
"           0 36 translate\r";
"           .01 setgray\r";
"           72 36 graylabelbox\r";
"       grestore\r";
"       \r";
"       gsave\r";
"           newpath\r";
"           27  setabs setlinewidth\r";
"           36 23 moveto\r";
"           width 36 sub 23 lineto\r";
"           stroke\r";
"       grestore\r";
"       \r";
"   grestore\r";
") def\r";
"\r";
"/setdensitysetting              \r";
"{                               % <n> <density> setdensitysetting\r";
"   save\r";
"   3 1 roll\r";
"\r";
"   statusdict /li5 known\r";
"   {\r";
"       20 dict begin\r";
"           /res (00) def\r";
"           res 0 (00) putinterval\r";
"           /den (0000) def\r";
"           den 0 (0000) putinterval\r";
"           \r";
"           16 4 string cvrs        % convert to hex string\r";
"           den exch\r";
"           dup length\r";
"           4 exch sub\r";
"           exch putinterval\r";
"\r";
"           16 2 string cvrs        % convert to hex string\r";
"           res exch\r";
"           dup length\r";
"           2 exch sub\r";
"           exch putinterval\r";
"           \r";
"\r";
"           (0000000F00) 256 string \r";
"           statusdict /li5 get exec    % send switch recorder mode to disable\r";
"           pop\r";
"           \r";
"           (00000017)                  % set density command\r";
"           res concatstring\r";
"           den concatstring\r";
"           (00) concatstring           % for the recorder\r";
"\r";
"           256 string\r";
"           statusdict /li5 get exec    % send density change\r";
"           pop\r";
"           \r";
```

```
"           (0000000F00)                 % turn recorder back on\r";
"           256 string\r";
"           statusdict /li5 get exec     % send switch recorder mode to enable\r";
"           pop\r";
"                   \r";
"       end\r";
"   }\r";
"   { \r";
"       statusdict /statuscommand known % maybe we are cg\r";
"       {\r";
"           exch pop                     % dont need slot number here\r";
"           abs                          % make sure no nasty neg\r";
"           256 mod                      % or not too big\r";
"           2 dict begin\r";
"               /den (0000) def\r";
"               den 0 (0000) putinterval\r";
"           \r";
"               4 string cvs                 % convert densityto decimal string\r";
"               den exch\r";
"               dup length\r";
"               4 exch sub\r";
"               exch putinterval\r";
"\r";
"               (_SET0500)                   % set density command\r";
"               den concatstring\r";
"               256 string\r";
"               statusdict /statuscommand get exec  % send density change\r";
"               pop                          % pop status bool\r";
"               pop                          % pop response string\r";
"           end\r";
"       }\r";
"       {\r";
"           pop pop \r";
"       } ifelse\r";
"   \r";
"   } ifelse\r";
"   restore\r";
"} def\r";
"\r";
"\r";
"\r";
"\r";
"\r";
"%%EndProlog\r";
"\r";
"%%BeginSetup\r";
"\r";
"/dosetup\r";
"{\r";
"   statusdict /setpageparams known\r";
"       {statusdict begin\r";
"%      width 32 add height 32 add 0 1 setpageparams\r";
"       8.7333 inch height 32 add 0 1 setpageparams\r";
"       end\r";
"       .75 .75 scale\r";
"       }\r";
"       {letter\r";
"       -90 rotate\r";
"       -720 50 translate\r";
"       .5 .5 scale\r";
"       }\r";
"   ifelse\r";
"   linescreen 0 ne                  % if dont want default\r";
"   lineangle 0 ne or\r";
```

```
"    {\r";
"        currentscreen\r";
"        3 1 roll \r";
"        lineangle 0 ne\r";
"        {\r";
"            pop\r";
"            lineangle\r";
"        } if\r";
"        exch\r";
"        linescreen 0 ne\r";
"        {\r";
"            pop\r";
"            linescreen\r";
"        } if\r";
"        exch\r";
"        \r";
"        3 -1 roll\r";
"        setscreen\r";
"    } if\r";
"\r";
"    usenegative\r";
"        statusdict /negativeprint known      % get RIP negative sense\r";
"        {   statusdict begin\r";
"                negativeprint\r";
"            end\r";
"        }\r";
"        { \r";
"            false\r";
"        } ifelse\r";
"\r";
"    xor\r";
"    getcurrentnegative  \r";
"    xor                  % if both are negative, result is null\r";
"    \r";
"    \r";
"    \r";
"    {{1 exch sub}}\r";
"    {{}} ifelse\r";
"    settransfer\r";
"    erasepage\r";
"\r";
"} def\r";
"\r";
"/exdf {exch def} def\r";
"\r";
"/setteststripparams\r";
"{\r";
"    /usenegative exdf\r";
"    /linescreen exdf\r";
"    /lineangle exdf\r";
"    100 mul round cvi /enddensity exdf\r";
"    100 mul round cvi /stepdensity exdf\r";
"    100 mul round cvi /initialdensity exdf\r";
"    /usecalibration exdf\r";
"    \r";
"    userdict /swscaldict known\r";
"    {   swscaldict begin\r";
"        /calibratoractive usecalibration def          % turns calibrator on/off\r";
"        end\r";
"\r";
"    } if\r";
"    \r";
"    linescreen dup cvi sub 0 eq          % if even line screen\r";
"    {\r";
```

```
"       /linescreen linescreen cvi def      % make integer for rip-30\r";
"    } if\r";
"    lineangle dup cvi sub 0 eq             % if even line angle\r";
"    {\r";
"       /lineangle lineangle cvi def        % make integer for rip-30\r";
"    } if\r";
"\r";
"} def\r";
"\r";
"\r";
"/imageset\r";
"{\r";
"    dosetup\r";
"    statusdict /assigndensity known not\r";
"    statusdict /statuscommand known not and\r";
"    {    \r";
"        dopage\r";
"        showpage\r";
"    }\r";
"    {\r";
"        stepdensity 0 ne\r";
"        {\r";
"            /resslot getcurrentres def\r";
"            /cdensity getcurrentdensity def\r";
"            \r";
"            initialdensity\r";
"            stepdensity\r";
"            enddensity\r";
"            {\r";
"                resslot\r";
"                exch\r";
"                setdensitysetting\r";
"\r";
"                dopage\r";
"                showpage\r";
"                .75 .75 scale\r";
"            }\r";
"            for\r";
"            resslot cdensity setdensitysetting\r";
"        }\r";
"        {\r";
"            dopage\r";
"            showpage\r";
"        } ifelse\r";
"    } ifelse\r";
"} def\r";
"\r";
"\r";
"%true .60 .20 1.00  0 0 false setteststripparams \r";
"%true 0 0 0  0 0 false setteststripparams \r";
"%false 4.75 0.25 5.25  45 120 true setteststripparams \r";
"%imageset\r";
"\r";
"\r";
"\r";
""
}
};


resource 'POST' (304,purgeable) {
256,
{
"%!PS-Adobe-2.0 ExitServer\r";
```

```
"%%Title: Set Sys/Start file from temp\r";
"%\r";
"%  Copyright 1990 Jim Burns & Southwest Software Inc.\r";
"\r";
"serverdict begin 0 exitserver\r";
"\r";
"/Sys_Start (Sys/Start) def\r";
"\r";
"\r";
"/tsmappendage\r";
"(%%TSMAppendage\r";
"vmstatus                   % check save level\r";
"pop pop                       % if not in exitserver\r";
"0 ne                       % then do one\r";
"(  serverdict begin 0 exitserver\r";
") if\r";
"\r";
"(TSM/TSMMain) run          % then do startup\r";
")\r";
"def\r";
"\r";
"/calappendage\r";
"(%%CALAppendage\r";
"vmstatus                   % check save level\r";
"pop pop                       % if not in exitserver\r";
"0 ne                       % then do one\r";
"(  serverdict begin 0 exitserver\r";
") if\r";
"\r";
"(CAL/CALMain) run          % then do startup\r";
")\r";
"def\r";
"\r";
"/writetsmappendage false def\r";
"\r";
"/asize calappendage length def\r";
"\r";
"/calthere false def\r";
"\r";
"Sys_Start status           % do we have a sys/start\r";
"{  \r";
"   pop pop exch pop        % have size\r";
"   /ssize exch def\r";
"   /sfile Sys_Start (r+) file def\r";
"   ssize asize ge                            % is file equal to or bigger than our appendage\r";
"   {    \r";
"\r";
"       ssize dup asize idiv \r";
"       {\r";
"           asize sub                         % file length was left on stack\r";
"           dup                               % leave for crawl\r";
"           sfile exch setfileposition\r";
"           sfile 14 string readstring        % and suck it up\r";
"           pop\r";
"           (%%CALAppendage) eq\r";
"           {\r";
"               /calthere true def\r";
"               exit\r";
"           } if\r";
"       } repeat\r";
"       \r";
"       calthere not\r";
"       {\r";
"           ssize asize sub \r";
```

```
"          sfile exch setfileposition\r";
"          sfile 14 string readstring      % and suck it up\r";
"          pop\r";
"          (%%TSMAppendage) eq            % if RipMaster there,\r";
"          {\r";
"              sfile ssize asize sub setfileposition\r";
"              sfile calappendage writestring              % and put our guy out\r";
"              sfile tsmappendage writestring      % then do it\r";
"              sfile closefile\r";
"          }\r";
"          {\r";
"              sfile ssize setfileposition\r";
"              sfile calappendage writestring              % and put our guy out\r";
"              sfile closefile\r";
"          } ifelse\r";
"      } if\r";
"   }\r";
"   {                                                % else file smaller than \r";
"       sfile ssize setfileposition\r";
"       sfile calappendage writestring              % and put our guy out\r";
"       sfile closefile\r";
"   } ifelse\r";
"\r";
"}\r";
"{  \r";
"   /sfile Sys_Start (w) file def       % else make one\r";
"   sfile calappendage writestring             % and put our guy out\r";
"   sfile closefile\r";
"}\r";
"ifelse\r";
"\r";
"\r";
"statusdict begin\r";
"statusdict /setdosysstart known\r";
"{  true setdosysstart\r";
"   (%%[DoSysStart set true]%%) =\r";
"} if\r";
"end\r";
"\r";
"statusdict begin\r";
"statusdict /defaultscreencachesize known\r";
"{\r";
"   defaultscreencachesize\r";
"   0 setdefaultscreencachesize\r";
"} if\r";
"end\r";
"\r";
"\r";
"\r";
"\r";
"\r";
""
}
};

resource 'POST' (305,purgeable) {
256,
{
"%!PS-Adobe-2.0 ExitServer\r";
"%%Title: Smart Clear Sys/Start file\r";
"%\r";
"%  Copyright 1990 Jim Burns & Southwest Software Inc.\r";
"\r";
"serverdict begin 0 exitserver\r";
```

```
"/Sys_Start (Sys/Start) def\r";
"\r";
"/tsmappendage\r";
"(%%TSMAppendage\r";
"vmstatus                   % check save level\r";
"pop pop                       % if not in exitserver\r";
"0 ne                       % then do one\r";
"{  serverdict begin 0 exitserver\r";
"} if\r";
"\r";
"(TSM/TSMMain) run          % then do startup\r";
")\r";
"def\r";
"\r";
"/calappendage\r";
"(%%CALAppendage\r";
"vmstatus                   % check save level\r";
"pop pop                       % if not in exitserver\r";
"0 ne                       % then do one\r";
"{  serverdict begin 0 exitserver\r";
"} if\r";
"\r";
"(CAL/CALMain) run          % then do startup\r";
")\r";
"def\r";
"\r";
"/asize calappendage length def\r";
"\r";
"\r";
"/linefeed ( ) def\r";
"linefeed 0 10 put\r";
"\r";
"Sys_Start status         % do we have a sys/start\r";
"{  \r";
"   pop pop exch pop     % have size\r";
"   /ssize exch def\r";
"   /sfile Sys_Start (r+) file def\r";
"   ssize asize ge                    % is file equal to or bigger than our appendage\r";
"   {     \r";
"\r";
"       ssize dup asize idiv \r";
"       {\r";
"           asize sub                         % file length was left on stack\r";
"           dup                               % leave for crawl\r";
"           sfile exch setfileposition\r";
"           sfile 14 string readstring        % and suck it up\r";
"           pop\r";
"           (%%CALAppendage) eq\r";
"           {\r";
"               ssize asize eq                % if we are it,\r";
"               {\r";
"                   sfile closefile           % nuke startup\r";
"                   Sys_Start deletefile      \r";
"                   pop\r";
"               }\r";
"               {\r";
"                   sfile exch setfileposition\r";
"                   asize 1 sub               % write over since truncate wont work\r";
"                   {   sfile ( ) writestring\r";
"                   } repeat\r";
"                   sfile linefeed writestring\r";
"                   sfile closefile\r";
"               } ifelse\r";
"               exit\r";
```

```
"          } if\r";
"       \r";
"       } repeat\r";
"   }\r";
"   { sfile closefile\r";
"   } ifelse\r";
"}\r";
"if\r";
"\r";
"(CAL/CALSets) status\r";
"{(CAL/CALSets) deletefile} if\r";
"(CAL/CALMain) status\r";
"{(CAL/CALMain) deletefile} if\r";
"\r";
"\r";
""
}
};


resource 'POST' (306,purgeable) {
256,
{
"%!PS-Adobe-2.0 Query\r";
"%%Title: Query Rip Resident Calibration Sets\r";
"%% returns <set List>\r";
"\r";
"/argString 256 string def\r";
"statusdict begin\r";
"/jobname (Precision; document: Rip Set Query) def\r";
"end\r";
"\r";
"userdict /swscaldict known\r";
"{\r";
"   swscaldict /calsetsdict get\r";
"   {\r";
"       exch\r";
"       argString cvs\r";
"       dup\r";
"       dup\r";
"       (nullcalset) eq\r";
"       exch\r";
"       (defaultcalset) eq or\r";
"       {pop pop}\r";
"       {\r";
"           (%%[RipSet:) print\r";
"           \r";
"           exch\r";
"           begin\r";
"               initialneg\r";
"               {\r";
"                   1 actualnegative\r";
"               }\r";
"               {\r";
"                   0 actualpositive\r";
"               } ifelse\r";
"               {6 string cvs print ( ) print} forall\r";
"               6 string cvs print\r";
"               ( ) print freqhigh 10 string cvs print\r";
"               ( ) print freqlow 10 string cvs print\r";
"               ( ) print freqpoint 10 string cvs print\r";
"               ( ) print freqname 10 string cvs print\r";
"               ( ) print density 10 string cvs print\r";
"               ( ) print dpi 10 string cvs print\r";
```

```
"               ( ) print (\\() print media print (\\) ) print\r";
"           end\r";
"           (\\() print print (\\)) print\r";
"           (}%%) =\r";
"         } ifelse\r";
"    } forall\r";
"\r";
"} if\r";
"\r";
"\r";
"\r";
""
}
};
```

(Copyright © 1989,1990 by Jim Burns, Robert Burns & Southwest Software Inc.)
( All rights reserved.)

```
UNIT UTSM;


INTERFACE

USES
    {$LOAD MacIntf.LOAD}
        MemTypes, QuickDraw, OSIntf, ToolIntf, PackIntf,
    {$LOAD UMacApp.LOAD}
        UMAUtil, UViewCoords, UFailure,
        UMemory, UMenuSetup, UObject, UList, UAssociation, UMacApp,
    {$LOAD}
        SANE,
        UTEView,
        UGridView,
        UDialog,
        UPap,
        UExtendedText,
        UPrinting;


CONST

  {Command numbers}

    kSignature          =   'SWA3'; {Application signature}
    kFileType           =   'SWF1'; {File-type code used for document files
                                     created by this application}
    kFileTypeCal        =   'SWF3'; {File-type code used for document files
                                     created by this application}
    kOldFileTypeCal     =   'SWF2'; {File-type code used for document files
                                     created by this application}
    kMaxPAPLength       =   31;      {max field lengths for PAP}

    phNotEnoughSpace    =   313;    {if no room for job log write}

    kRowHeight      =   12;
    cJobLogWindow   =   1001;
    cStatusWindow   =   1003;
    cInstall        =   1006;
    cRemove         =   1007;
    cInstallSlug    =   1010;
    cRemoveSlug     =   1011;
    cCopyJobLog     =   1200;
    cWriteJobLog    =   1201;

    cPSizePopup     =   1100;
    cUSLetter       =   1;
    cLetterSideways =   2;
    cLetterExtra    =   3;
    cLetterExtraSideways    =   4;
    cUSLegal        =   5;
    cA4Letter       =   6;
    cB5Letter       =   7;
    cTabloid        =   8;


    cbtcr           =   2010;
    cbtmd           =   2011;
    cbtrm           =   2012;
    cbtul           =   2013;
```

```
cbtdl           =  2014;
cbtgs           =  2015;
cbtvr           =  2016;

cNewCal         =  11;
cOpenCal        =  21;
cCalRemove      =  2020;
cCalInstall     =  2021;
cImageTestStrip =  2022;
cCheckCalibration = 2023;



kCALConfigWindowID      =  2000;
kCALDATAWindowID        =  3000;
kGetRezWindowID         =  3001;
kTestStripWindowID      =  3002;

cRes3386        =  3001;
cRes2540        =  3002;
cRes1693        =  3003;
cRes1270        =  3004;
cRes635         =  3005;
cResOther       =  3006;



kPSizePopup          =  235;
kTSMWindowID         =  1001;
kTSMWindowIDp        =  1002;
kTSMConfigWindowID   =  1000;
kTSMStatusWindowID   =  1003;
kPSErrorWindowID     =  1004;
kInitializeWindowID  =  1005;
kInstallWindowID     =  1006;
kRemoveWindowID      =  1007;
kInitStatusWindowID  =  1008;
kRemoveStatusWindowID   =  1009;
kInstallJobSlugWindowID =  1010;
kRemoveJobSlugWindowID  =  1011;
kMemFullWindowID     =  1012;
kStart1WindowID      =  1014;
kStart2WindowID      =  1015;
kStart3WindowID      =  1016;
kAboutWindowID       =  1017;

kCMStart1WindowID       =  1018;

kpostTSMQuery    = 200;
kpostJobLog      = 201;
kpostDiskQuery   = 202;
kpostVMQuery     = 203;
kpostMemoQuery   = 204;
kpostCutFeed     = 205;
kpostReload      = 206;
kpostTimeSynch   = 207;
kpostClearLog    = 208;

kpostTempTSM     = 209;
kpostSetSysStart= 210;
kpostReStartP    = 211;
kpostRemoveTSM   = 212;

kpostExitserver = 213;
```

```
   kpostSetFilm    = 214;

   kpostRemoveSlug = 215;
   kpostInstallAltSlug     = 217;

   kpostSetSlug    = 220;

{   *** Calimaster Defs }
{   *                   }
{   *                   }

   kPostCalQuery            = 300;
   kCalSetHeader            = 301;
   kPostdownloadSWSCal      = 302;
   kPostdownloadTestStrip   = 303;

   kpostSetCalSysStart      = 304;
   kpostRemoveCal           = 305;
   kPostGetRipSets          = 306;

   kNumCalPoints   =   24;

   kDownLoadCalStatusWindowID  =   2008;
   kInitializeCalWindowID      =   2009;
   kDownLoadCaliMasterStatusWindowID   =   2010;
   kRemoveCalWindowID          =   2011;

   dErrNeedMediaName   =   400;
   dErrFromTooBig      =   401;
   dErrMeasTooBig      =   402;
   dErrMatchesAnother  =   403;

   kStatusInterval =   10*60;

   kHeadString      =   1000;   { STR# for header string }
   kMeasureSysStr   =   1001;
   kGeneralStrings  =   1002;
   kPrinterStatus   =   1003;
   kInterFace       =   1004;

TYPE
    pStr    =    ^STR255;
    hStr    =    ^pStr;

    SpecialPapPhaseType =   (silentSPhase,queryPhase,dialogPhase,endDialogPhase,tempTSM,closetempTSM,
                            setSlug,closesetSlug,setSysStart,closeSysStart,reStartP,closeRestart,
                            removeTSM,closeremoveTSM,removeSlug,closeremoveSlug,
                            installAltSlug,closeinstallAltSlug,

                            queryCalPhase,queryCalInstallPhase,queryCalRipSetPhase,
                            queryCalWaitPhase,queryCalInstallWaitPhase,queryCalRipSetWaitPhase,

                            sendCal,closesendCal,
                            dialogCalPhase,endDialogCalPhase,
                            dialogCalInstallPhase,endDialogCalInstallPhase,
                            downloadTestStrip,closedownloadTestStrip,
                            downloadSWSCal,closedownloadSWSCal,
                            startupCalSets,closestartupCalSets,
                            setCalSysStart,closeCalSysStart,reStartCalP,closeRestartCal,
                            removeCal,closeremoveCal,removeCalSet,closeremoveCalSet

                            );

    TSMFileHeader   =       { File Header for disk reads and writes }
```

```
RECORD
    theVersionNumber:   STRING[5];
    theBytesInName:     INTEGER;
    theRollLength:      INTEGER;
    theFeedLength:      INTEGER;
    theDispStatus:      BOOLEAN;
    theDispJobLog:      BOOLEAN;
    theConfigWPos:      POINT;
    theJobWPos:         POINT;
    theStatWPos:        POINT;
    theMeasureSys:      INTEGER;
    thePadForFuture:    STRING[98]; {pad to 128 bytes}
END;

CALFileHeader   =       { File Header for Calibration disk reads and writes }
RECORD
    theVersionNumber:   STRING[5];
    theBytesInName:     INTEGER;
    theNumOfCalHeaders: INTEGER;
    theConfigWPos:      POINT;
    thePadForFuture:    STRING[110];    {pad to 128 bytes}
END;

CALDataRecord   =       { Structure to hold Calibration Data  }
RECORD
    theName:            STR255;
    theMedia:           STR255;
    theResolution:      INTEGER;
    theResIndex:        INTEGER;
    theExposureIntensity:   EXTENDED;
    theLineScreen:      EXTENDED;
    theCalPoint:        EXTENDED;
    theCalFrom:         EXTENDED;
    theCalTo:           EXTENDED;
    theNegDot:          BOOLEAN;
    theDMax:            EXTENDED;
    theTheoreticals:    Array[0..kNumCalPoints] of EXTENDED;
    theActuals:         Array[0..kNumCalPoints] of EXTENDED;
    theCalPointIDs:     Array[0..kNumCalPoints] of IDType;
    theSpotFuncLen:     INTEGER;

{   thePadForFuture:    STRING[110];    }{pad to 128 bytes}

END;

TestStripRecord =       { Structure to hold parameters for Test Strip Printing }
RECORD
    theUseCalib:        Boolean;
    theInitialDensity:  Extended;
    theStepDensity:     Extended;
    theEndDensity:      Extended;
    theStripLineScreen: Extended;
    theStripLineAngle:  Extended;
    theUseNegative:     Boolean;
END;

TTCsPicture =   OBJECT(TPicture)

    fCassettePhase:     Integer;
    fDrawSpinnerOnly:   Boolean;

    PROCEDURE TTCsPicture.Draw(area: Rect); OVERRIDE;

END;
```

```
TTS1Picture =   OBJECT(TPicture)

    PROCEDURE TTS1Picture.Draw(area: Rect); OVERRIDE;

END;

TTSMCoHandler   =   OBJECT(TEvtHandler)

    Procedure TTSMCoHandler.DoIdle(phase: IdlePhase); OVERRIDE;

    END;

TTSMApplication = OBJECT(TApplication)

    PROCEDURE TTSMApplication.ITSMApplication(
            itsMainFileType: OSType);
        {Initializes the application and globals.}

    PROCEDURE TTSMApplication.DoSetupMenus; OVERRIDE;
        {Enables the new new command}

    PROCEDURE TTSMApplication.SFGetParms(itsCmdNumber: CmdNumber;
                                         VAR dlgID: INTEGER;
                                         VAR where: Point;
                                         VAR fileFilter, dlgHook,
                                         filterProc: ProcPtr;
                                         typeList: HTypeList); OVERRIDE;

    FUNCTION  TTSMApplication.DoMakeDocument(
            itsCmdNumber: CmdNumber): TDocument; OVERRIDE;

    FUNCTION  TTSMApplication.DoMenuCommand(aCmdNumber: CmdNumber):
                TCommand; override;

    FUNCTION  TTSMApplication.KindOfDocument(itsCmdNumber: CmdNumber;
                    itsPAppFile: PAppFile): CmdNumber; override;

    PROCEDURE TTSMApplication.GetPrinterName
                        (VAR PrinterName:STR255; VAR result: INTEGER);
    END;

TPostList   =   OBJECT(TSortedList)

    FUNCTION TPostList.Compare(item1, item2: TObject):INTEGER; OVERRIDE;
    Procedure TPostList.AddKey(KeyStr : Str32; ExecObj : TObject);
    Procedure TPostList.ExecKey(KeyString : Str255;itsDoc: TDocument);
END;

TTSMPapSession = Object(TPAPSession)

    fDocument:      TDocument;
    fExecList:      TPostList;
    fNeedsClose:    Boolean;

End;

TSmartNumberText    =   Object(TNumberText)

    fCurrentMeasurementSystem:  INTEGER;

    FUNCTION  TSmartNumberText.DoKeyCommand (ch: Char; aKeyCode: INTEGER;
                            VAR info: EventInfo): TCommand; OVERRIDE;
```

```
    FUNCTION  TSmartNumberText.GetInchValue: LONGINT;

    PROCEDURE TSmartNumberText.SetInchValue (newValue: LONGINT; redraw: BOOLEAN);

    PROCEDURE TSmartNumberText.GetInchText (VAR theText: Str255);

    PROCEDURE TSmartNumberText.SetInchText (theText: Str255; redraw: BOOLEAN);

    PROCEDURE TSmartNumberText.SetMinMax (itsMinimum, itsMaximum: LONGINT);

    PROCEDURE TSmartNumberText.SetMeasurementUnits;

End;


TTSMView = OBJECT(TView)

    PROCEDURE TTSMView.DoSetUpMenus; override;

    FUNCTION TTSMView.DoMenuCommand(aCmdNumber: CmdNumber): TCommand; override;

    PROCEDURE TTSMView.Draw(area: Rect); OVERRIDE;

    PROCEDURE TTSMView.DoChoice(origView: TView; itsChoice: INTEGER); OVERRIDE;

    PROCEDURE TTSMView.Activate(entering: Boolean); OVERRIDE;

    PROCEDURE TTSMView.SetMeasurementUnits;

    PROCEDURE TTSMView.Close; OVERRIDE;

    END;

TTSMViewP = OBJECT(TTSMView)

    PROCEDURE TTSMViewP.CalcMinSize (VAR minSize: VPoint); OVERRIDE;

    END;

{   TDebugDialogView = OBJECT(TDialogView)

    FUNCTION TDebugDialogView.PoseModally: IDType; OVERRIDE;
    FUNCTION  TDebugDialogView.DoKeyCommand (ch: Char; aKeyCode: INTEGER;
                              VAR info: EventInfo): TCommand; OVERRIDE;

    FUNCTION  TDebugDialogView.CanDismiss (dismissing: IDType): BOOLEAN; OVERRIDE;

    FUNCTION TDebugDialogView.HandleCR (callingView: TView; VAR info: EventInfo): TCommand; OVERRIDE.
END;
}
TTSMConfigView = OBJECT(TDialogView)

    PROCEDURE TTSMConfigView.Draw(area: Rect); OVERRIDE;

    PROCEDURE TTSMConfigView.Activate(entering: Boolean); OVERRIDE;

    PROCEDURE TTSMConfigView.DoChoice(origView: TView; itsChoice: INTEGER); OVERRIDE;

    PROCEDURE TTSMConfigView.SetMeasurementUnits;

    PROCEDURE TTSMConfigView.Close; OVERRIDE;

    END;
```

```
TTSMStatusView = OBJECT(TDialogView)

    PROCEDURE TTSMStatusView.Draw(area: Rect); OVERRIDE;

    PROCEDURE TTSMStatusView.DoChoice(origView: TView; itsChoice: INTEGER); OVERRIDE;

    PROCEDURE TTSMStatusView.Close; OVERRIDE;

    END;

TTSMInitializeView = OBJECT(TDialogView)

    PROCEDURE TTSMInitializeView.DoChoice(origView: TView; itsChoice: INTEGER); OVERRIDE;

    END;


TPapDocument = OBJECT(TDocument)

    fPapSession:        TTSMPapSession;
    fPrinterName:       STR255;
    fPaPaName:          PAPAName;
    fPAPdres:           Handle;
    fPapPhase:          PapPhase;
    fErrorStr:          Str255;
    fSpecialPapPhase:   SpecialPapPhaseType;
    fNeedsSpecialPap:   Boolean;
    fInitStatusWindow:  TWindow;

    fDoingReset:            Boolean;

    Procedure TPapDocument.InitiatePAP(thePapName: STR255; theExecList: TPostList);

    Procedure TPapDocument.DoPAPIdle;

    end;


TTSMDocument = OBJECT(TPapDocument)

    fConfigWindow:  TWindow;
    fJobWindow:     TWindow;
    fStatusWindow:  TWindow;
    fJobView:       TTSMView;
    fJobViewP:      TTSMViewP;
    fJobGrid:       TList;
    fUpdateCnt:     longint;
    fUpdateTim:     Longint;
    fFileSetter:    STR255;
    fNeedsJobUpdate:    Boolean;
    fNeedsCut:      Boolean;
    fNeedsReload:   Boolean;
    fNeedsClearLog: Boolean;
    fPageDivisor:   INTEGER;
    fmemo:          INTEGER;
    fsupply:        LONGINT;
    ftakeup:        LONGINT;
    fnumjobs:       LONGINT;

    fBaseTime:      LONGINT;
    fNeedsFirstSynch: Boolean;
    fLastMacTime:   LONGINT;
    fFirstMacTime:  Longint;
```

```
fTotalJobTime:  Longint;

fStatusTime:    LongInt;
fInsertNext:    INTEGER;        {rows added in chunks, insert line here}
fFileData:      TSMFileHeader;
fIsPrinting:    Boolean;

fMemGotFull:    Boolean;        { flag if memory became full & job lines lost}
fMemFullAck:    Boolean;        { mem full acknowledged }

fUtil:          Longint;
fVMTotal:       Longint;
fVMUsed:        Longint;
fUserDiskPercent:       Longint;
fDiskTotal:     Longint;
fDiskFree:      Longint;
fResolution:    Longint;
fli5status:     Longint;

fvRefNum:       Integer;
fFileName:      STR63;

Procedure TTSMDocument.DoPAPIdle; OVERRIDE;

Procedure TTSMDocument.DoTCsIdle;

Procedure TTSMDocument.DoIdle(phase: IdlePhase); OVERRIDE;

PROCEDURE TTSMDocument.DoMakeViews(forPrinting: BOOLEAN); OVERRIDE;

PROCEDURE TTSMDocument.MakeStatusView;

PROCEDURE TTSMDocument.MakeJobGridView;

PROCEDURE TTSMDocument.DoClearJobGrid;

PROCEDURE TTSMDocument.DoSetUpMenus; override;

FUNCTION TTSMDocument.DoMenuCommand(aCmdNumber: CmdNumber): TCommand; override;

Procedure TTSMDocument.DoNeedDiskSpace(VAR dataForkBytes, rsrcForkBytes: LONGINT); OVERRIDE;

Procedure TTSMDocument.DoWrite(aRefNum: INTEGER; makingCopy: BOOLEAN); OVERRIDE;

Procedure TTSMDocument.DoRead(aRefNum: INTEGER; rsrcExists, forPrinting: BOOLEAN); OVERRIDE;

Procedure TTSMDocument.UpdateStats;

Procedure TTSMDocument.AddJobLine(aJobLine,anErrLine: STR255; anIsJob: Boolean; anInthTenthValue

procedure TTSMDocument.Close; Override;
END;


{-----------------------------------+
|  TJobGridView                     |
+-----------------------------------}
TJobGridView = OBJECT(TTextGridView)

   PROCEDURE TJobGridView.GetText (aCell: GridCell; VAR aString: Str255); OVERRIDE;

   FUNCTION TJobGridView.CanSelectCell(aCell: GridCell): Boolean; OVERRIDE;
```

```
    PROCEDURE TJobGridView.SelectCell(theCell: GridCell; extend, highlight, select: Boolean); OVERRIDE;

    END;

{-----------------------------------+
|   THeadGridView                   |
+-----------------------------------}
THeadGridView = OBJECT(TTextGridView)

    PROCEDURE THeadGridView.GetText (aCell: GridCell; VAR aString: Str255); OVERRIDE;

    FUNCTION THeadGridView.CanSelectCell(aCell: GridCell): Boolean; OVERRIDE;

    END;


{-----------------------------------+
|   TTSMPostMsg                     |
+-----------------------------------}
TTSMPostMsg = OBJECT(TObject)
    fKeyText:       Str32;
    fTimeOut:       Longint;
    fExecObject:    TTSMPostMsg;

    Procedure TTSMPostMsg.ProcessMsg(argStr : Str255; itsDoc:TDocument);
    Procedure TTSMPostMsg.PAPBroken(itsDoc:TDocument);
    Procedure TTSMPostMsg.PsBroken(itsDoc:TDocument);
End;

TJobObj = Object(TObject)
    fIsJob:             BOOLEAN;
    fJobLine :          Str255;
    fErrLineHdl :       hSTR;
    fInchTenthValue:    Longint;

    Procedure TJobObj.Free; OVERRIDE;
end;


{-----------------------------------+
|   TTSMProcMsg1     - %%[Last      |
+-----------------------------------}
TTSMProcLast = OBJECT(TTSMPostMsg)

    Procedure TTSMProcLast.ProcessMsg(argStr : Str255; itsDoc:TDocument); Override;
End;

{-----------------------------------+
|   TCalProcLast     - %%[Last      |
+-----------------------------------}
TCalProcLast = OBJECT(TTSMPostMsg)

    Procedure TCalProcLast.ProcessMsg(argStr : Str255; itsDoc:TDocument); Override;
End;

{-----------------------------------+
|   TCalProcRipSet   - %%[RipSet    |
+-----------------------------------}
TCalProcRipSet = OBJECT(TTSMPostMsg)

    Procedure TCalProcRipSet.ProcessMsg(argStr : Str255; itsDoc:TDocument); Override;
End;

{-----------------------------------+
```

```
|   TTSMProcSJob - %%{StartJob           |
+-------------------------------------}
TTSMProcSJob = OBJECT(TTSMPostMsg)

    Procedure TTSMProcSJob.ProcessMsg(argStr : Str255; itsDoc:TDocument); Override;
End;

{-------------------------------------+
|   TTSMProcEJob - %%{EndJob           |
+-------------------------------------}
TTSMProcEJob = OBJECT(TTSMPostMsg)

    Procedure TTSMProcEJob.ProcessMsg(argStr : Str255; itsDoc:TDocument); Override;
End;

{-------------------------------------+
|   TTSMProcTSMErr - %%{TSMERROR:      |
+-------------------------------------}
TTSMProcErr = OBJECT(TTSMPostMsg)

    Procedure TTSMProcErr.ProcessMsg(argStr : Str255; itsDoc:TDocument); Override;
End;

{-------------------------------------+
|   TTSMProcPSErr - %%{ERROR:          |
+-------------------------------------}
TTSMProcPSErr = OBJECT(TTSMPostMsg)

    Procedure TTSMProcPSErr.ProcessMsg(argStr : Str255; itsDoc:TDocument); Override;
End;

{-------------------------------------+
|   TTSMProcTSMSta - %%{TSMStatus:     |
+-------------------------------------}
TTSMProcSta = OBJECT(TTSMPostMsg)

    Procedure TTSMProcSta.ProcessMsg(argStr : Str255; itsDoc:TDocument); Override;
End;

{-----------------------------------------+
|   TTSMProcVMSta - %%{VMStatus:           |
+-----------------------------------------}
TTSMProcVMSta = OBJECT(TTSMPostMsg)

    Procedure TTSMProcVMSta.ProcessMsg(argStr : Str255; itsDoc:TDocument); Override;
End;

{-----------------------------------------+
|   TTSMProcDiskSta - %%{DiskStatus:       |
+-----------------------------------------}
TTSMProcDiskSta = OBJECT(TTSMPostMsg)

    Procedure TTSMProcDiskSta.ProcessMsg(argStr : Str255; itsDoc:TDocument); Override;
End;

{-----------------------------------------+
|   TTSMProcTimeSynch - %%{TimeSynch:      |
+-----------------------------------------}
TTSMProcTimeSynch = OBJECT(TTSMPostMsg)

    Procedure TTSMProcTimeSynch.ProcessMsg(argStr : Str255; itsDoc:TDocument); Override;
End;

{-----------------------------------------+
```

```
|   TTSMProcMemo - %%{Memo:                |
+----------------------------------------}
TTSMProcMemo = OBJECT(TTSMPostMsg)

    Procedure TTSMProcMemo.ProcessMsg(argStr : Str255; itsDoc:TDocument); Override;
End;

{----------------------------------------+
|   TTSMProcFileSize - %%{FileSize:       |
+----------------------------------------}
TTSMProcFileSize = OBJECT(TTSMPostMsg)

    Procedure TTSMProcFileSize.ProcessMsg(argStr : Str255; itsDoc:TDocument); Override;
End;

{----------------------------------------+
|   TTSMProcFeednCut - %%{FeednCut:       |
+----------------------------------------}
TTSMProcFeednCut = OBJECT(TTSMPostMsg)

    Procedure TTSMProcFeednCut.ProcessMsg(argStr : Str255; itsDoc:TDocument); Override;
End;

{----------------------------------------+
|   TTSMProcSpooler - %%{Spooler          |
+----------------------------------------}
TTSMProcSpooler = OBJECT(TTSMPostMsg)

    Procedure TTSMProcSpooler.ProcessMsg(argStr : Str255; itsDoc:TDocument); Override;
End;

{----------------------------------------+
|   TTSMProcStartUp - %%{StartUp          |
+----------------------------------------}
TTSMProcStartUp = OBJECT(TTSMPostMsg)

    Procedure TTSMProcStartUp.ProcessMsg(argStr : Str255; itsDoc:TDocument); Override;
End;



{------------------------------------+
|   TCalProcTSMSta - %%{CalStatus:   |
+------------------------------------}
TCalProcSta = OBJECT(TTSMPostMsg)

    Procedure TCalProcSta.ProcessMsg(argStr : Str255; itsDoc:TDocument); Override;
End;


{----------------------------------------+
|   TCalSetObj -                          |
+----------------------------------------}

TCalSetObj = Object(TObject)
    fName:  STR255;
    fCalData:   CALDataRECORD;

    Procedure TCalSetObj.Init;
    Procedure TCalSetObj.DoNeedDiskSpace(VAR dataForkBytes, rsrcForkBytes: LONGINT);
    Procedure TCalSetObj.DoWrite(aRefNum: INTEGER; makingCopy: BOOLEAN);
```

```
      Procedure TCalSetObj.DoRead(aRefNum: INTEGER; rsrcExists, forPrinting: BOOLEAN);

      Procedure TCalSetObj.SendCalPS(aPAPSession: TTSMPapSession);

   end;

   TCALDocument = OBJECT(TPapDocument)

      fConfigWindow:           TWindow;

      fFileData:               CALFileHeader;
      fTestStrip:              TestStripRecord;

      fLocalSets:              TList;
      fRIPSets:                TList;
      fLocalCalListView:       TCalListView;
      fRIPCalListView:         TCalListView;

      fLastItemSelected:       integer;
      fLastRipItemSelected:    integer;

      Procedure TCALDocument.DoPAPIdle; OVERRIDE;

{     Procedure TCALDocument.DoIdle(phase: IdlePhase); OVERRIDE;
}

      PROCEDURE TCALDocument.DoMakeViews(forPrinting: BOOLEAN); OVERRIDE;

      PROCEDURE TCALDocument.AddLocalSet(aSetName: STR255; aCalSetObj:    TCalSetObj);

      PROCEDURE TCALDocument.AddRIPSet(aSetName: STR255; aCalSetObj:  TCalSetObj);

      PROCEDURE TCALDocument.DoSetUpMenus; override;

      FUNCTION TCALDocument.DoMenuCommand(aCmdNumber: CmdNumber): TCommand; override;

      Procedure TCALDocument.DoNeedDiskSpace(VAR dataForkBytes, rsrcForkBytes: LONGINT); OVERRIDE;

      Procedure TCALDocument.DoWrite(aRefNum: INTEGER; makingCopy: BOOLEAN); OVERRIDE;

      Procedure TCALDocument.DoRead(aRefNum: INTEGER; rsrcExists, forPrinting: BOOLEAN); OVERRIDE;

      Procedure TCALDocument.SendCalibrationSets;

      Procedure TCALDocument.SendTestStrip;

(*    Procedure TCALDocument.UpdateStats;

      Procedure TCALDocument.AddJobLine(aJobLine,anErrLine: STR255; anIsJob: Boolean; anInthTenthValue

      procedure TCALDocument.Close; Override;
*)    END;

  {-----------------------------------+
  !   TCalListView                    |
  +-----------------------------------}
  TCalListView = OBJECT(TTextListView)

      PROCEDURE TCalListView.GetItemText (anItem: Integer; VAR aString: Str255); OVERRIDE;

      FUNCTION TCalListView.CanSelectItem(anItem: INTEGER): Boolean; OVERRIDE;

      PROCEDURE TCalListView.SelectCell (theCell: GridCell;
                              extend, highlight, select: BOOLEAN); OVERRIDE;
```

```
    FUNCTION  TCalListView.DoMouseCommand (VAR theMouse: Point; VAR info: EventInfo;
                            VAR hysteresis: Point) : TCommand; OVERRIDE;

    FUNCTION TCalListView.Focus: Boolean; OVERRIDE;

    END;

TOutlinedScroller = OBJECT(TScroller)

    PROCEDURE TOutlinedScroller.Draw(area: Rect); OVERRIDE;
    {override to draw outline of scroller}

    END;

TStripDialogView = OBJECT(TDialogView)

    PROCEDURE TStripDialogView.DoChoice(origView: TView; itsChoice: INTEGER); OVERRIDE;

{   PROCEDURE TStripDialogView.EachEditText (PROCEDURE DoToEditText (theEditText: TEditText)); OVERR
}
    PROCEDURE TStripDialogView.DoSelectEditText (theEditText: TEditText; selectChars: BOOLEAN); OVER


    END;

TCalSelectDialogView = OBJECT(TDialogView)

    PROCEDURE TCalSelectDialogView.Draw(area: Rect); OVERRIDE;
    {override to draw outline of scroller}

    FUNCTION  TCalSelectDialogView.HandleMouseDown (theMouse:           VPoint;
                            VAR info:         EventInfo;
                            VAR hysteresis:   Point;
                            VAR theCommand:   TCommand): BOOLEAN; OVERRIDE;

    END;

TCalDataDialogView = OBJECT(TDialogView)

    fDisplayOnly:   Boolean;

    PROCEDURE TCalDataDialogView.DoSetupMenus; OVERRIDE;
    {override to enable resolution popup}
    PROCEDURE TCalDataDialogView.DoChoice(origView: TView; itsChoice: INTEGER); OVERRIDE;
    { used to set other resolutions }
    PROCEDURE TCalDataDialogView.DoSelectEditText (theEditText: TEditText; selectChars: BOOLEAN); OV

    END;

TCalDataView    =   OBJECT(TView)

    end;

TCreateCommand  =   OBJECT(TCommand)

    fItemNum:   Integer;
    fCalSetObj: TCalSetObj;

    Procedure TCreateCommand.Doit;      OVERRIDE;
    Procedure TCreateCommand.Undoit;    OVERRIDE;
    Procedure TCreateCommand.Redoit;    OVERRIDE;
    Procedure TCreateCommand.Commit;    OVERRIDE;
```

```
    end;

  TRemoveCommand  =  OBJECT(TCommand)

    fItemNum:   Integer;
    fCalSetObj: TCalSetObj;

    Procedure TRemoveCommand.DoIt;     OVERRIDE;
    Procedure TRemoveCommand.UndoIt;   OVERRIDE;
    Procedure TRemoveCommand.RedoIt;   OVERRIDE;
    Procedure TRemoveCommand.Commit;   OVERRIDE;

    end;

  TModCalCommand  =  OBJECT(TCommand)

    fItemNum:   Integer;
    fCalSetObj: TCalSetObj;

    Procedure TModCalCommand.DoIt;     OVERRIDE;
    Procedure TModCalCommand.UndoIt;   OVERRIDE;
    Procedure TModCalCommand.RedoIt;   OVERRIDE;
    Procedure TModCalCommand.Commit;   OVERRIDE;

    end;

  TChangeOPopUp  =  OBJECT(TPopup)

    fPreviousItem:  Integer;

    PROCEDURE TChangeOPopUp.SetItemText (item: INTEGER; VAR theText: Str255);

    PROCEDURE TChangeOPopUp.SetCurrentItem (item: INTEGER; redraw: BOOLEAN); override;

    end;

  TModCellSelectCommand  =  OBJECT(TCellSelectCommand)

    FUNCTION TModCellSelectCommand.TrackMouse (aTrackPhase: TrackPhase;
           VAR anchorPoint, previousPoint, nextPoint: VPoint;
           mouseDidMove: BOOLEAN): TCommand; OVERRIDE;

    end;


  TCommandButton  =  OBJECT(TButton)

    FUNCTION  TCommandButton.DoMouseCommand (VAR theMouse: Point; VAR info: EventInfo;
                              VAR hysteresis: Point) : TCommand; OVERRIDE;


    END;



VAR

gProcLast:      TTSMProcLast;
gProcSJob:      TTSMProcSJob;
gProcEJob:      TTSMProcEJob;
gProcErr:       TTSMProcErr;
gProcPSErr:     TTSMProcPSErr;
gProcSta:       TTSMProcSta;
```

```
gProcVMSta:       TTSMProcVMSta;
gProcDiskSta:     TTSMProcDiskSta;
gProcTimeSynch:   TTSMProcTimeSynch;
gProcMemo:        TTSMProcMemo;
gProcFileSize:    TTSMProcFileSize;
gProcFeednCut:    TTSMProcFeednCut;
gProcSpooler:     TTSMProcSpooler;
gProcStartUp:     TTSMProcStartUp;

gCalProcLast:     TCalProcLast;
gCalProcRipSet:   TCalProcRipSet;
gCalProcSta:      TCalProcSta;


gRIPMExecList:        TPostList;
gCalExecList:         TPostList;

gConversionTable:     ARRAY[0..3] of EXTENDED;
gUnitTable:           ARRAY[0..3] of STR255;
gHeadStrings:         ARRAY[0..3] of STR255;
gFeedStrings:         ARRAY[0..2] of STR255;
gStatusStrings:       ARRAY[0..4] of STR255;
gInterFaceStrings:    ARRAY[0..2] of STR255;
gUpdatingString:      STR255;

IMPLEMENTATION

{$I UTSM.incl.p}

END.
```

{Copyright © 1989,1990 Southwest Software. All rights reserved.}

```
{$S ARes}
PROCEDURE Pause(ticks : Longint);
var finalticks: LONGINT;
BEGIN
    finalticks := TickCount + Ticks;
    while TickCount < finalTicks do
        begin end;
END;

Procedure TTSMPostMsg.PAPBroken(itsDoc:TDocument);
Begin
    StdAlert(phLwIoProblem);
End;

Procedure TTSMPostMsg.PsBroken(itsDoc:TDocument);
Begin
    StdAlert(phLwIoProblem);
End;

Procedure TTSMPostMsg.ProcessMsg(argStr : Str255; itsDoc:TDocument);
begin
    {$IFC qDebug}
    WriteLn('Process Msg Default [',argStr,']');
    {$ENDC}
end;

{-----------------------------------+
|  TTSMProcSta                      |
+-----------------------------------}
{*
 * TTSMProcSta.ProcessMsg - Process %%[TSMStatus: Msg
 *}
Procedure TTSMProcSta.ProcessMsg(argStr : Str255; itsDoc:TDocument); override;
var aJobObj : TJobObj;
    theJobGridView: TJobGridView;
    theJobGridViewp:    TJobGridView;
    aDateTime:  Longint;
    aStr:       STR255;

begin
{$IFC qDebug}
WriteLn('process status - fNeedsSpecial = ',TTSMDocument(itsDoc).fNeedsSpecialPap);
{$ENDC}

    if ((copy(argStr,14,1) <> 't')  or (TTSMDocument(itsDoc).fNeedsSpecialPap)) then
        begin
            {$IFC qDebug}
            WriteLn('arStr from ProcSta "',argStr,'"');
            {$ENDC}
            if (TTSMDocument(itsDoc).fStatusWindow <> NIL) then TTSMDocument(itsDoc).fStatusWindow.Close;
            if (TTSMDocument(itsDoc).fJobWindow <> NIL) then TTSMDocument(itsDoc).fJobWindow.Close;

            IF copy(argStr,2,1) <> 't' then
            begin {could not ... because ...}
                ParamText('initialize this printer','there is no file system','','');
                Failure(papErr,phLwIoProblem);
            end;

            IF copy(argStr,8,1) <> 't' then
            begin {could not ... because ...}
                ParamText('initialize this printer','its disk is not on-line','','');
                Failure(papErr,phLwIoProblem);
```

```
        end;

        {got to do this phase stuff because pap cant be called recursively
            from the message processors - need to do separate jobs and resets }

        TTSMDocument(itsDoc).fPapSession.fNeedsClose    :=  TRUE;
        IF (NOT TTSMDocument(itsDoc).fNeedsSpecialPap) then
        begin   {from job or status window request - put up dialog}
            TTSMDocument(itsDoc).fSpecialPapPhase   :=  dialogPhase;
        end
        else begin {dialog up already from menu command }
                   {disk stuff trapped out above}
            TTSMDocument(itsDoc).fSpecialPapPhase   :=  endDialogPhase;
        end;
        TTSMDocument(itsDoc).fNeedsSpecialPap   :=  TRUE;
    end
else
    begin   {system is fully up - dump all ps requests }

{ get disk statistics}

        TTSMDocument(itsDoc).fPAPSession.WritePs(kpostDiskQuery,'get disk statistics');

{ send time synch if needed}

        GetDateTime(aDateTime);
                   {if first time through, or 2 hr since last synch}
        IF TTSMDocument(itsDoc).fNeedsFirstSynch or
            ((TTSMDocument(itsDoc).fJobWindow <> NIL) and
            ((TTSMDocument(itsDoc).fBaseTime = 0) or
            ((aDateTime-TTSMDocument(itsDoc).fLastMacTime) > 2*60*60)))
        then
        begin
            {$IFC qDebug}
            WriteLn('sending time synch');
            {$ENDC}
            TTSMDocument(itsDoc).fNeedsFirstSynch := false;
            NumToString(aDateTime,aStr);
            TTSMDocument(itsDoc).fPAPSession.fWriteStr := concat(
                'TSM /mactime (',aStr,') put ');
            TTSMDocument(itsDoc).fPAPSession.WritePs(kpostUseStr,'synchronize printer time');
            TTSMDocument(itsDoc).fPAPSession.WritePs(kpostTimeSynch,'synchronize printer time');
        end;

{ get memory statistics}

        TTSMDocument(itsDoc).fPAPSession.WritePs(kpostVMQuery,'get memory statistics');

{get cassette data id neded}

        IF TTSMDocument(itsdoc).fStatusWindow <> NIL then
        begin
            TTSMDocument(itsDoc).fPAPSession.WritePs(kpostMemoQuery,'get cassette data')
        end;

{get log data if needed}

        if TTSMDocument(itsDoc).fJobWindow <> NIL then
        begin

            TTSMDocument(itsDoc).fPAPSession.fWriteStr :=
                TTSMDocument(itsDoc).fFileSetter;
            TTSMDocument(itsDoc).fPAPSession.WritePs(kpostUseStr,'get job log');
            TTSMDocument(itsDoc).fPAPSession.WritePs(kpostJobLog,'get job log');
```

```
        end;

    {post last message expected}

            TTSMDocument(itsDoc).fPAPSession.fWriteStr := '{%%[Last:]%%} = flush ';
            TTSMDocument(itsDoc).fPAPSession.WritePs(kpostUseStr,'end connection');     {send eom}

        end;
end;

{-----------------------------------+
|   TCalProcSta                     |
+-----------------------------------}
(*
 *  TCalProcSta.ProcessMsg - Process %%[TSMStatus: Msg
 *)
Procedure TCalProcSta.ProcessMsg(argStr : Str255; itsDoc:TDocument); override;
var
    aStr:       STR255;

begin
{$IFC qDebug}
WriteLn('TCalProcSta');
{$ENDC}

    if ((copy(argStr,14,1) <> 't')  or (TPapDocument(itsDoc).fSpecialPapPhase = queryCalInstallWaitPhase)
        begin

            IF copy(argStr,2,1) <> 't' then
            begin {could not … because …}
                ParamText('initialize this printer','there is no file system','','');
                Failure(papErr,phLwIoProblem);
            end;

            IF copy(argStr,8,1) <> 't' then
            begin {could not … because …}
                ParamText('initialize this printer','its disk is not on-line','','');
                Failure(papErr,phLwIoProblem);
            end;

            {got to do this phase stuff because pap cant be called recursively
                from the message processors - need to do separate jobs and resets }

            TPapDocument(itsDoc).fPapSession.fNeedsClose    :=  TRUE;
            IF ((TPapDocument(itsDoc).fSpecialPapPhase = queryCalWaitPhase) or
                (TPapDocument(itsDoc).fSpecialPapPhase = queryCalRipSetWaitPhase))

            then
            begin   {from job or status window request - put up dialog}

                if (TPapDocument(itsDoc).fInitStatusWindow <> NIL)
                    then TPapDocument(itsDoc).fInitStatusWindow.Close;
                TPapDocument(itsDoc).fInitStatusWindow  :=  NIL;

                TPapDocument(itsDoc).fSpecialPapPhase   :=  dialogCalPhase;
            end
            else begin {dialog up already from menu command }
                        {disk stuff trapped out above}
                TPapDocument(itsDoc).fSpecialPapPhase   :=  endDialogCalPhase;
            end;
            TPapDocument(itsDoc).fNeedsSpecialPap   :=  TRUE;
        end
    else
        begin   {system is fully up - dump all ps requests }
```

```
    { get disk statistics}

            TPapDocument(itsDoc).fPAPSession.WritePs(kpostDiskQuery,'get disk statistics');

    { get memory statistics}

            TPapDocument(itsDoc).fPAPSession.WritePs(kpostVMQuery,'get memory statistics');

            IF (TPapDocument(itsDoc).fSpecialPapPhase = queryCalWaitPhase) then
            begin
                TPapDocument(itsDoc).fSpecialPapPhase   :=  sendCal;
            end
            else begin
            TPapDocument(itsDoc).fPAPSession.WritePs(kPostGetRipSets,'get rip sets');

            TPapDocument(itsDoc).fPAPSession.fWriteStr := '(%%[Last:]%%) = flush ';
            TPapDocument(itsDoc).fPAPSession.WritePs(kpostUseStr,'end connection');     {send eom}

            TPapDocument(itsDoc).fPAPSession.WritePs(kpostEOF,'get memory statistics');

            end;

        end;
end;

{------------------------------------+
|   TTSMProcLast                      |
+------------------------------------}
(*
 *  TTSMProcLast.ProcessMsg - Process %%[Last Msg
 *)
Procedure TTSMProcLast.ProcessMsg(argStr : Str255; itsDoc:TDocument); override;
var aTSlPicture:    TTSlPicture;
begin

    {$IFC qDebug}
    WriteLn('Process Last [',argStr,']');
    {$ENDC}
    with TTSMDocument(itsDoc) do
        begin
            fPapSession.fNeedsClose := True;
            if fUpdateCnt = 0 then
                fUpdateCnt := TickCount;
            IF (TTSMDocument(itsDoc).fStatusWindow <> NIL) then
            begin   {update utilization figure}
                aTSlPicture :=  TTSlPicture(TTSMDocument(itsDoc).fStatusWindow.FindSubView('TPCT'));
                aTSlPicture.DrawContents;
            end;
        end;
end;

{------------------------------------+
|   TCalProcRipSet                    |
+------------------------------------}
(*
 *  TCalProcRipSet.ProcessMsg - Process %%[RipSet Msg
 *)
Procedure TCalProcRipSet.ProcessMsg(argStr : Str255; itsDoc:TDocument); override;
var aCalSetObj: TCalSetObj;
    posn,ndx:       Integer;
    tmpStr:     Str255;

    FUNCTION GetNextExtendedToken: Extended;
```

```
    VAR outnum: Extended;
    BEGIN
        posn    :=  posn+1; {shift past the blank}
        tmpStr  :=  copy(argStr,posn,Length(argStr)-posn+1);
        posn    :=  pos(' ',tmpStr);
        outNum  :=  Str2Num(copy(tmpStr,1,posn-1));
        argStr  :=  tmpStr;
        GetNextExtendedToken := outnum;
    END;
    FUNCTION GetNextIntegerToken: LONGINT;
    VAR outnum: LONGINT;
    BEGIN
        posn    :=  posn+1; {shift past the blank}
        tmpStr  :=  copy(argStr,posn,Length(argStr)-posn+1);
        posn    :=  pos(' ',tmpStr);
        StringToNum(copy(tmpStr,1,posn-1), outnum);
        argStr  :=  tmpStr;
        GetNextIntegerToken := outnum;
    END;
    FUNCTION GetNextStringToken: Str255;
    VAR outStr: Str255;
        posn2:  Integer;
    BEGIN
        posn    :=  posn+1; {shift past the blank}
        tmpStr  :=  copy(argStr,posn,Length(argStr)-posn+1);
        posn2   :=  pos('(',tmpStr);
        posn    :=  pos(')',tmpStr);
        outStr  :=  copy(tmpStr,posn2+1,posn-1-posn2);
        argStr  :=  tmpStr;
        GetNextStringToken := outStr;
    END;

begin

    {$IFC qDebug}
    WriteLn('TCalProcRipSet [',argStr,']');
    {$ENDC}
    New(aCalSetObj);
    FailNil(aCalSetObj);
    aCalSetObj.Init;
    aCalSetObj.fName    :=  argStr;

    posn    :=  0;                              { start at first ACTUALS number }
    for ndx:=0 to kNumCalPoints  do
    begin
        aCalSetObj.fCalData.theActuals[ndx] :=  GetNextExtendedToken * 100.00;
    end;

    if GetNextExtendedToken = 1 then        { neg xfer  }
    begin
        aCalSetObj.fCalData.theNegDot   :=  true;
    end
    else begin
        aCalSetObj.fCalData.theNegDot   :=  false;
    end;

    aCalSetObj.fCalData.theCalTo    :=  GetNextExtendedToken;
    aCalSetObj.fCalData.theCalFrom  :=  GetNextExtendedToken;
    aCalSetObj.fCalData.theCalPoint :=  GetNextExtendedToken;
    aCalSetObj.fCalData.theLineScreen   :=  GetNextExtendedToken;

    aCalSetObj.fCalData.theExposureIntensity    :=  GetNextExtendedToken / 100.00;
    aCalSetObj.fCalData.theResolution   :=  GetNextIntegerToken;
```

```
    aCalSetObj.fCalData.theMedia     :=  GetNextStringToken;
    aCalSetObj.fCalData.theResIndex :=  6;
    aCalSetObj.fCalData.theName      :=  GetNextStringToken;

    tmpStr  :=  aCalSetObj.fCalData.theName;
    TCALDocument(itsDoc).AddRIPSet(tmpStr,aCalSetObj);

end;

{------------------------------------+
|   TCalProcLast                      |
+------------------------------------}
(*
 *  TCalProcLast.ProcessMsg - Process %%[Last Msg
 *)
Procedure TCalProcLast.ProcessMsg(argStr : Str255; itsDoc:TDocument); override;
begin

    {$IFC qDebug}
    WriteLn('Cal Process Last [',argStr,']');
    {$ENDC}
    with TPapDocument(itsDoc) do
        begin
            fPapSession.fNeedsClose := True;
        end;
end;

{------------------------------------+
|   TTSMProcSJob                      |
+------------------------------------}
(*
 *  TTSMProcSJob.ProcessMsg - Process %%[StartJob Msg
 *)
Procedure TTSMProcSJob.ProcessMsg(argStr : Str255; itsDoc:TDocument); override;
begin
    if TTSMDocument(itsDoc).fJobWindow <> NIL then
    begin
        TTSMDocument(itsDoc).AddJobLine(concat('Start ', argStr),'',FALSE,0);
    end;

end;

{------------------------------------+
|   TTSMProcSpooler                   |
+------------------------------------}
(*
 *  TTSMProcSpooler.ProcessMsg - Process %%[Spooler Msg
 *)
Procedure TTSMProcSpooler.ProcessMsg(argStr : Str255; itsDoc:TDocument); override;
begin
        Paramtext('establish link','this printer is spooled','','');
        Failure(PapErr,phLwIoProblem);
end;

{------------------------------------+
|   TTSMProcEJob                      |
+------------------------------------}
(*
 *  TTSMProcEJob.ProcessMsg - Process %%[EndJob Msg
 *)
Procedure TTSMProcEJob.ProcessMsg(argStr : Str255; itsDoc:TDocument); override;
var
    aString:        STR255;
    posn:           Integer;
```

```
    compTime:        Longint;
    inchValue,
    InchTenthValue: Longint;
    tmpStr,
    tmpStr2,
    tmpStr3:         STR255;
    thedate:         DateTimeRec;
    theINTL:         Intl0Hndl;
    spaces:          STRING[5];


    FUNCTION GetNextIntegerToken: LONGINT;
    VAR outnum: LONGINT;
    BEGIN
        posn    :=  posn+1; {shift past the blank}
        tmpStr  :=  copy(argStr,posn,Length(argStr)-posn+1);
        posn    :=  pos(' ',tmpStr);
        StringToNum(copy(tmpStr,1,posn-1), outnum);
        GetNextIntegerToken := outnum;
    END;

    Procedure AddToJobTime(theString: STR255);
    var hours,
        minutes,
        seconds:    longint;
    begin
        StringToNum(copy(theString,1,2),hours);
        StringToNum(copy(theString,4,2),minutes);
        StringToNum(copy(theString,7,2),seconds);
        TTSMDocument(itsDoc).fTotalJobTime  :=  TTSMDocument(itsDoc).fTotalJobTime
        +   3600*hours + 60*minutes + seconds;
    end;

begin
    spaces  :=  '     ';
    if TTSMDocument(itsDoc).fJobWindow <> NIL then
    begin
        posn      :=  72;
        compTime     :=  GetNextIntegerToken;

        IF (TTSMDocument(itsDoc).fBaseTime <> 0) then
        begin

            compTime    :=  (compTime div 1000) + TTSMDocument(itsDoc).fBaseTime;
            theINTL := Intl0Hndl(GetResource('INTL', 0));
            FailResError;
            with theINTL^^ do
                begin
                    shrtDateFmt := BOR(BAND(shrtDateFmt, 127), 64 + 32);
                    timeCycle := 0; { 24 Hr clock }
                end;
            IUDatePString (compTime, shortDate, tmpStr, Handle(theINTL));
            IUTimePString (compTime, FALSE,    tmpStr2, Handle(theINTL));
            ReleaseResource(Handle(theINTL));
            if Length(tmpStr2) = 4 then
                tmpStr2 := concat('0',tmpStr2);
        end
        else begin
            tmpStr  :=  '     ';
            tmpStr2 :=  '     ';
        end;

        IF (copy(argstr,103,1) = ' ') then      { no tenths digit - pre 1.6 log }
        begin
```

```
            StringToNum(copy(argStr,99,4),inchValue);
            inchTenthValue  :=  inchValue*10;
        end
        else begin                          { post 1.6 log - has tenths value   }
            StringToNum(copy(argStr,99,5),inchTenthValue);
            inchValue   :=  Round(inchTenthValue/10);
        end;
        NumToString(inchValue,tmpStr3);         { pad to four long  }
        tmpStr3 :=  concat(copy(spaces,1,4-length(tmpStr3)),tmpStr3);

        {build job log line}
        aString :=concat(
            copy(argStr,2,17),      { Document Name }
            ' ',
            copy(argStr,35,17),     { User Name }
            ' ',
            copy(argStr,67,5),      { Status    }
            ' ',
            copy(tmpStr,1,5),       { Comp Date }
            ' ',
            copy(tmpStr2,1,5),      { Comp Time }
            ' ',
            copy(argStr,88,7),      { Page Type }
            '',
            copy(argStr,95,3),      { Number Pages  }   (v1.6b2)
            ' ',
            (*copy(argStr,100,4),       { Inches    }   v1.6b2 *)
            tmpStr3,
            '  ',
            copy(argStr,105,8));    { Time  }

        TTSMDocument(itsDoc).
            AddJobLine(aString,TTSMDocument(itsDoc).fErrorStr,TRUE,inchTenthValue);
        TTSMDocument(itsDoc).fErrorStr := '';

        aString :=  copy(argStr,105,8); { get job Time  }
        AddToJobTime(aString);


    end;
end;

{-----------------------------------+
|   TTSMProcStartUp                 |
+-----------------------------------}
(*
 *  TTSMProcStartUp.ProcessMsg - Process %%[StartUp Msg
 *)
Procedure TTSMProcStartUp.ProcessMsg(argStr : Str255; itsDoc:TDocument); override;
begin

    TTSMDocument(itsDoc).fBaseTime  :=  0;  { re-boot clears timer pairs }

end;

{-----------------------------------+
|   TTSMProcFeednCut                |
+-----------------------------------}
(*
 *  TTSMProcFeednCut.ProcessMsg - Process %%[FeednCut
 *)
Procedure TTSMProcFeednCut.ProcessMsg(argStr : Str255; itsDoc:TDocument); override;
var aJobObj:    TJobObj;
    aString:    STR255;
```

```
    tmpString:  STR255;
    ndx:        INTEGER;
    inchSum:    INTEGER;
    inchTenthSum:   INTEGER;
    pageSum:    INTEGER;
    tmp:        LONGINT;
    spaces:     STRING[24];
begin
    if TTSMDocument(itsDoc).fJobWindow <> NIL then
    begin
        {62 spaces before},

        TTSMDocument(itsDoc).AddJobLine(gFeedStrings[0],'',FALSE,0);

        ndx :=  TTSMDocument(itsDoc).fInsertNext-2;
        inchSum :=  0;
        inchTenthSum    :=  0;
        pageSum :=  0;

        While (ndx > 0) DO BEGIN
            aJobObj :=  TJobObj(TTSMDocument(itsDoc).fJobGrid.At(ndx));
            if aJobObj.fIsJob THEN
            BEGIN
                aString :=  copy(aJobObj.fJobLine,62,3);
                StringToNum(aString,tmp);
                pageSum :=  pageSum+tmp;
                tmp :=  aJobObj.fInchTenthValue;
                inchTenthSum    :=  inchTenthSum+tmp;
                inchSum :=  inchSum+round(tmp/10);
                ndx :=  ndx-1;
            END
            ELSE BEGIN
                ndx :=  0;
            END;
        end;

        spaces :=  '                        ';
        {62 spaces before}
        NumToString(pageSum,tmpString);

        aString :=  concat(gFeedStrings[1],copy(spaces,1,4-length(tmpString)));{ feed & cut string }
        aString :=  concat(aString,tmpString);

        NumToString(inchSum,tmpString);

        aString :=  concat(aString,copy(spaces,1,5-length(tmpString)));
        aString :=  concat(aString,tmpString);

        TTSMDocument(itsDoc).AddJobLine(aString,'',true,inchTenthSum);  { set true so display will conve
                                                                        { proper measurement display        }

        TTSMDocument(itsDoc).AddJobLine(gFeedStrings[2],'',FALSE,0); { underline string }
    end;
end;

{-----------------------------------+
|   TTSMProcErr                     |
+-----------------------------------}
(*
 *  TTSMProcErr.ProcessMsg - Process %%[TSMERROR: Msg
 *)
Procedure TTSMProcErr.ProcessMsg(argStr : Str255; itsDoc:TDocument); override;
begin
    TTSMDocument(itsDoc).fErrorStr :=  argStr;
```

```
end;

{-----------------------------------+
|   TTSMProcPSErr                   |
+-----------------------------------}
(*
 *  TTSMProcPSErr.ProcessMsg - Process %%[ ERROR: Msg
 *)
Procedure TTSMProcPSErr.ProcessMsg(argStr : Str255; itsDoc:TDocument); override;
begin
    TPapDocument(itsDoc).fPapPhase := errorPhase;
    TPapDocument(itsDoc).fErrorStr := argStr;
    {$IFC qDebug}
    WriteLn('error received');
    {$ENDC}
end;

{-----------------------------------+
|   TTSMProcDiskSta                 |
+-----------------------------------}
(*
 *  TTSMProcDiskSta.ProcessMsg - Process %%[DiskStatus: Msg
 *)

Procedure TTSMProcDiskSta.ProcessMsg(argStr : Str255; itsDoc:TDocument); Override;
var posn : integer;
    l1, l2, l3 : Longint;
    aTS1Picture:    TTS1Picture;

    FUNCTION GetNextIntegerToken: LONGINT;
    VAR outnum: LONGINT;
    BEGIN
        posn    :=  posn+1; {shift past the blank}
        argStr  :=  copy(argStr,posn,Length(argStr)-posn+1);
        posn    :=  pos(' ',argStr);
        StringToNum(copy(argStr,1,posn-1), outnum);
        GetNextIntegerToken := outnum;
    END;

begin
    posn := 1;
    l1 := GetNextIntegerToken;
    l2 := GetNextIntegerToken;
    l3 := GetNextIntegerToken;

    {$IFC qDebug}
    WriteLn('Process DiskStatus ', l1, l2, l3);
    {$ENDC}

    TTSMDocument(itsDoc).fUserDiskPercent   :=  l1;
    TTSMDocument(itsDoc).fDiskTotal         :=  l2;
    TTSMDocument(itsDoc).fDiskFree          :=  l3;

    IF (TTSMDocument(itsDoc).fStatusWindow <> NIL) then
    begin
        aTS1Picture :=  TTS1Picture(TTSMDocument(itsDoc).fStatusWindow.FindSubView('TPCT'));
        aTS1Picture.DrawContents;
    end;


end;

{-----------------------------------+
```

```
|   TTSMProcTimeSynch                 |
+-----------------------------------}
(*
 *  TTSMProcTimeSynch.ProcessMsg - Process %%[TimeSynch: Msg
 *)

Procedure TTSMProcTimeSynch.ProcessMsg(argStr : Str255; itsDoc:TDocument); Override;
var posn : integer;
    l1, l2, l3 : Longint;
    aDateTime:  Longint;
    aStr:      STR255;

    FUNCTION GetNextIntegerToken: LONGINT;
    VAR outnum: LONGINT;
        neg:    Boolean;
    BEGIN
        neg :=  False;
        posn    :=  posn+1; {shift past the blank}
        IF (copy(argStr,posn,1) = '-') then
        begin
            neg :=  TRUE;
            posn    :=  posn+1;
        end;
        argStr  :=  copy(argStr,posn,Length(argStr)-posn+1);
        posn    :=  pos(' ',argStr);
        StringToNum(copy(argStr,1,posn-1), outnum);
        if neg then outnum := -outnum;
        GetNextIntegerToken := outnum;
    END;

begin
    posn := 1;
    l1 := GetNextIntegerToken;  { have mac time in secs}
    l2 := GetNextIntegerToken;  { printer time in ms since startup}

    TTSMDocument(itsDoc).fBaseTime      := l1 - (l2 div 1000);
    TTSMDocument(itsDoc).fLastMacTime   := l1;
    IF (TTSMDocument(itsDoc).fFirstMacTime = 0) then
        TTSMDocument(itsDoc).fFirstMacTime  := l1;



end;


{-----------------------------------+
|   TTSMProcVMSta                    |
+-----------------------------------}
(*
 *  TTSMProcVMSta.ProcessMsg - Process %%[VMStatus: Msg
 *)

Procedure TTSMProcVMSta.ProcessMsg(argStr : Str255; itsDoc:TDocument); Override;
var posn : integer;
    l1, l2, l3, l4, l5 :    Longint;
    aTS1Picture:        TTS1Picture;

    FUNCTION GetNextIntegerToken: LONGINT;
    VAR outnum: LONGINT;
    BEGIN
        posn    :=  posn+1; {shift past the blank}
        argStr  :=  copy(argStr,posn,Length(argStr)-posn+1);
        posn    :=  pos(' ',argStr);
        StringToNum(copy(argStr,1,posn-1), outnum);
```

```
        GetNextIntegerToken := outnum;
    END;

begin
    posn := 1;
    l1 := GetNextIntegerToken;
    l2 := GetNextIntegerToken;
    l3 := GetNextIntegerToken;
    l4 := GetNextIntegerToken;
    l5 := GetNextIntegerToken;


    {$IFC qDebug}
    WriteLn('Process VM ', l1, l2, l3, l4, l5);
    {$ENDC}
    TTSMDocument(itsDoc).fUtil       :=  45;
    TTSMDocument(itsDoc).fVMTotal    :=  l1;
    TTSMDocument(itsDoc).fVMUsed     :=  l2;
    TTSMDocument(itsDoc).fResolution     :=  l4;
    TTSMDocument(itsDoc).fli5status :=  l5;

    IF (TTSMDocument(itsDoc).fStatusWindow <> NIL) then
    begin
        aTSlPicture :=  TTSlPicture(TTSMDocument(itsDoc).fStatusWindow.FindSubView('TPCT'));
        aTSlPicture.DrawContents;
    end;


end;

{-----------------------------------+
|   TTSMProcFileSize                |
+-----------------------------------}
(*
 *  TTSMProcFileSize.ProcessMsg - Process %%[FileSize: Msg
 *)

Procedure TTSMProcFileSize.ProcessMsg(argStr : Str255; itsDoc:TDocument); Override;
begin
    {$IFC qDebug}
    WriteLn('Process FileSize arg *', argStr,'*');
    {$ENDC}
    TTSMDocument(itsDoc).fFileSetter :=
        concat('TSM /jobfileoffset ',argStr,' put ');

    {$IFC qDebug}
    WriteLn('Process FileSize ', TTSMDocument(itsDoc).fFileSetter);
    {$ENDC}

end;



{-----------------------------------+
|   TTSMProcMemo                    |
+-----------------------------------}
(*
 *  TTSMProcMemo.ProcessMsg - Process %%[Memo: Msg
 *)

Procedure TTSMProcMemo.ProcessMsg(argStr : Str255; itsDoc:TDocument); Override;
var posn : integer;
```

```
FUNCTION GetNextIntegerToken: LONGINT;
VAR outnum: LONGINT;
BEGIN
    posn    :=  posn+1; {shift past the blank}
    argStr  :=  copy(argStr,posn,Length(argStr)-posn+1);
    posn    :=  pos(' ',argStr);
    StringToNum(copy(argStr,1,posn-1), outnum);
    GetNextIntegerToken := outnum;
END;

begin
  {$IFC qDebug}
  WriteLn('Process Memo ');
  {$ENDC}
  IF TTSMDocument(itsdoc).fStatusWindow <> NIL then
  BEGIN
      posn := 1;
      TTSMDocument(itsdoc).fmemo := GetNextIntegerToken;
      TTSMDocument(itsdoc).fsupply := GetNextIntegerToken;
      TTSMDocument(itsdoc).ftakeup := GetNextIntegerToken;
      TTSMDocument(itsdoc).fnumjobs := GetNextIntegerToken;

      TTSMDocument(itsdoc).UpdateStats;

  end;

end;

{-----------------------------------+
|   UpdateStats                     |
+-----------------------------------}
Procedure TTSMDocument.UpdateStats;
VAR
    feet, inches:               Longint;
    supplyInch, takeupInch:     Longint;
    aTSMStatusView:             TTSMStatusView;
    tmpStr,outStr:              STR255;
    aTCsPicture:                TTcsPicture;
    theSys:                     INTEGER;
    conValue:                   LONGINT;

BEGIN
    theSys      :=  fFileData.theMeasureSys;

    IF fStatusWindow <> NIL then
    BEGIN
        aTCsPicture :=  TTcsPicture(fStatusWindow.FindSubView('SPCT'));
        aTCsPicture.fDrawSpinnerOnly    :=  false;
        aTCsPicture.DrawContents;

        aTSMStatusView := TTSMStatusView(fStatusWindow.FindSubView('SDLG'));
    {   *** plug values into status window with re-draw
        *                                                               }
        supplyInch  :=  (fsupply + 50) div 100;
        IF (theSys = 0) then
        begin
            feet        :=  supplyInch div 12;
            inches      :=  supplyInch-feet*12;
            NumToString(feet,tmpStr);
            outStr  :=  concat(tmpStr,'''');
            NumToString(inches,tmpStr);
            outStr  :=  concat(outStr,tmpStr,'"');
        end
        else begin
```

```
            conValue    :=  Round((fsupply/100) * gConversionTable[theSys]);
            NumToString(conValue,outStr);
        end;
        TStaticText(aTSMStatusView.FindSubView('spln')).SetText(outStr,true);

        supplyInch  :=  (supplyInch *100) div fPageDivisor;
        NumToString(supplyInch,outStr);
        TStaticText(aTSMStatusView.FindSubView('sppg')).SetText(outStr,true);

        takeupInch  :=  (ftakeup) div 100;
        IF (theSys = 0) then
        begin
            feet        :=  takeupInch div 12;
            inches      :=  takeupInch-feet*12;
            NumToString(feet,tmpStr);
            outStr  :=  concat(tmpStr,'''');
            NumToString(inches,tmpStr);
            outStr  :=  concat(outStr,tmpStr,'"');
        end
        else begin
            conValue    :=  Round((ftakeup/100) * gConversionTable[theSys]);
            NumToString(conValue,outStr);
        end;
        TStaticText(aTSMStatusView.FindSubView('tuln')).SetText(outStr,true);

        takeupInch  :=  (takeupInch*100) div fPageDivisor;
        NumToString(takeupInch,outStr);
        TStaticText(aTSMStatusView.FindSubView('tupg')).SetText(outStr,true);

        NumToString(fnumjobs,outStr);
        TStaticText(aTSMStatusView.FindSubView('tujb')).SetText(outStr,true);

        NumToString(fResolution,outStr);
        TStaticText(aTSMStatusView.FindSubView('resl')).SetText(outStr,true);

        if (fli5status < 0) | (fli5status > 2)
        then    fli5status  :=  1;
        TStaticText(aTSMStatusView.FindSubView('itfc')).SetText(gInterFaceStrings[fli5status],true);

    end;
END;



FUNCTION TPostList.Compare(item1, item2: TObject):INTEGER; Override;
VAR ans:    INTEGER;

BEGIN
    ans :=  0;
    IF (TTSMPostMsg(item1).fKeyText
        < TTSMPostMsg(item2).fKeyText)
        THEN ans := -1;
    IF (TTSMPostMsg(item1).fKeyText
        > TTSMPostMsg(item2).fKeyText)
        THEN ans := 1;

    Compare :=  ans;
END;

Procedure TPostList.AddKey(KeyStr : Str32; ExecObj : TObject);
var aPostMsg : TTSMPostMsg;
    result :    Integer;

Begin
```

```
    New(aPostMsg);
    FailNil(aPostMsg);
    aPostMsg.fKeyText := KeyStr;
    aPostMsg.fExecObject := TTSMPostMsg(ExecObj);
    Insert(TObject(aPostMsg));
End;

Procedure TPostList.ExecKey(KeyString : Str255; itsDoc: TDocument);
var aKey : Str32;
    aStr : Str255;
    aPostMsg : TTSMPostMsg;
    ndx, ndx2 : integer;

    FUNCTION Matches(item:TObject): BOOLEAN;
    BEGIN
        Matches :=  (TTSMPostMsg(item).fKeyText = aKey)
    END;

begin
    ndx := pos(':', KeyString);
    aKey := copy(KeyString, 1, ndx);
    ndx2 := Length(KeyString) - ndx-1;
    aStr := copy(KeyString, ndx+1, ndx2);
    if aStr[Length(aStr)] = chr(10) then
        aStr := copy(aStr,1,Length(aStr)-1);
    if aStr[Length(aStr)] = chr(13) then
        aStr := copy(aStr,1,Length(aStr)-1);
    ndx := pos(']%%',aStr);
    if ndx <> 0 then
        aStr := copy(aStr, 1, ndx-1);
(*  {$IFC qDebug}
        WriteLn('Exec Key, arg *',aKey,'*, *',aStr,'*');
    {$ENDC}
*)
    aPostMsg := TTSMPostMsg(FirstThat(Matches));
    if aPostMsg <> NIL then
    begin
        aPostMsg.fExecObject.ProcessMsg(aStr,itsDoc);
    end
    else
        Begin
        {$IFC qDebug}
        WriteLn('Exec Key Unknown *',KeyString,'*');
        {$ENDC}
    end;

end;

{$S AInit}

PROCEDURE TTSMApplication.ITSMApplication(itsMainFileType: OSType);
VAR
    aTSMView:        TTSMView;
    aTSMViewP:       TTSMViewP;
    {aTDebugDialogView: TDebugDialogView;}
    aTSMConfigView:      TTSMConfigView;
    aTSMStatusView:      TTSMStatusView;
    aTSMInitializeView: TTSMInitializeView;
    aJobGridView:    TJobGridView;
    aHeadGridView:   THeadGridView;

    acallistView:            TcallistView;
    aOutlinedScroller:       TOutlinedScroller;
    aCalSelectDialogView:    TCalSelectDialogView;
```

```
    aCalDataDialogView:      TCalDataDialogView;
    aCalDataView:            TCalDataView;
    aExtendedText:           TExtendedText;
    aChangeOPopUp:           TChangeOPopUp;
    aStripDialogView:        TStripDialogView;
    aCommandButton:          TCommandButton;

    aDateTime:        LONGINT;
    aStr:             STR255;
    aTSMCoHandler:    TTSMCoHandler;
    aTCsPicture:      TTCsPicture;
    aTS1Picture:      TTS1Picture;
    aSmartNumberText: TSmartNumberText;
    i:                INTEGER;
    aWindow:          TWindow;
    aWindow2:         TWindow;
    aWindow3:         TWindow;
    MaxTime:          LONGINT;
    anEvent:          EventRecord;
    blowoff:          Boolean;

BEGIN

    IApplication(itsMainFileType);

    gConversionTable[0] :=  1;
    gConversionTable[1] :=  2.540;
    gConversionTable[2] :=  6.0;
    gConversionTable[3] :=  5.618;

    GetIndString(gUpdatingString,kGeneralStrings,4);

    for i := 1 to 4 do      { set up header strings }
    begin
        GetIndString(gHeadStrings[i-1],kHeadString,i);
    end;
    for i := 1 to 4 do      { set up units of measure strings   }
    begin
        GetIndString(gUnitTable[i-1],kMeasureSysStr,i);
    end;
    for i := 1 to 3 do      { set up feed and cut strings   }
    begin
        GetIndString(gFeedStrings[i-1],kGeneralStrings,i);
    end;
    for i := 1 to 5 do      { set up printer status strings }
    begin
        GetIndString(gStatusStrings[i-1],kPrinterStatus,i);
    end;
    for i := 1 to 3 do      { set up interface strings  }
    begin
        GetIndString(gInterFaceStrings[i-1],kInterFace,i);
    end;

    InitUTEView;
    InitUDialog;

{let start window display while registering types   }
{   aWindow := NewTemplateWindow(kStart1WindowID, NIL);}

    aWindow := NewTemplateWindow(kCMStart1WindowID, NIL);

    aWindow.Open;
    aWindow.DrawContents;
    MaxTime :=  TickCount;
```

```
   blowOff := false;
   aWindow3 := NewTemplateWindow(kStart3WindowID, NIL);
   if (GetResource('view',kStart2WindowID) <> NIL)          { if lino screen not there  }
   then    aWindow2 := NewTemplateWindow(kStart2WindowID, NIL)
   else    aWindow2 := NIL;                                  { dont display it           }


{ now register all of our types }

   NEW(aSmartNumberText);      FailNIL(aSmartNumberText);
   RegisterType('TSmartNumberText', aSmartNumberText);
   NEW(aJobGridView);      FailNIL(aJobGridView);
   RegisterType('TJobGridView', aJobGridView);
   NEW(aHeadGridView);      FailNIL(aHeadGridView);
   RegisterType('THeadGridView', aHeadGridView);
   NEW(aTSMView);      FailNIL(aTSMView);
   RegisterType('TTSMView', aTSMView);
   NEW(aTSMViewP);      FailNIL(aTSMViewP);
   RegisterType('TTSMViewP', aTSMViewP);
   NEW(aTSMConfigView);      FailNIL(aTSMConfigView);
   RegisterType('TTSMConfigView', aTSMConfigView);
   NEW(aTSMStatusView);      FailNIL(aTSMStatusView);
   RegisterType('TTSMStatusView', aTSMStatusView);
   NEW(aTSMInitializeView);      FailNIL(aTSMInitializeView);
   RegisterType('TTSMInitializeView', aTSMInitializeView);
   NEW(aTCsPicture);      FailNIL(aTCsPicture);
   RegisterType('TCsPicture', aTCsPicture);
   NEW(aTSlPicture);      FailNIL(aTSlPicture);
   RegisterType('TSlPicture', aTSlPicture);

   NEW(acallistView);      FailNIL(acallistView);
   RegisterType('TCalListView', acallistView);
   NEW(aOutlinedScroller);      FailNIL(aOutlinedScroller);
   RegisterType('TOutlinedScroller', aOutlinedScroller);
   NEW(aCalSelectDialogView);      FailNIL(aCalSelectDialogView);
   RegisterType('TCalSelectDialogView', aCalSelectDialogView);
   NEW(aCalDataDialogView);      FailNIL(aCalDataDialogView);
   RegisterType('TCalDataDialogView', aCalDataDialogView);
   NEW(aCalDataView);      FailNIL(aCalDataView);
   RegisterType('TCalDataView', aCalDataView);
   NEW(aExtendedText);      FailNIL(aExtendedText);
   RegisterType('TExtendedText', aExtendedText);
   NEW(aChangeOPopUp);      FailNIL(aChangeOPopUp);
   RegisterType('TChangeOPopUp', aChangeOPopUp);
   NEW(aStripDialogView);      FailNIL(aStripDialogView);
   RegisterType('TStripDialogView', aStripDialogView);
   NEW(aCommandButton);      FailNIL(aCommandButton);
   RegisterType('TCommandButton', aCommandButton);


   New(gProcLast);
   FailNil(gProcLast);
   New(gProcSJob);
   FailNil(gProcSJob);
   New(gProcEJob);
   FailNil(gProcEJob);
   New(gProcErr);
   FailNil(gProcErr);
   New(gProcPSErr);
   FailNil(gProcPSErr);
   New(gProcSta);
   FailNil(gProcSta);
   New(gProcVMSta);
   FailNil(gProcVMSta);
```

```
New(gProcDiskSta);
FailNil(gProcDiskSta);
New(gProcTimeSynch);
FailNil(gProcTimeSynch);
New(gProcMemo);
FailNil(gProcMemo);
New(gProcFileSize);
FailNil(gProcFileSize);
New(gProcFeednCut);
FailNil(gProcFeednCut);
New(gProcSpooler);
FailNil(gProcSpooler);
New(gProcStartUp);
FailNil(gProcStartUp);

New(gRIPMExecList);
FailNil(gRIPMExecList);
gRIPMExecList.IList;

gRIPMExecList.AddKey('%%[Last:', gProcLast);
gRIPMExecList.AddKey('%%[StartJob:', gProcSJob);
gRIPMExecList.AddKey('%%[EndJob:', gProcEJob);
gRIPMExecList.AddKey('%%[TSMERROR:', gProcErr);
gRIPMExecList.AddKey('%%[ Error:', gProcPSErr);
gRIPMExecList.AddKey('%%[TSMStatus:', gProcSta);
gRIPMExecList.AddKey('%%[DiskStatus:', gProcDiskSta);
gRIPMExecList.AddKey('%%[TimeSynch:', gProcTimeSynch);
gRIPMExecList.AddKey('%%[Memo:', gProcMemo);
gRIPMExecList.AddKey('%%[VMStatus:', gProcVMSta);
gRIPMExecList.AddKey('%%[FileSize:', gProcFileSize);
gRIPMExecList.AddKey('%%[FeednCut:', gProcFeednCut);
gRIPMExecList.AddKey('%%[Spooler:', gProcSpooler);
gRIPMExecList.AddKey('%%[StartUp:', gProcStartUp);

New(gCalProcRipSet);
FailNil(gCalProcRipSet);
New(gCalProcLast);
FailNil(gCalProcLast);
New(gCalProcSta);
FailNil(gCalProcSta);

New(gCalExecList);
FailNil(gCalExecList);
gCalExecList.IList;

gCalExecList.AddKey('%%[CalStatus:', gCalProcSta);
gCalExecList.AddKey('%%[RipSet:', gCalProcRipSet);
gCalExecList.AddKey('%%[Last:', gCalProcLast);
gCalExecList.AddKey('%%[ Error:', gProcPSErr);
gPAPres := NIL;

New(aTSMCoHandler);
FailNil(aTSMCoHandler);
aTSMCoHandler.fIdleFreq := 30;
InstallCoHandler(aTSMCoHandler,true);


for i := 1 to 5 do
begin
    gApplication.PollEvent;
end;
while ((TickCount - MaxTime) < ord4(4*60)) & (not blowOff) do
begin
    blowOff := GetNextEvent(mDownMask+keyDownMask, anEvent);
```

```
    end;
    if blowOff then
        while not GetNextEvent(mUpMask+keyUpMask, anEvent) do ;
    aWindow.Close;

    if (not blowoff) then
    begin
        aWindow3.Open;
        aWindow3.DrawContents;
        MaxTime :=  TickCount;
        blowOff := false;
        while ((TickCount - MaxTime) < ord4(2*60)) & (not blowOff) do
            blowOff := GetNextEvent(mDownMask+keyDownMask, anEvent);
        if blowOff then
            while not GetNextEvent(mUpMask+keyUpMask, anEvent) do ;
        aWindow3.Close;

        if (aWindow2 <> NIL) then
        begin
            if (not blowoff) then
            begin
                aWindow2.Open;
                aWindow2.DrawContents;
                MaxTime :=  TickCount;
                blowOff := false;
                while ((TickCount - MaxTime) < ord4(2*60)) & (not blowOff) do
                    blowOff := GetNextEvent(mDownMask+keyDownMask, anEvent);
                if blowOff then
                    while not GetNextEvent(mUpMask+keyUpMask, anEvent) do ;
                aWindow2.Close;
            end
            else begin
                aWindow2.Free;
            end;
        end;
    end
    else begin
        aWindow3.Free;
        if (aWindow2 <> NIL) then
        begin
            aWindow2.Free;
        end;
    end;

    GetDateTime(aDateTime);
{$IFC qDebug}
    WriteLn('the time is: ',aDateTime);
    NumToString(aDateTime,aStr);
    WriteLn('*',aStr,'*');
{$ENDC}


END;

{$S AOpen}
PROCEDURE TTSMApplication.GetPrinterName
                            (VAR PrinterName:STR255; VAR result: INTEGER);
        {poke around the resource files and grab this stuff}

VAR
    crefnum:    INTEGER;
    prefnum:    INTEGER;
    brefnum:    INTEGER;
    volname:    STR255;
```

```
    sysvolname: STR255;
    oserror:    INTEGER;
    printerrefnum:  INTEGER;
    resattrs:   INTEGER;
    xpram:      LONGINT;
    xperr:      INTEGER;
    rSTR:       Handle;             {handle to string resource}
    sometext:   STR255;


    FUNCTION BuildNameFromPAP(rPName: Handle): STR255;
    VAR
        numchars:       INTEGER;
        aDest:          Ptr;
        aSource:        PTR;
        aString:        STR255;
        outString:      STR255;
    BEGIN
        aSource     :=  rPName^;
        numchars    :=  INTEGER(aSource^)+1;
        aDest       :=  @aString;

        BlockMove(aSource,aDest,numchars);
        {$IFC qDebug}
            WriteLn('1st name pick = ',aString);
        {$ENDC}
        outString   :=  aString;

                                        {snag the type, if any, but ignore}
        aSource :=  PTR(ORD(aSource)+numchars);
        numchars    :=  INTEGER(aSource^)+1;
        BlockMove(aSource,aDest,numchars);
        {$IFC qDebug}
            WriteLn('2nd name pick = ',aString);
        {$ENDC}

        aSource :=  PTR(ORD(aSource)+numchars);
        numchars    :=  INTEGER(aSource^)+1;
        BlockMove(aSource,aDest,numchars);
        {$IFC qDebug}
            WriteLn('3rd name pick = ',aString);
        {$ENDC}
        IF aString <> '*' THEN
        BEGIN
            outString   :=  concat(outString,'@',aString);
        END;
        {$IFC qDebug}
            WriteLn('final name = ',outString);
        {$ENDC}

        BuildNameFromPAP := outString;
    END;

BEGIN
    result  :=  0;              {good result}
    rSTR := GetResource(kSTRType,kPrinterID);
    IF rSTR <> NIL THEN
    BEGIN
        LoadResource(rSTR);             {because printer name is purgable!}
        sometext := hSTR(rSTR)^^;
        {$IFC qDebug}
        WriteLn('printer file is - ',sometext);
        {$ENDC}
        crefnum := CurResFile;              {get current resource file  }
```

```
        UseResFile(0);                    {set srch path to system    }
        prefnum := CurResFile;            {get path refnum to system  }
        UseResFile(crefnum);              {set srch back}
        FailOsErr(GetVRefNum(prefnum,brefnum));
        (*{$IFC qDebug}
        Writeln('current pathrefnum ',crefnum);
        Writeln('syspathrefnum ',prefnum);
        WriteLn('vol ref of sys, err ',brefnum,oserror);
        {$ENDC}*)
        FailOSErr(GetVol(@volname,crefnum));
        (*{$IFC qDebug}
        WriteLn('current volume is - ',volname);
        WriteLn('ready for the NIL,bootrefnum setvol');
        {$ENDC} *)

        FailOSErr(SetVol(NIL,brefnum));
        (*{$IFC qDebug}
            WriteLn('setvol ok');
            FailOSErr(GetVol(@sysvolname,brefnum));
            WriteLn('System volume is - ',sysvolname);
            WriteLn('ready to open the resfile: ',sometext);
        {$ENDC} *)

        printerrefnum := OpenResFile(sometext);
        FailOSErr(ResError);              {func returns resource error}
        (*{$IFC qDebug}
            WriteLn('ready to set default volume back');
        {$ENDC}*)
        FailOSErr(SetVol(@volname,crefnum));     {put default vol back      }
        (*{$IFC qDebug}
            WriteLn('ready to get the resource');
        {$ENDC}*)
        rSTR := GetResource(kPAPAType,kPrinterID);
        IF rSTR <> NIL THEN
        BEGIN
            sometext := hSTR(rSTR)^^;

            {$IFC qDebug}
            WriteLn('printer name is - ',sometext);
            {$ENDC}
            IF sometext <> '' THEN
            BEGIN
                PrinterName := BuildNameFromPAP(rSTR);

            END
            ELSE BEGIN
                result  :=  phSysTooOld;
            END;
        END
        ELSE BEGIN
            result  :=  phNoPrinterName;
        END;
        CloseResFile(printerrefnum);      {and done with printer driver}
    END
    ELSE BEGIN
        result  :=  phNotLW;
    END;
END;

PROCEDURE TTSMApplication.DoSetupMenus; OVERRIDE;
begin
    INHERITED DoSetupMenus;
    Enable(cNewCal,TRUE);
    Enable(cOpenCal,TRUE);
```

```
end;

PROCEDURE TTSMApplication.SFGetParms(itsCmdNumber: CmdNumber;
                                     VAR dlgID: INTEGER;
                                     VAR where: Point;
                                     VAR fileFilter, dlgHook,
                                     filterProc: ProcPtr;
                                     typeList: HTypeList); OVERRIDE;

BEGIN
    INHERITED SFGetParms(itsCmdNumber, dlgID, where, fileFilter, dlgHook,
                         filterProc, typeList);

    CASE itsCmdNumber OF
        cOpen:
            {main doc type is already ; nothing further to do};
        cOpenCal:
            begin
            SetHandleSize(Handle(typeList), 8 {i.e., allow for 2 file types});
                typeList^^[1] := kOldFileTypeCal;
                typeList^^[2] := kFileTypeCal;
            end;
        OTHERWISE
                {IMPORTANT: The "otherwise" case handles both the general
                    Open command and the case of opening either type of
                    document from the Finder}
            BEGIN
            SetHandleSize(Handle(typeList), 8 {i.e., allow for 2 file types});
            {typeList^^[1] is already the main file type (kfiletype)}
            typeList^^[1] := koldFileTypeCal;
            typeList^^[2] := kFileTypeCal;
            END;
        END;
END;


FUNCTION  TTSMApplication.DoMakeDocument(itsCmdNumber: CmdNumber):TDocument; OVERRIDE;
    VAR aTSMDocument:   TTSMDocument;
        aCALDocument:   TCALDocument;
    aDateTime:          Longint;
    printerNameFromChooser: STR255;
    result:             Integer;

BEGIN
    { Allocate and initialize the document}

    if (itsCmdNumber = cNew) then
    begin

        New(aTSMDocument);
        FailNil(aTSMDocument);

        aTSMDocument.fPAPdres:= NIL;
        aTSMDocument.IDocument(kFileType, kSignature, kUsesDataFork,
                NOT kUsesRsrcFork, NOT kDataOpen, NOT kRsrcOpen);

        LoadPAPdriver;
        with aTSMDocument do
        begin
            fPAPdres:= gPAPRes;
            DetachResource(fPAPdres);
            fSavePrintInfo := TRUE;
            fPapSession :=  NIL;            {dont flip pap out}
```

```
fPapPhase    :=  silentPhase;    {nil condition}
fConfigWindow   :=  NIL;
fJobWindow      :=  NIL;
fStatusWindow   :=  NIL;
fInitStatusWindow       :=  NIL;
fErrorStr       := '';
fUpdateCnt      := 0;
fUpdateTim      := 60*60;        {update once per minute}
fJobGrid        := NewList;
fFileSetter     := '';
fNeedsSpecialPap    :=  False;
fSpecialPapPhase    :=  silentSPhase;
fNeedsJobUpdate := False;
fNeedsCut       := False;
fNeedsReload    := False;
fNeedsClearLog  := False;

fPageDivisor    :=  1100;
fmemo           :=  0;
fsupply         :=  0;
ftakeup         :=  0;
fnumjobs        :=  0;

fBaseTime       :=  0;
fNeedsFirstSynch    :=  TRUE;
fFirstMacTime   :=  0;
fTotalJobTime   :=  0;

GetDateTime(aDateTime);
fLastMacTime    :=  aDateTime;
fStatusTime := TickCount;

fInsertNext     :=  1;
fMemGotFull     :=  false;
fMemFullAck     :=  false;
fIdleFreq       :=  10;
fJobViewP       :=  NIL;

fUtil           :=  0;
fVMTotal        :=  0;
fResolution     :=  0;
fli5status      :=  0;

fVMUsed         :=  0;
fUserDiskPercent:=  0;
fDiskTotal      :=  0;
fDiskFree       :=  0;


fFileData.theVersionNumber  :=  '1.6B5';
fFileData.theRollLength     :=  1800;
fFileData.theFeedLength     :=  8;
fFileData.theDispStatus     :=  FALSE;
fFileData.theDispJobLog     :=  FALSE;
fPrinterName    :=  '';
fIsPrinting     :=  False;
fFileData.theConfigWPos.h   :=  0;
fFileData.theConfigWPos.v   :=  0;
fFileData.theJobWPos.h  :=  0;
fFileData.theJobWPos.v  :=  0;
fFileData.theStatWPos.h :=  0;
fFileData.theStatWPos.v :=  0;

fFileData.theMeasureSys :=  0;  { default inches }
```

```
     end;
        GetPrinterName(printerNameFromChooser,result);
        {$IFC qDebug}
            WriteLn('result, pname = ',result,printerNameFromChooser);
        {$ENDC}
        IF result = 0 THEN                          {preset printer name}
        BEGIN
            aTSMDocument.fPrinterName    :=  printerNameFromChooser;
        END;

     DoMakeDocument := aTSMDocument;
 end { Ripmaster Document}

 else begin

     {calibrator document}

     { check if enough memory for one of our documents }

     IF (FreeMem <= 30*1024) then
         FailNil(NIL);
     New(aCALDocument);
     FailNil(aCALDocument);

     aCALDocument.fPAPdres:= NIL;
     aCALDocument.IDocument(kFileTypeCal, kSignature, kUsesDataFork,
            NOT kUsesRsrcFork, NOT kDataOpen, NOT kRsrcOpen);

     LoadPAPdriver;
     with aCALDocument do
     begin
         fPAPdres:= gPAPRes;
         DetachResource(fPAPdres);
         fSavePrintInfo       := FALSE;
         fPapSession          :=  NIL;          {dont flip pap out}
         fPapPhase            :=  silentPhase;  {nil condition}
         fNeedsSpecialPap     :=  FALSE;
         fInitStatusWindow       :=  NIL;

         fFileData.theVersionNumber  :=  '1.1';
         fPrinterName    :=  '';
         fFileData.theConfigWPos.h   :=  0;
         fFileData.theConfigWPos.v   :=  0;

         fLocalSets  :=  NewList;
         fRIPSets    :=  NewList;

     end;
     GetPrinterName(printerNameFromChooser,result);
     {$IFC qDebug}
         WriteLn('result, pname = ',result,printerNameFromChooser);
     {$ENDC}
     IF result = 0 THEN                          {preset printer name}
     BEGIN
         aCALDocument.fPrinterName    :=  printerNameFromChooser;
     END;

     DoMakeDocument := aCALDocument;

   end;
{$IFC qDebug}
WriteLn('finished making document');
```

```
{$ENDC}
END;


FUNCTION  TTSMApplication.KindOfDocument(itsCmdNumber: CmdNumber;
                                    itsPAppFile: PAppFile): CmdNumber;
            OVERRIDE;
    VAR itsFileType: OSType;
BEGIN
    IF itsCmdNumber = cFinderNew THEN
        KindOfDocument := cNewCal   {app's icon opened from the Finder;
                                        launch box doc}
    ELSE
    IF itsPAppFile = NIL THEN
        KindOfDocument := itsCmdNumber
    ELSE
        {otherwise, must be an existing disk file; look at file-type}
        BEGIN
        itsFileType := itsPAppFile^.fType;
        IF itsFileType = kFileType THEN
            KindOfDocument := cNew
        ELSE
        IF itsFileType = kFileTypeCal THEN
            KindOfDocument := cNewCal
        ELSE
        IF itsFileType = kOldFileTypeCal THEN
            KindOfDocument := cNewCal
{$IFC qDebug}
        ELSE
            ProgramBreak('No Kind of Doc matched')
{$ENDC};
        END;
END;


{$S ADoCommand}
FUNCTION  TTSMApplication.DoMenuCommand(aCmdNumber: CmdNumber):TCommand; override;
VAR aWindow:    TWindow;
    theDialog:  TDialogView;
    dismisser:  IDType;
Begin
    if (aCmdNumber = cAboutApp) then
        begin
            aWindow := NewTemplateWindow(kAboutWindowID, NIL);
            theDialog := TDialogView(aWindow.FindSubView('DLOG'));
            aWindow.fTarget :=  TEvtHandler(theDialog);
            dismisser := theDialog.PoseModally;
            {$IFC qDebug}
            WriteLn('Install dismissed - ',dismisser);
            {$ENDC}
            aWindow.Close;
            DoMenuCommand   :=  gNoChanges;
        end
        else begin
            DoMenuCommand   :=  INHERITED DoMenuCommand(aCmdNumber);
        end;
end;


Procedure TCalSetObj.SendCalPS(aPAPSession: TTSMPapSession);
var aStr:   str255;
    bStr:   str255;
    outStr: str255;
```

```
    dString:        DecStr;
    Mask:           DecForm;
    extValue:       Extended;
    ndx:            Integer;
    strLineFeed:    string[2];

begin
    strLineFeed[0]  :=  chr(1);
    strLineFeed[1]  :=  chr(13);

    aStr    := 'download calibration set';
    aPAPSession.fWriteStr := '{} ';
    aPAPSession.WritePs(kpostUseStr,aStr);          {send spot func}

    Mask.digits := 4;
    Mask.style := FixedDecimal;

    outStr  :=  '[ ';

    for ndx:=0 to kNumCalPoints  do
    begin
        extValue    :=  fCalData.theActuals[ndx] / 100.00;
        Num2Str ( Mask , extValue , dString );
        outStr  :=  concat(outStr,dString,' ');
    end;

    outStr  :=  concat(outStr,']',strLineFeed);

{$IFC qDebug}
WriteLn('and the actuals are:',outStr);
{$ENDC}

    aPAPSession.fWriteStr := outStr;
    aPAPSession.WritePs(kpostUseStr,aStr);          {send actuals       }


    outStr  :=  '[ ';

    for ndx:=0 to kNumCalPoints  do
    begin
        extValue    :=  fCalData.theTheoreticals[ndx];
        Num2Str ( Mask , extValue , dString );
        outStr  :=  concat(outStr,dString,' ');
    end;

    outStr  :=  concat(outStr,']',strLineFeed);

    aPAPSession.fWriteStr := outStr;
    aPAPSession.WritePs(kpostUseStr,aStr);          {send theoreticals  }

    if (fCalData.theNegDot)
        then    outStr  :=  'true  '
        else    outStr  :=  'false ';               { set negxfer       }

    extValue    :=  fCalData.theCalTo;
    Num2Str ( Mask , extValue , dString );
    outStr  :=  concat(outStr,dString,' ');

    extValue    :=  fCalData.theCalFrom;
    Num2Str ( Mask , extValue , dString );
    outStr  :=  concat(outStr,dString,' ');

    extValue    :=  fCalData.theCalPoint;
    Num2Str ( Mask , extValue , dString );
```

```
    outStr  :=  concat(outStr,dString,' ');

    extValue    :=  fCalData.theLineScreen;
    Num2Str ( Mask , extValue , dString );
    outStr  :=  concat(outStr,dString,' ');

    extValue    :=  fCalData.theExposureIntensity;
    Num2Str ( Mask , extValue , dString );
    outStr  :=  concat(outStr,dString,' ');

    NumToString ( fCalData.theResolution,bStr );
    outStr  :=  concat(outStr,bStr,' ');

    outStr  :=  concat(outStr,'(',fCalData.theMedia,') ');

    outStr  :=  concat(outStr,'(',fCalData.theName,') ');

    outStr  :=  concat(outStr,'buildcalset ',strLineFeed);

    aPAPSession.fWriteStr := outStr;
    aPAPSession.WritePs(kpostUseStr,aStr);          {send rest of command       }

end;


{SS ARes2}
Procedure TTSMCoHandler.DoIdle(phase : IdlePhase); override;
    procedure RunIdlePAP(item : TObject);
    begin
        TPapDocument(item).DoPAPIdle;
    end;

Begin
    IF phase = idleContinue THEN
        gDocList.Each(RunIdlePAP);
end;


(*************************************************************************************)
(*      T P a p D o c u m e n t                                                     *)
(*************************************************************************************)
{----------------------------------+
|   InitiatePap                    |
+----------------------------------}
Procedure TPapDocument.InitiatePAP(thePapName: STR255; theExecList: TPostList);
VAR
    aPapSession :   TTSMPAPSession;
    reply : Integer;
    slag:   Boolean;

    FUNCTION BuildPapName(thePrinterName: STR255): PAPAName;
    VAR ObjTypeZone:    PAPAName;
        numchars:       INTEGER;
        cp,
        iColon,
        iAtSign:        INTEGER;
        aDest:          Ptr;
        LwName,
        lTypeName,
        lZoneName:      STRING[32];
    BEGIN
        lTypeName := 'LaserWriter';
        lZoneName := '*';
```

```
        cp  :=  1;

        iColon  :=  Pos(':',thePrinterName);
        iAtSign :=  Pos('@',thePrinterName);

        IF (iAtSign = 0) THEN
            iAtSign :=  Length(thePrinterName)+1;

        IF (iColon = 0) OR (iColon > iAtSign) THEN
            iColon  :=  iAtSign;

        LwName   :=  Copy(thePrinterName,cp,MIN(kMaxPAPLength,iColon-cp));
        cp       :=  1 + iColon;

        IF ((iAtSign-iColon) > 0) THEN
            lTypeName   :=  Copy(thePrinterName,cp,MIN(kMaxPAPLength,
                                                iAtSign-iColon-1));
        cp       :=  1 + iAtSign;

        IF ((Length(thePrinterName)-iAtSign) > 0) THEN
            lZoneName   :=  Copy(thePrinterName,cp,MIN(kMaxPAPLength,
                                                Length(thePrinterName)-iAtSign));

        numchars := Length(LwName)+1;
        aDest := @ObjTypeZone;
        BlockMove(@LwName,aDest,numchars);

        aDest := Ptr(ord(aDest)+numchars);
        numchars := Length(lTypeName)+1;
        BlockMove(@lTypeName,aDest,numchars);

        aDest := Ptr(ORD(aDest)+numchars);
        numchars := Length(lZoneName)+1;
        BlockMove(@lZoneName,aDest,numchars);
        BuildPapName := ObjTypeZone;
    {$IFC qDebug}
    WriteLn(LwName,':',lTypeName,'@',lZoneName);
    {$ENDC}
    END;
begin
    {$IFC qDebug}
    WriteLn('Starting with IPAP');
    {$ENDC}

    New(aPapSession);
    FailNil(aPapSession);
    HLock(Handle(aPapSession));
    aPapSession.fDocument    :=  TDocument(SELF);
    fPapsession := aPapSession;
    aPapsession.fNeedsClose := FALSE;
    aPapSession.fExecList := theExecList;
    fIdleFreq := 30;
    aPapsession.IPapSession('TypeSet Mgr', fPAPdRes);

    fDoingReset :=  false;


    {$IFC qDebug}
    WriteLn('Finished with IPAP');
    {$ENDC}

    fPrinterName    :=  thePapName;
```

```
    fPaPaName := BuildPapName(thePapName);


    {$IFC qDebug}
    WriteLn('Starting OpenSession: ',thePapName);
    {$ENDC}
        reply := aPapSession.OpenSession(fPaPaName);
    {$IFC qDebug}
    WriteLn('Reply OpenSession', reply);
    {$ENDC}
    fPapPhase  :=  openingPhase;   {for now}
end;

{-----------------------------------+
|   DoIdle                          |
+-----------------------------------}
Procedure TPapDocument.DoPapIdle;
begin
    { do nothing }
end;



{********************************************************************************}
{*      T T S M D o c u m e n t                                                 *}
{********************************************************************************}



{-----------------------------------+
|   DoIdle                          |
+-----------------------------------}
Procedure TTSMDocument.DoIdle(phase: IdlePhase); OVERRIDE;
VAR theHeader:  TSMFileHeader;
    pName:      STR255;
    numBytes:   LONGINT;
    {-----------------------------------+
    |   MakeMemFullDialog               |
    +-----------------------------------}
    PROCEDURE MakeMemFullDialog;

    VAR
        aWindow:        TWindow;
        theDialog:      TDialogView;
        dismisser:      IDType;

    BEGIN
        aWindow := NewTemplateWindow(kMemFullWindowID, NIL);
        theDialog := TDialogView(aWindow.FindSubView('MEMF'));
        theDialog.ParamTxt('^0', fPrinterName);
        aWindow.fTarget :=  TEvtHandler(theDialog);
        dismisser := theDialog.PoseModally;
        {$IFC qDebug}
        WriteLn('dismissed - ',dismisser);
        {$ENDC}
        aWindow.Close;
        aWindow.Free;
    END;

begin
    IF (phase = idleContinue) THEN
    begin
```

```
        IF (fMemGotFull and (not fMemFullAck)) then
        begin
            MakeMemFullDialog;
            fMemFullAck :=  True;
        end;

        TEditText(fConfigWindow.FindSubView('tsnm')).GetText(pName);
        WITH theHeader DO begin
            theRollLength       :=  TSmartNumberText(fConfigWindow.FindSubView('rlsz')).GetInchValue;
            theFeedLength       :=  TSmartNumberText(fConfigWindow.FindSubView('fdsz')).GetInchValue;
            theDispStatus       :=  TCheckBox(fConfigWindow.FindSubView('swds')).IsOn;
            theDispJobLog       :=  TCheckBox(fConfigWindow.FindSubView('jwds')).IsOn;
        end;

        IF (fPrinterName <> pName)  then
        begin
            fPrinterName    :=  pName;
            fChangeCount    :=  fChangeCount+1;
            DoSetUpMenus;

        end;
        IF (fFileData.theRollLength <> theHeader.theRollLength) then
        begin
            fFileData.theRollLength :=  theHeader.theRollLength;
            fChangeCount    :=  fChangeCount+1;
        end;
        IF (fFileData.theFeedLength <> theHeader.theFeedLength) then
        begin
            fFileData.theFeedLength :=  theHeader.theFeedLength;
            fChangeCount    :=  fChangeCount+1;
        end;
        IF (fFileData.theDispStatus <> theHeader.theDispStatus) then
        begin
            fFileData.theDispStatus :=  theHeader.theDispStatus;
            fChangeCount    :=  fChangeCount+1;
        end;
        IF (fFileData.theDispJobLog <> theHeader.theDispJobLog) then
        begin
            fFileData.theDispJobLog :=  theHeader.theDispJobLog;
            fChangeCount    :=  fChangeCount+1;
        end;
    end;
    inherited DoIdle(phase);
end;

{$S ADoCommand}
{-----------------------------------+
|   MakeStatusView                  |
+-----------------------------------}
Procedure TTSMDocument.MakeStatusView;
VAR
    aWindow:            TWindow;
    aDialogView:        TDialogView;
    aPopup:             TPopup;
    aTCsPicture:        TTCsPicture;
    aTSLPicture:        TTSLPicture;
    aPt:                Point;
BEGIN
    SetPt(aPt,0,0);
    aWindow         := NewTemplateWindow(kTSMStatusWindowID, SELF);
    fStatusWindow   :=  aWindow;

    IF (fFileData.theStatWPos.h <> 0) then
    begin
```

```
        MoveWindow(aWindow.fWMgrWindow,fFileData.theStatWPos.h,fFileData.theStatWPos.v,FALSE);
        aWindow.ForceOnScreen;
    end;


    aDialogView := TDialogView(aWindow.FindSubView('SDLG'));
    IF gConfiguration.hasHierarchicalMenus THEN
        aPopup := TPopup(DoCreateViews(NIL, aDialogView, cPSizePopup));
    fStatusTime :=  TickCount;

    aWindow.SetTitleForDoc(concat(fPrinterName,' Status'));
    aTCsPicture :=  TTCsPicture(aWindow.FindSubView('SPCT'));
    aTCsPicture.fCassettePhase  :=  0;
    aTCsPicture.fDrawSpinnerOnly    :=  False;
    aTCsPicture.fDocument           :=  SELF;

    aTSLPicture :=  TTSLPicture(aWindow.FindSubView('TPCT'));
    aTSLPicture.fDocument           :=  SELF;

    aWindow.Open;
END;

{-----------------------------------+
|   MakeJobGridView                 |
+-----------------------------------}
Procedure TTSMDocument.MakeJobGridView;
VAR
    aWindow:            TWindow;
    aTSMView:           TTSMView;
    aTSMViewp:          TTSMViewP;
    aTSMConfigView:     TTSMConfigView;
    aHandler:           TStdPrintHandler;
    theJobGridView:     TJobGridView;
    theHeadGridView:    THeadGridView;
    theJobGridViewp:    TJobGridView;
    theHeadGridViewp:   THeadGridView;
    Scroller1:          TScroller;
    Scroller2:          TScroller;
    aSScrollBar:        TSScrollBar;
    pName:              STR255;
    aPt:                POINT;

BEGIN
    SetPt(aPt,0,0);
    aWindow         := NewTemplateWindow(kTSMWindowID, SELF);
    fJobWindow      :=  aWindow;

    IF (fFileData.theJobWPos.v <> 0) then
    begin
        MoveWindow(aWindow.fWMgrWindow,fFileData.theJobWPos.h,fFileData.theJobWPos.v,FALSE);
        aWindow.ForceOnScreen;
    end;



    aTSMView        := TTSMView(aWindow.FindSubView('TSMG'));
    fJobView        :=  aTSMView;
    aTSMViewp       :=  TTSMViewP(DoCreateViews (SELF,NIL, kTSMWindowIDp));


    theJobGridView  := TJobGridView(aTSMView.FindSubView('jgrd'));
    theJobGridView.DelRowLast(theJobGridView.fnumOfRows);
    theJobGridViewp     := TJobGridView(aTSMViewp.FindSubView('jgrp'));
    theJobGridViewp.DelRowLast(theJobGridViewp.fnumOfRows);
```

```
    theJobGridView.SetColWidth(1,1,480);
    theJobGridView.SetSingleSelection(TRUE);
    theJobGridViewp.SetColWidth(1,1,432);
    theJobGridViewp.SetSingleSelection(TRUE);

    theHeadGridView      := THeadGridView(aTSMView.FindSubView('jghd'));
    theHeadGridViewp     := THeadGridView(aTSMViewp.FindSubView('jghp'));

    theHeadGridView.SetColWidth(1,1,480);
    theHeadGridViewp.SetColWidth(1,1,432);

{   *** Synchronize the scroll views to the same horiz scroll bar
*                                                                   }
    { get headings grid scroller     }
    Scroller1    := TScroller(aTSMView.FindSubView('SCRH'));
    { get main job grid scroller     }
    Scroller2    := TScroller(aTSMView.FindSubView('SCRL'));
    aSScrollBar := Scroller2.fScrollBars[h];
    aSScrollBar.fScrollers.InsertFirst(Scroller1);

{   *** plug static text printer name from config window
*                                                                   }
    aTSMConfigView       := TTSMConfigView(SELF.fConfigWindow.FindSubView('DLOG'));
    TEditText(aTSMConfigView.FindSubView('tanm')).GetText(pName);
    TStaticText(aTSMView.FindSubView('ganm')).SetText(pName,false);
    TStaticText(aTSMViewp.FindSubView('ganp')).SetText(pName,false);

    New(aHandler);
    FailNIL(aHandler);
    aHandler.IStdPrintHandler(SELF,      { its document                      }
        aTSMViewp,                       { its view                          }
        TRUE,                            { has square dots                   }
        FALSE,                           { horzontal page size is fixed      }
        FALSE);                          { vertical page size is notfixed    }
    fJobViewP        :=  aTSMViewp;

    aWindow.SetTitleForDoc(concat(fPrinterName,' Job Log'));
    aWindow.Open;

end;

{$S ARes2}
{-----------------------------------+
|   DoSetUpMenus                    |
+-----------------------------------}
PROCEDURE TTSMDocument.DoSetUpMenus; override;
var pName: STR255;
begin
    inherited DoSetUpMenus;
    IF (fConfigWindow <> NIL) then
    begin
        TEditText(fConfigWindow.FindSubView('tanm')).GetText(pName);
        IF ((pName <> '') and (not fNeedsSpecialPap)) then
        begin
            Enable(cJobLogWindow,TRUE);
            Enable(cStatusWindow,TRUE);
            Enable(cInstall,TRUE);
            Enable(cRemove,TRUE);
            Enable(cInstallSlug,TRUE);
            Enable(cRemoveSlug,TRUE);
        end
        else begin
            Enable(cJobLogWindow,false);
```

```
            Enable(cStatusWindow,false);
            Enable(cInstall,false);
            Enable(cRemove,false);
            Enable(cInstallSlug,false);
            Enable(cRemoveSlug,false);
        end;
    end;
    Enable(cUSLetter,TRUE);
    Enable(cLetterSideways,TRUE);
    Enable(cLetterExtra,TRUE);
    Enable(cLetterExtraSideways,TRUE);
    Enable(cUSLegal,TRUE);
    Enable(cA4Letter,TRUE);
    Enable(cB5Letter,TRUE);
    Enable(cTabloid,TRUE);
    IF (fPapPhase <> silentPhase) then
    begin
        Enable(cPrint,FALSE);
        Enable(cPrintOne,FALSE);
    end;
end;
{-----------------------------------+
|  DoSetUpMenus                     |
+-----------------------------------}
PROCEDURE TCALDocument.DoSetUpMenus; override;
var pName:      STR255;
    numItems:   integer;

procedure countitems(anItem: Integer);
begin
    numItems            :=  numItems+1;
    fLastItemSelected   :=  anItem;
end;

procedure countripitems(anItem: Integer);
begin
    numItems               :=  numItems+1;
    fLastRipItemSelected    :=  anItem;
end;

begin
    inherited DoSetUpMenus;
    Enable(cbtcr,TRUE);

    TEditText(fConfigWindow.FindSubView('tanm')).GetText(pName);
    IF ((pName <> '') and (not fNeedsSpecialPap)) then
    begin
        Enable(cbtgs,TRUE);
        Enable(cbtdl, (fLocalSets.fSize <> 0));

        Enable(cCalRemove,TRUE);
        Enable(cCalInstall,TRUE);
        Enable(cImageTestStrip,TRUE);
        Enable(cCheckCalibration,TRUE);

    end;
(*
    end
    else begin
        Enable(cbtgs,false);
        Enable(cbtdl,false);
        Enable(cbtul,false);
    end;
*)
```

```
    numItems    :=  0;
    fLocalCalListView.EachSelectedItemDo(countItems);
    Enable(cbtmd, (numItems = 1));
    Enable(cbtrm, (numItems = 1));

    numItems    :=  0;
    fRIPCalListView.EachSelectedItemDo(countRipItems);
    Enable(cbtvr, (numItems = 1));

end;

{$S ASelCommand}
{-----------------------------------+
|   DoMenuCommand                   |
+-----------------------------------}
FUNCTION TTSMDocument.DoMenuCommand(aCmdNumber: CmdNumber): TCommand; override;
VAR aWindow:    TWindow;
    theDialog:  TDialogView;
    dismisser:  IDType;

    where:      Point;
    prompt:     Str255;
    reply:      SFReply;
    theTypeList:    SFTypeList;


Begin
    CASE aCmdNumber OF

    cJobLogWindow:
        begin
            IF (fJobWindow = NIL) THEN
            BEGIN
                MakeJobGridView;
                fFileSetter     := '';
                fNeedsJobUpdate :=  TRUE;
            END
            ELSE BEGIN
                fJobWindow.Select;
            END;
            DoMenuCommand   :=  gNoChanges;
        end;
    cStatusWindow:
        begin
            IF (fStatusWindow = NIL) THEN
            BEGIN
                MakeStatusView;
                fNeedsJobUpdate :=  TRUE;
                END
            ELSE BEGIN
                fStatusWindow.Select;
            END;
            DoMenuCommand   :=  gNoChanges;
        end;

    cInstall:
        begin
            aWindow := NewTemplateWindow(kInstallWindowID, NIL);
            theDialog := TDialogView(aWindow.FindSubView('DLOG'));
            aWindow.fTarget :=  TEvtHandler(theDialog);
            dismisser := theDialog.PoseModally;
            {$IFC qDebug}
            WriteLn('Install dismissed - ',dismisser);
            {$ENDC}
```

```
        IF (dismisser = 'insl') then
        begin
            if (fStatusWindow <> NIL)   then fStatusWindow.Close;
            if (fJobWindow <> NIL)      then fJobWindow.Close;
            fNeedsSpecialPap     :=  True;
            fSpecialPapPhase     :=  queryPhase; {download temp TSM file}
            IF fPapPhase = silentPhase then fPapPhase    :=  NeedOpenPhase;
        end
        else begin
            fNeedsSpecialPap     :=  False;
            fSpecialPapPhase     :=  silentSPhase;
        end;
        aWindow.Close;
        aWindow.Free;

        DoMenuCommand   :=  gNoChanges;

    end;

cInstallSlug:
    begin
        aWindow := NewTemplateWindow(kInstallJobSlugWindowID, NIL);
        theDialog := TDialogView(aWindow.FindSubView('DLOG'));
        aWindow.fTarget :=  TEvtHandler(theDialog);
        dismisser := theDialog.PoseModally;
        {$IFC qDebug}
        WriteLn('Install dismissed - ',dismisser);
        {$ENDC}
        aWindow.Close;
        aWindow.Free;
        IF (dismisser = 'insl') then
        begin
            where.h :=  100; where.v := 100;
            theTypeList[0]   :=  'TEXT';
            Prompt   :=  'Select PostScript File';
            SFGetFile(where,prompt,NIL,1,theTypeList,NIL,reply);
            {$IFC qDebug}
            WriteLn('reply info = ',reply.good,reply.vrefnum,reply.fName);
            {$ENDC}

            IF (reply.good) then
            begin
                fvRefNum     :=  reply.vrefnum;
                fFileName    :=  reply.fName;
                fNeedsSpecialPap     :=  True;
                fSpecialPapPhase     :=  installAltSlug; {download temp TSM file}
                IF fPapPhase = silentPhase then fPapPhase    :=  NeedOpenPhase;
            end;

        end
        else begin
            fNeedsSpecialPap     :=  False;
            fSpecialPapPhase     :=  silentSPhase;
        end;

        DoMenuCommand   :=  gNoChanges;

    end;

cRemove:
    begin
        aWindow := NewTemplateWindow(kRemoveWindowID, NIL);
        theDialog := TDialogView(aWindow.FindSubView('DLOG'));
        aWindow.fTarget :=  TEvtHandler(theDialog);
```

```
            dismisser := theDialog.PoseModally;
            {$IFC qDebug}
            WriteLn('Install dismissed - ',dismisser);
            {$ENDC}
            IF (dismisser = 'rmve') then
            begin
                if (fStatusWindow <> NIL)   then fStatusWindow.Close;
                if (fJobWindow <> NIL)      then fJobWindow.Close;
                fNeedsSpecialPap    :=  True;
                fSpecialPapPhase    :=  removeTSM;  {download remove TSM file}
            end
            else begin
                fNeedsSpecialPap    :=  False;
                fSpecialPapPhase    :=  silentSPhase;
            end;

            aWindow.Close;
            aWindow.Free;

            DoMenuCommand   :=  gNoChanges;

        end;

    cRemoveSlug:
        begin
            aWindow := NewTemplateWindow(kRemoveJobSlugWindowID, NIL);
            theDialog := TDialogView(aWindow.FindSubView('DLOG'));
            aWindow.fTarget :=  TEvtHandler(theDialog);
            dismisser := theDialog.PoseModally;
            {$IFC qDebug}
            WriteLn('Install dismissed - ',dismisser);
            {$ENDC}
            IF (dismisser = 'rmve') then
            begin
                fNeedsSpecialPap    :=  True;
                fSpecialPapPhase    :=  removeSlug; {download remove Slug file}
            end
            else begin
                fNeedsSpecialPap    :=  False;
                fSpecialPapPhase    :=  silentSPhase;
            end;

            aWindow.Close;
            aWindow.Free;

            DoMenuCommand   :=  gNoChanges;

        end;

    OTHERWISE
        DoMenuCommand   :=  Inherited DoMenuCommand(aCmdNumber);
    end;
end;
{-----------------------------------+
|   DoMenuCommand                   |
+-----------------------------------}
FUNCTION TCALDocument.DoMenuCommand(aCmdNumber: CmdNumber): TCommand; override;
VAR aWindow:            TWindow;
    theDialog:          TDialogView;
    dismisser:          IDType;
    where:              Point;
    prompt:             Str255;
    reply:              SFReply;
    theTypeList:        SFTypeList;
```

```
aString:         STR255;
theResPopup:     TChangeOPopUp;
aCalSetObj:      TCalSetObj;
sepChar:         string[1];
aCreateCommand:  TCreateCommand;
aRemoveCommand:  TRemoveCommand;
aModCalCommand:  TModCalCommand;
thecallistView:  TcallistView;
dialogOK:        Boolean;
modifiedItem:    Integer;
aSourceCalSetObj: TCalSetObj;

Procedure GetDialogValues(theDialog: TDialogView);
var i:              integer;
    jLong:          LONGINT;
    Mask:           DecForm;
    nameString:     STR255;
    extVal:         EXTENDED;
    aDecString:     DecStr;

begin
    sepChar :=  '-';
    TEditText(theDialog.FindSubView('mtyp')).GetText(aString);
    aCalSetObj.fCalData.theMedia     :=  aString;

    theResPopup :=  TChangeOPopUp(theDialog.FindSubView('resp'));
    i   :=  theResPopup.GetCurrentItem;
    aCalSetObj.fCalData.theResIndex :=  i;
    theResPopup.GetItemText (i,aString);
    StringToNum(aString,jLong);
    aCalSetObj.fCalData.theResolution   :=  jLong;

    aCalSetObj.fCalData.theExposureIntensity
        :=  TExtendedText(theDialog.FindSubView('cdei')).GetValue;
    aCalSetObj.fCalData.theLineScreen
        :=  TExtendedText(theDialog.FindSubView('lsnm')).GetValue;
    aCalSetObj.fCalData.theCalPoint
        :=  TExtendedText(theDialog.FindSubView('lscp')).GetValue;
    aCalSetObj.fCalData.theCalFrom
        :=  TExtendedText(theDialog.FindSubView('lsfr')).GetValue;
    aCalSetObj.fCalData.theCalTo
        :=  TExtendedText(theDialog.FindSubView('lsto')).GetValue;

    aCalSetObj.fCalData.theDMax
        :=  TExtendedText(theDialog.FindSubView('dmax')).GetValue;

    aCalSetObj.fCalData.theNegDot
        :=  TRadio(theDialog.FindSubView('ngdt')).IsOn;

    for i   :=  1 to kNumCalPoints-1 do
    begin
        aCalSetObj.fCalData.theActuals[i]    :=  TExtendedText(theDialog.FindSubView(
                          aCalSetObj.fCalData.theCalPointIDs[i])).GetValue;
    end;

    aCalSetObj.fCalData.theActuals[kNumCalPoints]    :=  100.00;

    aCalSetObj.fCalData.theSpotFuncLen   :=  0;

    nameString   :=  concat(aCalSetObj.fCalData.theMedia,sepChar);

    NumToString(aCalSetObj.fCalData.theResolution,aString);
    nameString   :=  concat(nameString,aString,sepChar);
```

```
     Mask.digits := 2;
     Mask.style := FixedDecimal;
     extVal  :=  aCalSetObj.fCalData.theExposureIntensity;
     Num2Str ( Mask , extVal , aDecString );

     nameString  :=  concat(nameString,aDecString,sepChar);

     Mask.digits := 0;
     Mask.style := FixedDecimal;
     extVal  :=  aCalSetObj.fCalData.theLineScreen;
     Num2Str ( Mask , extVal , aDecString );

     nameString  :=  concat(nameString,aDecString);

     aCalSetObj.fCalData.theName :=  nameString;
     aCalSetObj.fName     :=  nameString;
     {$IFC qDebug}
     WriteLn('New Name =',aCalSetObj.fName);
     {$ENDC}


end;

Procedure SetDialogValues(theSourceCalSetObj: TCalSetObj; theDialog: TDialogView);
var i:              integer;
     jLong:          LONGINT;
     Mask:           DecForm;
     nameString:     STR255;
     extVal:         EXTENDED;
     aDecString:     DecStr;

begin

     aString :=  theSourceCalSetObj.fCalData.theMedia;
          {$IFC qDebug}
          WriteLn('media type =',aString);
          {$ENDC}
     TEditText(theDialog.FindSubView('mtyp')).SetText(aString,true);

     theResPopup :=  TChangeOPopUp(theDialog.FindSubView('resp'));
     theResPopup.SetCurrentItem(theSourceCalSetObj.fCalData.theResIndex,true);

     if (theSourceCalSetObj.fCalData.theResIndex = 6) then
     begin
          NumToString(theSourceCalSetObj.fCalData.theResolution,aString);
          theResPopup.SetItemText(6,aString);
     end;


     TExtendedText(theDialog.FindSubView('cdei')).SetValue
          (theSourceCalSetObj.fCalData.theExposureIntensity,true);

     TExtendedText(theDialog.FindSubView('lsnm')).SetValue
          (theSourceCalSetObj.fCalData.theLineScreen,true);

     TExtendedText(theDialog.FindSubView('lscp')).SetValue
          (theSourceCalSetObj.fCalData.theCalPoint,true);

     TExtendedText(theDialog.FindSubView('lsfr')).SetValue
          (theSourceCalSetObj.fCalData.theCalFrom,true);

     TExtendedText(theDialog.FindSubView('lsto')).SetValue
          (theSourceCalSetObj.fCalData.theCalTo,true);
```

```
        TExtendedText(theDialog.FindSubView('dmax')).SetValue
            (theSourceCalSetObj.fCalData.theDMax,true);


        TRadio(theDialog.FindSubView('ngdt')).SetState
        (theSourceCalSetObj.fCalData.theNegDot,true);
        TRadio(theDialog.FindSubView('pldt')).SetState
        (NOT theSourceCalSetObj.fCalData.theNegDot,true);
        TRadio(theDialog.FindSubView('pldn')).SetState
        (NOT theSourceCalSetObj.fCalData.theNegDot,true);
        TRadio(theDialog.FindSubView('ngdn')).SetState
        (NOT theSourceCalSetObj.fCalData.theNegDot,true);

        for i   :=  1 to kNumCalPoints do
        begin
            TExtendedText(theDialog.FindSubView(
                theSourceCalSetObj.fCalData.theCalPointIDs[i])).SetValue
                (theSourceCalSetObj.fCalData.theActuals[i],true);
        end;

    end;

    Function CheckDialogValues(theDialog: TDialogView; theCalSetObj: TCalSetObj): Boolean;
    var i:              integer;
        isOK:           Boolean;
        theID:          IDType;
        matchCalSetObj: TCalSetObj;

    FUNCTION Matches(item:TObject): BOOLEAN;
    var found:  Boolean;

    BEGIN
        found   :=  false;

        if (fLocalSets.GetItemNumber(item) <> modifiedItem)
        then begin
            if (TCalSetObj(item).fCalData.theResolution =
                theCalSetObj.fCalData.theResolution) then
            begin
{$IFC qDebug}
WriteLn('resolution match');
{$ENDC}
                if (TCalSetObj(item).fCalData.theExposureIntensity =
                    theCalSetObj.fCalData.theExposureIntensity) then
                begin
{$IFC qDebug}
WriteLn('match 1',((TCalSetObj(item).fCalData.theCalFrom <=
                        theCalSetObj.fCalData.theCalFrom) and
                        (theCalSetObj.fCalData.theCalFrom <=
                         TCalSetObj(item).fCalData.theCalTo)));
WriteLn('match 2',((TCalSetObj(item).fCalData.theCalFrom <=
                        theCalSetObj.fCalData.theCalTo) and
                        (theCalSetObj.fCalData.theCalTo <=
                         TCalSetObj(item).fCalData.theCalTo)));
WriteLn('match 3',((theCalSetObj.fCalData.theCalFrom <=
                        TCalSetObj(item).fCalData.theCalFrom) and
                        (TCalSetObj(item).fCalData.theCalFrom <=
                        theCalSetObj.fCalData.theCalTo)));
WriteLn('match lines ',TCalSetObj(item).fCalData.theCalTo,TCalSetObj(item).fCalData.theCalFrom);
WriteLn('list lines ',theCalSetObj.fCalData.theCalTo,theCalSetObj.fCalData.theCalFrom);

{$ENDC}
                    if (((TCalSetObj(item).fCalData.theCalFrom <=
```

```
                theCalSetObj.fCalData.theCalFrom) and
                (theCalSetObj.fCalData.theCalFrom <=
                 TCalSetObj(item).fCalData.theCalTo))
                or
                ((TCalSetObj(item).fCalData.theCalFrom <=
                theCalSetObj.fCalData.theCalTo) and
                (theCalSetObj.fCalData.theCalTo <=
                 TCalSetObj(item).fCalData.theCalTo))
                or
                ((theCalSetObj.fCalData.theCalFrom <=
                TCalSetObj(item).fCalData.theCalFrom) and
                (TCalSetObj(item).fCalData.theCalFrom <=
                theCalSetObj.fCalData.theCalTo)))

            then begin
                found   :=  true;
            end;
        end;
    end;
end;

    Matches :=  found;
END;

begin
    isOK    :=  true;

    if (theCalSetObj.fCalData.theMedia = '')
    then begin
        theDialog.SelectEditText('mtyp',true);
        SysBeep(20);
        StdAlert(dErrNeedMediaName);
        isOK    :=  false;
    end;

    if (theCalSetObj.fCalData.theCalFrom > theCalSetObj.fCalData.theCalTo)
    then begin
        theDialog.SelectEditText('lsto',true);
        SysBeep(20);
        StdAlert(dErrFromTooBig);
        isOK    :=  false;
    end;

    for i   :=  1 to kNumCalPoints do
    begin
        if (theCalSetObj.fCalData.theActuals[i-1] >
            theCalSetObj.fCalData.theActuals[i]) then
        begin
            theID   :=  theCalSetObj.fCalData.theCalPointIDs[i];
            theDialog.SelectEditText(theID,true);
            SysBeep(20);
            StdAlert(dErrMeasTooBig);
            isOK    :=  false;
        end;
    end;

    matchCalSetObj  :=  TCalSetObj(fLocalSets.FirstThat(Matches));
    if (matchCalSetObj <> nil)
    then begin
        SysBeep(20);
        aString :=  matchCalSetObj.fCalData.theName;
        ParamText(aString,'','','');
        StdAlert(dErrMatchesAnother);
        isOK    :=  false;
```

```
      end;



   CheckDialogValues   :=  isOK;

   end;


Begin
   CASE aCmdNumber OF

   cbtcr:                                    {create new }
      begin
         modifiedItem    :=  -1;

         aWindow := NewTemplateWindow(kCALDATAWindowID, NIL);
         theDialog := TDialogView(aWindow.FindSubView('cldg'));
         TCalDataDialogView(theDialog).fDisplayOnly  :=  false;
         aWindow.fTarget :=  TEvtHandler(theDialog);

         theResPopup :=  TChangeOPopUp(aWindow.FindSubView('resp'));
         theResPopup.SetCurrentItem(2,true);

         New(aCalSetObj);
         FailNil(aCalSetObj);
         aCalSetObj.Init;

         dialogOK    :=  false;
         repeat
            dismisser := theDialog.PoseModally;
            IF (dismisser = 'cdok') then
            begin

               GetDialogValues(theDialog);
               dialogOK     :=  CheckDialogValues(theDialog,aCalSetObj);
               if dialogOK then
               begin
                  New(aCreateCommand);
                  FailNil(aCreateCommand);
                  gApplication.CommitLastCommand;

                  aCreateCommand.ICommand(cbtcr,SELF,fLocalCalListView,NIL);
                  aCreateCommand.fItemNum      :=  0;
                  aCreateCommand.fCalSetObj    :=  aCalSetObj;
                  DoMenuCommand    :=  aCreateCommand;
               end;
            end
            else begin
               aCalSetObj.Free;
               DoMenuCommand    :=  gNoChanges;
               dialogOK     :=  true;
            end;
         until dialogOK;

         aWindow.Close;
      end;

   cbtmd:                                    {modify existing}
      begin
         modifiedItem     :=  fLastItemSelected;  {to check for duplications in CheckDialogValues}

         aWindow := NewTemplateWindow(kCALDATAWindowID, NIL);
         theDialog := TDialogView(aWindow.FindSubView('cldg'));
```

```
        TCalDataDialogView(theDialog).fDisplayOnly  :=  false;
        aWindow.fTarget :=  TEvtHandler(theDialog);

        theResPopup :=  TChangeOPopUp(aWindow.FindSubView('resp'));
        theResPopup.SetCurrentItem(2,true);

        New(aCalSetObj);
        FailNil(aCalSetObj);
        aCalSetObj.Init;

        aSourceCalSetObj    :=  TCalSetObj(fLocalSets.At(fLastItemSelected));

        SetDialogValues(aSourceCalSetObj,theDialog);

        dialogOK    :=  false;
        repeat
            dismisser :=  theDialog.PoseModally;
            IF (dismisser = 'cdok') then
            begin
                GetDialogValues(theDialog);
                dialogOK    :=  CheckDialogValues(theDialog,aCalSetObj);
                if dialogOK then
                begin
                    gApplication.CommitLastCommand;
                    New(aModCalCommand);
                    FailNil(aModCalCommand);
                    aModCalCommand.ICommand(cbtmd,SELF,fLocalCalListView,NIL);
                    aModCalCommand.fItemNum     :=  fLastItemSelected;
                    aModCalCommand.fCalSetObj   :=  aCalSetObj;
                    DoMenuCommand   :=  aModCalCommand;
                end;
            end
            else begin
                aCalSetObj.Free;
                DoMenuCommand   :=  gNoChanges;
                dialogOK        :=  true;
            end;
        until dialogOK;

        aWindow.Close;
    end;

cbtvr:                              (view rip existing)
    begin

        aWindow :=  NewTemplateWindow(kCALDATAWindowID, NIL);
        theDialog :=  TDialogView(aWindow.FindSubView('cldg'));
        TCalDataDialogView(theDialog).fDisplayOnly  :=  true;
        aWindow.fTarget :=  TEvtHandler(theDialog);

        theResPopup :=  TChangeOPopUp(aWindow.FindSubView('resp'));
        theResPopup.SetCurrentItem(2,true);


        New(aCalSetObj);
        FailNil(aCalSetObj);
        aCalSetObj.Init;

{$IFC qDebug}
WriteLn('fLasRipItemSelected = ',fLastRipItemSelected);
{$ENDC}

        aSourceCalSetObj    :=  TCalSetObj(fRIPSets.At(fLastRipItemSelected));
```

```
            SetDialogValues(aSourceCalSetObj,theDialog);

            theResPopup.DimState(true,true);
            TRadio(theDialog.FindSubView('ngdt')).DimState(true,true);
            TRadio(theDialog.FindSubView('pldt')).DimState(true,true);


            dismisser := theDialog.PoseModally;

            aCalSetObj.Free;
            DoMenuCommand    :=  gNoChanges;

            aWindow.Close;
        end;

    cbtrm:                                {remove existing }
        begin
            New(aRemoveCommand);
            FailNil(aRemoveCommand);
            aRemoveCommand.ICommand(cbtrm,SELF,fLocalCalListView,NIL);
            aRemoveCommand.fItemNum :=  fLastItemSelected;
            DoMenuCommand    :=  aRemoveCommand;
        end;

    cbtdl:
        begin


            thecallistView  :=  TcallistView(fConfigWindow.FindSubView('rpgd'));
            fRIPcallistView :=  thecallistView;
            thecallistView.DelRowLast(thecallistView.fnumOfRows);
            fRIPSets.FreeAll;

            fNeedsSpecialPap     :=  True;
            fSpecialPapPhase     :=  queryCalPhase;  {download calibration sets}
            IF fPapPhase = silentPhase then fPapPhase     :=  NeedOpenPhase;
            DoMenuCommand    :=  gNoChanges;
        end;

    cbtgs:
        begin
            thecallistView  :=  TcallistView(fConfigWindow.FindSubView('rpgd'));
            fRIPcallistView :=  thecallistView;
            thecallistView.DelRowLast(thecallistView.fnumOfRows);
            fRIPSets.FreeAll;

            fNeedsSpecialPap     :=  True;
            fSpecialPapPhase     :=  queryCalRipSetPhase;    {upload calibration sets}
            IF fPapPhase = silentPhase then fPapPhase     :=  NeedOpenPhase;
            DoMenuCommand    :=  gNoChanges;
        end;

cCalInstall:
        begin
            thecallistView  :=  TcallistView(fConfigWindow.FindSubView('rpgd'));
            fRIPcallistView :=  thecallistView;
            thecallistView.DelRowLast(thecallistView.fnumOfRows);
            fRIPSets.FreeAll;

            fNeedsSpecialPap     :=  True;
            fSpecialPapPhase     :=  dialogCalInstallPhase;  {download calibration sets}
            DoMenuCommand    :=  gNoChanges;
        end;
```

```
cImageTestStrip:
        begin
            aWindow := NewTemplateWindow(kTestStripWindowID, NIL);
            theDialog := TDialogView(aWindow.FindSubView('DLOG'));
            aWindow.fTarget :=  TEvtHandler(theDialog);

            TControl(theDialog.FindSubView('sdnt')).DimState(true,true);
            TControl(theDialog.FindSubView('idnt')).DimState(true,true);
            TControl(theDialog.FindSubView('ednt')).DimState(true,true);
            TControl(theDialog.FindSubView('sdst')).DimState(true,true);
            TControl(theDialog.FindSubView('idst')).DimState(true,true);
            TControl(theDialog.FindSubView('edst')).DimState(true,true);

            TControl(theDialog.FindSubView('lant')).DimState(true,true);
            TControl(theDialog.FindSubView('last')).DimState(true,true);
            TControl(theDialog.FindSubView('lsnt')).DimState(true,true);
            TControl(theDialog.FindSubView('lsst')).DimState(true,true);


            dismisser := theDialog.PoseModally;
            {$IFC qDebug}
            WriteLn('Install dismissed - ',dismisser);
            {$ENDC}
            IF (dismisser = 'btOK') then
            begin
                fTestStrip.theUseCalib  :=  false;

                if (TCheckBox(theDialog.FindSubView('reis')).IsOn) then
                begin

                    fTestStrip.theInitialDensity
                        :=      TExtendedText(theDialog.FindSubView('sdnt')).GetValue;
                    fTestStrip.theStepDensity
                        :=      TExtendedText(theDialog.FindSubView('idnt')).GetValue;
                    fTestStrip.theEndDensity
                        :=      TExtendedText(theDialog.FindSubView('ednt')).GetValue;
                end
                else begin
                    fTestStrip.theInitialDensity    :=  0;
                    fTestStrip.theStepDensity       :=  0;
                    fTestStrip.theEndDensity        :=  0;
                end;

                if (TCheckBox(theDialog.FindSubView('unls')).IsOn) then
                begin
                    fTestStrip.theStripLineScreen
                        :=      TExtendedText(theDialog.FindSubView('lsnt')).GetValue;
                    fTestStrip.theStripLineAngle
                        :=      TExtendedText(theDialog.FindSubView('lant')).GetValue;
                end
                else begin
                    fTestStrip.theStripLineScreen   :=  0;
                    fTestStrip.theStripLineAngle    :=  0;
                end;

                fTestStrip.theUseNegative
                    :=      TCheckBox(theDialog.FindSubView('negp')).IsOn;

                fNeedsSpecialPap    :=  true;
                fSpecialPapPhase    :=  downloadTestStrip;

            end
            else begin
                fNeedsSpecialPap    :=  False;
```

```
            fSpecialPapPhase     :=  silentSPhase;
        end;

        aWindow.Close;

        DoMenuCommand    :=  gNoChanges;

    end;

cCheckCalibration:
    begin
        aWindow := NewTemplateWindow(kTestStripWindowID, NIL);
        theDialog := TDialogView(aWindow.FindSubView('DLOG'));
        aWindow.fTarget :=  TEvtHandler(theDialog);

        TControl(theDialog.FindSubView('reis')).DimState(true,true);

        TControl(theDialog.FindSubView('sdnt')).DimState(true,true);
        TControl(theDialog.FindSubView('idnt')).DimState(true,true);
        TControl(theDialog.FindSubView('ednt')).DimState(true,true);
        TControl(theDialog.FindSubView('sdst')).DimState(true,true);
        TControl(theDialog.FindSubView('idst')).DimState(true,true);
        TControl(theDialog.FindSubView('edst')).DimState(true,true);

        TControl(theDialog.FindSubView('lant')).DimState(true,true);
        TControl(theDialog.FindSubView('last')).DimState(true,true);
        TControl(theDialog.FindSubView('lsnt')).DimState(true,true);
        TControl(theDialog.FindSubView('lsst')).DimState(true,true);

        dismisser := theDialog.PoseModally;
        {$IFC qDebug}
        WriteLn('Install dismissed - ',dismisser);
        {$ENDC}
        IF (dismisser = 'btOK') then
        begin
            fTestStrip.theUseCalib  :=  true;

            fTestStrip.theInitialDensity    :=  0;
            fTestStrip.theStepDensity       :=  0;
            fTestStrip.theEndDensity        :=  0;

            if (TCheckBox(theDialog.FindSubView('unls')).IsOn) then
            begin
                fTestStrip.theStripLineScreen
                    :=      TExtendedText(theDialog.FindSubView('lsnt')).GetValue;
                fTestStrip.theStripLineAngle
                    :=      TExtendedText(theDialog.FindSubView('lant')).GetValue;
            end
            else begin
                fTestStrip.theStripLineScreen   :=  0;
                fTestStrip.theStripLineAngle    :=  0;
            end;

            fTestStrip.theUseNegative
                :=      TCheckBox(theDialog.FindSubView('negp')).IsOn;

            fNeedsSpecialPap    :=  true;
            fSpecialPapPhase    :=  downloadTestStrip;

        end
        else begin
            fNeedsSpecialPap    :=  False;
            fSpecialPapPhase    :=  silentSPhase;
        end;
```

```
            aWindow.Close;

            DoMenuCommand    :=  gNoChanges;

        end;

cCalRemove:
        begin
            aWindow := NewTemplateWindow(kRemoveCalWindowID, NIL);
            theDialog := TDialogView(aWindow.FindSubView('DLOG'));
            aWindow.fTarget :=  TEvtHandler(theDialog);
            dismisser := theDialog.PoseModally;
            {$IFC qDebug}
            WriteLn('Install dismissed - ',dismisser);
            {$ENDC}
            IF (dismisser = 'rmve') then
            begin
                fNeedsSpecialPap     :=  True;
                fSpecialPapPhase     :=  removeCal;  {download remove TSM file}
            end
            else begin
                fNeedsSpecialPap     :=  False;
                fSpecialPapPhase     :=  silentSPhase;
            end;

            aWindow.Close;
            aWindow.Free;

            DoMenuCommand    :=  gNoChanges;

        end;


(*  cInstall:
        begin
            aWindow := NewTemplateWindow(kInstallWindowID, NIL);
            theDialog := TDialogView(aWindow.FindSubView('DLOG'));
            aWindow.fTarget :=  TEvtHandler(theDialog);
            dismisser := theDialog.PoseModally;
            {$IFC qDebug}
            WriteLn('Install dismissed - ',dismisser);
            {$ENDC}
            IF (dismisser = 'insl') then
            begin
                if (fStatusWindow <> NIL)   then fStatusWindow.Close;
                if (fJobWindow <> NIL)      then fJobWindow.Close;
                fNeedsSpecialPap     :=  True;
                fSpecialPapPhase     :=  queryPhase; {download temp TSM file}
                IF fPapPhase = silentPhase then fPapPhase   :=  NeedOpenPhase;
            end
            else begin
                fNeedsSpecialPap     :=  False;
                fSpecialPapPhase     :=  silentSPhase;
            end;
            aWindow.Close;
            aWindow.Free;

            DoMenuCommand    :=  gNoChanges;

        end;

    cInstallSlug:
```

```
        begin
            aWindow := NewTemplateWindow(kInstallJobSlugWindowID, NIL);
            theDialog := TDialogView(aWindow.FindSubView('DLOG'));
            aWindow.fTarget :=  TEvtHandler(theDialog);
            dismisser := theDialog.PoseModally;
            {$IFC qDebug}
            WriteLn('Install dismissed - ',dismisser);
            {$ENDC}
            aWindow.Close;
            aWindow.Free;
            IF (dismisser = 'insl') then
            begin
                where.h :=  100; where.v := 100;
                theTypeList[0]  :=  'TEXT';
                Prompt  :=  'Select PostScript File';
                SFGetFile(where,prompt,NIL,1,theTypeList,NIL,reply);
                {$IFC qDebug}
                WriteLn('reply info = ',reply.good,reply.vrefnum,reply.fName);
                {$ENDC}

                IF (reply.good) then
                begin
                    fvRefNum     :=  reply.vrefnum;
                    fFileName    :=  reply.fName;
                    fNeedsSpecialPap    :=  True;
                    fSpecialPapPhase    :=  installAltSlug; {download temp TSM file}
                    IF fPapPhase = silentPhase then fPapPhase   :=  NeedOpenPhase;
                end;

            end
            else begin
                fNeedsSpecialPap    :=  False;
                fSpecialPapPhase    :=  silentSPhase;
            end;

            DoMenuCommand   :=  gNoChanges;

        end;

    cRemove:
        begin
            aWindow := NewTemplateWindow(kRemoveWindowID, NIL);
            theDialog := TDialogView(aWindow.FindSubView('DLOG'));
            aWindow.fTarget :=  TEvtHandler(theDialog);
            dismisser := theDialog.PoseModally;
            {$IFC qDebug}
            WriteLn('Install dismissed - ',dismisser);
            {$ENDC}
            IF (dismisser = 'rmve') then
            begin
                if (fStatusWindow <> NIL)   then fStatusWindow.Close;
                if (fJobWindow <> NIL)      then fJobWindow.Close;
                fNeedsSpecialPap    :=  True;
                fSpecialPapPhase    :=  removeTSM;  {download remove TSM file}
            end
            else begin
                fNeedsSpecialPap    :=  False;
                fSpecialPapPhase    :=  silentSPhase;
            end;

            aWindow.Close;
            aWindow.Free;

            DoMenuCommand   :=  gNoChanges;
```

```
        end;

    cRemoveSlug:
        begin
            aWindow := NewTemplateWindow(kRemoveJobSlugWindowID, NIL);
            theDialog := TDialogView(aWindow.FindSubView('DLOG'));
            aWindow.fTarget :=  TEvtHandler(theDialog);
            dismisser := theDialog.PoseModally;
            {$IFC qDebug}
            WriteLn('Install dismissed - ',dismisser);
            {$ENDC}
            IF (dismisser = 'rmve') then
            begin
                fNeedsSpecialPap    :=  True;
                fSpecialPapPhase    :=  removeSlug; {download remove Slug file}
            end
            else begin
                fNeedsSpecialPap    :=  False;
                fSpecialPapPhase    :=  silentSPhase;
            end;

            aWindow.Close;
            aWindow.Free;

            DoMenuCommand   :=  gNoChanges;

        end;
*)
    OTHERWISE
        DoMenuCommand   :=  Inherited DoMenuCommand(aCmdNumber);
    end;
end;

{$S AWriteFile}

{-----------------------------------+
|   DoNeedDiskSpace                 |
+-----------------------------------}
Procedure TTSMDocument.DoNeedDiskSpace(VAR dataForkBytes, rsrcForkBytes: LONGINT); OVERRIDE;
VAR theHeader:  TSMFileHeader;
    pName:      STR255;
begin
    inherited DoNeedDiskSpace(dataForkBytes, rsrcForkBytes);
    dataForkBytes   :=  dataForkBytes + SizeOf(TSMFileHeader) + SizeOf(pName);
    {$IFC qDebug}
        WriteLn('size for write = ',dataForkBytes);
    {$ENDC}
end;

{-----------------------------------+
|   DoWrite                         |
+-----------------------------------}
Procedure TTSMDocument.DoWrite(aRefNum: INTEGER; makingCopy: BOOLEAN); OVERRIDE;
VAR theHeader:  TSMFileHeader;
    pName:      STR255;
    numBytes:   LONGINT;
    global:     Rect;
begin
    inherited DoWrite(aRefNum, makingCopy);
    TEditText(fConfigWindow.FindSubView('tsnm')).GetText(pName);

    WITH theHeader DO begin
        theVersionNumber    :=  '1.6';
```

```
        theRollLength       :=  TSmartNumberText(fConfigWindow.FindSubView('rlsz')).GetValue;
        theFeedLength       :=  TSmartNumberText(fConfigWindow.FindSubView('fdsz')).GetValue;
        theDispStatus       :=  TCheckBox(fConfigWindow.FindSubView('swds')).IsOn;
        theDispJobLog       :=  TCheckBox(fConfigWindow.FindSubView('jwds')).IsOn;
        theMeasureSys       :=  fFileData.theMeasureSys;
        IF (fConfigWindow <> NIL) then
        begin
            fConfigWindow.GetGlobalBounds(global);
            SetPt(theConfigWPos,global.left,global.top);
        end
        else begin
            SetPt(theConfigWPos,0,0);
        end;
        IF (fJobWindow <> NIL) then
        begin
            fJobWindow.GetGlobalBounds(global);
            SetPt(theJobWPos,global.left,global.top);
        end
        else begin
            SetPt(theJobWPos,0,0);
        end;

        IF (fStatusWindow <> NIL) then
        begin
            fStatusWindow.GetGlobalBounds(global);
            SetPt(theStatWPos,global.left,global.top);
        end
        else begin
            SetPt(theStatWPos,0,0);
        end;

    end;
    numBytes := SIZEOF(TSMFileHeader);
    FailOSErr(FSWrite(aRefNum, numBytes, @theHeader));

    numBytes := SIZEOF(STR255);
    FailOSErr(FSWrite(aRefNum, numBytes, @pName));


end;

{-----------------------------------+
|   DoNeedDiskSpace                 |
+-----------------------------------}
Procedure TCALDocument.DoNeedDiskSpace(VAR dataForkBytes, rsrcForkBytes: LONGINT); OVERRIDE;
VAR theHeader:  CALFileHeader;
    pName:      STR255;

    Procedure SizeIt(aObject: TObject);
    begin
        TCalSetObj(aObject).DoNeedDiskSpace(dataForkBytes, rsrcForkBytes);
    end;
begin
    inherited DoNeedDiskSpace(dataForkBytes, rsrcForkBytes);

    TEditText(fConfigWindow.FindSubView('tsnm')).GetText(pName);
    dataForkBytes    :=  dataForkBytes + SizeOf(CALFileHeader) + SIZEOF(pName);

    fLocalSets.Each(SizeIt);


    {$IFC qDebug}
        WriteLn('size for write = ',dataForkBytes);
    {$ENDC}
```

```
end;

Procedure TCalSetObj.DoNeedDiskSpace(VAR dataForkBytes, rsrcForkBytes: LONGINT);
begin
    dataForkBytes   :=  dataForkBytes + SizeOf(CALDataRECORD); { plus amount for spot}
end;


{------------------------------------+
|   DoWrite                          |
+------------------------------------}
Procedure TCALDocument.DoWrite(aRefNum: INTEGER; makingCopy: BOOLEAN); OVERRIDE;
VAR theCalHeader:   CALFileHeader;
    pName:       STR255;
    numBytes:    LONGINT;
    global:      Rect;
    i:           integer;

    Procedure WriteIt(aObject: TObject);
    begin
        TCalSetObj(aObject).DoWrite(aRefNum,makingCopy);
    end;

begin
    inherited DoWrite(aRefNum, makingCopy);
    TEditText(fConfigWindow.FindSubView('tsnm')).GetText(pName);

    WITH theCalHeader DO begin
        theVersionNumber     :=  '0.5';
        theBytesInName       :=  length(pName);
        theNumOfCalHeaders   :=  fLocalSets.fSize;

        IF (fConfigWindow <> NIL) then
        begin
            fConfigWindow.GetGlobalBounds(global);
            SetPt(theConfigWPos,global.left,global.top);
        end
        else begin
            SetPt(theConfigWPos,0,0);
        end;

    end;
    numBytes := SIZEOF(CALFileHeader);
    FailOSErr(FSWrite(aRefNum, numBytes, @theCalHeader));

    numBytes := SIZEOF(STR255);
    FailOSErr(FSWrite(aRefNum, numBytes, @pName));

    fLocalSets.Each(WriteIt);


end;

Procedure TCalSetObj.DoWrite(aRefNum: INTEGER; makingCopy: BOOLEAN);
VAR theCalData: CALDataRECORD;
    numBytes:   LONGINT;
begin
    theCalData  :=  SELF.fCalData;
    numBytes := SIZEOF(CALDataRECORD);
    FailOSErr(FSWrite(aRefNum, numBytes, @theCalData));

end;
```

```
{$S AReadFile}
{-----------------------------------+
|   DoRead                          |
+-----------------------------------}
Procedure TTSMDocument.DoRead(aRefNum: INTEGER; rsrcExists, forPrinting: BOOLEAN); OVERRIDE;
VAR theHeader:  TSMFileHeader;
    pName:      STR255;
    numBytes:   LONGINT;
begin
    inherited DoRead(aRefNum, rsrcExists, forPrinting);
    numBytes .:= SizeOf(TSMFileHeader);
    FailOSErr(FSRead(aRefNum, numBytes, @theHeader));

    numBytes := SizeOf(STR255);
    FailOSErr(FSRead(aRefNum, numBytes, @pName));

    fFileData.theVersionNumber  :=  theHeader.theVersionNumber;
    fFileData.theBytesInName    :=  theHeader.theBytesInName;
    fFileData.theRollLength     :=  theHeader.theRollLength;
    fFileData.theFeedLength     :=  theHeader.theFeedLength;
    fFileData.theDispStatus     :=  theHeader.theDispStatus;
    fFileData.theDispJobLog     :=  theHeader.theDispJobLog;
    fFileData.theMeasureSys     :=  theHeader.theMeasureSys;

    IF ((fFileData.theMeasureSys < 0) | (fFileData.theMeasureSys > 3))
        then    fFileData.theMeasureSys :=  0;


    IF (copy(theHeader.theVersionNumber,1,3) < '1.5') then
    begin
        fFileData.theConfigWPos.h   :=  0;
        fFileData.theConfigWPos.v   :=  0;
        fFileData.theJobWPos.h  :=  0;
        fFileData.theJobWPos.v  :=  0;
        fFileData.theStatWPos.h :=  0;
        fFileData.theStatWPos.v :=  0;
    end
    else begin
{$IFC qDebug}
    WriteLn('v 1.5 Config window: ',theHeader.theConfigWPos.h,theHeader.theConfigWPos.v);
    WriteLn('v 1.5 job window: ',theHeader.theJobWPos.h,theHeader.theJobWPos.v);
    WriteLn('v 1.5 Status window: ',theHeader.theStatWPos.h,theHeader.theStatWPos.v);
{$ENDC}
        fFileData.theConfigWPos     :=  theHeader.theConfigWPos;
        fFileData.theJobWPos        :=  theHeader.theJobWPos;
        fFileData.theStatWPos       :=  theHeader.theStatWPos;
    end;

    fPrinterName    :=  pName;

end;

{-----------------------------------+
|   DoRead  -TCalDocument           |
+-----------------------------------}
Procedure TCALDocument.DoRead(aRefNum: INTEGER; rsrcExists, forPrinting: BOOLEAN); OVERRIDE;
VAR theCalHeader:   CALFileHeader;
    pName:      STR255;
    numBytes:   LONGINT;
    ndx:        INTEGER;
    aCalSetObj: TCalSetObj;

begin
{$IFC qDebug}
```

```
    WriteLn('cal doc read');
{$ENDC}
    inherited DoRead(aRefNum, rsrcExists, forPrinting);
{$IFC qDebug}
    WriteLn('back from inherited');
{$ENDC}

    numBytes := SizeOf(CALFileHeader);
    FailOSErr(FSRead(aRefNum, numBytes, @theCalHeader));

    fFileData.theVersionNumber  :=  theCalHeader.theVersionNumber;
    fFileData.theBytesInName    :=  theCalHeader.theBytesInName;
    fFileData.theConfigWPos     :=  theCalHeader.theConfigWPos;
    fFileData.theNumOfCalHeaders:=  theCalHeader.theNumOfCalHeaders;

{$IFC qDebug}
    WriteLn('header read done');
{$ENDC}
    numBytes := SizeOf(STR255);
    FailOSErr(FSRead(aRefNum, numBytes, @pName));
    fPrinterName    :=  pName;
{$IFC qDebug}
    WriteLn('name is',fPrinterName);
    WriteLn('number of sets = ',fFileData.theNumOfCalHeaders);
{$ENDC}

    ndx :=  0;
    while (ndx < fFileData.theNumOfCalHeaders) do
    begin
        New(aCalSetObj);
        FailNil(aCalSetObj);
        aCalSetObj.Init;
        aCalSetObj.DoRead(aRefNum, rsrcExists, forPrinting);
        fLocalSets.InsertLast(aCalSetObj);      { text list will be there in make views}
        ndx :=  ndx+1;
    end;
{$IFC qDebug}
    WriteLn('read complete');
{$ENDC}
end;

{-----------------------------------+
|   DoRead  -TCalSetObj             |
+-----------------------------------}
Procedure TCalSetObj.DoRead(aRefNum: INTEGER; rsrcExists, forPrinting: BOOLEAN);
VAR
    numBytes:   LONGINT;
    theCALDataRECORD:   CALDataRECORD;

begin
    numBytes := SizeOf(CALDataRECORD);
    FailOSErr(FSRead(aRefNum, numBytes, @theCALDataRECORD));
    fCalData    :=  theCALDataRECORD;
    fName       :=  fCalData.theName;

    {no spot func at this time }
end;


{$S ARes2}
{-----------------------------------+
|   DoTCsIdle                       |
+-----------------------------------}
```

```
Procedure TTSMDocument.DoTCsIdle;
var aTCsPicture:    TTCsPicture;
begin
    IF (fStatusWindow <> NIL) then
    begin
        aTCsPicture :=  TTCsPicture(fStatusWindow.FindSubView('SPCT'));
        aTCsPicture.fCassettePhase  :=  (aTCsPicture.fCassettePhase+1) MOD 4;
        aTCsPicture.fDrawSpinnerOnly    :=  TRUE;
        aTCsPicture.DrawContents;
    end;
end;


{-----------------------------------+
!   DoPAPIdle                       !
+-----------------------------------}
Procedure TTSMDocument.DoPAPIdle; OVERRIDE;
var reply: Integer;
    aPapResp :          TPapResp;
    aRespStr:           Str255;
    aStr :              Str255;
    pName:              Str255;
    monitorOpenResult:  INTEGER;
    papFi:              FailInfo;       {pap failure record}
    theResToPost:       Integer;

    PROCEDURE PAPFailure(err: INTEGER; message: LONGINT);
    BEGIN
        if (fStatusWindow <> NIL) then fStatusWindow.Close;
        if (fJobWindow <> NIL) then fJobWindow.Close;
        if (fInitStatusWindow <> NIL) then fInitStatusWindow.Close;
        fStatusWindow   :=  NIL;
        fJobWindow      :=  NIL;
        fInitStatusWindow       :=  NIL;
        {$IFC qDebug}
        WriteLn('ErrorClosing: ', err, ' ', message);
        {$ENDC}
        fPapsession.CloseSession;
        HUnLock(Handle(fPapSession));
        fPapsession.Free;
        fPapsession := NIL;
        fPapPhase   :=  silentPhase;
        fNeedsSpecialPap    :=  FALSE;
        fNeedsJobUpdate :=  FALSE;
        fNeedsCut       :=  FALSE;
        fNeedsReload    :=  FALSE;
        fNeedsClearLog  :=  FALSE;
        Sysbeep(20);
        IF (err = papErr) then
        begin
            StdAlert(message);
            Failure(noErr,0);
        end
        else begin
            Failure(err,message);
        end;
    END;

    Procedure UpdateJobnUser;
    VAR statStr:    STR255;
        statNum:    INTEGER;
        Function Extract(aLine,aTag: STR255): STR255;
        VAR cPos:   INTEGER;
            outStr: STR255;
```

```
    begin
        cPos    :=  Pos(aTag,aLine);
        IF (cpos <> 0) then
        begin
            outStr  :=  copy(aLine,cPos+Length(aTag),length(aLine)-cPos-Length(aTag)+1);
            outStr  :=  copy(outStr,1,Pos(';',outStr));
        end
        else begin
            outstr  :=  '';
        end;
        Extract :=  outStr;
    end;
begin
    statStr := PrinterStatus(fPaPaName,fPAPdres);

    aStr    :=  Extract(statStr,'job: ');
    TStaticText(fStatusWindow.FindSubView('stus')).SetText(aStr,true);

    aStr    :=  Extract(statStr,'document: ');
    TStaticText(fStatusWindow.FindSubView('stjb')).SetText(aStr,true);

    aStr    :=  Extract(statStr,'status: ');
    if (aStr='') then
    begin
        aStr := 'idle;';
        if (fPapSession <> NIL) then
        begin
            IF fPapSession.fWaitingOnRecorder
            then aStr   :=  'waiting;';
        end;
    end;
    if (aStr='printing;')
        then fIsPrinting    :=  true
        else fIsPrinting    :=  false;

    statNum :=  0;
    if (aStr = 'busy') then statNum :=  1;
    if (aStr = 'waiting;') then statNum :=  2;
    if (aStr = 'printing;') then statNum    :=  3;
    if (aStr = 'initializing;') then statNum    :=  4;

    TStaticText(fStatusWindow.FindSubView('stst')).SetText(gStatusStrings[statNum],true);
end;

Procedure DoClearLog;
var aDateTime:  LONGINT;
begin
        fPapSession.WritePs(kpostClearLog,'clear log file');
        fFileSetter :=  '';

    { send time synch}

        GetDateTime(aDateTime);
        {$IFC qDebug}
        WriteLn('sending time synch');
        {$ENDC}
        NumToString(aDateTime,aStr);
        fPAPSession.fWriteStr := concat(
            'TSM /mactime (',aStr,') put ');
        fPAPSession.WritePs(kpostUseStr,'synchronize printer time');
        fPAPSession.WritePs(kpostTimeSynch,'synchronize printer time');
end;

{-----------------------------------+
```

```
|   DoInitDialog                    |
+-----------------------------------}
PROCEDURE DoInitDialog;
VAR
    aWindow:        TWindow;
    theDialog:      TDialogView;
    dismisser:      IDType;
    aStr:           STR255;

BEGIN
    fNeedsSpecialPap    :=  False;  {because we need to pose modal & have pap close first}
    aWindow := NewTemplateWindow(kInitializeWindowID, NIL);
    theDialog := TDialogView(aWindow.FindSubView('IZDL'));
    aStr    :=  fPrinterName;
    theDialog.ParamTxt('^0',aStr);
    aWindow.fTarget :=  TEvtHandler(theDialog);
    dismisser := theDialog.PoseModally;
    {$IFC qDebug}
    WriteLn('dismissed - ',dismisser);
    {$ENDC}
    IF (dismisser = 'insl') then
    begin
        fNeedsSpecialPap    :=  True;
        fSpecialPapPhase    :=  tempTSM;
    end
    else begin
        fNeedsSpecialPap    :=  False;
        fSpecialPapPhase    :=  silentSPhase;
    end;
    aWindow.Close;
    aWindow.Free;
END;

{-----------------------------------+
|   MakeInitStatusDialog            |
+-----------------------------------}
PROCEDURE MakeInitStatusDialog;
VAR
    aWindow:        TWindow;
    theDialog:      TDialogView;
    aStr:           STR255;
    whichOne:       Integer;
BEGIN
    IF (fInitStatusWindow = NIL) then
    begin
        IF ((fSpecialPapPhase = removeSlug) or (fSpecialPapPhase = installAltSlug))
            then    aStr    :=  'Job Slug'
            else    aStr    :=  'RIPMaster';

        IF ((fSpecialPapPhase = queryPhase) or (fSpecialPapPhase = tempTSM) or (fSpecialPapPhase = i
            then whichOne := kInitStatusWindowID
            else whichOne := kRemoveStatusWindowID;

        aWindow := NewTemplateWindow(whichOne, NIL);
        theDialog := TDialogView(aWindow.FindSubView('DLOG'));
        theDialog.fDocument :=  SELF;
        theDialog.ParamTxt('^0',aStr);
        aStr    :=  fPrinterName;
        theDialog.ParamTxt('^1',aStr);
        fInitStatusWindow   :=  aWindow;
        aWindow.Open;
    end;
END;
```

```
begin
    if ((TickCount - fStatusTime) > kStatusInterval) and (fStatusWindow <> NIL) then
    Begin
        IF (fPAPdres <> NIL) then UpdateJobnUser;
        fStatusTime := TickCount;
    End;

    CatchFailures(papFi, PAPFailure);

    IF (fPapPhase = silentPhase) then
    BEGIN
        IF (fNeedsSpecialPap) then
        begin
            IF (fSpecialPapPhase = dialogPhase) then DoInitDialog;
            IF (fSpecialPapPhase <> silentSPhase) then
            begin {got work to do }
                fPapPhase   :=  needOpenPhase;  {we need an open with nothing else}
            end
            else begin {not going to init now}
                fNeedsSpecialPap    :=  FALSE;
            end;
        end
        else begin
            IF ((fStatusWindow <> NIL) or (fJobWindow <> NIL)) then
            begin
                IF fNeedsCut or fNeedsReload or fNeedsJobUpdate or fNeedsClearLog then
                begin
                    fNeedsJobUpdate :=  TRUE;
                    fPapPhase   :=  needOpenPhase;
                end
                else begin
                    if ((fUpdateCnt <> 0) ) then
                        if (TickCount - fUpdateCnt) > fUpdateTim then
                        begin
                            fUpdateCnt := 0;
                            fNeedsJobUpdate :=  TRUE;
                            fPapPhase   :=  needOpenPhase;
                        end;
                end;
            end;
        end;
    end;
    IF (fPapPhase <> silentphase) then
    begin {not silent phase}

        CASE fPapPhase OF

        needOpenPhase:
        begin
            Enable(cPrint,FALSE);
            Enable(cPrintOne,FALSE);

            {$IFC qDebug}
            WriteLn('needOpenPhase - fNeedsSpecialPap =',fNeedsSpecialPap);
            {$ENDC}
            IF fNeedsSpecialPap then MakeInitStatusDialog;

            if fPapSession = NIL then
            begin
                TEditText(fConfigWindow.FindSubView('tsnm')).GetText(pName);
                InitiatePap(pName,gRIPMExecList);
                IF (fJobWindow <> NIL) then
                begin
```

```
                TStaticText(fJobWindow.FindSubView('uptx')).SetText(gUpdatingString,true);
                TButton(fJobWindow.FindSubView('btcl')).DimState(true,true);
            end;
            IF (fStatusWindow <> NIL) then
            begin
                TButton(fstatusWindow.FindSubView('BTFC')).DimState(true,true);
                TButton(fstatusWindow.FindSubView('BTRL')).DimState(true,true);
            end;

        end
        else begin
            {$IFC qDebug}
            ProgramBreak('pap non nil on need open');
            {$ENDC}
        end;
    end;

    openingPhase:
    begin
        monitorOpenResult   :=  fPapSession.MonitorOpen;
        IF (monitorOpenResult = 0) then
        begin
            fPapPhase   :=  isOpenPhase;
        end
        else if (monitorOpenResult < 0) then
        begin
            fPapPhase   :=  errorPhase;
            {$IFC qDebug}
            ProgramBreak('error on open');
            {$ENDC}
        end;
    end;

    isOpenPhase:
    begin

        IF fNeedsSpecialPap then
        begin
            CASE fSpecialPapPhase OF
            queryPhase:
                begin
                    theResToPost    :=  kpostTSMQuery;
                    aStr            :=  'get printer stats';
                end;
            tempTSM:
                begin
                    theResToPost    :=  kpostTempTSM;
                    aStr            :=  'download temporary TSM file';
                end;
            setSlug:
                begin
                    theResToPost    :=  kpostSetSlug+fFileData.theMeasureSys;
                    aStr            :=  'download Job Slug';
                end;
            setSysStart:
                begin
                    theResToPost    :=  kpostSetSysStart;
                    aStr            :=  'set SYS/Start file';
                end;
            reStartP:
                begin
                    fDoingReset     :=  true;
                    theResToPost    :=  kpostReStartP;
                    aStr            :=  'restart the printer';
```

```
        end;
    removeTSM:
        begin
            theResToPost    :=  kpostRemoveTSM;
            aStr            :=  'remove the startup file';
        end;
    removeSlug:
        begin
            theResToPost    :=  kpostRemoveSlug;
            aStr            :=  'remove the startup file';
        end;
    installAltSlug:
        begin
            fPapSession.fvRefNum    :=  fvRefNum;
            fPapSession.fFileName   :=  fFileName;

            aStr            :=  'install the alternate job slug';
            fPAPSession.WritePs(kpostInstallAltSlug,aStr);
            theResToPost    :=  kpostUseTextFile;
        end;

    OTHERWISE
        begin
            theResToPost    :=  0;
            {$IFC qDebug}
            ProgramBreak('odd phase in fSpecialPap Send it out!');
            {$ENDC}
        end;
    end;

    IF theResToPost <> 0 then
    begin
        {$IFC qDebug}
        WriteLn('special ps to post = ',theResToPost);
        {$ENDC}
        fPAPSession.WritePs(theResToPost,aStr);
        IF theResToPost <> kpostTSMQuery then
        begin
            fPAPSession.WritePs(kpostEOF,'send eof');   {send eof before close}
            fPapPhase   :=  closingPhase;   {dump it out - dont need to wait}
        end;
    end
    else begin
        fNeedsSpecialPap    :=  false;
        fSpecialPapPhase    :=  silentSPhase;
        fPapPhase           :=  closingPhase;
    end;
end; {fNeedsSpecialPap}

IF fNeedsClearLog then
begin {*** may need tsmquery first! }
    DoClearLog;
    fNeedsClearLog  :=  False;
    DoClearJobGrid;
end;

IF fNeedsJobUpdate then
begin
    fPapSession.WritePs(kpostTSMQuery,'get memory statistics');
    fNeedsJobUpdate :=  False;
end;

if fNeedsCut or fNeedsReload then
begin {*** may need tsmquery first! }
```

```
if fNeedsCut then
begin
    fNeedsCut    :=  False;
    TSmartNumberText(fConfigWindow.FindSubView('fdsz')).GetInchText(aStr);
    {$IFC qDebug}
    WriteLn('Feedsizeinchtext is *',aStr,'*');
    {$ENDC}
    fPAPSession.fWriteStr := concat('/feedlength ',aStr,' def ');
    fPAPSession.WritePs(kpostUseStr,'cut and feed');        {set feed size}
    fNeedsCut := False;
    fPapSession.WritePs(kpostCutFeed,'cut and feed');

    aStr    :=  '0';
    TStaticText(fStatusWindow.FindSubView('tujb')).SetText(aStr,true);
    TStaticText(fStatusWindow.FindSubView('tupg')).SetText(aStr,true);
    TStaticText(fStatusWindow.FindSubView('tuln')).SetText(aStr,true);
end;
if fNeedsReload then
begin
    {$IFC qDebug}
    WriteLn('sending reload...');
    {$ENDC}
    fNeedsReload    :=  False;
    TSmartNumberText(fConfigWindow.FindSubView('rlsz')).GetInchText(aStr);
    {$IFC qDebug}
    WriteLn('rollsizeinchtext is *',aStr,'*');
    {$ENDC}
    fPAPSession.fWriteStr := concat('/rolllength ',aStr,' def ');
    fPAPSession.WritePs(kpostUseStr,'reload');      {set feed size}

    TSmartNumberText(fConfigWindow.FindSubView('fdsz')).GetInchText(aStr);
    {$IFC qDebug}
    WriteLn('Feedsizeinchtext is *',aStr,'*');
    {$ENDC}
    fPAPSession.fWriteStr := concat('/feedlength ',aStr,' def ');
    fPAPSession.WritePs(kpostUseStr,'reload');      {set feed size}

    fPapSession.WritePs(kpostReload,'reload');

    TStaticText(fStatusWindow.FindSubView('sppg')).SetText('0',true);
    TStaticText(fStatusWindow.FindSubView('spln')).SetText('0',true);


    fPAPSession.WritePs(kpostExitserver,'set film counter');        {setfilmcounter}

    TSmartNumberText(fConfigWindow.FindSubView('rlsz')).GetInchText(aStr);
    fPAPSession.fWriteStr := concat('/rolllength ',aStr,' def ');
    fPAPSession.WritePs(kpostUseStr,'reload');      {set feed size}
    TSmartNumberText(fConfigWindow.FindSubView('fdsz')).GetInchText(aStr);
    {$IFC qDebug}
    WriteLn('feedsizeinchtext is *',aStr,'*');
    {$ENDC}
    fPAPSession.fWriteStr := concat('/feedlength ',aStr,' def ');
    fPAPSession.WritePs(kpostUseStr,'reload');      {set feed size}

    fPAPSession.WritePs(kpostSetFilm,'set film counter');       {send eom}

    fPAPSession.WritePs(kpostEOF,'set film counter');       {send eom}
    fPapsession.fNeedsClose :=  TRUE;

end;

if fJobGrid <> NIL then
    fUpdateCnt := TickCount-fUpdateTim+4*60;
```

```
        end; (needs cut or reload)

        if not fPapsession.fNeedsClose then
        Begin
            reply := fPapsession.MonitorRead;
            while fPapSession.fInpQue.fSize <> 0 do
                Begin
                    aPapResp := TPapResp(fPapsession.fInpQue.At(1));
                    fPapsession.fInpQue.Delete(aPapResp);
                    aRespStr    :=  aPapResp.fRespMsg;
                    fPapSession.fExecList.ExecKey(aRespStr,SELF);
                    aPapResp.Free;
                end;
            if fPapSession.fInpQue.fSize = 0 then
                fPapSession.fInpQue.RemoveDeletions;
        end;
        if fPapsession.fNeedsClose then (here because above stuff could req close)
        Begin
            fPapPhase   :=  closingPhase;
        end;
    end;

    errorPhase:
    begin
        {$IFC qDebug}
        WriteLn('signaling failure from error phase');
        {$ENDC}
        aStr    :=  fErrorStr;
        Paramtext(aStr,'','','');
        Failure(papErr,phLwIoProblemPS);
    end;

    abortPhase:
    begin
        {$IFC qDebug}
        WriteLn('user abort');
        {$ENDC}
        Failure(papErr,phabort);
    end;

    closingPhase:
    begin
        IF (fJobWindow <> NIL) then
        begin
            TStaticText(fJobWindow.FindSubView('uptx')).SetText('',true);
            TButton(fJobWindow.FindSubView('btcl')).DimState(false,true);
        end;
        IF (fStatusWindow <> NIL) then
        begin
            TButton(fstatusWindow.FindSubView('BTFC')).DimState(false,true);
            TButton(fstatusWindow.FindSubView('BTRL')).DimState(false,true);
        end;
        {$IFC qDebug}
        WriteLn('ClosingPhase');
        {$ENDC}

        {fPAPSession.WritePs(kpostEOF,'close');}        {send eom}
        fPapsession.CloseSession;
        HUnLock(Handle(fPapSession));
        fPapsession.Free;           {usually done in PAPClose}
        fPapsession := NIL;
        fPapPhase   :=  silentPhase;

        IF fNeedsSpecialPap then
```

```
        begin
            CASE fSpecialPapPhase OF
            dialogPhase:
                begin
                    fPapPhase           :=  silentPhase;
                end;
            endDialogPhase:
                begin
                    fSpecialPapPhase    :=  tempTSM;
                    fPapPhase           :=  needOpenPhase;
                end;
            tempTSM:
                begin
                    fSpecialPapPhase    :=  setSlug;
                    fPapPhase           :=  needOpenPhase;
                end;
            setSlug:
                begin
                    fSpecialPapPhase    :=  setSysStart;
                    fPapPhase           :=  needOpenPhase;
                end;
            setSysStart:
                begin
                    fSpecialPapPhase    :=  reStartP;
                    fPapPhase           :=  needOpenPhase;
                end;
            removeTSM:
                begin
                    fSpecialPapPhase    :=  reStartP;
                    fPapPhase           :=  needOpenPhase;
                end;
            reStartP,
            removeSlug,
            installAltSlug:
                begin
                    fSpecialPapPhase    :=  silentSPhase;
                    fPapPhase           :=  silentPhase;
                    fNeedsSpecialPap    :=  false;
                    if (fInitStatusWindow <> NIL) then fInitStatusWindow.Close;
                    fInitStatusWindow   :=  NIL;
                end;

            OTHERWISE
                begin
                    {$IFC qDebug}
                    ProgramBreak('odd phase in close!');
                    {$ENDC}
                    fSpecialPapPhase    :=  silentSPhase;
                    fPapPhase           :=  silentPhase;
                    fNeedsSpecialPap    :=  false;
                end;
            end;

        end; {fNeedsSpecialPap}

        DoSetUpMenus;               {let printing get re-enabled}
    end;    { closing }
    end; {CASE phases}

end; {not silent phase}

Success(papFi);

IF fIsPrinting then
```

```
    begin
        DoTCsIdle;
    end;


end; {doPapIdle}


{-----------------------------------+
|   DoPAPIdle                       |
+-----------------------------------}
Procedure TCALDocument.DoPAPIdle; OVERRIDE;
var reply: Integer;
    aPapResp :          TPapResp;
    aStr :              Str255;
    pName:              Str255;
    monitorOpenResult:  INTEGER;
    papFi:              FailInfo;       {pap failure record}
    theResToPost:       Integer;

    PROCEDURE PAPFailure(err: INTEGER; message: LONGINT);
    BEGIN
        if (fInitStatusWindow <> NIL) then fInitStatusWindow.Close;
        fInitStatusWindow       :=  NIL;
        {$IFC qDebug}
        WriteLn('ErrorClosing: ', err, ' ', message);
        {$ENDC}
        fPapsession.CloseSession;
        HUnLock(Handle(fPapSession));
        fPapsession.Free;
        fPapsession         := NIL;
        fPapPhase           :=  silentPhase;
        fNeedsSpecialPap    :=  FALSE;
        Sysbeep(20);
        IF (err = papErr) then
        begin
            if (not fDoingReset) then
                StdAlert(message);
            Failure(noErr,0);
        end
        else begin
            Failure(err,message);
        end;
    END;

    {-----------------------------------+
    |   DoInitDialog                    |
    +-----------------------------------}
    PROCEDURE DoInitDialog;
    VAR
        aWindow:        TWindow;
        theDialog:      TDialogView;
        dismisser:      IDType;
        aStr:           STR255;

    BEGIN
        fNeedsSpecialPap    :=  False;  {because we need to pose modal & have pap close first}
        aWindow := NewTemplateWindow(kInitializeCalWindowID, NIL);
        theDialog := TDialogView(aWindow.FindSubView('IZDL'));
        aStr    :=  fPrinterName;
        theDialog.ParamTxt('^0',aStr);
        aWindow.fTarget :=  TEvtHandler(theDialog);
        dismisser := theDialog.PoseModally;
        {$IFC qDebug}
```

```
    WriteLn('dismissed - ',dismisser);
    {SENDC}
    IF (dismisser = 'insl') then
    begin
        fNeedsSpecialPap    :=  True;
        if (fSpecialPapPhase = dialogCalInstallPhase) then
        begin
            fSpecialPapPhase    :=  queryCalInstallPhase;
        end
        else begin
            fSpecialPapPhase    :=  downloadSWSCal;
        end;
    end
    else begin
        fNeedsSpecialPap    :=  False;
        fSpecialPapPhase    :=  silentSPhase;
    end;
    aWindow.Close;
    aWindow.Free;
END;

{-----------------------------------+
|   MakeInitStatusDialog            |
+-----------------------------------}
PROCEDURE MakeInitStatusDialog;
VAR
    aWindow:        TWindow;
    theDialog:      TDialogView;
    aStr:           STR255;
    whichOne:       Integer;
BEGIN
    IF (fInitStatusWindow = NIL) then
    begin
        aStr    :=  'Precision';

        CASE fSpecialPapPhase of
    queryCalPhase:
        begin
            whichOne    :=  kDownLoadCalStatusWindowID;
        end;
queryCalInstallPhase,
downloadSWSCal:
        begin
            whichOne    :=  kDownLoadCaliMasterStatusWindowID;
            aStr    :=  'Precision ';
        end;
    queryCalRipSetPhase:
        begin
            whichOne    :=  kDownLoadCaliMasterStatusWindowID;
            aStr    :=  'rip set query';
        end;
    downloadTestStrip:
        begin
            whichOne    :=  kDownLoadCaliMasterStatusWindowID;
            aStr    :=  'density/gray scale test strip';
        end;
otherwise
        begin
            whichOne    :=  kDownLoadCaliMasterStatusWindowID;
            aStr    :=  'remove Precision';
        end;
        end;
        aWindow := NewTemplateWindow(whichOne, NIL);
        theDialog := TDialogView(aWindow.FindSubView('DLOG'));
```

```
        theDialog.fDocument :=  SELF;
        theDialog.ParamTxt('^0',aStr);
        TEditText(fConfigWindow.FindSubView('tsnm')).GetText(pName);
        aStr            :=  pName;
        fPrinterName    :=  pName;
        theDialog.ParamTxt('^1',aStr);
        fInitStatusWindow   :=  aWindow;
        aWindow.Open;
    end;
  END;


begin

  CatchFailures(papFi, PAPFailure);

  IF (fPapPhase = silentPhase) then
  begin
    IF (fNeedsSpecialPap) then
    begin
      IF (fSpecialPapPhase = dialogCalPhase) then DoInitDialog;
      IF (fSpecialPapPhase = dialogCalInstallPhase) then DoInitDialog;

      IF (fSpecialPapPhase <> silentSPhase) then
      begin {got work to do }
        fPapPhase   :=  needOpenPhase;  {we need an open with nothing else}
      end
      else begin {not going to init now}
        fNeedsSpecialPap    :=  FALSE;
      end;
    end
  end;
  IF (fPapPhase <> silentphase) then
  begin {not silent phase}

    CASE fPapPhase OF

    needOpenPhase:
    begin

      {$IFC qDebug}
      WriteLn('needOpenPhase - fNeedsSpecialPap =',fNeedsSpecialPap);
      {$ENDC}
      IF fNeedsSpecialPap then MakeInitStatusDialog;

      if fPapSession = NIL then
      begin
        TEditText(fConfigWindow.FindSubView('tsnm')).GetText(pName);
        InitiatePap(pName,gCalExecList);
      end
      else begin
        {$IFC qDebug}
        ProgramBreak('pap non nil on need open');
        {$ENDC}
      end;
    end;

    openingPhase:
    begin
      monitorOpenResult   :=  fPapSession.MonitorOpen;
      IF (monitorOpenResult = 0) then
      begin
        fPapPhase   :=  isOpenPhase;
      end
```

```
    else if (monitorOpenResult < 0) then
    begin
        fPapPhase   :=  errorPhase;
        {$IFC qDebug}
        ProgramBreak('error on open');
        {$ENDC}
    end;
end;

isOpenPhase:
begin

    IF fNeedsSpecialPap then
    begin
        CASE fSpecialPapPhase OF
        queryCalInstallPhase:
            begin
                aStr            :=  'get printer stats';
                fPAPSession.WritePs(kpostCalQuery,aStr);
                fSpecialPapPhase    :=  queryCalInstallWaitPhase;
            {$IFC qDebug}
            WriteLn('cal query posted - on install wait phase');
            {$ENDC}
            end;
        queryCalPhase:
            begin
                aStr            :=  'get printer stats';
                fPAPSession.WritePs(kpostCalQuery,aStr);
                fSpecialPapPhase    :=  queryCalWaitPhase;
            end;
        queryCalRipSetPhase:
            begin
                aStr            :=  'get printer stats';
                fPAPSession.WritePs(kpostCalQuery,aStr);
                fSpecialPapPhase    :=  queryCalRipSetWaitPhase;
            end;
        sendCal:
            begin
                SendCalibrationSets;
                fSpecialPapPhase    :=  closesendCal;
                fPAPSession.WritePs(kpostEOF,'send eof');   {send eof before close}
                fPapPhase   :=  closingPhase;   {dump it out - dont need to wait}
            end;
        closesendCal:
            begin
            end;

        downloadSWSCal:
            begin
            {$IFC qDebug}
            WriteLn('download SWSCal called ');
            {$ENDC}
                aStr            :=  'initialize typesetter';

                fPAPSession.WritePs(kPostdownloadSWSCal,aStr);

                fSpecialPapPhase    :=  closedownloadSWSCal;
                fPAPSession.WritePs(kpostEOF,'send eof');   {send eof before close}
                fPapPhase   :=  closingPhase;   {dump it out - dont need to wait}
            end;
        setCalSysStart:
            begin
            {$IFC qDebug}
            WriteLn('download SWSCal/Sys/Start called ');
```

```
        {$ENDC}
            aStr            :=  'initialize typesetter';

            fPAPSession.WritePs(kpostSetCalSysStart,aStr);

            fSpecialPapPhase     :=  closeCalSysStart;
            fPAPSession.WritePs(kpostEOF,'send eof');    {send eof before close}
            fPapPhase    :=  closingPhase;    {dump it out - dont need to wait}
        end;
    removeCal:
        begin
        {$IFC qDebug}
        WriteLn('rémove cal called ');
        {$ENDC}
            aStr            :=  'remove';

            fPAPSession.WritePs(kpostRemoveCal,aStr);

            fSpecialPapPhase     :=  closeremoveCal;
            fPAPSession.WritePs(kpostEOF,'send eof');    {send eof before close}
            fPapPhase    :=  closingPhase;    {dump it out - dont need to wait}
        end;
    reStartCalP:
        begin
        {$IFC qDebug}
        WriteLn('restarting ');
        {$ENDC}
            aStr            :=  'initialize typesetter';

            fDoingReset :=  true;
            fPAPSession.WritePs(kpostReStartP,aStr);

            fSpecialPapPhase     :=  closeRestartCal;
            fPAPSession.WritePs(kpostEOF,'send eof');    {send eof before close}
            fPapPhase    :=  closingPhase;    {dump it out - dont need to wait}
        end;
    downloadTestStrip:
        begin
        {$IFC qDebug}
        WriteLn('download test strips ');
        {$ENDC}

            aStr            :=  'download test strips';
            fPAPSession.WritePs(kPostdownloadTestStrip,aStr);

            SendTestStrip;

            fSpecialPapPhase     :=  closedownloadTestStrip;
            fPAPSession.WritePs(kpostEOF,'send eof');    {send eof before close}
            fPapPhase    :=  closingPhase;    {dump it out - dont need to wait}
        end;
    startupCalSets:
        begin
        {$IFC qDebug}
        WriteLn('sending startup cal sets ');
        {$ENDC}
            SendCalibrationSets;     { this does exitserver and disk }
            fSpecialPapPhase     :=  closestartupCalSets;
            fPAPSession.WritePs(kpostEOF,'send eof');    {send eof before close}
            fPapPhase    :=  closingPhase;    {dump it out - dont need to wait}
        end;
    OTHERWISE
        begin
        end;
    ;
```

```
            end;

(*          IF theResToPost <> 0 then
            begin
                {$IFC qDebug}
                WriteLn('special ps to post = ',theResToPost);
                {$ENDC}
                fPAPSession.WritePs(theResToPost,aStr);
                IF theResToPost <> kpostTSMQuery then
                begin
                    fPAPSession.WritePs(kpostEOF,'send eof');   {send eof before close}
                    fPapPHase   :=  closingPhase;   {dump it out - dont need to wait}
                end;
            end
            else begin
                fNeedsSpecialPap    :=  false;
                fSpecialPapPhase    :=  silentSPhase;
                fPapPhase           :=  closingPhase;
            end;
*)
        end; {fNeedsSpecialPap}


        if not fPapsession.fNeedsClose then
        Begin
            reply := fPapsession.MonitorRead;
            while fPapSession.fInpQue.fSize <> 0 do
                Begin
                    aPapResp := TPapResp(fPapsession.fInpQue.At(1));
                    fPapsession.fInpQue.Delete(aPapResp);
                    aStr    :=  aPapResp.fRespMsg;
                    {$IFC qDebug}
                    WriteLn('fRespMsg = ',aStr);
                    {$ENDC}
                    fPapSession.fExecList.ExecKey(aStr,SELF);
                    aPapResp.Free;
                end;
            if fPapSession.fInpQue.fSize = 0 then
                fPapSession.fInpQue.RemoveDeletions;
        end;
        if fPapsession.fNeedsClose then {here because above stuff could req close}
        Begin
            fPapPhase   :=  closingPhase;
        end;
    end;

    errorPhase:
    begin
        {$IFC qDebug}
        WriteLn('signaling failure from error phase');
        {$ENDC}
        aStr    :=  fErrorStr;
        Paramtext(aStr,'','','');
        Failure(papErr,phLwIoProblemPS);
    end;

    abortPhase:
    begin
        {$IFC qDebug}
        WriteLn('user abort');
        {$ENDC}
        Failure(papErr,phabort);
    end;
```

```
closingPhase:
begin
    {$IFC qDebug}
    WriteLn('ClosingPhase');
    {$ENDC}
    fPapsession.CloseSession;
    HUnLock(Handle(fPapSession));
    fPapsession.Free;           {usually done in PAPClose}
    fPapsession := NIL;
    fPapPhase   :=  silentPhase;

    IF fNeedsSpecialPap then
    begin
        CASE fSpecialPapPhase OF
        dialogCalPhase:
            begin
                fPapPhase           :=  silentPhase;
                {$IFC qDebug}
                WriteLn('going dialog');
                {$ENDC}
            end;
        endDialogCalPhase:
            begin
                fSpecialPapPhase    :=  downloadSWSCal;
                if (fPapPhase = silentPhase ) then
                    fPapPhase           :=  needOpenPhase;
                {$IFC qDebug}
                WriteLn('going temp ');
                {$ENDC}
            end;
        closesendCal:
            begin
                fSpecialPapPhase    :=  reStartCalP;
                fPapPhase           :=  needOpenPhase;
            end;
        closedownloadTestStrip:
            begin
                if (fInitStatusWindow <> NIL) then fInitStatusWindow.Close;
                fInitStatusWindow   :=  NIL;
                fSpecialPapPhase    :=  silentSPhase;
                fPapPhase           :=  silentPhase;
                fNeedsSpecialPap    :=  false;
            end;
        closedownloadSWSCal:
            begin
                fSpecialPapPhase    :=  setCalSysStart;
                fPapPhase           :=  needOpenPhase;
            end;
        closeCalSysStart:
            begin
                fSpecialPapPhase    :=  startupCalSets;
                fPapPhase           :=  needOpenPhase;
            end;
        closestartupCalSets:
            begin
                fSpecialPapPhase    :=  reStartCalP;
                fPapPhase           :=  needOpenPhase;
            end;
        closeremoveCal:
            begin
                fSpecialPapPhase    :=  reStartCalP;
                fPapPhase           :=  needOpenPhase;
            end;
```

```
            closeRestartCal,
            queryCalRipSetWaitPhase:
                begin
                    if (fInitStatusWindow <> NIL) then fInitStatusWindow.Close;
                    fInitStatusWindow     :=  NIL;
                    fSpecialPapPhase      :=  silentSPhase;
                    fPapPhase             :=  silentPhase;
                    fNeedsSpecialPap      :=  false;
                end;

            OTHERWISE
                begin
                    {$IFC qDebug}
                    ProgramBreak('odd phase in close!');
                    {$ENDC}
                    fSpecialPapPhase      :=  silentSPhase;
                    fPapPhase             :=  silentPhase;
                    fNeedsSpecialPap      :=  false;
                end;
            end;

        end; {fNeedsSpecialPap}

        DoSetUpMenus;                 {let printing get re-enabled}
    end;    { closing }
    end; {CASE phases}

  end; {not silent phase}

  Success(papFi);

end; {doPapIdle}

{-----------------------------------+
|   SendTestStrip                   |
+-----------------------------------}
Procedure TCALDocument.SendTestStrip;
var aStr:    STR255;
    dString:        DecStr;
    Mask:           DecForm;
    extValue:       Extended;
begin                                   { first download to memory  }
                                        { disk and all others already checked   }
    Mask.digits := 2;
    Mask.style := FixedDecimal;

    if (fTestStrip.theUseCalib)
    then aStr   :=  'true  '
    else aStr   :=  'false ';

    extValue    :=  fTestStrip.theInitialDensity;
    Num2Str ( Mask , extValue , dString );
    aStr    :=  concat(aStr,dString,' ');

    extValue    :=  fTestStrip.theStepDensity;
    Num2Str ( Mask , extValue , dString );
    aStr    :=  concat(aStr,dString,' ');

    extValue    :=  fTestStrip.theEndDensity;
    Num2Str ( Mask , extValue , dString );
    aStr    :=  concat(aStr,dString,' ');

    Mask.digits := 3;
    Mask.style := FixedDecimal;
```

```
   extValue    :=  fTestStrip.theStripLineAngle;
   Num2Str ( Mask , extValue , dString );
   aStr    :=  concat(aStr,dString,' ');

   extValue    :=  fTestStrip.theStripLineScreen;
   Num2Str ( Mask , extValue , dString );
   aStr    :=  concat(aStr,dString,' ');

   if (fTestStrip.theUseNegative)
   then aStr    :=  concat(aStr,'true  ')
   else aStr    :=  concat(aStr,'false ');

   aStr    :=  concat(aStr,'settestsstripparams imageset ');

{$IFC qDebug}
   WriteLn('test strip params = ',aStr);
{$ENDC}
   fPAPSession.fWriteStr := aStr;
   fPAPSession.WritePs(kpostUseStr,'download test strip');        {send test command start}



end;


{-----------------------------------+
|  SendCalibrationSets              |
+-----------------------------------}
Procedure TCALDocument.SendCalibrationSets;
var aStr:   STR255;

   Procedure WriteItOut(anObject: TObject);
   begin
       TCalSetObj(anObject).SendCalPS(fPAPSession);
   end;

begin                                   { first download to memory  }
                                        { disk and all others already checked   }
   aStr    :=  'download calibration sets';
{  fPAPSession.WritePs(kpostExitserver,aStr);}

   fPAPSession.WritePs(kCalSetHeader,aStr);            {send header}

   fPAPSession.fWriteStr := 'swscaldict begin ';
   fPAPSession.WritePs(kpostUseStr,aStr);          {send dict start}

   fLocalSets.Each(WriteItOut);

   fPAPSession.fWriteStr := 'end ';
   fPAPSession.WritePs(kpostUseStr,aStr);          {send dict end}

(* fPAPSession.fWriteStr := '(%%[Last:]%%) = flush ';
   fPAPSession.WritePs(kpostUseStr,'end connection');      {send eom}
*)

end;


{-----------------------------------+
|  AddJobLine                       |
+-----------------------------------}
Procedure TTSMDocument.AddJobLine(aJobLine,anErrLine: STR255; anIsJob: Boolean; anInthTenthValue: LONGIN
Label   1000;
```

```
var aJobObj:         TJobObj;
    theJobGridView: TJobGridView;
    theJobGridViewp:    TJobGridView;
    aCell:           GridCell;
    aRect:           VRect;
    ndx:             Integer;
    MemFi:               FailInfo;       {pap failure record}
    noMore:          BOOLEAN;
    str255Size:      LONGINT;

    PROCEDURE MemFailure(err: INTEGER; message: LONGINT);
    BEGIN
        IF (err = memFullErr) then
        begin
            {$IFC qDebug}
                Sysbeep(20);
                WriteLn('out of memory - continuing');
            {$ENDC}
            GOTO 1000;
        end
        else begin
            Failure(err,message);
        end;
    END;

begin
    CatchFailures(memFi,MemFailure);

    IF (FreeMem <= 50*1024) then
    BEGIN                       { try to throw away oldest entries }
        noMore  :=  FALSE;
        REPEAT
            IF (fInsertNext > 8) then
            begin   { can delete at least eight rows }
                fMemGotFull     :=  true;

                theJobGridView := TJobGridView(fJobView.FindSubView('jgrd'));
                theJobGridViewp := TJobGridView(fJobViewp.FindSubView('jgrp'));
                theJobGridView.DelRowAt(1,8);
                theJobGridViewp.DelRowAt(1,8);
                FOR ndx := 1 to 8 DO Begin
                    aJobObj :=  TJobObj(fJobGrid.First);
                    FailNil(aJobObj);
                    fJobGrid.Delete(aJobObj);
                    aJobObj.Free;
                end;
                fJobGrid.RemoveDeletions;
                fInsertNext :=  fInsertNext - 8;
            end
            else begin
                noMore  :=  TRUE;
            end;
        UNTIL noMore or (FreeMem > 50*1024);
    end;
    IF (FreeMem > 50*1024) then
    BEGIN
        theJobGridView := TJobGridView(fJobView.FindSubView('jgrd'));
        theJobGridViewp := TJobGridView(fJobViewp.FindSubView('jgrp'));

        IF (fInsertNext > theJobGridView.fnumOfRows) then
        begin   { no more rows left - add 8 more }
                {shake that bush}
            TStaticText(fJobView.FindSubView('uptx')).SetText('',true);
```

```
            FOR ndx := 1 to 8 DO Begin
                New(aJobObj);
                FailNil(aJobObj);
                aJobObj.fIsJob  :=  FALSE;
                aJobObj.fJobLine:= '';
                aJobObj.fErrLineHdl:= NIL;
                aJobObj.fInchTenthValue :=  0;
                fJobGrid.InsertLast(aJobObj);
            end;
            theJobGridView.InsRowLast(8, kRowHeight);
            theJobGridViewp.InsRowLast(8, kRowHeight);
            aCell.h :=  1;'
            aCell.v :=  theJobGridView.fnumOfRows;
            theJobGridView.CellToVRect(aCell, aRect);

            theJobGridView.RevealRect (aRect, aCell, TRUE);

            fJobViewP.AdJustSize;   (tell print handler that size changed)
            TStaticText(fJobView.FindSubView('uptx')).SetText(gUpdatingString,true);
        end;

        aJobObj :=  TJobObj(fJobGrid.At(fInsertNext));
        aJobObj.fIsJob  :=  anIsJob;
        aJobObj.fJobLine:= aJobLine;
        aJobObj.fInchTenthValue :=  anInthTenthValue;
        IF anErrLine <> '' then
        begin
            str255Size  :=  SIZEOF(STR255);
            aJobObj.fErrLineHdl :=  hSTR(NewHandle(SIZEOF(STR255)));
            FailNil(aJobObj.fErrLineHdl);
            aJobObj.fErrLineHdl^^   :=  anErrLine;
        end;
        aCell.h :=  1;
        aCell.v :=  fInsertNext;
        theJobGridView.InvalidateCell(aCell);

        fInsertNext :=  fInsertNext+1;

    end
    else begin
        {$IFC qDebug}
        WriteLn('mem space is low!');
        {$ENDC}
    end;
    1000:
        Success(memFi);
end;

{$S AClose}
{----------------------------------+
|   Close                          |
+----------------------------------}
procedure TTSMDocument.Close; Override;
begin
    if fPapSession <> NIL then
        begin
            fPapsession.CloseSession;
            HUnLock(Handle(fPapSession));
            fPapsession.Free;           {usually done in PAPClose}
            fPapsession := NIL;
            fUpdateCnt := 0;
        end;
    if fPAPdres <> NIL then
    begin
```

```
        DisposHandle(fPAPdres);
        fPAPdres    :=  NIL;
    end;
    inherited close;
end;

{$S AOpen}
{-----------------------------------+
|   DoMakeViews                      |
+-----------------------------------}
PROCEDURE TTSMDocument.DoMakeViews(forPrinting: BOOLEAN); OVERRIDE;

VAR
    aWindow:            TWindow;
    aTSMConfigView:     TTSMConfigView;
    anEditText:         TEditText;
    aHandler:           TStdPrintHandler;
    aSmartNumberText1:  TSmartNumberText;
    aSmartNumberText2:  TSmartNumberText;
    theMinimum,
    theMaximum:         LONGINT;
    theSys:             INTEGER;
    aString:            STR255;
BEGIN
    IF NOT forPrinting THEN
    BEGIN
        aWindow         :=  NewTemplateWindow(kTSMConfigWindowID, SELF);
        fConfigWindow   :=  aWindow;
        IF (fFileData.theConfigWPos.h <> 0) then
        begin
            MoveWindow(aWindow.fWMgrWindow,fFileData.theConfigWPos.h,fFileData.theConfigWPos.v,FALSE);
            aWindow.ForceOnScreen;
        end;

        aTSMConfigView  := TTSMConfigView(aWindow.FindSubView('DLOG'));

        aSmartNumberText1   :=  TSmartNumberText(fConfigWindow.FindSubView('rlsz'));
        aSmartNumberText2   :=  TSmartNumberText(fConfigWindow.FindSubView('fdsz'));
        aSmartNumberText1.fDocument :=  SELF;
        aSmartNumberText2.fDocument :=  SELF;

        aSmartNumberText1.fCurrentMeasurementSystem :=  fFileData.theMeasureSys;
        aSmartNumberText2.fCurrentMeasurementSystem :=  fFileData.theMeasureSys;

        theSys      :=  fFileData.theMeasureSys;
        IF (theSys <> 0)                        { measurement sys not in inches }
        then begin                              { everything configured to inches at start  }
            { set radio buttons to right value  }
            TRadio(fConfigWindow.FindSubView('msin')).SetState(false,true);
            CASE theSys OF
            1:  TRadio(fConfigWindow.FindSubView('mscm')).SetState(true,true);
            2:  TRadio(fConfigWindow.FindSubView('mspc')).SetState(true,true);
            3:  TRadio(fConfigWindow.FindSubView('mscr')).SetState(true,true);
            end;
            { set proper units to display   }
            TStaticText(aTSMConfigView.FindSubView('runt')).SetText(gUnitTable[theSys],true);
            TStaticText(aTSMConfigView.FindSubView('funt')).SetText(gUnitTable[theSys],true);
            { set mins and maxes to right units }
            theMinimum  :=  aSmartNumberText1.fMinimum;
            theMaximum  :=  aSmartNumberText1.fMaximum;
            theMinimum  :=  Round(aSmartNumberText1.fMinimum * gConversionTable[theSys]);
            theMaximum  :=  Round(aSmartNumberText1.fMaximum * gConversionTable[theSys]);
            aSmartNumberText1.SetMinMax(theMinimum,theMaximum);
            theMinimum  :=  aSmartNumberText2.fMinimum;
```

```
            theMaximum  :=  aSmartNumberText2.fMaximum;
            theMinimum  :=  Round(aSmartNumberText2.fMinimum * gConversionTable[theSys]);
            theMaximum  :=  Round(aSmartNumberText2.fMaximum * gConversionTable[theSys]);
            aSmartNumberText2.SetMinMax(theMinimum,theMaximum);
        end;
        aSmartNumberText1.SetValue(fFileData.theRollLength,TRUE);
        aSmartNumberText2.SetValue(fFileData.theFeedLength,TRUE);


        TCheckBox(fConfigWindow.FindSubView('swds')).SetState(fFileData.theDispStatus,TRUE);
        TCheckBox(fConfigWindow.FindSubView('jwds')).SetState(fFileData.theDispJobLog,TRUE);
        TEditText(fConfigWindow.FindSubView('tsnm')).SetText(fPrinterName,TRUE);
        TEditText(fConfigWindow.FindSubView('tsnm')).fDocument  :=  SELF;
        TEditText(fConfigWindow.FindSubView('tsnm')).SetSelection(0,MAXINT,true);

        New(aHandler);
        FailNIL(aHandler);
        aHandler.IStdPrintHandler(SELF,      { its document                    }
            aTSMConfigView,                     { its view                         }
            TRUE,                            { has square dots                 }
            FALSE,                           { horzontal page size is fixed    }
            FALSE);                          { vertical page size is notfixed  }

        fConfigWindow.Open;
        if fFileData.theDispStatus then
        begin
            MakeStatusView;
            fNeedsJobUpdate :=  TRUE;
        end;
        if fFileData.theDispJobLog then
        begin
            MakeJobGridView;
            fFileSetter     := '';
            fNeedsJobUpdate :=  TRUE;
        end;
    END;
end;
{-----------------------------------+
|   DoMakeViews                     |
+-----------------------------------}
PROCEDURE TCALDocument.DoMakeViews(forPrinting: BOOLEAN); OVERRIDE;

VAR
    aWindow:            TWindow;
    thecallistView:     TcallistView;
    Scroller:           TScroller;
    aSScrollBar:        TSScrollBar;
    aCommandButton:     TCommandButton;


BEGIN
    IF NOT forPrinting THEN
    BEGIN
        aWindow         :=  NewTemplateWindow(kCALConfigWindowID, SELF);
        fConfigWindow   :=  aWindow;
        IF (fFileData.theConfigWPos.h <> 0) then
        begin
            MoveWindow(aWindow.fWMgrWindow,fFileData.theConfigWPos.h,fFileData.theConfigWPos.v,FALSE);
            aWindow.ForceOnScreen;
        end;

        thecallistView  :=  TcallistView(aWindow.FindSubView('lcgd'));
        fLocalcallistView   :=  thecallistView;
        thecallistView.DelRowLast(thecallistView.fnumOfRows);
```

```
        thecallistView.InsItemLast(fLocalSets.fSize);    { match number is local set list}

        thecallistView.SetColWidth(1,1,147);
        {thecallistView.SetSingleSelection(false);}

        TEditText(fConfigWindow.FindSubView('tsnm')).SetText(fPrinterName,TRUE);

        thecallistView  :=  TcallistView(aWindow.FindSubView('rpgd'));
        fRIPcallistView :=  thecallistView;
        thecallistView.DelRowLast(thecallistView.fnumOfRows);

        thecallistView.SetColWidth(1,1,147);
        {thecallistView.SetSingleSelection(false);}

        aCommandButton  :=  TCommandButton(aWindow.FindSubView('btcr'));
        aCommandButton.fDocument     :=  SELF;
        aCommandButton  :=  TCommandButton(aWindow.FindSubView('btdl'));
        aCommandButton.fDocument     :=  SELF;

        aWindow.Open;

    END;
END;


{$S ARes}
{-----------------------------------+
|   DoClearJobGrid                  |
+-----------------------------------}
PROCEDURE TTSMDocument.DoClearJobGrid;
VAR
    theJobGridView:      TJobGridView;
    theJobGridViewp:     TJobGridView;

BEGIN
    if (fJobWindow <> NIL) then
    begin

        theJobGridView   := TJobGridView(fJobView.FindSubView('jgrd'));
        theJobGridView.DelRowLast(theJobGridView.fnumOfRows);
        theJobGridViewp      := TJobGridView(fJobViewP.FindSubView('jgrp'));
        theJobGridViewp.DelRowLast(theJobGridViewp.fnumOfRows);
        fJobGrid.FreeList;
        fJobGrid         :=  NewList;
        fInsertNext      :=  1;
        fMemGotFull      :=  false;
        fMemFullAck      :=  false;

    end;
end;


(*******************************************************************************************)
(*      T J o b G r i d V i e w                                                          *)
(*******************************************************************************************)
{-----------------------------------+
|   GetText                         |
+-----------------------------------}
PROCEDURE TJobGridView.GetText (aCell: GridCell; VAR aString: Str255); OVERRIDE;

VAR
    jobstr:          STR255;
    aJobObj:         TJobObj;
```

```
    theRow, theCol: INTEGER;
    theLength:      LONGINT;
    x:              EXTENDED;
    tmpString:      STR255;
    spaces:         STRING[5];
BEGIN
    theRow  :=  aCell.v;
    theCol  :=  aCell.h;
    aString :=  '';
    spaces  :=  '     ';

    if theRow <= TTSMDocument(fDocument).fJobGrid.fSize then
    Begin
        aJobObj := TJobObj(TTSMDocument(fDocument).fJobGrid.At(theRow));
        if aJobObj <> Nil then
        begin
            aString := aJobObj.fJobLine;
            IF aJobObj.fIsJob & (aString <> '') &    { if numbers there }
                    (TTSMDocument(fDocument).fFileData.theMeasureSys <> 0) then {not in inches}
            begin
                x    :=  gConversionTable[TTSMDocument(fDocument).fFileData.theMeasureSys]
                         * aJobObj.fInchTenthValue / 10;
                theLength   :=  Round(x);
                NumToString(theLength,tmpString);
                aString :=  copy(spaces,1,5-length(tmpString));
                aString :=  concat(copy(aJobObj.fJobLine,1,64),
                                aString,tmpString,
                                copy(aJobObj.fJobLine,70,10));
            end;
        end;
    end;
END;
{-----------------------------------+
|   CanSelectCell                   |
+-----------------------------------}
FUNCTION TJobGridView.CanSelectCell(aCell: GridCell): Boolean; Override;
var theRow: Integer;
    aJobObj:        TJobObj;
begin
    theRow  :=  aCell.v;
    if theRow <= TTSMDocument(fDocument).fJobGrid.fSize then
    Begin
        aJobObj := TJobObj(TTSMDocument(fDocument).fJobGrid.At(theRow));
        if aJobObj <> Nil then
        begin
            CanSelectCell   :=  (aJobObj.fErrLineHdl <> NIL);
        end
        else begin
            CanSelectCell   :=  FALSE;
        end;
    end;
end;


{-----------------------------------+
|   SelectCell                      |
+-----------------------------------}
PROCEDURE TJobGridView.SelectCell(theCell: GridCell; extend, highlight, select: Boolean); OVERRIDE;
var theRow: Integer;
    aJobObj:        TJobObj;
    {-----------------------------------+
    |   MakeErrorDialog                 |
    +-----------------------------------}
    PROCEDURE MakeErrorDialog(theError: STR255);
```

```
    VAR
        aWindow:        TWindow;
        theDialog:      TDialogView;
        dismisser:      IDType;

    BEGIN
        aWindow := NewTemplateWindow(kPSErrorWindowID, NIL);
        theDialog := TDialogView(aWindow.FindSubView('PSDL'));
        theDialog.ParamTxt('^0', theError);
        aWindow.fTarget :=  TEvtHandler(theDialog);
        dismisser := theDialog.PoseModally;
        {$IFC qDebug}
        WriteLn('dismissed - ',dismisser);
        {$ENDC}
        aWindow.Close;
        aWindow.Free;
    END;


begin
    theRow  :=  theCell.v;
    inherited SelectCell(theCell,extend,highlight,select);
    if theRow <= TTSMDocument(fDocument).fJobGrid.fSize then
    Begin
        aJobObj := TJobObj(TTSMDocument(fDocument).fJobGrid.At(theRow));
        if aJobObj <> Nil then
        begin
            IF  (aJobObj.fErrLineHdl <> NIL) then
            begin
                MakeErrorDialog(concat('ERROR: ',aJobObj.fErrLineHdl^^));
            end;
        end;
    end;

end;


(***************************************************************************************)
(*      T H e a d G r i d V i e w                                                     *)
(***************************************************************************************)
{-----------------------------------+
|   GetText                         |
+-----------------------------------}
PROCEDURE THeadGridView.GetText (aCell: GridCell; VAR aString: Str255); OVERRIDE;

VAR
    theRow, theCol: INTEGER;
BEGIN
    aString :=  gHeadStrings[TTSMDocument(fDocument).fFileData.theMeasureSys];
END;

{-----------------------------------+
|   CanSelectCell                   |
+-----------------------------------}
FUNCTION THeadGridView.CanSelectCell(aCell: GridCell): Boolean; OVERRIDE;
BEGIN
    CanSelectCell   :=  FALSE;
END;



PROCEDURE TCALDocument.AddLocalSet(aSetName: STR255; aCalSetObj:    TCalSetObj);
VAR
```

```
    aCell:  GridCell;
begin
{$IFC qDebug}
WriteLn('local set added ',aSetName);
{$ENDC}
    aCell.h :=  1;
    aCell.v :=  1;
    aCalSetObj.fName     :=  aSetName;
    fLocalSets.InsertLast(aCalSetObj);
    fLocalcallistView.InsRowLast(1,16);
    TScroller(fLocalcallistView.fSuperview).AdjustScrollBars;

end;

PROCEDURE TCALDocument.AddRIPSet(aSetName: STR255; aCalSetObj:  TCalSetObj);
VAR
    aCell:  GridCell;
begin
{$IFC qDebug}
WriteLn('RIP set added ',aSetName);
{$ENDC}
    aCell.h :=  1;
    aCell.v :=  1;
    aCalSetObj.fName     :=  aSetName;
    fRIPSets.InsertLast(aCalSetObj);
    fRIPcallistView.InsRowLast(1,16);

    TScroller(fLocalcallistView.fSuperview).AdjustScrollBars;

end;


(*****************************************************************************************)
(*      T C a l L I S T V i e w                                                        *)
(*****************************************************************************************)
{-----------------------------------+
|   GetText                         |
+-----------------------------------}
PROCEDURE TcallistView.GetItemText (anItem: INTEGER; VAR aString: Str255); OVERRIDE;

VAR
    theList:        TList;

BEGIN

    if (fIdentifier = 'lcgd')
        then theList    :=  TCALDocument(fDocument).fLocalSets
        else theList    :=  TCALDocument(fDocument).fRIPSets;

    aString :=  TCalSetObj(theList.At(anItem)).fName;

END;

{-----------------------------------+
|   CanSelectCell                   |
+-----------------------------------}
FUNCTION TcallistView.CanSelectItem(anItem: INTEGER): Boolean; OVERRIDE;
BEGIN
    (*if (fIdentifier = 'lcgd')
    then    CanSelectItem   :=  TRUE
    else    CanSelectItem   :=  FALSE; *)
    CanSelectItem   :=  TRUE;
END;
```

```
{-----------------------------------+
!   SelectCell                      !
+-----------------------------------}
PROCEDURE TcallistView.SelectCell (theCell: GridCell;
                                   extend, highlight, select: BOOLEAN); OVERRIDE;
BEGIN
    INHERITED SelectCell(theCell,extend, highlight, select);
END;

{-----------------------------------+
!   DoMouseCommand                  !
+-----------------------------------}
FUNCTION  TcallistView.DoMouseCommand (VAR theMouse: Point; VAR info: EventInfo;
                                  VAR hysteresis: Point) : TCommand; OVERRIDE;

VAR
    whichPart:                  GridViewPart;
    aRow, aCol:                 INTEGER;
    aModCellSelectCommand:      TModCellSelectCommand;
    aRowSelectCommand:          TRowSelectCommand;
    aColumnSelectCommand:       TColSelectCommand;
    aVertexSelectCommand:       TVertexSelectCommand;
    aCell:                      GridCell;

BEGIN

    whichPart := IdentifyPoint (themouse, aRow, aCol);
    aCell.h := aCol;
    aCell.v := aRow;

    CASE whichPart OF
        inCell:
            BEGIN

NEW (aModCellSelectCommand);
            FailNIL (aModCellSelectCommand);
            aModCellSelectCommand.ICellSelectCommand (SELF, aCell, info.theShiftKey,
                info.theCmdKey);
            DoMouseCommand := aModCellSelectCommand;


            END;

        inRow:
            BEGIN
            NEW (aRowSelectCommand);
            FailNIL (aRowSelectCommand);
            aRowSelectCommand.IRowSelectCommand (SELF, aRow, info.theShiftKey,
                info.theCmdKey);
            DoMouseCommand := aRowSelectCommand;
            END;

        inColumn:
            BEGIN
            NEW (aColumnSelectCommand);
            FailNIL (aColumnSelectCommand);
            aColumnSelectCommand.IColSelectCommand (SELF, aCol, info.theShiftKey,
                info.theCmdKey);
            DoMouseCommand := aColumnSelectCommand;
            END;

        inVertex:
            BEGIN
            NEW (aVertexSelectCommand);
```

```
            FailNIL (aVertexSelectCommand);
            aVertexSelectCommand.IVertexSelectCommand (SELF, aRow, aCol,
                info.theShiftKey, info.theCmdKey);
            DoMouseCommand := aVertexSelectCommand;
            END;

        OTHERWISE
            DoMouseCommand := gNoChanges;
        END;
END;

FUNCTION TCalListView.Focus: Boolean; OVERRIDE;
var out:    boolean;
begin
    out :=  INHERITED Focus;
    Focus   :=  TRUE;          { only cared when command button was used to make first entry}
end;


(*****************************************************************************************)
(*      T M o d C e l l S e l e c t C o m m a n d                                         *)
(*****************************************************************************************)
FUNCTION TModCellSelectCommand.TrackMouse (aTrackPhase: TrackPhase;
                VAR anchorPoint, previousPoint, nextPoint: VPoint;
                mouseDidMove: BOOLEAN): TCommand; OVERRIDE;
var theCommand: TCommand;
    procedure countitems(anItem: Integer);
    begin
        TCALDocument(fGridView.fDocument).fLastItemSelected :=  anItem;
    end;
    procedure countripitems(anItem: Integer);
    begin
        TCALDocument(fGridView.fDocument).fLastRipItemSelected  :=  anItem;
    end;
BEGIN

    theCommand  :=  INHERITED TrackMouse (aTrackPhase,anchorPoint, previousPoint, nextPoint,
                    mouseDidMove);
    WITH fGridView DO
    BEGIN
        IF ((aTrackPhase = TrackRelease) and (gClickCount >= 2)
            and (fGridView.fIdentifier = 'lcgd') ) THEN
        BEGIN
            TCALDocument(fGridView.fDocument).fLocalCalListView.EachSelectedItemDo(countItems);
            theCommand  :=  fGridView.fDocument.DoMenuCommand(cbtmd);
        END;
        IF ((aTrackPhase = TrackRelease) and (gClickCount >= 2)
            and (fGridView.fIdentifier = 'rpgd') ) THEN
        BEGIN
            TCALDocument(fGridView.fDocument).fRIPCalListView.EachSelectedItemDo(countripItems);
            theCommand  :=  fGridView.fDocument.DoMenuCommand(cbtvr);
        END;
    END; (* with *)
    TrackMouse := theCommand;
END;

(*****************************************************************************************)
(*      T O u t l i n e d s c r o l l e r                                                 *)
(*****************************************************************************************)
{-----------------------------------+
|   Draw                            |
+-----------------------------------}
PROCEDURE TOutlinedScroller.Draw(area: Rect); OVERRIDE;
VAR pensize: POINT;
```

```
    viewSize:   Rect;
    itsAdorn:   CntlAdornment;
begin
    INHERITED Draw(area);
    pensize.v   :=  1;
    pensize.h   :=  1;
    viewSize.top:=  0;
    viewsize.left   :=  0;
    viewsize.bottom :=  fSize.v;
    viewsize.right  :=  fSize.h;
    itsAdorn    :=  [adnLineTop,adnLineLeft,adnLineBottom];
    Adorn(viewsize,pensize,itsAdorn);
end;

(*************************************************************************************)
(*      T S t r i p D i a l o g V i e w                                             *)
(*************************************************************************************)
{----------------------------------+
|   DoChoice                        |
+----------------------------------}

PROCEDURE TStripDialogView.DoChoice(origView: TView; itsChoice: INTEGER); OVERRIDE;
VAR
    setState:   Boolean;
BEGIN
    Inherited doChoice(origView,itsChoice);

    CASE itsChoice OF
    mCheckBoxHit:
    BEGIN
        if (origview.fIdentifier = 'reis')
        then begin
            setState    :=  Not TCheckBox(origview).IsOn;

            TControl(FindSubView('sdnt')).DimState(setState,true);
            TControl(FindSubView('idnt')).DimState(setState,true);
            TControl(FindSubView('ednt')).DimState(setState,true);
            TControl(FindSubView('sdst')).DimState(setState,true);
            TControl(FindSubView('idst')).DimState(setState,true);
            TControl(FindSubView('edst')).DimState(setState,true);
        end;
        if (origview.fIdentifier = 'unls')
        then begin
            setState    :=  Not TCheckBox(origview).IsOn;
            TControl(FindSubView('lant')).DimState(setState,true);
            TControl(FindSubView('last')).DimState(setState,true);
            TControl(FindSubView('lsst')).DimState(setState,true);
            TControl(FindSubView('lsnt')).DimState(setState,true);

        end;
    END;

    END;
END;
{----------------------------------+
|   EachEditText                    |
+----------------------------------}
(*PROCEDURE TStripDialogView.EachEditText (PROCEDURE DoToEditText (theEditText: TEditText)); OVERRIDE;

    {------------------------------+
    |   CheckSubView                |
    +------------------------------}
    PROCEDURE CheckSubView (theSubView: TView);
```

```
    BEGIN
        IF MEMBER(theSubView, TControl)
        THEN begin
            IF (MEMBER(theSubView, TEditText) and (not(TControl(theSubView).fDimmed)))
            then begin
                DoToEditText(TEditText(theSubView));
            end
            else begin
                theSubView.EachSubView(CheckSubView);
            end;
        end
        ELSE begin
            theSubView.EachSubView(CheckSubView);
        end;
    END;

BEGIN
    EachSubView(CheckSubView);
END;
*)
{-----------------------------------+
|   DoSelectEditText                 |
+-----------------------------------}
PROCEDURE TStripDialogView.DoSelectEditText (theEditText: TEditText; selectChars: BOOLEAN); OVERRIDE;

VAR
    itsWindow:      TWindow;

BEGIN

    IF theEditText <> fCurrentEditText THEN             { If we're not editing this view...       }
        IF (fCurrentEditText <> NIL) & NOT fCurrentEditText.StopEdit THEN
            CantDeselect(fCurrentEditText)
        ELSE
            BEGIN
            fCurrentEditText := theEditText;
            IF theEditText <> NIL THEN
            begin
                if (.not theEditText.fDimmed ) then
                begin
                    theEditText.StartEdit(selectChars, fTEView);
                end
                else begin
                    fCurrentEditText    :=  NIL;
                    itsWindow := GetWindow;             { Set the window's target, which sets    }
                    IF itsWindow <> NIL THEN
                        itsWindow.SetTarget(SELF);

                end;
            end
            ELSE
                BEGIN
                itsWindow := GetWindow;                 { Set the window's target, which sets    }
                IF itsWindow <> NIL THEN
                    itsWindow.SetTarget(SELF);
                END;
            END
    ELSE IF selectChars THEN                            { Make sure all the chars are selected. }
        theEditText.SetSelection(0, MAXINT, kRedraw);

END;


{*******************************************************************************************}
```

```
(*     T C a l S e l e c t D i a l o g V i e w                                          *)
(*************************************************************************************)
{----------------------------------+
|   Draw                           |
+----------------------------------}
PROCEDURE TCalSelectDialogView.Draw(area: Rect); OVERRIDE;
VAR pensize: POINT;
    viewSize:   Rect;
    itsAdorn:   CntlAdornment;
    aScroller: TScroller;
    procedure outline(theID: IDType);
    begin
        pensize.v     :=  1;
        pensize.h     :=  1;
        aScroller     :=  TScroller(FindSubView(theID));
        viewSize.top      :=  aScroller.fLocation.v - 1;
        viewsize.left     :=  aScroller.fLocation.h - 1;
        viewsize.bottom :=  aScroller.fLocation.v+aScroller.fSize.v + 1;
        viewsize.right  :=  aScroller.fLocation.h+aScroller.fSize.h + 1;
        itsAdorn      :=  [adnLineTop,adnLineLeft,adnLineBottom,adnLineRight];
        Adorn(viewsize,pensize,itsAdorn);
    end;

begin
{$IFC qDebug}
WriteLn('drawing');
{$ENDC}
    INHERITED Draw(area);
    outline('lcsc');
    outline('rpsc');
end;

FUNCTION  TCalSelectDialogView.HandleMouseDown (theMouse:           VPoint;
                                   VAR info:        EventInfo;
                                   VAR hysteresis:  Point;
                                   VAR theCommand:  TCommand): BOOLEAN; OVERRIDE;
var itwashandled:   boolean;
procedure deSelectItems(anItem: Integer);
var aCell:  GridCell;
BEGIN
    aCell.h := 1;
    aCell.v := anItem;

    TCALDocument(fDocument).fLocalCalListView.SelectItem
            (anItem,false,true,false);
    {TCALDocument(fDocument).fLocalCalListView.InvalidateCell(aCell);}
end;
procedure deSelectRipItems(anItem: Integer);
var aCell:  GridCell;
BEGIN
    aCell.h := 1;
    aCell.v := anItem;

    TCALDocument(fDocument).fRIPCalListView.SelectItem
            (anItem,false,true,false);
    {TCALDocument(fDocument).fRIPCalListView.InvalidateCell(aCell);}
end;
begin

    itwashandled:=  Inherited HandleMouseDown(theMouse,info,hysteresis,theCommand);


{$IFC qDebug}
WriteLn('mouse down - got it =',itwashandled);
```

```
{SENDC}
    if (not itwashandled) then
    begin
        TCALDocument(fDocument).fLocalCalListView.EachSelectedItemDo(deSelectItems);
        TCALDocument(fDocument).fRIPCalListView.EachSelectedItemDo(deSelectRipItems);
    end;

    HandleMouseDown := itwashandled;
end;


{********************************************************************************}
{*     T C a l D a t a D i a l o g V i e w                                      *}
{********************************************************************************}
PROCEDURE TCalDataDialogView.DoSetUpMenus; override;
begin
    inherited DoSetUpMenus;
    Enable(cRes3386,not fDisplayOnly);
    Enable(cRes2540,not fDisplayOnly);
    Enable(cRes1693,not fDisplayOnly);
    Enable(cRes1270,not fDisplayOnly);
    Enable(cRes635,not fDisplayOnly);
    Enable(cResOther,not fDisplayOnly);
end;

PROCEDURE TCalDataDialogView.DoChoice(origView: TView; itsChoice: INTEGER); OVERRIDE;
VAR aWindow:    TWindow;
    theDialog:  TDialogView;
    dismisser:  IDType;
    anItem:     Integer;
    lastItem:   Integer;
    theRes:     Longint;
    aStr:       STR255;

BEGIN
    CASE itsChoice OF
    mPopupHit:
    BEGIN
        anItem  :=  TChangeOPopUp(origView).GetCurrentItem;
        if (anItem = 6) then
        begin
            aWindow := NewTemplateWindow(kGetRezWindowID, NIL);
            theDialog := TDialogView(aWindow.FindSubView('DLOG'));
            aWindow.fTarget :=  TEvtHandler(theDialog);
            theDialog.SelectEditText('nrez',true);

            dismisser := theDialog.PoseModally;

            if (dismisser = 'btOK') then
            begin
                theRes  :=  TNumberText(theDialog.FindSubView('nrez')).GetValue;
                NumToString(theRes,aStr);

                TChangeOPopup(origView).SetItemText(6,aStr);

            end
            else begin
                lastItem    :=  TChangeOPopup(origView).fPreviousItem;

                TChangeOPopup(origView).SetCurrentItem(lastItem,true);
                TChangeOPopup(origView).fPreviousItem   :=  lastItem;
            end;

            aWindow.Close;
```

```
        end
        else begin
            aStr    :=  'Other…';
            TChangeOPopup(origView).SetItemText(6,aStr);

            Inherited doChoice(origView,itsChoice);
        end;
    END;
mEditTextHit:
    begin
        if not fDisplayOnly
        then Inherited doChoice(origView,itsChoice);
    end;

    OTHERWISE
        Inherited doChoice(origView,itsChoice);
    END;
END;

{-----------------------------------+
|   DoSelectEditText                |
+-----------------------------------}
PROCEDURE TCalDataDialogView.DoSelectEditText (theEditText: TEditText; selectChars: BOOLEAN); OVERRIDE;

VAR
    itsWindow:      TWindow;

BEGIN

    IF theEditText <> fCurrentEditText THEN             { If we're not editing this view…       }
        IF (fCurrentEditText <> NIL) & NOT fCurrentEditText.StopEdit THEN
            CantDeselect(fCurrentEditText)
        ELSE
            BEGIN
            fCurrentEditText := theEditText;
            IF theEditText <> NIL THEN
            begin
                if ( not fDisplayOnly) then
                begin
                    theEditText.StartEdit(selectChars, fTEView);
                end
                else begin
                    fCurrentEditText    :=  NIL;
                    itsWindow := GetWindow;             { Set the window's target, which sets   }
                    IF itsWindow <> NIL THEN
                        itsWindow.SetTarget(SELF);

                end;
            end
            ELSE
                BEGIN
                itsWindow := GetWindow;                 { Set the window's target, which sets   }
                IF itsWindow <> NIL THEN
                    itsWindow.SetTarget(SELF);
                END;
            END
    ELSE IF selectChars THEN                            { Make sure all the chars are selected. }
        theEditText.SetSelection(0, MAXINT, kRedraw);

END;
```

```
(*****************************************************************************************)
(*     T C a l S e t O b j                                                               *)
(*****************************************************************************************)

Procedure TCalSetObj.Init;
begin
    with fCalData do
    begin
        theName          :=  'FILM_2540_2.00_150';
        theMedia         :=  'FILM';
        theResolution    :=  2540;
        theExposureIntensity    :=  2.00;
        theLineScreen    :=  150;
        theCalPoint      :=  150.00;
        theCalFrom       :=  0.00;
        theCalTo         :=  0.00;
        theNegDot        :=  TRUE;
        theDMax          :=  0.00;

        theTheoreticals[ 0] :=  0.0;
        theTheoreticals[ 1] :=  0.02;
        theTheoreticals[ 2] :=  0.05;
        theTheoreticals[ 3] :=  0.07;
        theTheoreticals[ 4] :=  0.10;
        theTheoreticals[ 5] :=  0.15;
        theTheoreticals[ 6] :=  0.20;
        theTheoreticals[ 7] :=  0.25;
        theTheoreticals[ 8] :=  0.30;
        theTheoreticals[ 9] :=  0.35;
        theTheoreticals[10] :=  0.40;
        theTheoreticals[11] :=  0.45;
        theTheoreticals[12] :=  0.50;
        theTheoreticals[13] :=  0.55;
        theTheoreticals[14] :=  0.60;
        theTheoreticals[15] :=  0.65;
        theTheoreticals[16] :=  0.70;
        theTheoreticals[17] :=  0.75;
        theTheoreticals[18] :=  0.80;
        theTheoreticals[19] :=  0.85;
        theTheoreticals[20] :=  0.90;
        theTheoreticals[21] :=  0.93;
        theTheoreticals[22] :=  0.95;
        theTheoreticals[23] :=  0.98;
        theTheoreticals[24] :=  1.00;

        theActuals[ 0]   :=  0.0;
        theActuals[ 1]   :=  2;
        theActuals[ 2]   :=  5;
        theActuals[ 3]   :=  7;
        theActuals[ 4]   :=  10;
        theActuals[ 5]   :=  15;
        theActuals[ 6]   :=  20;
        theActuals[ 7]   :=  25;
        theActuals[ 8]   :=  30;
        theActuals[ 9]   :=  35;
        theActuals[10]   :=  40;
        theActuals[11]   :=  45;
        theActuals[12]   :=  50;
        theActuals[13]   :=  55;
        theActuals[14]   :=  60;
        theActuals[15]   :=  65;
        theActuals[16]   :=  70;
        theActuals[17]   :=  75;
        theActuals[18]   :=  80;
```

```
        theActuals[19]  :=  85;
        theActuals[20]  :=  90;
        theActuals[21]  :=  93;
        theActuals[22]  :=  95;
        theActuals[23]  :=  98;
        theActuals[24]  :=  100;

        theCalPointIDs[ 0]  :=  '    ';
        theCalPointIDs[ 1]  :=  'cd02';
        theCalPointIDs[ 2]  :=  'cd05';
        theCalPointIDs[ 3]  :=  'cd07';
        theCalPointIDs[ 4]  :=  'cd10';
        theCalPointIDs[ 5]  :=  'cd15';
        theCalPointIDs[ 6]  :=  'cd20';
        theCalPointIDs[ 7]  :=  'cd25';
        theCalPointIDs[ 8]  :=  'cd30';
        theCalPointIDs[ 9]  :=  'cd35';
        theCalPointIDs[10]  :=  'cd40';
        theCalPointIDs[11]  :=  'cd45';
        theCalPointIDs[12]  :=  'cd50';
        theCalPointIDs[13]  :=  'cd55';
        theCalPointIDs[14]  :=  'cd60';
        theCalPointIDs[15]  :=  'cd65';
        theCalPointIDs[16]  :=  'cd70';
        theCalPointIDs[17]  :=  'cd75';
        theCalPointIDs[18]  :=  'cd80';
        theCalPointIDs[19]  :=  'cd85';
        theCalPointIDs[20]  :=  'cd90';
        theCalPointIDs[21]  :=  'cd93';
        theCalPointIDs[22]  :=  'cd95';
        theCalPointIDs[23]  :=  'cd98';
        theCalPointIDs[24]  :=  'cd00';

        theSpotFuncLen      :=  0;
    end;

end;


(*****************************************************************************************)
(*      T C r e a t e C o m m a n d                                                      *)
(*****************************************************************************************)


Procedure TCreateCommand.Doit;      OVERRIDE;
var itempos:    integer;
begin

    itemPos     :=  TCALDocument(fChangedDocument).fLocalSets.fSize+1;
    fItemNum    :=  itemPos;
    TCALDocument(fChangedDocument).fLocalSets.InsertBefore(itemPos,fCalSetObj);
    TCALDocument(fChangedDocument).fLocalCalListView.InsItemLast (1);

end;

Procedure TCreateCommand.Undoit;    OVERRIDE;
begin
    fCalSetObj  :=  TCalSetObj(TCALDocument(fChangedDocument).fLocalSets.At(fItemNum));
    TCALDocument(fChangedDocument).fLocalSets.Delete(fCalSetObj);
    TCALDocument(fChangedDocument).fLocalCalListView.DelItemAt(fItemNum,1);

end;

Procedure TCreateCommand.Redoit;    OVERRIDE;
```

```
begin
    Doit;
end;

Procedure TCreateCommand.Commit;     OVERRIDE;
begin
    TCALDocument(fChangedDocument).fLocalSets.RemoveDeletions;
end;



(******************************************************************************)
(*      T R e m o v e C o m m a n d                                          *)
(******************************************************************************)


Procedure TRemoveCommand.Doit;       OVERRIDE;
begin
    fCalSetObj  :=  TCalSetObj(TCALDocument(fChangedDocument).fLocalSets.At(fItemNum));
    TCALDocument(fChangedDocument).fLocalSets.Delete(fCalSetObj);
    TCALDocument(fChangedDocument).fLocalCalListView.DelItemAt(fItemNum,1);

end;

Procedure TRemoveCommand.Undoit;     OVERRIDE;
begin
    TCALDocument(fChangedDocument).fLocalSets.InsertBefore(fItemNum,fCalSetObj);
    TCALDocument(fChangedDocument).fLocalCalListView.InsItemBefore (fItemNum,1);
end;

Procedure TRemoveCommand.Redoit;     OVERRIDE;
begin
    Doit;
end;

Procedure TRemoveCommand.Commit;     OVERRIDE;
begin
    fCalSetObj.Free;
    TCALDocument(fChangedDocument).fLocalSets.RemoveDeletions;
end;



(******************************************************************************)
(*      T M o d C a l C o m m a n d                                          *)
(******************************************************************************)


Procedure TModCalCommand.Doit;       OVERRIDE;
var localCalSetObj: TCalSetObj;
    aCell:          GridCell;
begin
    aCell.v :=  fItemNum;
    aCell.h :=  1;

    localCalSetObj  :=  fCalSetObj;
    fCalSetObj   :=  TCalSetObj(TCALDocument(fChangedDocument).fLocalSets.At(fItemNum));
    TCALDocument(fChangedDocument).fLocalSets.AtPut(fItemNum,localCalSetObj);
    TCALDocument(fChangedDocument).fLocalCalListView.InvalidateCell(aCell);
end;

Procedure TModCalCommand.Undoit;     OVERRIDE;
begin
    Doit;
```

```
end;

Procedure TModCalCommand.Redoit;    OVERRIDE;
begin
    Doit;
end;

Procedure TModCalCommand.Commit;    OVERRIDE;
begin
    fCalSetObj.Free;

end;









(*****************************************************************************************)
(*      T T S M V i e w                                                                  *)
(*****************************************************************************************)
PROCEDURE TTSMView.DoSetUpMenus; override;
VAR aJobGridView:   TJobGridView;
    numRows:        INTEGER;
begin
    inherited DoSetUpMenus;
    aJobGridView    :=TJobGridView(SELF.findSubView('jgrd'));
    numRows :=  aJobGridView.fNumOfRows;
    Enable(cCopyJobLog, (numRows<>0));
    Enable(cWriteJobLog, (numRows<>0));
end;

FUNCTION TTSMView.DoMenuCommand(aCmdNumber: CmdNumber): TCommand; override;

    PROCEDURE DoCopyJobLog;
    VAR aJobGridView:   TJobGridView;
        numRows:        INTEGER;
        TextLength:     LONGINT;
        TextPtr:        PTR;
        TextHandle:     HANDLE;
        aDest:          PTR;
        numchars:       INTEGER;
        aCell:          GridCell;
        aString:        STR255;
        tmpString:      STR255;
        jobNdx:         Integer;
        strTab,
        strLineFeed:        STRING[2];
        scrapInfo:      PScrapStuff;

        PROCEDURE AddToBuffer;
        BEGIN
            numchars    := Length(aString);
            BlockMove(source,aDest,numchars);       {move chars to buffer}
            aDest       := Ptr(ord(aDest)+numchars);
            TextLength  := TextLength+numchars;
        END;

        Function InsertTabs(theJobString: STR255): STR255;
        var outString: STR255;
```

```
      begin
         IF (theJobString <> '') then
         InsertTabs  :=  concat(
                           copy(theJobString,1,18),strTab,
                           copy(theJobString,19,18),strTab,
                           copy(theJobString,37,5),strTab,
                           copy(theJobString,43,5),strTab,
                           copy(theJobString,49,5),strTab,
                           copy(theJobString,55,8),strTab,
                           copy(theJobString,62,3),strTab,
                           copy(theJobString,65,5),strTab,
                           copy(theJobString,72,8),strLineFeed)
         else InsertTabs := '';
      end;


   BEGIN
      strLineFeed[0]  :=  chr(1);
      strLineFeed[1]  :=  chr(13);
      strTab[0]       :=  chr(1);
      strTab[1]       :=  chr(9);

      aJobGridView    :=TJobGridView(SELF.findSubView('jgrd'));
      numRows :=  TTSMDocument(SELF.fDocument).fJobGrid.fSize;
      aCell.h :=  1;
      aCell.v :=  1;
      jobNdx  :=  1;
      numChars    :=  0;

      While (jobNdx   <=  numRows) do
      begin
         aCell.v :=  jobNdx;
         aJobGridView.GetText(aCell,tmpString);
         aString :=  InsertTabs(tmpString);
         numChars    :=  numChars+length(aString);
         jobNdx  :=  jobNdx+1;
      end;

{$IFC qDebug}
WriteLn('numrows,knumchars = ',numrows,numchars);
{$ENDC}
      TextHandle  :=  NewHandle(numChars);

      FailNil(TextHandle);
      hLock(TextHandle);

      source      :=  Ptr(ORD(@aString)+1);
      aDest   :=  TextHandle^;
      TextPtr :=  TextHandle^;
      TextLength  :=  0;

      jobNdx  :=  1;

      While (jobNdx   <=  numRows) do
      begin
         aCell.v :=  jobNdx;
         aJobGridView.GetText(aCell,tmpString);
         aString :=  InsertTabs(tmpString);
         AddToBuffer;
         jobNdx  :=  jobNdx+1;
      end;

{$IFC qDebug}
WriteLn('textlength,handlesize = ',TextLength,GetHandleSize(TextHandle));
```

```
IF (TextLength <> GetHandleSize(TextHandle)) then
    ProgramBreak('text length and handle size not equal.');
{SENDC}
        FailOsErr(ZeroScrap);                        {clear out the scrap}
        FailOsErr(PutScrap(TextLength,'TEXT',TextPtr)); {and put on scrap}
        hUnLock(TextHandle);
        DisposHandle(TextHandle);

{$IFC qDebug}
        scrapInfo   :=  InfoScrap;
        WriteLn('scrapLength = ',scrapInfo^.scrapSize);
{SENDC}

        gClipWrittenToDeskScrap := TRUE;

    END;

    PROCEDURE DoWriteJobLog;
    VAR aJobGridView:   TJobGridView;
        numRows:        INTEGER;
        TextLength:     LONGINT;
        TextPtr:        PTR;
        TextHandle:     HANDLE;
        aDest:          PTR;
        numchars:       LONGINT;
        aCell:          GridCell;
        aString:        STR255;
        tmpString:      STR255;
        jobNdx:         Integer;
        strTab,
        strLineFeed:        STRING[2];
        where:          Point;
        prompt:         Str255;
        origName:       Str255;
        reply:          SFReply;
        bytesneeded:     LONGINT;
        bytesavail:     LONGINT;
        saveRefnum:     INTEGER;
        newrefnum:      INTEGER;
        SPrefnum:       INTEGER;
        bytes2copy:     INTEGER;
        err:            INTEGER;
        compTime:       Longint;
        tmpStr,tmpStr2: STR255;
        thedate:        DateTimeRec;
        theINTL:        IntlCHndl;

        Function InsertTabs(theJobString: STR255): STR255;
        var outString: STR255;
        begin
            IF (theJobString <> '') then
            InsertTabs  :=  concat(
                            copy(theJobString,1,18),strTab,
                            copy(theJobString,19,18),strTab,
                            copy(theJobString,37,5),strTab,
                            copy(theJobString,43,5),strTab,
                            copy(theJobString,49,5),strTab,
                            copy(theJobString,55,8),strTab,
                            copy(theJobString,62,3),strTab,
                            copy(theJobString,65,5),strTab,
                            copy(theJobString,72,8),strLineFeed)
           else InsertTabs := '';
        end;
```

```
BEGIN
    strLineFeed[0]  :=  chr(1);
    strLineFeed[1]  :=  chr(13);
    strTab[0]       :=  chr(1);
    strTab[1]       :=  chr(9);
    where.v :=  100;
    where.h :=  100;
    prompt  :=  'Select Destination';
    GetDateTime(compTime);
    theINTL := Intl0Hndl(GetResource('INTL', 0));
    FailResError;
    with theINTL^^ do
        begin
            shrtDateFmt := BOR(BAND(shrtDateFmt, 127), 64 + 32);
            timeCycle := 0; { 24 Hr clock }
        end;
    IUDatePString (compTime, shortDate, tmpStr, Handle(theINTL));
    ReleaseResource(Handle(theINTL));
    origName:=  concat(TTSMDocument(fDocument).fPrinterName,'Log',tmpStr);

    SFPutFile(where,prompt,origName,NIL,reply);
    {$IFC qDebug}
    WriteLn('reply info = ',reply.good,reply.vrefnum,reply.fName);
    {$ENDC}

    IF reply.good THEN
    BEGIN
        err :=  FSDelete(reply.fName,reply.vrefnum);    {remove any old}
    {$IFC qDebug}
    WriteLn('result of fsdelete ',err);
    {$ENDC}
        aJobGridView    :=TJobGridView(SELF.findSubView('jgrd'));
        numRows :=  TTSMDocument(SELF.fDocument).fJobGrid.fSize;
        aCell.h :=  1;
        aCell.v :=  1;
        jobNdx  :=  1;
        numChars    :=  0;

        While (jobNdx   <=  numRows) do
        begin
            aCell.v :=  jobNdx;
            aJobGridView.GetText(aCell,tmpString);
            aString :=  InsertTabs(tmpString);
            numChars    :=  numChars+length(aString);
            jobNdx  :=  jobNdx+1;
        end;

{$IFC qDebug}
WriteLn('numrows,knumchars = ',numrows,numchars);
{$ENDC}

        bytesneeded :=  numchars;
        FailOSErr(GetVol(NIL,saveRefnum));
        FailOSErr(SetVol(NIL,reply.vrefnum));
        FailOSErr(GetVInfo(0,NIL,newrefnum,bytesavail));
        FailOSErr(SetVol(NIL,saveRefnum));
    {$IFC qDebug}
    WriteLn('bytes needed - ',bytesneeded,'  avail - ', bytesavail);
    {$ENDC}
        IF bytesavail < bytesneeded THEN
            err :=  Alert(phNotEnoughSpace,NIL)
        ELSE BEGIN
    {$IFC qDebug}
```

```
        WriteLn('ready to create');
        {$ENDC}
                FailOSErr(Create(reply.fName,reply.vrefnum,'MPS ','TEXT'));
        {$IFC qDebug}
        WriteLn('done ready to open');
        {$ENDC}
                FailOSErr(FSOpen(reply.fName,reply.vrefnum,SPrefnum));

        {$IFC qDebug}
        WriteLn('open - initing');
        {$ENDC}
            source      := Ptr(ORD(@aString)+1);
            jobNdx  :=  1;
            While (jobNdx   <=  numRows) do
            begin
                aCell.v :=  jobNdx;
                aJobGridView.GetText(aCell,tmpString);
                aString :=  InsertTabs(tmpString);
                numchars    :=  Length(aString);
                FailOSErr(FSWrite(SPrefnum,numchars,source));
                jobNdx  :=  jobNdx+1;
            end;
        {$IFC qDebug}
        WriteLn('closing');
        {$ENDC}

                FailOSErr(FSClose(SPrefnum));
                FailOSErr(FlushVol(NIL,newrefnum));
            END;

        END;

    END;


begin
    IF aCmdNumber = cCopyJobLog then
    begin
        DoCopyJobLog;
        DoMenuCommand   :=  gNoChanges;
    end
    else begin
        IF aCmdNumber = cWriteJobLog then
        begin
            DoWriteJobLog;
            DoMenuCommand   :=  gNoChanges;
        end
        else begin
            DoMenuCommand   :=  inherited DoMenuCommand(aCmdNumber);
        end;
    end;
end;


PROCEDURE TTSMViewP.CalcMinSize (VAR minSize: VPoint); OVERRIDE;
VAR aJobGridView:   TJobGridView;
    aSize:          VPoint;
begin
        aJobGridView    :=TJobGridView(SELF.findSubView('jgrp'));
        aJobGridView.CalcMinSize(aSize);
        aSize.v :=  aSize.v+50; {pad for grid header}
        minSize :=  aSize;
end;
```

```
PROCEDURE TTSMView.Draw(area: Rect); OVERRIDE;
VAR
    itsQDExtent:        Rect;

BEGIN

    PenNormal;                              { Restore the pen state.                  }
END;

PROCEDURE TTSMView.DoChoice(origView: TView; itsChoice: INTEGER); OVERRIDE;
VAR anItem: INTEGER;

BEGIN
    CASE itsChoice OF
    mButtonHit:
    BEGIN
        IF (origView.fIdentifier = 'btcl') then     {feed and cut pressed }
        BEGIN
                TTSMDocument(fDocument).fNeedsClearLog := TRUE;
        end;
    END;

    OTHERWISE
        Inherited doChoice(origView,itsChoice);
    END;
END;


PROCEDURE TTSMView.SetMeasurementUnits;
begin
    ForceReDraw;
end;

PROCEDURE TTSMView.Activate(entering: Boolean); OVERRIDE;
begin
    inherited Activate(entering);
    IF (entering) then
    fDocument.fDocPrintHandler  :=  TTSMDocument(fDocument).fJobViewP.fPrintHandler;
end;

PROCEDURE TTSMView.Close; OVERRIDE;
VAR aSScrollBar:    TSScrollBar;
Begin
{$IFC qDebug}
WriteLn('TTSMView closing');
{$ENDC}
    WITH TTSMDocument(fDocument) DO
    begin
        fNeedsSpecialPap    :=  False;
        fSpecialPapPhase    :=  silentSPhase;
        {fNeedsJobUpdate    :=  False;}
        fNeedsCut       :=  False;
        fNeedsReload    :=  False;
        fNeedsClearLog  :=  False;
        fJobGrid.FreeList;
        fJobGrid    :=  NewList;
        fJobViewP   :=  NIL;
        fJobWindow  :=  NIL;
        fInsertNext :=  1;
        fMemGotFull     :=  false;
        fMemFullAck     :=  false;
        fTotalJobTime   :=  0;
        fFirstMacTime   :=  0;
        fFileSetter     :=  '';
```

```
    end;

    { need to remove dependent scroller from scroll bar list }
    aSScrollBar :=  TScroller(SELF.FindSubView('SCRL')).fScrollBars[h];
    aSScrollBar.fScrollers.Delete(aSScrollBar.fScrollers.First);

    IF ((TTSMDocument(fDocument).fPapPhase <> silentPhase)
        and (TTSMDocument(fDocument).fStatusWindow = NIL))
    then begin
        TTSMDocument(fDocument).fPapPhase   :=  closingPhase;
    end;
    inherited close;
end;

(*************************************************************************************)
(*      T S m a r t N u m b e r T e x t                                              *)
(*************************************************************************************)


FUNCTION  TSmartNumberText.DoKeyCommand (ch: Char; aKeyCode: INTEGER;
                                  VAR info: EventInfo): TCommand; OVERRIDE;
BEGIN
    IF (((ORD(ch) >= 48) and (ORD(ch) <= 57)) | (ch IN fControlChars)
        |  (ch = chEnter) | (ch = chReturn) | (ch = chTAB))
    then
        DoKeyCommand := INHERITED DoKeyCommand(ch, aKeyCode, info)
    else
    begin
        Sysbeep(5);
        DoKeyCommand    :=  gNoChanges;
    end;
END;

FUNCTION  TSmartNumberText.GetInchValue: LONGINT;
VAR theSys: INTEGER;
    theLength:      LONGINT;
begin
    theSys  :=TTSMDocument(fDocument).fFileData.theMeasureSys;
    theLength   :=  GetValue;
    IF theSys <> 0                  { if not inches, then convert }
    then begin
        theLength   :=  Round(theLength / gConversionTable[theSys]);
    end;
    GetInchValue    :=  theLength;
end;

PROCEDURE TSmartNumberText.SetInchValue (newValue: LONGINT; redraw: BOOLEAN);
VAR theSys: INTEGER;
begin
    theSys  :=TTSMDocument(fDocument).fFileData.theMeasureSys;
    IF theSys <> 0                  { if not inches, then convert }
        then newValue   :=  Round(newValue * gConversionTable[theSys]);
    SetValue(newValue,redraw);
end;


PROCEDURE TSmartNumberText.GetInchText (VAR theText: Str255);
VAR
    aString:        Str255;
    theValue:       LONGINT;
    conValue:       LONGINT;
    theSys: INTEGER;

BEGIN
```

```
    GetText(aString);
    theSys  :=TTSMDocument(fDocument).fFileData.theMeasureSys;
    IF theSys <> 0                  { if not inches, then convert }
    then begin
        StringToNum(aString, theValue);
        theValue    :=  Round(theValue / gConversionTable[theSys]);
        NumToString(theValue,aString);
    end;
    if aString = '' then aString := '0';
    theText :=  aString;
END;

PROCEDURE TSmartNumberText.SetInchText (theText: Str255; redraw: BOOLEAN);
VAR
    aString:        Str255;
    theValue:       LONGINT;
    conValue:       LONGINT;
    theSys: INTEGER;

BEGIN
    aString :=  theText;
    theSys  :=TTSMDocument(fDocument).fFileData.theMeasureSys;
    IF theSys <> 0                  { if not inches, then convert }
    then begin
        StringToNum(theText, theValue);
        theValue    :=  Round(theValue * gConversionTable[theSys]);
        NumToString(theValue,theText);
    end;
    if theText = '' then theText := '0';
    SetText(aString,redraw);
END;

PROCEDURE TSmartNumberText.SetMinMax (itsMinimum, itsMaximum: LONGINT);
begin
    fMinimum    :=  itsMinimum;
    fMaximum    :=  itsMaximum;
end;

PROCEDURE TSmartNumberText.SetMeasurementUnits;
VAR theValue:   LONGINT;
    theMinimum,
    theMaximum: LONGINT;
    theSys: INTEGER;
begin
    theSys      :=  fCurrentMeasurementSystem;
    theValue    :=  GetValue;       { in old units }
    theMinimum  :=  fMinimum;
    theMaximum  :=  fMaximum;
    IF theSys <> 0                  { if not inches, then convert }
    then begin
        theValue    :=  Round(theValue / gConversionTable[theSys]);
        theMinimum  :=  Round(theMinimum / gConversionTable[theSys]);
        theMaximum  :=  Round(theMaximum / gConversionTable[theSys]);
    end;
    theSys  :=  TTSMDocument(fDocument).fFileData.theMeasureSys;
    IF theSys <> 0                  { if not inches, then convert }
    then begin
        theValue    :=  Round(theValue * gConversionTable[theSys]);
        theMinimum  :=  Round(theMinimum * gConversionTable[theSys]);
        theMaximum  :=  Round(theMaximum * gConversionTable[theSys]);
    end;
    SetMinMax(theMinimum,theMaximum);
    SetValue(theValue,true);
    fCurrentMeasurementSystem   :=  theSys;
```

```
end;


(*********************************************************************************)
(*     T T S M C o n f i g V i e w                                              *)
(*********************************************************************************)


PROCEDURE TTSMConfigView.Draw(area: Rect); OVERRIDE;
VAR
    itsQDExtent:        Rect;

BEGIN

    PenNormal;                                  { Restore the pen state.                  }
END;

PROCEDURE TTSMConfigView.Activate(entering: Boolean); OVERRIDE;
begin
    inherited Activate(entering);
    if (entering) then
        fDocument.fDocPrintHandler  :=  fPrintHandler;
end;

PROCEDURE TTSMConfigView.DoChoice(origView: TView; itsChoice: INTEGER); OVERRIDE;
VAR anItem: INTEGER;
    aString:    STR255;
    theButton:  INTEGER;
BEGIN
    CASE itsChoice OF
    mRadioHit:
    BEGIN
        IF (origView.fIdentifier = 'msin')
            then theButton  :=  0
        else if (origView.fIdentifier ='mscm')
            then theButton  :=  1
        else if (origView.fIdentifier = 'mspc')
            then theButton  :=  2
        else if (origView.fIdentifier = 'mscr')
            then theButton  :=  3;

        TTSMDocument(fDocument).fFileData.theMeasureSys :=  theButton;

        SetMeasurementUnits;
        TTSMDocument(fDocument).UpDateStats;
        IF (TTSMDocument(fDocument).fJobWindow <> NIL) then
        begin
            TTSMView(TTSMDocument(fDocument).fJobWindow.FindSubView('TSMG')).SetMeasurementUnits;
        end;
    END;
    OTHERWISE
        Inherited doChoice(origView,itsChoice);
    END;
END;

PROCEDURE TTSMConfigView.SetMeasurementUnits;
VAR theUnits:   INTEGER;
    aString:    STR255;
begin
    theUnits    :=  TTSMDocument(fDocument).fFileData.theMeasureSys;
    TStaticText(FindSubView('runt')).SetText(gUnitTable[theUnits],true);
    TStaticText(FindSubView('funt')).SetText(gUnitTable[theUnits],true);
    TSmartNumberText(FindSubView('rlsz')).SetMeasurementUnits;
    TSmartNumberText(FindSubView('fdsz')).SetMeasurementUnits;
```

```
end;

PROCEDURE TTSMConfigView.Close; OVERRIDE;
Begin
    TTSMDocument(fDocument).fConfigWindow   :=  NIL;
    inherited close;
end;

(*****************************************************************************************)
(*      T T S M S t a t u s V i e w                                                      *)
(*****************************************************************************************)

PROCEDURE TTSMStatusView.DoChoice(origView: TView; itsChoice: INTEGER); OVERRIDE;
VAR anItem: INTEGER;

BEGIN
    CASE itsChoice OF
    mButtonHit:
    BEGIN
        IF (origView.fIdentifier = 'BTFC') then      {feed and cut pressed }
        BEGIN
                IF TNumberText(TTSMDocument(fDocument).fConfigWindow.FindSubView('fdsz')).Validate
                then begin
                    TTSMDocument(fDocument).fNeedsCut := TRUE;
                end
                else begin
                    Sysbeep(5);
                    TTSMDocument(fDocument).fConfigWindow.Select;
                    TNumberText(TTSMDocument(fDocument).
                        fConfigWindow.FindSubView('fdsz')).SetSelection(0,MAXINT,true);
                end;
        end
        else if (origView.fIdentifier = 'BTRL') then        {re-load pressed }
        begin
                IF TNumberText(TTSMDocument(fDocument).fConfigWindow.FindSubView('fdsz')).Validate
                    and TNumberText(TTSMDocument(fDocument).fConfigWindow.FindSubView('rlsz')).Validate
                then begin
                    TTSMDocument(fDocument).fNeedsReload := TRUE;
                end
                else begin
                    Sysbeep(5);
                    TTSMDocument(fDocument).fConfigWindow.Select;
                    IF TNumberText(TTSMDocument(fDocument).fConfigWindow.FindSubView('fdsz')).Validate
                    then  TNumberText(TTSMDocument(fDocument).
                        fConfigWindow.FindSubView('rlsz')).SetSelection(0,MAXINT,true)
                    else
                        TNumberText(TTSMDocument(fDocument).
                        fConfigWindow.FindSubView('fdsz')).SetSelection(0,MAXINT,true)
                end;
        end;
    END;

    mPopupHit:

        BEGIN
        WITH TTSMDocument(fDocument) DO
        BEGIN
            anItem  :=  TChangeOPopUp(origView).GetCurrentItem;
            CASE anItem OF
            cUSLetter:
                begin
                    fPageDivisor    :=  1100;
                    UpdateStats;
```

```
            end;

        cLetterSideways:
            begin
                fPageDivisor    :=  850;
                UpdateStats;
            end;

        cLetterExtra:
            begin
                fPageDivisor    :=  1200;
                UpdateStats;
            end;

        cLetterExtraSideways:
            begin
                fPageDivisor    :=  950;
                UpdateStats;
            end;

        cUSLegal:
            begin
                fPageDivisor    :=  1400;
                UpdateStats;
            end;

        cA4Letter:
            begin
                fPageDivisor    :=  1169;
                UpdateStats;
            end;

        cB5Letter:
            begin
                fPageDivisor    :=  984;
                UpdateStats;
            end;

        cTabloid:
            begin
                fPageDivisor    :=  1700;
                UpdateStats;
            end;
        END;
      END;
      END;

  OTHERWISE
      Inherited doChoice(origView,itsChoice);
  END;
END;


PROCEDURE TTSMStatusView.Draw(area: Rect); OVERRIDE;
VAR
  itsQDExtent:        Rect;

BEGIN

  PenNormal;                            { Restore the pen state.                }
{
  DrawSlider(fVmCurr, fVmMax, ... VmPictRect);
}
```

```
END;

PROCEDURE TTSMStatusView.Close; OVERRIDE;
Begin
    TTSMDocument(fDocument).fStatusWindow   :=  NIL;
    inherited close;
end;

(****************************************************************************************)
(*     T T C s P i c t u r e                                                            *)
(****************************************************************************************)
PROCEDURE TTCsPicture.Draw(area: Rect); OVERRIDE;
var r:              rect;
    radius:         integer;
    outerRadius:    integer;
    centerPt:       Point;
    centerPt2:      Point;
    theSPpercent:   longint;
    theTUpercent:   longint;
    theRollSize:    longint;

    Procedure DrawBB(theCenter: Point; theRadius: Integer; thePhase: Integer;
                    theOuterRadiusPercent: longint; drawsponly: Boolean;
                    theFeedPhase: Integer);
    Var circleRect: rect;
        startAngle: Integer;
        outerRadius: Integer;
        radMax:     Integer;
        feedRect:   rect;
    begin
        if theOuterRadiusPercent > 100 then theOuterRadiusPercent := 100;
        radMax  :=  18;
        PenNormal;
        PenSize(1,1);
        outerRadius :=  ((radMax-theRadius-2)*theOuterRadiusPercent div 100)+theRadius+2;
        IF (not drawsponly) then
        begin
            SetRect(circleRect,theCenter.h-radMax,theCenter.v-radMax,
                    theCenter.h+radMax,theCenter.v+radMax);
            EraseOval(circleRect);
            SetRect(circleRect,theCenter.h-outerRadius,theCenter.v-outerRadius,
                    theCenter.h+outerRadius,theCenter.v+outerRadius);
            PaintOval(circleRect);
            SetRect(feedRect,theCenter.h-outerRadius,theCenter.v-radMax,
                    theCenter.h+outerRadius,theCenter.v+radMax);
                    startAngle  :=  90*theFeedPhase;
            FrameArc(feedRect,startAngle,90);
            IF (theFeedPhase = 0)
                then moveto(theCenter.h,theCenter.v-radMax)
                else moveto(theCenter.h,theCenter.v+radMax);
            line(-4,0);

        end;
        SetRect(circleRect,theCenter.h-theRadius,theCenter.v-theRadius,
                theCenter.h+theRadius,theCenter.v+theRadius);
        InsetRect(circleRect,-2,-2);
        EraseOVal(circleRect);
        InsetRect(circleRect,1,1);
        FrameOval(circleRect);
        InsetRect(circleRect,1,1);
        startAngle  :=  45*(thePhase+1);
        PaintArc(circleRect,startAngle,90);
        PaintArc(circleRect,startAngle+180,90);
    end;
```

```
begin
    IF (not fDrawSpinnerOnly) then Inherited Draw(area);
    SetPt(centerPt,62,26);
    SetPt(centerPt2,62,26+136);

    IF TNumberText(TTSMDocument(fDocument).fConfigWindow.FindSubView('rlsz')).Validate
    then
        theRollSize :=  TSmartNumberText(TTSMDocument(fDocument).
                            fConfigWindow.FindSubView('rlsz')).GetInchValue
    else theRollSize    :=  1800;
    IF theRollSize <= 0 then theRollSize := 1800;
    theSPpercent := TTSMDocument(fDocument).fsupply div theRollSize;
    theTUpercent := TTSMDocument(fDocument).ftakeup div 360; {already 100 times too big}

    DrawBB(centerPt,6,fCassettePhase,theTUpercent,fDrawSpinnerOnly,0);
    DrawBB(centerPt2,6,fCassettePhase,theSPpercent,fDrawSpinnerOnly,1);
    fDrawSpinnerOnly    :=  false;
end;

(*****************************************************************************************)
(*      T T S 1 P i c t u r e                                                            *)
(*****************************************************************************************)
Procedure TTS1Picture.Draw(area: Rect); OVERRIDE;
var utilrect,
    vmrect,
    cachediskrect:  Rect;
    leftside,
    topside,
    width,
    height:     Integer;
    aDateTime:  LONGINT;

    Procedure DrawSlider(CurVal, MaxVal : LongInt; pRect : Rect);
    var aRect : Rect;

    Begin
        aRect := pRect;

        IF MaxVal = 0 then
        begin
            MaxVal := 1;
            CurVal := 0;
        end;
        with arect do
            Right := Left + (right-Left)*CurVal div MaxVal;

        PenSize(1,1);
        PenPat(white);
        InsetRect(pRect,1,0);
        paintRect(pRect);

        PenPat(black);
        paintRect(aRect);
        InsetRect(aRect,1,1);
        PenPat(gray);
        paintRect(aRect);

    End;

begin
    inherited Draw(area);
    leftside    :=  6;
    topside     :=  17;
    width       :=  100;
```

```
    height      :=  9;

    GetDateTime(aDateTime);      {get time now}
    aDateTime   :=  aDateTime - TTSMDocument(fDocument).fFirstMacTime;  {less start }
    TTSMDocument(fDocument).fUtil   :=  (100*TTSMDocument(fDocument).fTotalJobTime) div aDateTime;

    SetRect(utilrect,leftside,topside,leftside+width,topside+height);
    DrawSlider(MIN(TTSMDocument(fDocument).fUtil,100),100,utilrect);

    SetRect(VMRect,leftside,topside+54,leftside+width,topside+height+54);
    DrawSlider(TTSMDocument(fDocument).fVMUsed,TTSMDocument(fDocument).fVMTotal,VMRect);

    SetRect(cachediskrect,leftside,topside+108,leftside+width,topside+height+108);
    DrawSlider(TTSMDocument(fDocument).fDiskTotal-TTSMDocument(fDocument).fDiskFree,
    TTSMDocument(fDocument).fDiskTotal,
    cachediskrect);

end;

(*********************************************************************************)
(*     T T S M I n i t i a l i z e V i e w                                      *)
(*********************************************************************************)
PROCEDURE TTSMInitializeView.DoChoice(origView: TView; itsChoice: INTEGER); OVERRIDE;
VAR anItem: INTEGER;

BEGIN
    CASE itsChoice OF
    mButtonHit:
    BEGIN
        IF (origView.fIdentifier = 'cncl') then     {cancel button pressed }
        BEGIN
                TPapDocument(fDocument).fPAPPhase   :=  abortPhase;
        end;
    END;

    OTHERWISE
        Inherited doChoice(origView,itsChoice);
    END;
END;

Procedure TJobObj.Free; OVERRIDE;
begin
    if fErrLineHdl <> NIL
        then DisposHandle(Handle(fErrLineHdl));
    Inherited Free;
end;

(*
FUNCTION  TDebugDialogView.DoKeyCommand (ch: Char; aKeyCode: INTEGER;
                                VAR info: EventInfo): TCommand; OVERRIDE;
BEGIN
    { If we get this far, nobody's handled the Tab, Enter, or Return keys, so we will      }
{$IFC qDebug}
    IF ch = chTab THEN
        WriteLn('tab entered')
    ELSE IF (ch = chEnter) | (ch = chReturn) THEN
        WriteLn('enter or return hit')
    ELSE
        WriteLn('something else hit');
{$ENDC}


    IF ch = chTab THEN
        DoKeyCommand := HandleTab(SELF, info)
```

```
    ELSE IF (ch = chEnter) | (ch = chReturn) THEN
        DoKeyCommand := HandleCR(SELF, info)
    ELSE
        DoKeyCommand := INHERITED DoKeyCommand(ch, aKeyCode, info);
END;

FUNCTION  TDebugDialogView.CanDismiss (dismissing: IDType): BOOLEAN; OVERRIDE;
BEGIN
    CanDismiss := TRUE;
    IF (LONGINT(fCancelItem) = LONGINT(kNoIdentifier)) | (dismissing <> fCancelItem) THEN
        IF (fCurrentEditText <> NIL) & NOT fCurrentEditText.Validate THEN
            BEGIN
            CanDismiss := FALSE;
            CantDeselect(fCurrentEditText);
            {$IFC qDebug}
                WriteLn('said cant dismiss...');
            {$ENDC}
            END;
END;

FUNCTION TDebugDialogView.HandleCR (callingView: TView; VAR info: EventInfo): TCommand; OVERRIDE;
VAR
    fDefaultControl:    TControl;
    dontCare:           LONGINT;
BEGIN
    IF LONGINT(fDefaultItem) <> LONGINT(kNoIdentifier) THEN
    begin
    {$IFC qDebug}
    WriteLn('ok so far - calling candismiss');
    {$ENDC}
        IF CanDismiss(fDefaultItem) THEN
            BEGIN
    {$IFC qDebug}
    WriteLn('flash it sucker');
    {$ENDC}
            {FlashControl(TControl(FindSubView(fDefaultItem)));}
            DismissDialog(fDefaultItem);
            END;
    end;
    HandleCR := gNoChanges;
END;

FUNCTION  TDebugDialogView.PoseModally: IDType;

VAR
    itsWindow:      TWindow;

BEGIN
    itsWindow := GetWindow;
    {$IFC qDebug}
    WriteLn('pose it dude');
    {$ENDC}
    IF itsWindow <> NIL THEN
        BEGIN
        {itsWindow.fTarget  :=  TEvtHandler(SELF);}

        itsWindow.Open;

        fDismissed := FALSE;
        REPEAT
            gApplication.PollEvent;
        UNTIL fDismissed;
        PoseModally := fDismisser;
        END
```

```
    ELSE
        PoseModally := kNoIdentifier;
END;
*)

(*****************************************************************************************)
(*      T C h a n g e O P o p u p                                                      *)
(*****************************************************************************************)

PROCEDURE TChangeOPopUp.SetItemText (item: INTEGER; VAR theText: Str255);
var dummyArea: Rect;
BEGIN
    IF fMenuHandle <> NIL THEN
        setItem(fMenuHandle, item, theText);
    Draw(dummyArea);
END;

PROCEDURE TChangeOPopUp.SetCurrentItem (item: INTEGER; redraw: BOOLEAN); override;
begin
    fPreviousItem   :=  fCurrentItem;
    INHERITED SetCurrentItem(item,redraw);
end;



FUNCTION TCommandButton.DoMouseCommand (VAR theMouse: Point; VAR info: EventInfo;
                                VAR hysteresis: Point): TCommand; OVERRIDE;

BEGIN
    IF TestControl(fCMgrControl, theMouse) <> 0 THEN
    begin
        IF TrackControl(fCMgrControl, theMouse, NIL) <> 0 THEN
        begin
            if (fIdentifier = 'btcr')
            then begin
                DoMouseCommand := fDocument.DoMenuCommand(cbtcr);
            end
            else
            begin
                if ((fIdentifier = 'btdl') and (TCALDocument(fDocument).fLocalSets.fSize <> 0))
                then begin
                {$IFC qDebug}
                WriteLn('download avail');
                {$ENDC}

                    DoMouseCommand := fDocument.DoMenuCommand(cbtdl);
                end
                else
                DoMouseCommand := gNoChanges;
            end;
        end
        else begin
            DoMouseCommand := gNoChanges;
        end;
    end
    else begin
        DoMouseCommand := gNoChanges;
    end;
END {TCtlMgr.DoMouseCommand};
```

What is claimed is:

1. A method of calibrating output images from an image generating device, comprising the steps of:

providing input images, each including a plurality of requested image densities, each said input image being a function of controllable imaging parameters that affect image calibration;

reproducing said input images onto image bearing media;

measuring a density of each said requested image density of each said input image with a densitometer;

generating a plurality of calibration sets in accordance with said measuring step, each said calibration set corresponding to a variation between said requested image density and said respective measured density reading for each said input image at different values of said controllable imaging parameters; and converting a subsequent plurality of input images to a respective plurality of calibrated output images according to changes made to subsequent input images by said calibration sets.

2. The method as recited in claim 1, wherein said plurality of calibrated output images each are a function of said controllable imaging parameters, and each of said plurality of calibrated output images being programmable by at least one of said calibration sets.

3. The method as recited in claim 1, further comprises storing said calibration sets in a local memory medium.

4. The method as recited in claim 1, wherein said converting step further comprises converting either positive or negative sense uncalibrated input images to negative sense calibrated output images.

5. The method as recited in claim 1, wherein said converting step comprises converting either positive or negative sense uncalibrated input images to positive sense calibrated output images.

6. The method as recited in claim 1, wherein said step of converting further comprises programmably selecting a particular calibration set of said plurality of calibration sets to be used to convert one of said subsequent plurality of input images depending upon current settings of said controllable imaging parameters in said generating device.

7. A method of calibrating output images from an image generating device, comprising the steps of:

providing input images each having a set of requested image densities, wherein each image density is dependent upon controllable imaging parameters of each said input image;

reproducing said input images onto image bearing media;

measuring a density of each image density of each input image by a densitometer for selected values of said controllable imaging parameters;

generating a plurality of calibration sets corresponding to a variation between said requested image density and the density measured by said densitometer for each said input image at different values of said controllable imaging parameters; and mapping said input images through a transfer function process capable of transferring either positive or negative image densities of said input images to either positive or negative image densities of said output images.

8. A method of producing calibrated output images from an image generating device, comprising the steps of:

providing input images, each said image having a set of requested image density values, each image density value being dependent upon selected controllable imaging parameters;

reproducing said input images onto image bearing media;

measuring a density of each image density of each input image by a densitometer for selected values of said controllable imaging parameters;

generating a plurality of calibration sets corresponding to a variation between said requested image density and the density measured by said densitometer for each said input image at different values of said controllable imaging parameters;

mapping subsequent input images through a transfer function process to produce positive or negative sense image density values for any subsequent input image;

storing said calibration sets and said transfer function in a local memory medium;

inputting said subsequent input images, each said subsequent input image having a plurality of image densities; and converting said image densities of each said subsequent input image to respective image densities of said calibrated output images according to programmed retrieval of selected stored calibration sets and said transfer function.

9. The method as recited in claim 8, wherein said converting step further comprises applying said transfer function to at least one image density of each said subsequent input image to generate either positive or negative sense of said calibrated output image.

10. An apparatus for generating calibrated output images from a image generating device, comprising:

a means for converting an input image into a page description language, said input image including a plurality of image density values, each said image density value having a requested density value;

an image processor having a channel for receiving said page description language and converting said language into a representation of said input image;

a recorder connected to said image processor, for recording said representation onto image bearing media;

a densitometer for measuring a density of each said image density value of said recorded image;

a computer for receiving a plurality of programmed calibration sets, said sets including variations between density measured by said densitometer and corresponding requested density;

a selector accessed by said computer for receiving subsequent uncalibrated input images represented in said page description language, and for selecting a corresponding said calibration set stored in said computer to programmably adjust said uncalibrated input image to said calibrated output image; and mapping means for mapping either positive or negative sense representations of said subsequent uncalibrated input images through said image processor, and said recorder, to be output as said calibrated output images on said image bearing media.

11. The apparatus as recited in claim 10, wherein each said calibration set comprises means for calibrating image density values of said subsequent uncalibrated input images as a function of controllable imaging parameters.

12. The apparatus as recited in claim 10, wherein said image bearing media is paper.

13. The apparatus as recited in claim 10, wherein said image bearing media is film.

* * * * *